United States Patent [19]

Karamchetty

[11] Patent Number: 5,680,557
[45] Date of Patent: Oct. 21, 1997

[54] NATURAL COMPUTING SYSTEM

[75] Inventor: Somayajulu D. Karamchetty, Columbia, Md.

[73] Assignee: The United States of America as represented by the Secretary of the Army, Washington, D.C.

[21] Appl. No.: 197,787

[22] Filed: Feb. 16, 1994

[51] Int. Cl.$^6$ .................................................. G06F 3/14
[52] U.S. Cl. .......................... 395/334; 395/326; 395/333
[58] Field of Search ............................ 395/10, 11, 12, 395/13, 20, 21, 22, 700, 775, 155, 156, 157, 158, 159, 160, 161; 364/419.01

[56] References Cited

U.S. PATENT DOCUMENTS

| | | | |
|---|---|---|---|
| 4,866,634 | 9/1989 | Reboh et al. | 364/513 |
| 4,905,163 | 2/1990 | Garber et al. | 364/513 |
| 4,945,476 | 7/1990 | Bodick et al. | 364/413.02 |
| 4,965,741 | 10/1990 | Winchell et al. | 364/513 |
| 4,972,349 | 11/1990 | Kleinberger | 364/900 |
| 4,989,134 | 1/1991 | Shaw | 364/200 |
| 5,006,992 | 4/1991 | Skeirik | 364/513 |
| 5,008,853 | 4/1991 | Bly et al. | 364/900 |
| 5,136,686 | 8/1992 | Koza | 395/13 |
| 5,136,687 | 8/1992 | Edelman et al. | 395/22 |
| 5,276,881 | 1/1994 | Chen et al. | 395/700 |
| 5,343,554 | 8/1994 | Koza et al. | 395/13 |
| 5,371,675 | 12/1994 | Greif et al. | 364/419.1 |

*Primary Examiner*—Thomas G. Black
*Assistant Examiner*—Ruay Lian Ho
*Attorney, Agent, or Firm*—Freda L. Krosnick; Frank J. Dynda

[57] ABSTRACT

A natural computational system and environment replaces domain-specific conventional application programs by allowing the juxtaposition of text, graphs, tables, equations, and sketches while concurrently permitting the use of these computational features in calculations and other problem-solving procedures, allowing non-programmers to develop computational schemes and obtain solutions to domain problems in a natural manner, with little or no code development, using familiar representational schemes presented to the user with the same functionality as is provided by a textbook or handbook. Each of the features is made up of a plurality of objects in a hierarchical scheme which permits development and use of the features in a completely natural and flexible manner. The system and environment thus permits the development of electronic textbooks, handbooks, and catalogs in which the text and features are simultaneously displayed, but which permits interactive use of the features.

39 Claims, 170 Drawing Sheets

ABACUS
MULTIPLICATION TABLES
LOG TABLES
SLIDE RULES
CALCULATOR, MECHANICAL
CALCULATOR, ELECTRONIC

COMPUTERS
- MACHINE LANGUAGE
- ASSEMBLER
- FORTRAN
- BASIC
- COBOL
- SPREADSHEETS
- WORDPROCESSORS
- DATABASE/QUERY LANGUAGES
- SYMBOLIC LANGUAGES
- HYPERCARD/HYPERTEXT
- OBJECT ORIENTED PROGRAMMING

NATURAL COMPUTING

TIME

1990

EXAMPLE TABLE

| FLUID | VISCOSITY SSU | VELOCITY fps |
|---|---|---|
| DIESEL OIL | 32 | 30 |
| LUBE OIL | 1,000 | 12 |
| NO. C FUEL OIL | 7,000 | 7 |
| CASTOR OIL | 20,000 | 2 |
| CELLULOSE | 60,000 | 0.5 |

(REF: GARTMANN PAGE 6-46)

FIGURE 2

| GAS | V VOL, % | $T_c$ | V $T_c$ | $P_c$ | V $P_c$ |
|---|---|---|---|---|---|
| $C_2H_6$ | 14 | 550.09 | 77.01 | 708.3 | 99.16 |
| $CH_4$ | 85 | 343.5 | 292.00 | 673.1 | 572.19 |
| $N_2$ | 1 | 227.2 | 002.27 | 492.0 | 4.92 |
| | | FOR MIXTURE $T_c$ = 371.28 | | $P_c$ = 676.27 | |

126

(REF: GARTMANN PAGE 6-67)

FIGURE 6

130 — DISCHARGE COEFFICIENTS FOR QUADRANT-EDGE ORIFICES

| B | c' | K' | LIMITING $N_{Re}^*$ FOR CONSTANT COEFFICIENT# | |
|---|---|---|---|---|
| | | | LOWER | UPPER |
| 0.225 | 0.770 | 0.771 | 5,000 | 60,000 |
| 0.400 | 0.780 | 0.790 | 5,000 | 150,000 |
| 0.500 | 0.824 | 0.851 | 4,000 | 200,000 |
| 0.600 | 0.856 | 0.918 | 3,000 | 120,000 |
| 0.630 | 0.885 | 0.964 | 3,000 | 105,000 |

\* BASED ON PIPE DIAMETER AND VELOCITY

\# FOR A PRECISION OF ABOUT ± 0.5 PERCENT.

! CAN BE USED WITH CORNER TAPS, FLANGE TAPS, OR RADIUS TAPS (SOURCE: PERRY, PAGE 5-14, TABLE 5-3)

132 — CELL LABELLING TO DEVELOP GRAPH REPRESENTATION.

| | | | 14 | 133 |
|---|---|---|---|---|
| 11 | 12 | 13 | 14L | 14R |
| 21 | 22 | 23 | 24L | 25R |
| 31 | 32 | 33 | 34L | 35R |
| 41 | 42 | 43 | 44L | 45R |
| 51 | 52 | 53 | 54L | 55R |

141 TABLE 3-239. SATURATED MERCURY

| ABS PRESSURE, LB/SQ IN. p | TEMP, DEG F t | VOLUME CU FT/LB VAPOR vf | ENTHALPY, BTU/(LB) | | ENTROPY, BTU/(LB)(DEG R) | |
|---|---|---|---|---|---|---|
| | | | LIQUID hf | VAPOR hg | LIQUID sf | VAPOR sg |
| 0.4 | 402.3 | 114.5 | 13.81 | 141.9 | 0.02094 | 0.1696 |
| 0.6 | 426.1 | 78.23 | 14.70 | 142.3 | 0.02195 | 0.1660 |

142

(SOURCE: PERRY, PAGE 3-178)

FIGURE 10

191 — ORIGINAL TABLE

| FLUID | VISCOSITY SSU | VELOCITY fps |
|---|---|---|
| DIESEL OIL | 32 | 30 |
| LUBE OIL | 1,000 | 12 |
| NO. C FUEL OIL | 7,000 | 7 |
| CASTOR OIL | 20,000 | 2 |
| CELLULOSE | 60,000 | 0.5 |

192 DELETE THIS ROW

FIGURE 24

201 REPRESENTATION OF THE ORIGINAL TABLE

| p0 | p1 | p2 | p3 | p4 | p5 | p6 | p7 | p8 | p9 | p10 | p11 | p12 | p13 | p14 | p15 | p16 | p17 |
|----|----|----|----|----|----|----|----|----|----|-----|-----|-----|-----|-----|-----|-----|-----|
| 0  | 1  | 2  | 3  | 4  | 5  | 6  | 7  | 8  | 9  | 10  | 11  | 12  | 13  | 14  | 15  | 16  | 17  |
| 11 | 12 | 13 | 21 | 22 | 23 | 31 | 32 | 33 | 41 | 42  | 43  | 51  | 52  | 53  | 61  | 62  | 63  |

202 DELETED ROW AND POINTERS
p6 p7 p8
31 32 33

| p0 | p1 | p2 | p3 | p4 | p5 | | | | p9 | p10 | p11 | p12 | p13 | p14 | p15 | p16 | p17 |
|----|----|----|----|----|----|--|--|--|----|-----|-----|-----|-----|-----|-----|-----|-----|
| 0  | 1  | 2  | 3  | 4  | 5  | 6 | 7 | 8 | 9 | 10 | 11 | 12 | 13 | 14 | 15 | 16 | 17 |
| 11 | 12 | 13 | 21 | 22 | 23 | | | | 41 | 42 | 43 | 51 | 52 | 53 | 61 | 62 | 63 |

203 REPRESENTATION AFTER DELETING CELLS IN ROW

| p0 | p1 | p2 | p3 | p4 | p5 | p9 | p10 | p11 | p12 | p13 | p14 | p15 | p16 | p17 |
|----|----|----|----|----|----|----|-----|-----|-----|-----|-----|-----|-----|-----|
| 0  | 1  | 2  | 3  | 4  | 5  | 6  | 7   | 8   | 9   | 10  | 11  | 12  | 13  | 14  |
| 11 | 12 | 13 | 21 | 22 | 23 | 41 | 42  | 43  | 51  | 52  | 53  | 61  | 62  | 63  |

204 REPRESENTATION OF THE NEW TABLE

205 MEMORY

CELL INDEXES OF ORIGINAL TABLE / 206 COMPARISON TABLE

| 11 | 12 | 13 | 21 | 22 | 23 | 31 | 32 | 33 | 41 | 42 | 43 | 51 | 52 | 53 | 61 | 62 | 63 |
|----|----|----|----|----|----|----|----|----|----|----|----|----|----|----|----|----|----|
| 11 | 12 | 13 | 21 | 22 | 23 | 41 | 42 | 43 | 51 | 52 | 53 | 61 | 62 | 63 |    |    |    |

CELL INDEXES OF FINAL TABLE

320

| GRADE OF FUEL OIL | | FLASH POINT, DEG F | POUR POINT, DEG F | WATER AND SEDIMENT, % | CARBON RESIDUE ON 10% RESIDUUM, % | |
|---|---|---|---|---|---|---|
| NO. | DESCRIPTION | MIN | MAX | MAX | MAX | |
| 1 | DISTILLATION OIL INTENDED FOR VAPORIZING POT-TYPE BURNERS AND OTHER BURNERS REQUIRING THIS GRADE | 100 OR LEGAL | 0 | TRACE | 0.15 | |

321

322

| CELLS WITH NUMERICAL VALUE AND QUALIFIER | |
|---|---|
| NUMERICAL VALUE | INTEGER |
| QUALIFIER | CHARACTER STRING |

323

| MEMORY | | |
|---|---|---|
| 100 | OR LEGAL | 0 |
| TRACE | 90% POINT | |
| MAX | POUR POINT | |

FIGURE 40

| GRADE OF FUEL OIL | | CARBON RESIDUE ON 10% RESIDUUM, % | ASH % | DISTILLATION TEMP, DEG F | | |
|---|---|---|---|---|---|---|
| NO. | DESCRIPTION | | | 10% POINT | 90% POINT | END POINT |
| | | MAX | MAX | MAX | MAX | MAX |
| 1 | DISTILLATION OIL INTENDED FOR VAPORIZING POT-TYPE BURNERS AND OTHER BURNERS REQUIRING THIS GRADE | 0.15 | ... | 420 | ... | 625 |
325 ↖ (points to row 1)
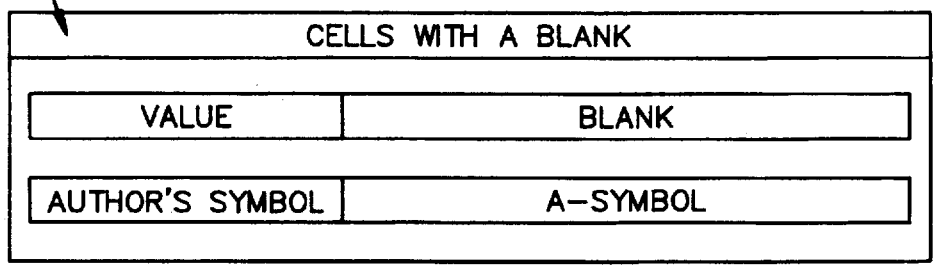
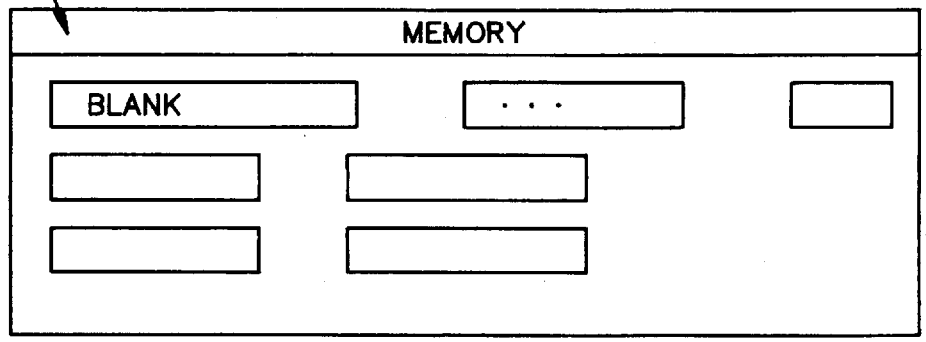
FIGURE 41

330 — DISCHARGE COEFFICIENTS FOR QUADRANT-EDGE ORIFICES

331 →

| B | C ! | K ! | LIMITING N* FOR $Re$ CONSTANT COEFFICENT # | | 332 |
|---|---|---|---|---|---|
| | | | LOWER | UPPER | |
| 0.225 | 0.770 | 0.771 | 5,000 | 60,000 | |
| 0.400 | 0.780 | 0.790 | 5,000 | 150,000 | |
| 0.500 | 0.824 | 0.851 | 4,000 | 200,000 | |
| 0.600 | 0.856 | 0.918 | 3,000 | 120,000 | |
| 0.630 | 0.885 | 0.964 | 3,000 | 105,000 | |

\* BASED ON PIPE DIAMETER AND VELOCITY
\# FOR A PRECISION OF ABOUT ± 0.5 PERCENT.
! CAN BE USED WITH CORNER TAPS, FLANGE TAPS, OR RADIUS TAPS (SOURCE: PERRY, PAGE 5-14, TABLE 5-3)

335 —

| CELLS WITH FOOT-NOTE SYMBOLS | |
|---|---|
| VALUE | CHARACTER STRING |
| FOOT-NOTE SYMBOL | A-SYMBOL |
| FOOT-NOTE | POINTER |

337 —

| MEMORY |
|---|
| B \| C \| K \| # \| * |
| BASED ON PIPE DIAMETER AND VELOCITY |
| FOR A PRECISION OF ABOUT ±0.5 PERCENT |

FIGURE 42

340 — TABLE 6-2 DETAILED REQUIREMENTS FOR FUEL OILS ᵃ

| GRADE OF FUEL OIL | | FLASH POINT, DEG F | POUR POINT, DEG F | WATER AND SEDIMENT, % | CARBON RESIDUE ON 10% RESIDUUM, % |
|---|---|---|---|---|---|
| NO. | DESCRIPTION | MIN | MAX | MAX | MAX |
| 1 | DISTILLATION OIL INTENDED FOR VAPORIZING POT-TYPE BURNERS AND OTHER BURNERS REQUIRING THIS GRADE | 100 OR LEGAL | 0 | TRACE | 0.15 |

341 — FOOT-NOTES: a .......

342 — TABLE CAPTION WITH FOOT-NOTES

| TABLE-CAPTION | CHARACTER STRING |
|---|---|
| CAPTION FOOT-NOTE SYMBOL | CHARACTER STRING |
| FOOT-NOTES | POINTER TO CHARACTER STRING |

343 — MEMORY

TABLE 6-2 DETAILED REQUIREMENTS FOR FUEL OILS | a

RECOGNIZING THE NECESSITY FOR LOW-SULFUR FUEL OILS USED IN CONNECTION WITH HEAT TREATMENT, NONFERROUS METAL, GLASS AND CERAMIC FURNACES, AND OTHER SPECIAL USES, A SULFUR REQUIREMENT MAY BE SPECIFIED IN ACCORDANCE WITH THE FOLLOWING TABLE: ...

FIGURE 43

350 — TABLE 9-10. A.S.T.M. DETAILED REQUIREMENTS FOR FUEL OIL*

| FUEL OIL GRADE | DESCRIPTION AND REQUIREMENTS FOR USE | FLASH POINT, DEG F (DEG C) | POUR POINT, DEG F (DEG C) | WATER AND SEDIMENT, VOL % | CARBON RESIDUE ON 10% BOTTOMS, % |
|---|---|---|---|---|---|
| | | MIN | MAX | MAX | MAX |
| NO. 1 | A DISTILLATE OIL INTENDED FOR VAPORIZING POT-TYPE BURNERS AND OTHER BURNERS REQUIRING THIS GRADE OF FUEL | 100 OR LEGAL (38) | 0 | TRACE | 0.15 |

(SOURCE: PERRY, CHEMICAL ENGINEERS' HANDBOOK, 5TH ED., PAGE 9-9, TABLE 9-10)

351
| TABLE HEADER CELL WITH MULTIPLE VALUES ||
|---|---|
| VALUE-PRIMARY | CHARACTER STRING |
| VALUE-PARENTHETICAL | CHARACTER STRING |

352
| TABLE HEADER CELL WITH MULTIPLE VALUES ||
|---|---|
| VALUE-PRIMARY | NUMBER |
| VALUE-PARENTHETICAL | NUMBER |

354
| MEMORY |
|---|
| FLASH POINT DEG F |
| FLASH POINT (DEG C) |
| 100 |
| 38 |

FIGURE 44

360 — TABLE 10-13. PANEL COILS IMMERSED IN LIQUID. OVERALL AVERAGE HEAT-TRANSFER COEFFICIENTS U EXPRESSED IN B.T.U./(HR) (SQ.FT) (DEG F)*

| HOT SIDE | COLD SIDE | CLEAN SURFACE COEFFICIENTS | | DESIGN COEFFICIENTS, CONSIDERING USUAL FOULING IN THIS SERVICE | |
|---|---|---|---|---|---|
| | | NATRAL CONVECTION | FORCED CONVECTION | NATRAL CONVECTION | FORCED CONVECTION |
| HEATING STEAM | APPLICATIONS: WATERY SOLUTION | 250-500 | 300-550 | 100-200 | 150-275 |
| ... | ... | ... | ... | ... | ... |

PERRY: CHEMICAL ENGINEERS' HANDBOOK, 5TH ED., PAGE 10-41.

361 — TABLE CELLS WITH RANGE OF VALUES

| VALUE-ONE | NUMBER |
|---|---|
| VALUE-TWO | NUMBER |

362 — MEMORY

| 250 | 500 | 300 | 550 |
|---|---|---|---|
| 100 | 200 | 150 | 275 |

| FLUID | VISCOSITY SSU | VELOCITY fps |
|---|---|---|
| DIESEL OIL | 32 | 30 |
| LUBE OIL | 1,000 | 12 |
| NO. C FUEL OIL | 7,000 | 7 |
| CASTOR OIL | 20,000 | 2 |
| CELLULOSE | 60,000 | 0.5 |

371

| DISPLAY FORMAT OF A TABLE-TYPE ||
|---|---|
| ATTRIBUTE | VALUE(S) |
| EDGE THICKNESS | 0, 1, 2, 3, ... |
| VERTICAL LINES | 0, 1, 2, 3, ... |
| SIAMESE CELLS | 0, 1, 2, 3, ... |
| TABLE HEADER | FONT NAME<br>FONT SIZE<br>FONT STYLE |
| CELL MARGINS<br>NORTH<br>EAST<br>SOUTH<br>WEST | 0, 1, 2, 3, 4, ...<br>0, 1, 2, 3, 4, ...<br>0, 1, 2, 3, 4, ...<br>0, 1, 2, 3, 4, ... |
| NUMBERS<br>SIGNF DEC. DIGITS | 0, 1, 2, 3, 4, ... |
| ... | ... |

FIGURE 47

| ACTION | FEATURES | EDIT |
|---|---|---|
| ▍INTERACTIVE-USE▍ | TEXT | UNDO |
| PROGRAM USE | EQUATIONS | CUT |
| SETUP | ▍TABLES▍ | COPY |
| OPTIONS | SPREADSHEET-STRIPS | PASTE |
| . . . | GRAPHS | CLEAR |
| | UNIT-STRIPS | . . . |
| | . . . | |

| P, V, T RELATIONSHIP FOR GAS X |||
|---|---|---|
| TEMPERATURE | PRESSURE | VOLUME |
| DEG F | PSIA | CFT |
| 100 | 25.4 | 2.36 |
| [150] | [34.7] | [2.15] |
| 200 | 46.9 | 2.01 |
| 250 | 54.8 | 1.96 |

IN → TEMPERATURE = 150 DEG F

OUT → PRESSURE = 34.7 PSIA
VOLUME = 2.15 CFT

FIGURE 48

| ACTION | FEATURES | EDIT |
|---|---|---|
| SHOW | TEXT | UNDO |
| INTERACTIVE-USE | EQUATIONS | CUT |
| PROGRAM USE | TABLES | COPY |
| SETUP | SPREADSHEET-STRIPS | PASTE |
| OPTIONS | GRAPHS | CLEAR |
| . . . | UNIT-STRIPS | . . . |
|  | . . . |  |

| CAPTION |
|---|
| COLUMN HEADINGS (1 TO n) |
| UNITS (1 TO n) |
| ROWS (1 TO m) |
| VALUE ARRAY |

| P, V, T RELATIONSHIP FOR GAS X ||| 
|---|---|---|
| TEMPERATURE | PRESSURE | VOLUME |
| DEG F | PSIA | CFT |
| 100 | 25.4 | 2.36 |
| 150 | 34.7 | 2.15 |
| 200 | 46.9 | 2.01 |

FIGURE 50A

500 → VISCOSITY OF FLUIDS

| FLUID VELOCITY | VISCOSITY SSU | fps |
|---|---|---|
| DIESEL OIL | 32 | 30 |
| LUBE OIL | 1,000 | 12 |
| NO. C FUEL OIL | 7,000 | 7 |
| CASTOR OIL | 20,000 | 2 |
| CELLULOSE | 60,000 | 0.5 |

```
[TABLE:
[TABLE-CLASS:  TABLE-C1]
[TABLE-ID:  TABLE 1] [TABLE-CAPTION:  "VISCOSITY OF FLUIDS"]
[TABLE-HEADER-CELL:  COUNT:  3] [TABLE-HEADER-ROWS:  1, TABLE-
   HEADER-COLUMNS:  3]
[TABLE-HEADER-CELL-SEQUENCE:  11, 12, 13]
[TABLE-HEADER-CELLS:   [11 [CELL-TYPE:  TITLE, STRING] [VALUE:
   "FLUID"]]
          [21:  [CELL-TYPE:  TITLE, STRING, UNITS, STRING] [VALUE:  "VISCOSITY",
   "SSU"]]
   [31:  [CELL-TYPE:  TITLE, STRING, UNITS, STRING] [VALUE:  "VELOCITY",
   "FPS"]]
[TABLE-BODY-CELL-COUNT:  15] [TABLE-BODY-ROWS:  5, TABLE-BODY-
   COLUMNS:  3]
[TABLE-BODY-CELL-SEQUENCE:  11, 12, 13, 21, 22, 23, 31, 32, 33, 41,
   42, 43, 51, 52, 53]
[TABLE-BODY-CELLS:  [11:  [CELL-TYPE:  VALUE, STRING] ["DIESEL OIL"]]
  [12:   [CELL-TYPE:   VALUE, NUMBER] [32]]
  [13:   [CELL-TYPE:   VALUE, NUMBER] [30]]
  [21:   [CELL-TYPE:   VALUE, STRING] ["LUBE OIL"]]
  [22;   [CELL-TYPE:   VALUE, NUMBER] [1,000]]
  [23:   [CELL-TYPE:   VALUE, NUMBER] [12]]
                      ...
  [51:   [CELL-TYPE:   VALUE, STRING] ["CELLULOSE"]]
  [52:   [CELL-TYPE:   VALUE, NUMBER] [60,000]]
  [53:   [CELL-TYPE:   VALUE, NUMBER] [0.5]]
                                         ]    ]
```

FIGURE 500

STANDARD WEEKLY TABLE BLANK

| SUN | MON | TUE | WED | THU | FRI | SAT |
|-----|-----|-----|-----|-----|-----|-----|
|     |     |     |     |     |     |     |
|     |     |     |     |     |     |     |
|     |     |     |     |     |     |     |
|     |     |     |     |     |     |     |
|     |     |     |     |     |     |     |
|     |     |     |     |     |     |     |
|     |     |     |     |     |     |     |

FIGURE 50R

STANDARD MONTHLY TABLE BLANK

| JAN | FEB | MAR | APR | MAY | JUN | JUL | AUG | SEP | OCT | NOV | DEC |
|-----|-----|-----|-----|-----|-----|-----|-----|-----|-----|-----|-----|
|     |     |     |     |     |     |     |     |     |     |     |     |
|     |     |     |     |     |     |     |     |     |     |     |     |
|     |     |     |     |     |     |     |     |     |     |     |     |
|     |     |     |     |     |     |     |     |     |     |     |     |
|     |     |     |     |     |     |     |     |     |     |     |     |
|     |     |     |     |     |     |     |     |     |     |     |     |

FIGURE 50S

| TABLE-PACK-1: THERMAL PROPERTIES |||
|---|---|---|
| TABLE-4 = T, P, V RELATIONSHIP |||
| TABLE-3 = T, P, V RELATIONSHIP |||
| TABLE-2 = T, P, V RELATIONSHIP |||
| TABLE-1 = T, P, V RELATIONSHIP |||
| TEMPERATURE | PRESSURE | VOLUME |
| 100 | 25.4 | 2.36 |
| 150 | 34.7 | 2.15 |
| 200 | 46.9 | 2.01 |
| 250 | 54.8 | 1.96 |

FIGURE 50T

| NUMBER | CAPTION | PAGE |
|--------|---------|------|
| 2-1 | RELATIVE BENEFITS OF TECHNOLOGY IMPROVEMENTS | 2-4 |
| 3-1 | NATURAL GAS RECIPROCATING ENGINE MANUFACTURERS—UNITED STATES | 3-3 |
| 3-2 | TYPICAL HIGH-EFFICIENCY GENERATOR CHARACTERISTICS | 3-4 |
| 3-3 | GAS TURBINE MANUFACTURERS — UNITED STATES | 3-9 |
| 3-4 | AVAILABLE PRIME MOVERS LISTED BY SIZE (KW) | 3-16 |
| 3-5 | AVAILABLE PRIME MOVERS LISTED BY NET HEAT RATE (BTU/KWH) | 3-22 |
| 3-6 | AVAILABLE PRIME MOVERS LISTED BY TOTAL HEAT RECOVERY POTENTIAL | 3-28 |
| 3-7 | TOTAL INSTALLED COSTS FOR ENGINE AND TURBINE GENERATOR SETS INCLUDING BASIC HEAT RECOVERY EQUIPMENT AND GRID CONNECTION EQUIPMENT | 3-35 |

FIGURE 50U

BUILD GRAPH FROM A TABLE OF VALUES

| ACTION | FEATURES |
|---|---|
| SHOW | TEXT |
| INTERACTIVE-USE | EQUATIONS |
| PROGRAM USE | TABLES |
| SETUP | SPREADSHEET-STRIPS |
| OPTIONS | GRAPHS |
| . . . | UNIT-STRIPS |
| | . . . |

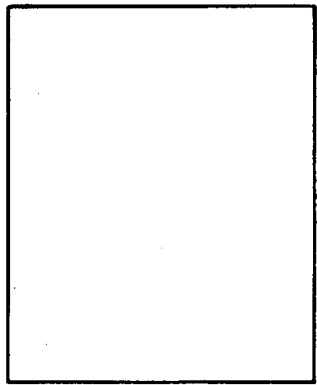
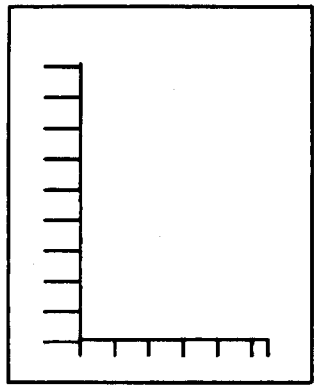
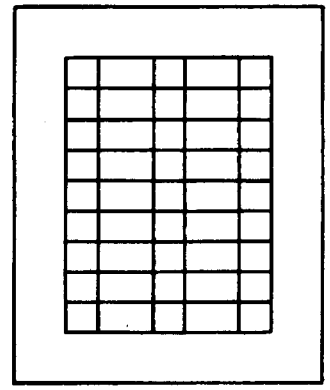
PLAIN PAPER LAYER      SCALE LAYER      GRID LINE LAYER
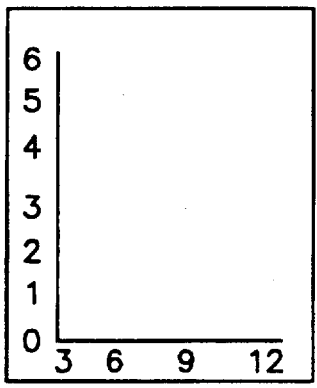
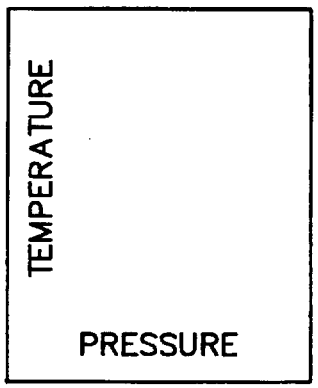
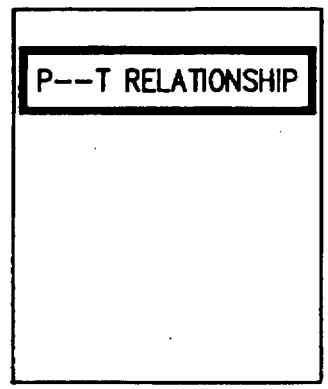
VALUE LABEL LAYER    AXIS LABEL LAYER    CAPTION LAYER
FIGURE 58

GRAPH REPRESTENTATION

STRUCTURE:

GRAF-TYPE
    GRAF-NAME
    PAPER-LAYER
    SCALE-LAYER
    GRID-LAYER
    VALUE-LABELS (X, Y)
    ORIGIN (X, Y)
    AXES-LABELS (X, Y)
    CAPTION-LAYER
    GRAPH-NUMBER
    GRAPH-LAYER
    CURSOR-LAYER
    PROPERTY-WINDOW-LAYER
    MAGNIFIER
    TEXT-NOTES
    LINE-STYLE
    POINT-STYLE(S)
    OTHER

CONSTRUCTORS
CREATE
MODIFY
ERASE
FILL
INSTANTIATE
PRINT
PLOT
COPY
ZOOM (IN, OUT)

FIGURE 59A

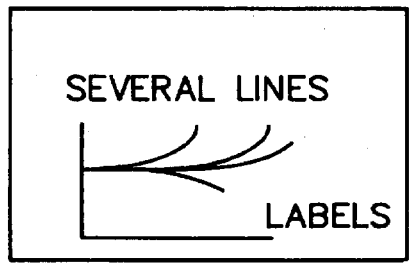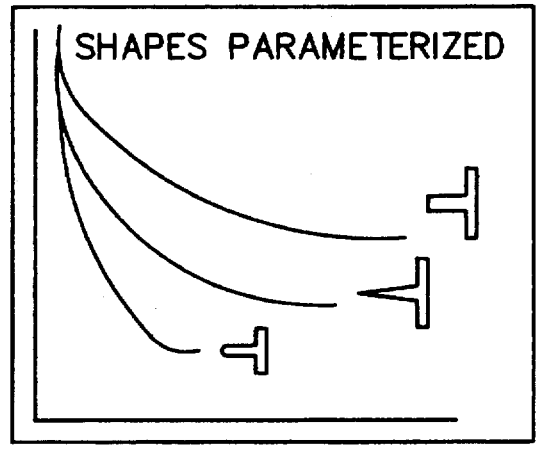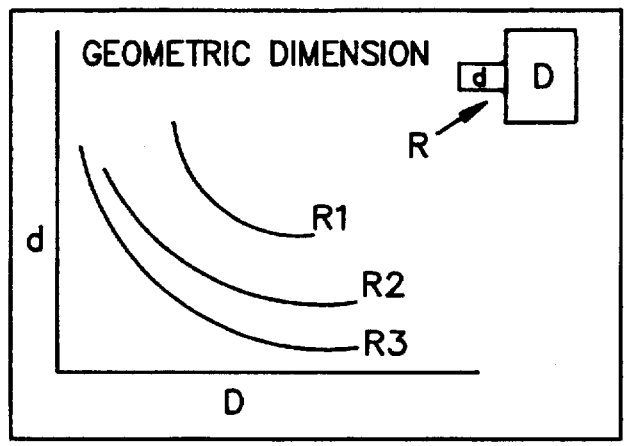
FIGURE 59B

CURSOR CAN LOCK ON CURVE 1
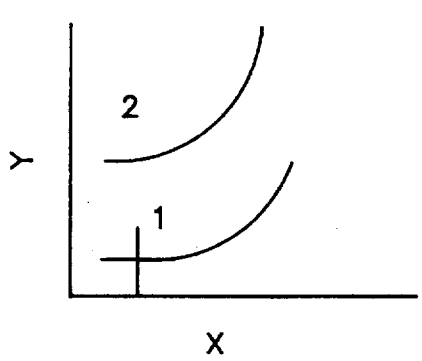
CURSOR CAN LOCK ON CURVE 2
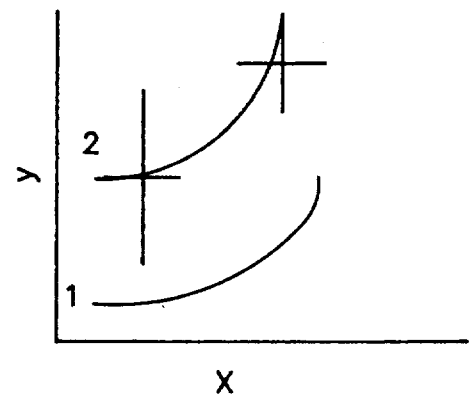
CURSOR CAN PROVIDE X-INTERCEPT
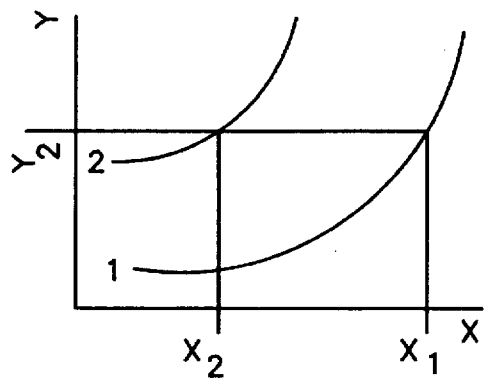
CURSOR CAN PROVIDE Y-INTERCEPT
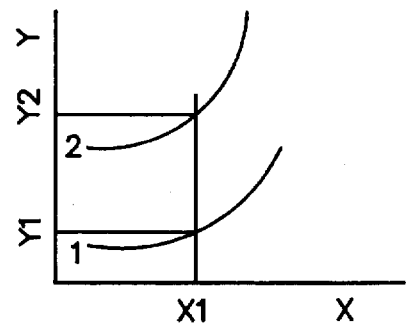
FIGURE 59C

| ACTION | FEATURES | ... |
|---|---|---|
| SHOW | TEXT | |
| INTERACTIVE-USE | EQUATIONS | |
| PROGRAM USE | TABLES | |
| SETUP | SPREADSHEET-STRIPS | |
| OPTIONS | GRAPHS | |
| ... | UNIT-STRIPS | |
| | ... | |

| EQUATION | $S = S_o + V_{av}\, t$ |
|---|---|

| NOTATION | |
|---|---|
| S | DISTANCE AT TIME t |
| $S_o$ | DISTANCE AT TIME o |
| $V_{av}$ | AVERAGE VELOCITY |
| t | TIME |

| UNITS | |
|---|---|
| S | METERS |
| $S_o$ | METERS |
| $V_{av}$ | METERS PER SECOND |
| t | SECONDS |

| PREDEFINED CONSTANTS | |
|---|---|
| S | ! |
| $S_o$ | ! |
| $V_{av}$ | ! |
| t | ! |

FIGURE 60

| ACTION | FEATURES | ... |
|---|---|---|
| SHOW | TEXT | |
| INTERACTIVE–USE | EQUATIONS | |
| PROGRAM USE | TABLES | |
| SETUP | SPREADSHEET–STRIPS | |
| OPTIONS | GRAPHS | |
| . . . | UNIT–STRIPS | |
| | . . . | |

| EQUATION | $S = S_o + V_{av} t$ | | | | | |
|---|---|---|---|---|---|---|
| VARIABLES & OPERATORS | S | = | $S_o$ | + | $V_{av}$ | * | t |
| VALUES | ? | | 60 | | 3.3 | | 4.0 |
| RESULT | 192 | | | | | | |

FIGURE 61

| ACTION | FEATURES |
|---|---|
| SHOW | TEXT |
| INTERACTIVE-USE | EQUATIONS |
| PROGRAM USE | TABLES |
| SETUP | SPREADSHEET-STRIPS |
| OPTIONS | GRAPHS |
| . . . | UNIT-STRIPS |
| | . . . |

| EQUATION | |
|---|---|
| | |

| NOTATION | |
|---|---|
| | |
| | |
| | |
| | |

| UNITS | |
|---|---|
| | |
| | |
| | |
| | |

| PREDEFINED CONSTANTS | |
|---|---|
| | |
| | |
| | |
| | |

FIGURE 62

| ACTION | FEATURES | EDIT |
|---|---|---|
| SHOW | TEXT | UNDO |
| INTERACTIVE-USE | EQUATIONS | CUT |
| PROGRAM USE | TABLES | COPY |
| SETUP | SPREADSHEET-STRIPS | PASTE |
| OPTIONS | GRAPHS | CLEAR |
| TRACE | UNIT-STRIPS | . . . |
| JUSTIFY | PROCEDURE | . . . |

| VARIABLES | PREDEFINED CONSTANTS | UNITS |
|---|---|---|
| $S_0$ | 40 | METERS |
| $V_0$ | 5 | METERS PER SECOND |
| $a$ | 4 | METERS PER SECOND$^2$ |

| ACTION | FEATURES | EDIT | BUILD |
|---|---|---|---|
| SHOW | TEXT | UNDO | REARRANGE |
| INTERACTIVE-USE | EQUATIONS | CUT | ... |
| PROGRAM USE | TABLES | COPY | ... |
| SETUP | SPREADSHEET-STRIPS | PASTE | ... |
| OPTIONS | GRAPHS | CLEAR | ... |
| ... | UNIT-STRIPS | ... | |
| | ... | | |

| | 1 | 2 | 3 | 4 | 5 | 6 | 7 | 8 | | ... | n | |
|---|---|---|---|---|---|---|---|---|---|---|---|---|
| | Y | = | m | · | x | + | c | | | | | EQUATION |
| | | | 1.3 | | | | 25.9 | | | | | CONSTANTS |
| | LB | | LB/FT | | FT | | LB | | | | | UNITS |

- NUMBER OF ITEMS
  - n
  - VALUES

- CONSTANTS
  - m
  - c

- OPTIONS
  - EXPLICIT
  - SHOW OPERATION
  - HIDE OPERATOR
    AS In $Y = m x + c$
    * IS HIDDEN
  - HIDE LINES, BOXES

- GENERAL EQUATION

- INSTANTIATION
    $y1 = m x1 + c$ $a = b z + c$

FIGURE 66

USE OF AN EQUATION

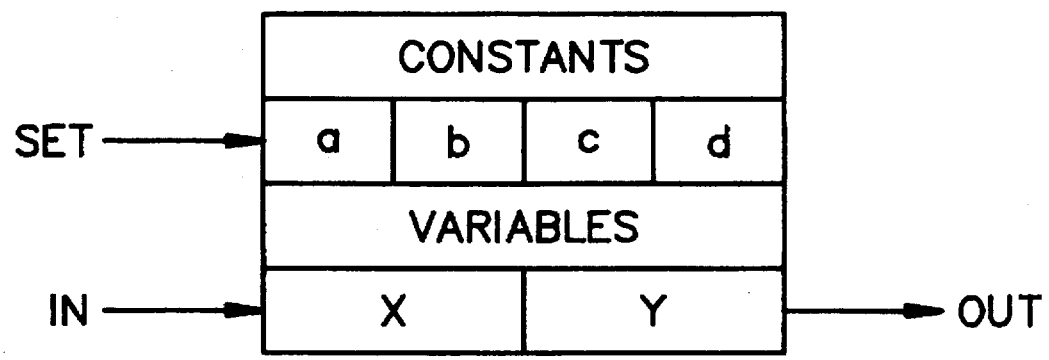
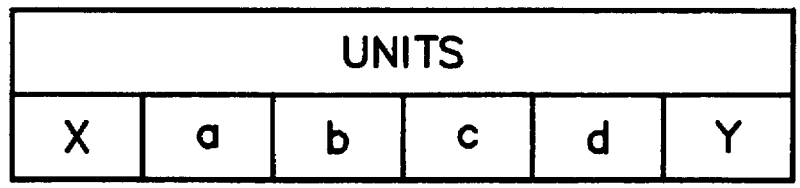
FIGURE 67B

ADJACENCY LISTS:

| ACTION | FEATURES | EDIT |
|---|---|---|
| SHOW | TEXT | UNDO |
| INTERACTIVE-USE | EQUATIONS | CUT |
| PROGRAM USE | TABLES | COPY |
| SETUP | SPREADSHEET-STRIPS | PASTE |
| OPTIONS | GRAPHS | CLEAR |
| . . . | UNIT-STRIPS | . . . |
|  | WORKSHEET |  |

SPECIFY COLUMNS

| 1 | 2 | 3 | 4 | ... | n |
|---|---|---|---|---|---|
| COMPONENT | MOLECULAR WEIGHT | MOLE | MOLE | LHV | BTU |
|  |  | % | LB | BTU/LB |  |
| CH4<br>C2H6<br>INPUT | 16.042 | 86.0<br>8.6<br>INPUT |  |  |  |

CONNECTIONS TO TABLE d.5.4

FORMULA
ELEMENT IN COL 2*
ELEMENT IN COL 3

FIGURE 71

ESTIMATING COLLEGE COSTS

|  |  | EXAMPLE |
|---|---|---|
| STEP 1: | NUMBER OF YEARS ATTENDING COLLEGE | 4 |
| STEP 2: | ENTER HALF OF STEP 1 | 2 |
| STEP 3: | NUMBER OF YEARS BEFORE STARTING COLLEGE: | 10.0 |
| STEP 4: | ADD STEPS 2 AND STEP 3: | 12.0 |
| STEP 5: | CURRENT ANNUAL COLLEGE COST: * | $10,000 |
|  | (PUBLIC SCHOOL AVERAGE COST = $4,800 TO $5,500) | |
|  | (PRIVATE SCHOOL AVERAGE COST = $11,000 TO $17,200) | |
| STEP 6: | CURRENT TOTAL COLLEGE COST: | |
|  | (MULTIPLY STEP 8 TIMES STEP 6) | $40,000 |
| STEP 7: | COLLEGE INFLATION FACTOR (FROM TABLE d.5.1): ** | 2.010 6% |
| STEP 8: | ESTIMATE FUTURE ANNUAL COSTS: | |
|  | (MULTIPLY STEP 7 TIMES STEP 6) | $80,400 |
| STEP 9: | PRESENT VALUE FACTOR (FROM TABLE d.5.2): *** | 0.400 8% |
| STEP 10: | LUMP SUM NEEDED TODAY: | |
|  | (MULTIPLY STEP 8 TIMES STEP 9) | $32,160 |
| STEP 11: | (DIVIDE STEP 8 BY 1,000) | 80.40 |
| STEP 12: | PRESENT VALUE FACTOR (FROM TABLE d.5.2): *** | 4.160 8% |
| STEP 13: | MONTHLY SAVINGS NEEDED STARTING TODAY: | |
|  | (MULTIPLY STEP 12 TIMES STEP 11) | $334 |

* COLLEGE COSTS VARY WIDELY. CHECK WITH THE COLLEGE OF YOUR CHOICE FOR CURRENT TOTAL ANNUAL COSTS FOR MORE ACCURATE CALCULATIONS.

** COLLEGE COSTS HAVE BEEN INCREASING FASTER THAN THE GENERAL INFLATION RATE. THIS MAY NOT BE TRUE IN THE FUTURE.

*** THE SAME AFTER-TAX EXPECTED RETURN ON COLLEGE SAVINGS/ INVESTMENTS SHOULD BE USED IN TABLES d.5.2 AND .3. REMEMBER THAT LONG TERM BEFORE-TAX STOCK MARKET RETURNS HAVE AVERAGED ONLY ABOUT 10%.

FIGURE 72A

TABLE d.5.1
STEP 4: COLLEGE COST INFLATION RATE

| YEARS | 4% | 6% | 8% | 10% | 12% |
|---|---|---|---|---|---|
| 4 | 1.17 | 1.26 | 1.36 | 1.46 | 1.57 |
| 6 | 1.27 | 1.42 | 1.59 | 1.77 | 1.97 |
| 8 | 1.37 | 1.59 | 1.85 | 2.14 | 2.48 |
| 10 | 1.48 | 1.79 | 2.16 | 2.59 | 3.11 |
| 12 | 1.60 | 2.01 | 2.52 | 3.14 | 3.90 |
| 14 | 1.73 | 2.26 | 2.94 | 3.80 | 4.89 |
| 16 | 1.87 | 2.54 | 3.43 | 4.59 | 6.13 |
| 18 | 2.03 | 2.85 | 4.00 | 5.56 | 7.69 |
| 20 | 2.19 | 3.21 | 4.66 | 6.73 | 9.65 |

TABLE d.5.2: LUMP SUM
STEP 4: AFTER-TAX YIELD ON SAVINGS

| YEARS | 5% | 6% | 8% | 10% | 12% | 14% |
|---|---|---|---|---|---|---|
| 4 | 0.82 | 0.79 | 0.74 | 0.68 | 0.64 | 0.59 |
| 6 | 0.75 | 0.70 | 0.63 | 0.56 | 0.51 | 0.46 |
| 8 | 0.68 | 0.63 | 0.54 | 0.47 | 0.40 | 0.35 |
| 10 | 0.61 | 0.56 | 0.46 | 0.39 | 0.32 | 0.27 |
| 12 | 0.56 | 0.50 | 0.40 | 0.32 | 0.26 | 0.21 |
| 14 | 0.51 | 0.44 | 0.34 | 0.26 | 0.20 | 0.16 |
| 16 | 0.46 | 0.39 | 0.29 | 0.22 | 0.16 | 0.12 |
| 18 | 0.42 | 0.35 | 0.25 | 0.18 | 0.13 | 0.09 |
| 20 | 0.38 | 0.31 | 0.21 | 0.15 | 0.10 | 0.07 |

FIGURE 72B

| TABLE d.5.3: MONTHLY SAVINGS/$1,000 OF FUTURE NEED |||||||
|---|---|---|---|---|---|---|
| STEP 4: AFTER-TAX YIELD ON SAVINGS |||||||
| YEARS | 5% | 6% | 8% | 10% | 12% | 14% |
| 4  | 18.86 | 18.49 | 17.75 | 17.03 | 16.33 | 15.66 |
| 6  | 11.94 | 11.57 | 10.87 | 10.19 | 9.55 | 8.94 |
| 8  | 8.49 | 8.14 | 7.47 | 6.84 | 6.25 | 5.70 |
| 10 | 6.44 | 6.10 | 5.47 | 4.88 | 4.35 | 3.86 |
| 12 | 5.08 | 4.76 | 4.16 | 3.62 | 3.13 | 2.70 |
| 14 | 4.12 | 3.81 | 3.25 | 2.75 | 2.31 | 1.94 |
| 16 | 3.41 | 3.11 | 2.58 | 2.13 | 1.74 | 1.41 |
| 18 | 2.86 | 2.58 | 2.08 | 1.67 | 1.32 | 1.04 |
| 20 | 2.43 | 2.16 | 1.70 | 1.32 | 1.01 | 0.77 |

FIGURE 72C

| COMP | MOLE WGT | MOLE % | LB | LHV BTU/LB | BTU | LB AIR PER LB FUEL | LB AIR |
|------|----------|--------|------|------|------|------|------|
| CH4  | 16.042 | 86.0 | 1,379.6 | 21,500 | 29,654,500 | 17.195 | 23,720 |
| C2H6 | 30.068 | 8.6  | 258.6   | 20,420 | 5,280,100  | 15.899 | 4,110 |
| C3H8 | 44.094 | 1.3  | 57.3    | 19,940 | 1,142,400  | 15.246 | 874 |
| H2   | 2.016  | 1.5  | 3.0     | 51,620 | 154,900    | 34.246 | 103 |
| CO2  | 44.010 | 2.6  | 114.4   | —      | —          | —      | — |
|      |        |      | 1,812.9 |        |            |        | 28,807 |

FIGURE 73

TABLE d.5.4

PROPERTIES USED TO PREDICT HEATING VALUES AND AIR REQUIREMENTS FOR GASEOUS FUELS

| GAS | FORMULA | MOLECULAR WEIGHT | HEAT OF COMBUSTION | | LB PER LB OF COMBUSTIBLES |
|---|---|---|---|---|---|
| | | | GROSS | NET | |
| CARBON MONOXIDE | CO | 28.01 | 4,347 | 4,347 | 2,462 |
| HYDROGEN | H2 | 2.016 | 61,095 | 51,623 | 34,267 |
| METHANE | CH4 | 16.042 | 23,875 | 21,495 | 17,195 |
| ETHANE | C2H6 | 30.068 | 22,323 | 20,418 | 15,899 |
| PROPANE | C3H8 | 44.094 | 21,669 | 19,937 | 15,246 |
| n-BUTANE | C4H10 | 58.12 | 21,321 | 19,678 | 14,984 |
| n-PENTANE | C5H12 | 72.146 | 21,095 | 19,507 | 15,323 |
| n-HEXANE | C6H14 | 86.172 | 20,966 | 19,415 | 15,238 |
| ETHYLENE | C2H4 | 28.052 | 21,636 | 20,275 | 14,807 |
| PROPYLENE | C3H6 | 42.078 | 21,048 | 19,687 | 14,807 |
| BUTYLENE | C4H8 | 56.104 | 20,854 | 19,493 | 14,807 |
| BENZENE | C6H6 | 78.108 | 18,184 | 17,451 | 13,297 |
| TOULENE | C7H8 | 92.134 | 18,501 | 17,672 | 13,503 |
| p-XYLENE | C8H10 | 106.16 | 18,633 | 17,734 | 13,663 |
| ACETYLENE | C2H2 | 26.036 | 21,502 | 20,769 | 13,297 |
| NAPHTHALENE | C10H8 | 128.164 | 17,303 | 16,708 | 12,932 |
| AMMONIA | NH3 | 17.032 | 9,667 | 7,985 | 5,998 |
| HYDROGEN SULFIDE | H2S | 34.076 | 7,097 | 6,537 | 6,005 |

FIGURE 74

(A) SPREADSHEET
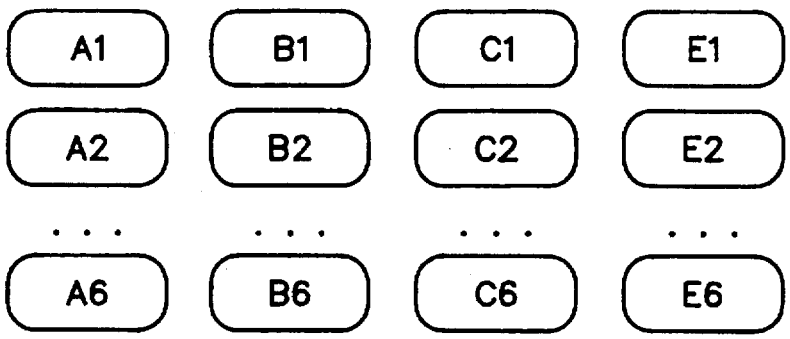
(B) CELL LABELS FOR GRAPH-THEORETIC REPRESENTATION
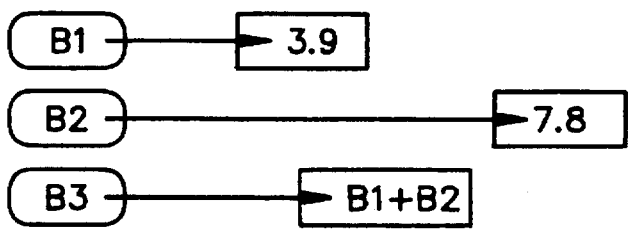
(C) SPREADSHEET CELLS CONNECTED TO CELL VALUES
FIGURE 76

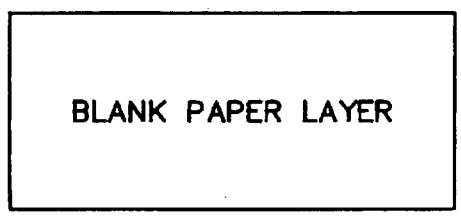
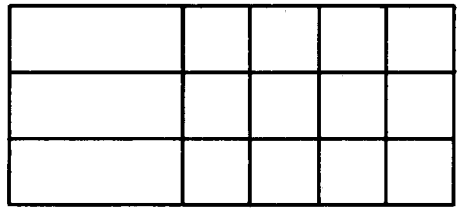
BLANK PAPER LAYER
GRID-LINE LAYER
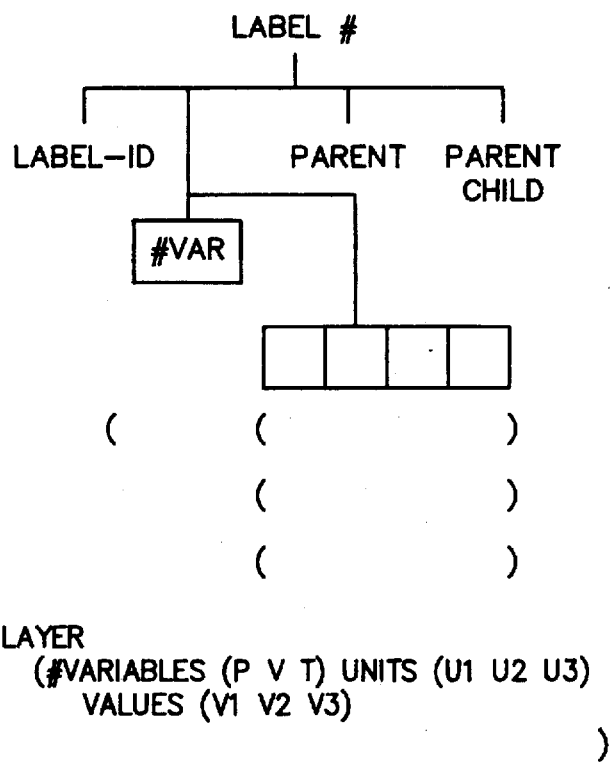
LABEL LAYER
FIGURE 77

| ACTION | FEATURES |
|---|---|
| SHOW | TEXT |
| INTERACTIVE-USE | EQUATIONS |
| PROGRAM USE | TABLES |
| SETUP | SPREADSHEET-STRIPS |
| OPTIONS | GRAPHS |
| . . . | UNIT-STRIPS |
|  | . . . |

| UNIT IN |  | CONVERSION FACTOR | UNIT OUT |
|---|---|---|---|
| DAYS | = | 86,400 | SECONDS |

FIGURE 78

| UNITS IN | | CONVERSION FACTOR | UNITS OUT |
|---|---|---|---|
| DAYS | = | 86,400 | SECONDS |
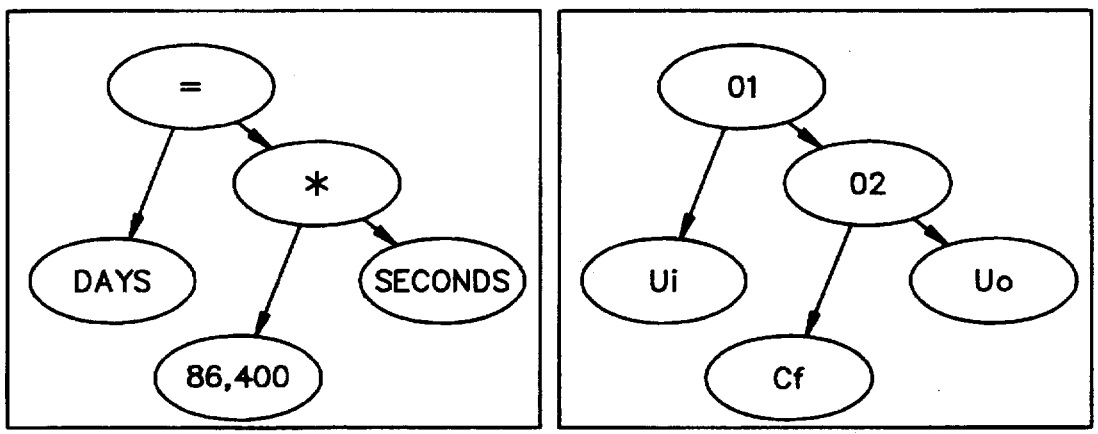
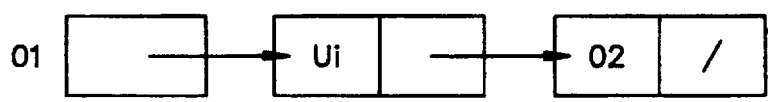
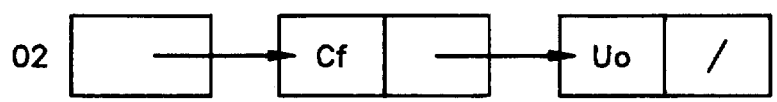
FIGURE 82

TESTING THE ARITHMETIC VALUE
OF AN EXPRESSION

| EXPRESSION | | |
|---|---|---|
| + | 0 | − |
| A1 | A2 | A3 |

(A)

TESTING A STRING

| EXPRESSION | | |
|---|---|---|
| YES | NO | MAYBE |
| A1 | A2 | A3 |

(B)

TESTING THE LOGICAL VALUE
OF AN EXPRESSION

| EXPRESSION | | |
|---|---|---|
| T | F | U |
| R1 | R2 | R3 |

```
CLASS NAME:    IF

SUBCLASS NAME:   IF_ARITHMETIC

STRUCTURE:   CONDITIONAL-EXPRESSION

RESULT-POSITIVE

RESULT-NEGATIVE

RESULT-ZERO
```

$$32 X^5 - 64 X + 31 = 0 \quad (1)$$

$$X = (32 X^5 + 31) / 64 \quad (2)$$

(a)

| # FIELD | VALUE | PRINT-INFO | LOCATION |
|---|---|---|---|
| 1 | ------ | ---- | ① |
| 2 | JOHN SMITH, ETC... | LINE WIDTH, ETC.. | ② |
| 3 | .... | ... | ... |

(b)

LISP REPRESENTATION OF TABLE ( ROW-1   ROW-2   ROW-3   ...... )

( (JOHN SMITH  ETC..)  (LINE WIDTH, ..)  (LOCATION)  )

FIGURE 95

VALUES OF THE CRITICAL CONSTANTS $T_C$ AND $P_C$ FOR INDIVIDUAL GASES ARE GIVEN IN TABLE 6-3, PHYSICAL CONSTANTS OF GASES, PAGE 6-75. AS AN EXAMPLE, $T_R$ AND $P_R$ FOR A GAS MIXTURE WITH A VOLUMETRIC COMPOSITION OF 14 PERCENT ETHANE, 85 PERCENT METHANE, AND 1 PERCENT NITROGEN ARE CALCULATED AS FOLLOWS:

| GAS | V VOL, % | $T_C$ | $VT_C$ | $P_C$ | $VP_C$ |
|---|---|---|---|---|---|
| $C_2H_6$ | 14 | 550.09 | 77.01 | 708.3 | 99.16 |
| $CH_4$ | 85 | 343.5 | 292.00 | 673.1 | 572.19 |
| $N_2$ | 1 | 227.2 | 002.27 | 492.0 | 4.92 |
| | | FOR MIXTURE $T_C$ = 371.28 | | $P_C$ = 676.27 | |

(REF: GARTMANN, PP 6-65,67)

FIGURE 99B (SOURCE OF CODE: MITCHELL WAITE, STEPHEN PRATA, AND DONALD MARTIN, C PRIMER PLUS, USER-FRIENDLY GUIDE TO THE C PROGRAMMING LANGUAGE, REVISED EDITION, HOWARD W. SAMS & COMPANY, INDIANAPOLIS, INDIANA, 1987, PAGE 155.)

```
PROCEDURE = ( (IN, GRAPH, PIPE) (IN, GRAPH, PIPE)
              (PIPE, PIPE, +)
              (PIPE, GRAPH, PIPE)
              (PIPE, OUTPUT)                      )
```

PROCEDURE PACK

PROCEDURE PACK IS A COMBINATION OF LOOP AND IF-THEN-ELSE OR DOTIMES PROCEDURES.

( PIPE PIPE #nn, ( DONOR, Y ), ( DONEE, VOLTAGE ) )

DIMENSIONS FROM A SKETCH ARE "CUT AND PASTED" INTO AN EQUATION STRIP.

SOURCE: PERRY & CHILTON, CHEMICAL ENGINEERING HANDBOOK, PAGE 3-130, FIG. 3-12.

GRAPH STRUCTURE 1

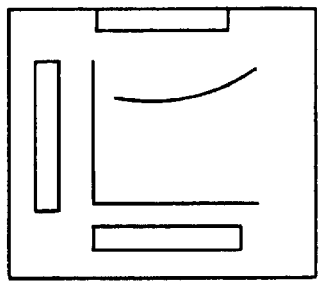

GRAPH DISPLAY

```
SCREEN LOCATION:
LINE-STYLE:
ZOOM-IN, OUT:
COLOR:
SELECTIVE-SUPPRESS:
SUPERPOSE:
CURSOR:
PROPERTY-WINDOW:
```

GRAPH DESCRIPTION

```
GRAPH-CLASS:
GRAPH-FILENAME:
GRAPH-CAPTION:
GRAPH-AXES (X AND Y)
GRAPH-SCALES (X AND Y):
GRAPH-FRAME-SIZE (H, W):
GRAPH-GRID (NX, SIZE X, NY, SIZE Y):
GRAPH-LABEL (X AND Y):
GRAPH-REFERENCE:
GRAPH-CURVES (NFAMILIES,
    (FAMILY-1, LABEL, REPRESENTATION, VALUES
...
...                                     ):
GRAPH-ORIGIN (X AND Y):
GRAPH-GRADUATIONS (X MIN, X MAX, Y MIN, Y MAX):
GRAPH-NOTES:
GRAPH-OVERWRITES:
```

GRAPH-EDITORS

```
GRAPHICAL-EDITOR
STRUCTURE-SYMBOLIC EDITOR
VALUE-EDITOR
PROPERTY-WINDOW-EDITOR
DISPLAY-EDITOR
```

```
INTERPOLATE:
EXTRAPOLATE:
FOLLOW-CONTOUR:
```

| ADD | DELETE | MODIFY | SAVE | DISPLAY | FILE-NAME |

FIGURE 120

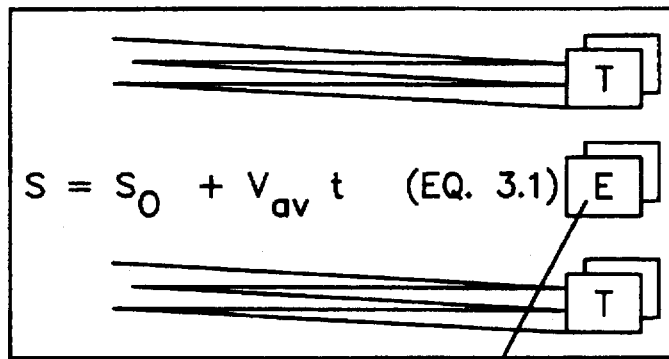
(a)
| EQUATION | $S = S_0 + V_{av} t$ | | | | | |
|---|---|---|---|---|---|---|
| VARIABLES & OPERATORS | S | = | $S_0$ | + | $V_{av}$ | * | t |
| VALUES | ? | | 60 | | 3.3 | | 40 |
| RESULT | 192 | | | | | | |
(b)
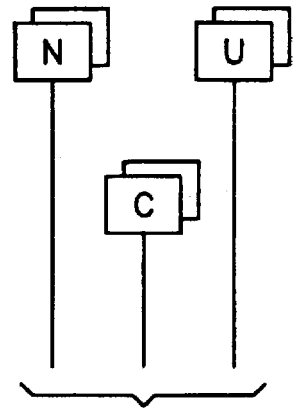
THESE CAN, IN TURN, BE HIGHLIGHTED AND MORE DETAILS DISPLAYED.
FIGURE 124

MECHANICS

| NOMENCLATURE SYMBOL | NAME | DEFINITION | DIMENSIONS |
|---|---|---|---|
| a | (LINEAR) ACCELERATION | $\dfrac{dv}{dt}$ | $IN./SEC^2, FT/SEC^2$ |
| a, b, c | VECTORS | ... | ACCORDING TO USE |
| A | AREA | ... | SQ IN., SQ FT |
| E | WORK DONE | F X S | IN.-LB, FT-LB |
| $E_k$ | KINETIC ENERGY | $\dfrac{m v^2}{2}$ | IN.-LB, FT-LB |
| F | FORCE | FUNDAMENTAL | LB |
| g | ACCELERATION OF GRAVITY | ... | $32.16\ FT/SEC^2$ |
| h, H | HYDROSTATIC HEAD | $\dfrac{P}{Y}$ | IN., FT (OF LIQUID) |
| ... | ... | ... | ... |
| v | VELOCITY | $\dfrac{ds}{dt}$ | IN./SEC, FPS |

(a)

(b) $E_k\quad \dfrac{m v^2}{2}$

| | | | |
|---|---|---|---|
| $E_k$ | KINETIC ENERGY | $\dfrac{m v^2}{2}$ | IN.-LB, FT-LB |
| m | MASS | $\dfrac{w}{g}$ | $LB-SEC^2/FT$ |
| v | VELOCITY | $\dfrac{ds}{dt}$ | IN./SEC, FPS |

FIGURE 126

NATURAL COMPUTING SYSTEM

BACKGROUND OF THE INVENTION

1. Field of the Invention

This invention relates to a computational system and environment for computers, the use of which will lead to the elimination of computer programming as presently understood.

2. Description of the Related Art

Recent computer hardware developments have placed enormous computational capability in the hands of users. However, just as the computational potential of papyrus and ink technology went unrealized for many years due to inadequate software systems (hieroglyphics), computational technology is limited by conventional programming languages. Only with the development of alphabets and arabic numerals did paper and ink technology become exploitable by the majority of users. The computational system and environment of the invention will have the same effect on computational technology.

All computers currently require programming in a language which interprets the programmers intentions into procedural instructions for a central processor unit (CPU) to follow in solving a problem. The inherent complexity of current language schemes has resulted in the existence of a class of professionals analogous to the scribes who transcribed hieroglyphic symbols for use by ancient end-users—the computer programmer.

In order to exploit a sophisticated computer for solving a computational problem, the end-user communicates the problem to the programmer, who then transcribes it into computer language. This need for an intermediary is disadvantageous because the programmer is often not fully versed in the subtleties of the problem to be solved, and the end user is ill equipped to assist the programmer in developing the appropriate software strategies necessary to find the solution to the problem.

Even where the solution is satisfactory, the process of development is by its nature inefficient. Software development is non-concurrent because the software must be reprogrammed every time a new procedure or method or solution is conceived by the engineer, scientist, analyst, or manager for whom the software has been developed. Such reprogramming is expensive and, as a result, the end-user must settle for black-box software systems, illustrated in FIG. 1A, that inevitably lag behind available solution methods. Under these conditions, software development can never catch up with advances in engineering, scientific, and business knowledge.

The more powerful the solution to a given problem, the more problems there are with the solution. Solutions to everyday problems might require millions of lines of code which are completely opaque to the user. As a result, it is virtually impossible to check the veracity of solutions obtained by the software. Solutions must be taken as a matter of faith, the end-user hoping that an error did not appear at some point during development of the software, because the computational path development has been taken out of the hands of the end-user and put it in the hands of a third party.

The natural way that people solve computational problems—by accumulating pieces of information, supplying intuition, innovating new methods or new data, and mixing them with the existing data and information to evolve new procedures, trying out the procedures, and improving them iteratively as they solve problems—is not an option with conventional software systems and environments in which any change to a parameter of a problem requires re-writing a million lines of software code. An integrated approach to software development is needed which maintains the natural computational process while harnessing the ability of computers to rapidly and repeatably manipulate large amounts of data.

The end-user of bygone eras armed only with a calculator, slide-rule, or logarithmic table, and a piece of paper and pencil, was in complete control of all phases of the computational process, namely, problem understanding, solution methodology, implementation, and execution. All necessary data and information could be clearly represented in the form of text, tables, graphs, equations, and sketches. These diverse data representations could, through the ingenuity of the user's own mind, be retrieved, understood and manipulated simultaneously and relatively easily. The principal limitation was the time necessary to create and modify the text, tables, graphs, equations, and sketches, but understanding how to create, manipulate, and verify the representations was not a problem.

Modern software, on the other hand, while enabling the rapid creation of text, tables, graphs, and equations, does not provide methods to work with these diverse and natural data representations simultaneously, interchangeably, and with verifiability. As a result, despite rapid strides in the technology of computation, as illustrated in FIG. 1B, current users now have less control over the computational process than did their ancestors armed only with a calculator or slide rule, tables, paper, and a pencil. Even the best current approaches—e.g., advanced applications programs such as word processing programs, graphics programs, and spread sheets, symbolic processing programs such as Simon, Macsyma, TKISolver, MathCad, MathSoft, Prescience, and Mathematica, specialized environments such as computer-aided design (CAD), computer aided manufacturing (CAM), and computer-aided engineering (CAE), and object oriented programming systems such as Small Talk, Object-Oriented LISP, Objective Pascal, and C++—at best represent refinements of rather than fundamental changes in historic computer programming approaches. None recognizes that, when the computer is turned on, the user would best be served by presenting the user with what is essentially a piece of paper on which are written, or on which can be written, all of the text, tables, graphs, equations, and sketches necessary to solve a given problem, and which can be manipulated in the same way as their non-electronic counterparts.

While all of the elements necessary to create a more natural computational system and environment currently are available, the user continues to be presented with blank screens, arcane commands, and mysterious programming paradigms. With current technology, text, tables, graphs, equations, and sketches can all be relatively easily created, and can exist even coexist on the screen, but an integrated approach to using and manipulating all of these devices has not been achieved—and in fact has heretofore not even been conceived.

SUMMARY OF THE INVENTION

It is accordingly an objective of the invention to provide a computational system and environment which allows the juxtaposition of text, graphs, tables, equations, and sketches while concurrently permitting the use of these computational features in calculations and other problem solving procedures, allowing non-programmers to develop computational schemes and obtain solutions to domain problems in a natural manner, with little or no code development, and thereby return control of the computational process to the end-user.

It is a further objective of the invention to provide a method which enables the computer user to carry out computations in familiar representational schemes, such as text, tables, graphs, equations, and sketches, simultaneously and with fluidity, interchangeability, and flexibility.

It is yet another objective of the invention to permit the solution to complex computational problems which might currently require millions of lines of opaque code, in a manner which corresponds to the natural way that people solve computational problems—by accumulating pieces of information, in the form of data or procedure to manipulate sets of data, supplying intuition, innovating new methods or new data and mixing them with the existing data and information to evolve new procedures, trying out the procedures, and improving them iteratively as they solve problems.

It is also an objective of the invention to allow a user to store information in a completely natural manner and provide him or her with tools that will give a great degree of choice for outputting the information, by presenting the user with familiar representational schemes such as tables, graphs, sketches, and so forth, and allowing these representations to be manipulated for solving problems in much the same way that the user would use printed tables, graphs, and so forth.

While many of the types of representations which will be included in the computational system and environment, or natural computing system, of the invention have previously been represented by computer, the system enables these representations to be used in a much more natural and flexible manner, as will be apparent from the following description.

What these representations have in common is the structuring of the representations into objects in a manner which tracks the function of the various parts of the structure as will be understood by the user, rather than strict mathematical arrays or the like. It should be understood, however, that the invention does not consist of a new object-oriented programming code, but rather consists of new ways of juxtaposing and manipulating objects created using conventional programming languages. Not only are tables, graphs, and so forth represented as objects, but also portions of tables, graphs, and so forth. Uniquely, these objects are related to text in a manner which, simply by virtue of the relation established, even where the related elements are themselves straightforward variations of known elements, results in a synergistic improvement over conventional computational techniques.

As those skilled in the art will undoubtedly be aware, the pre-programmed objects which make up the computational system and environment of the invention must be programmed in a way which makes them interpretable by the computer, but the end-user will see only the objects themselves and be able to work with them in an entirely natural and intuitive way. These objects, which are made up of other objects in hierarchical schemes, include tables, graphs, equations, text, unit-strips, work sheets and spreadsheets, templates and macros, other language programs, procedures, sketches and schematics, data connecting pipes, tracers, storage and display, compiled knowledge based data structures, and description of procedures.

BRIEF DESCRIPTION OF THE DRAWINGS

FIGS. 2–50U illustrate principles of table construction and organization in the preferred system and environment.

FIGS. 51–59C are representations of the various hierarchical levels involved in implementing graphs in the preferred system and environment.

FIGS. 60–70 are representations of the various hierarchical levels involved in representing equations in the preferred system and environment.

FIGS. 71–77 are representations of the various hierarchical levels involved in creating and manipulating work sheets and spread sheet strips in the preferred system and environment.

FIGS. 78–82 are representations of the various hierarchical levels involved in creating and manipulating units strips in the preferred system and environment.

FIGS. 83–90 are representations of the various hierarchical levels involved in creating and manipulating macros and templates.

FIGS. 91–96 are representations of the various hierarchical levels involved in creating and manipulating forms and flowcharts.

FIGS. 97A–101 are diagrams illustrating the manner in which text is integrated into the preferred system and environment.

FIGS. 119–127 are diagrams illustrating principles involved in the storage and display of objects in the preferred system and environment.

DETAILED DESCRIPTION OF THE PREFERRED EMBODIMENT

I. Overview of System

Figure 1A:
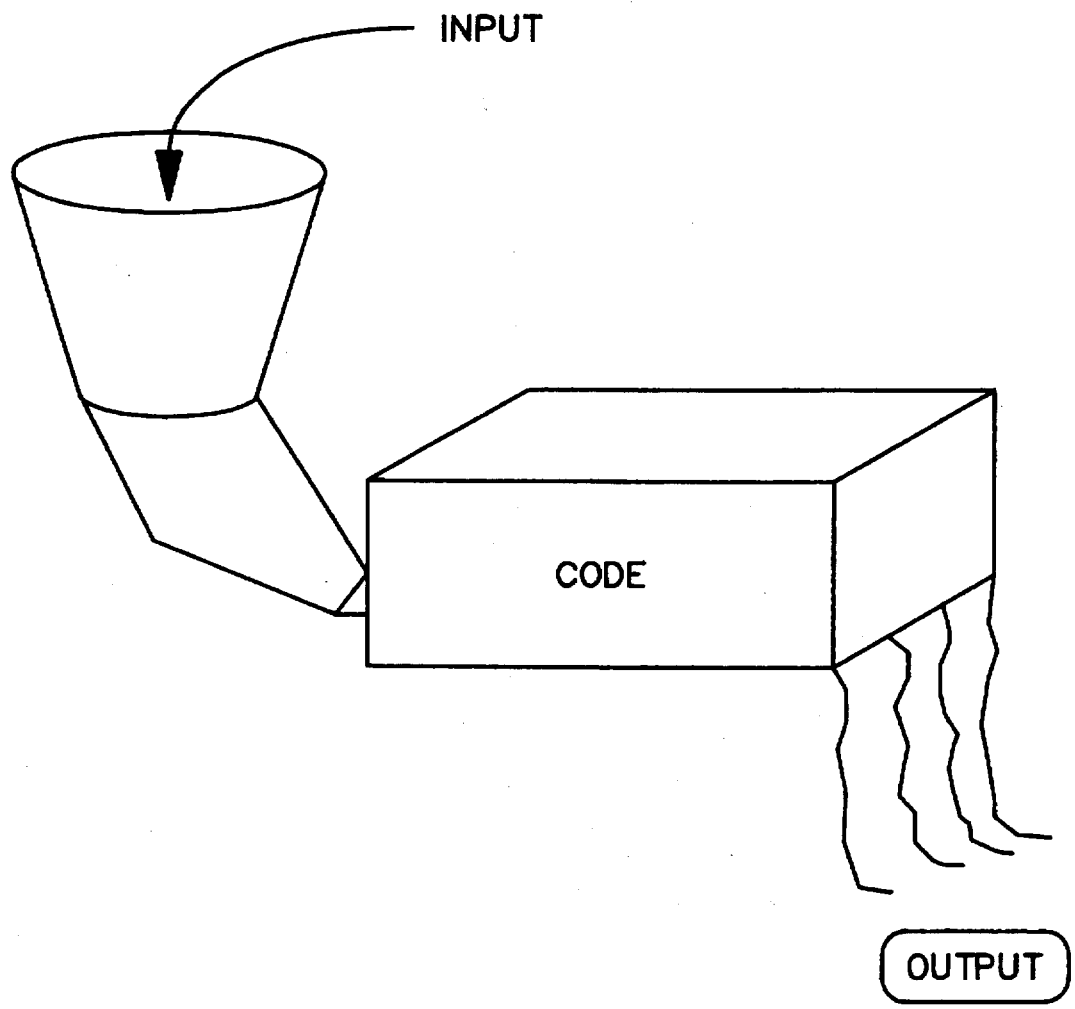
FIG. 1A is a schematic diagram illustrating the black box approach to programming.
Figure 1B:
FIG. 1B is a chart illustrating the historical development of computational hardware and software systems.
Figure 1C:
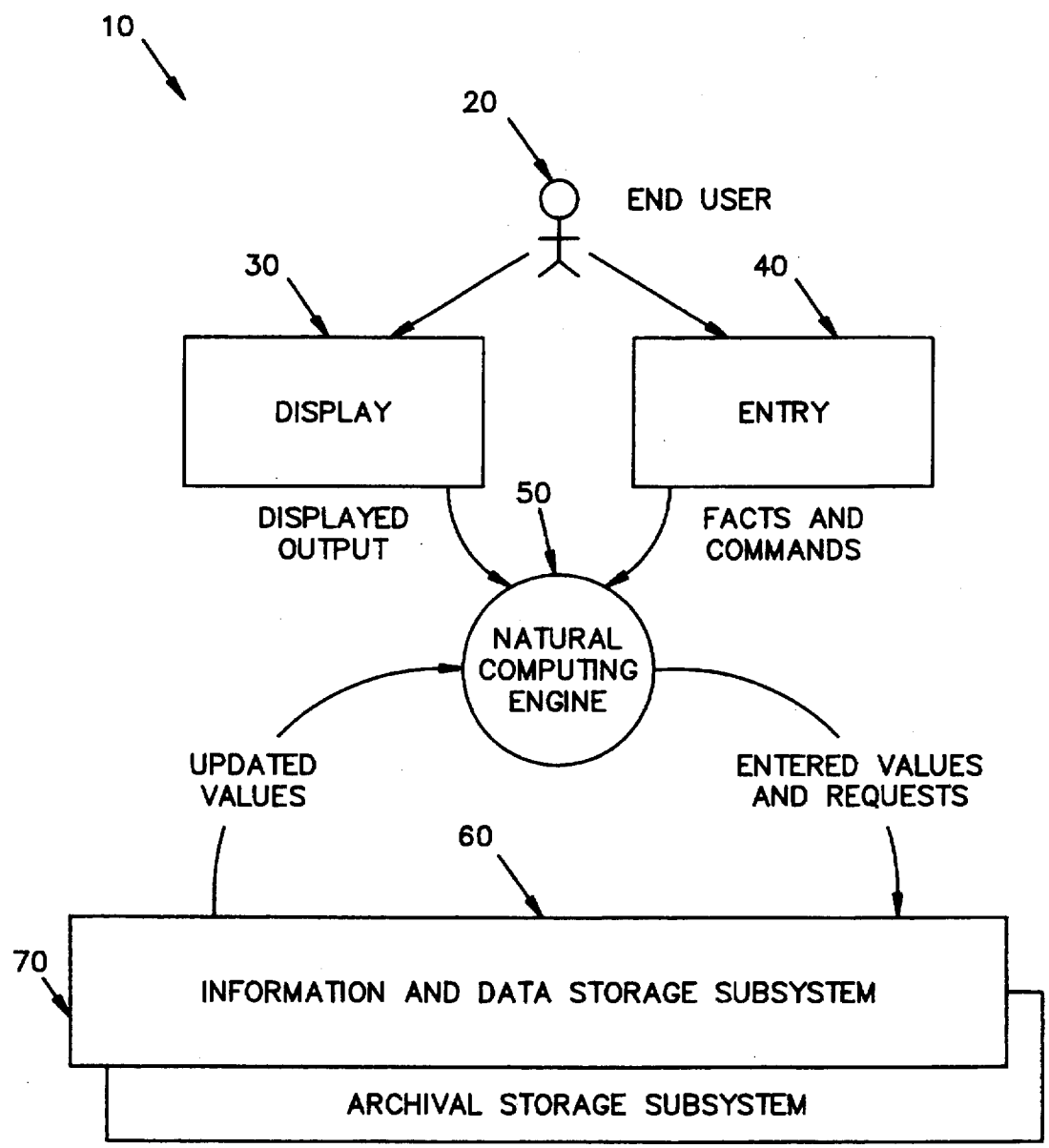
FIG. 1C is a high level data flow diagram of the preferred natural computing system and environment.

FIG. 1C is a high-level data flow diagram of a preferred computational system and environment 10 for computers. The preferred system and environment 10 includes a natural computing engine 50 and an information and data storage system 60. The natural computing engine 50 interacts with the user 20 through a display device 30 and an input device 40, for example a keyboard, which permits facts about a problem or commands to be issued to the system, and displays the result of those inputs. The natural computing engine also communicates with the data storage subsystem 60 and extracts information from archival storage subsystems 70.

Those skilled in the computer programming art will appreciate that a variety of different computer programming languages can be utilized in the implementation of the preferred system and environment, and that the preferred system and environment can be implemented on a variety of currently-available computer hardware systems. However, high level object-oriented languages, such as C++, Objective Pascal, Small Talk, and Object-Oriented LISP are the preferred languages for implementation, and the preferred hardware includes relatively advanced digital computers such as personal computers (PCs), minicomputers, mainframe computers with remote terminals, and workstations capable of supporting the preferred implementing languages, with appropriate memories and input/output devices. For example, display 30 may be in the form of a cathode-ray-tube or liquid crystal display. Preferred entry means include, in addition to a keyboard, a pointing device such as a mouse or track ball, and/or a scanner.

The information and data storage subsystem 60 contains the domain information retrieved from the archival storage subsystems 70, and also user provided information with respect to a current problem under investigation, current computing process, or a previously attempted and archived problem which is being subjected to a given computation. The information and data storage subsystem 60 and the archival storage subsystem 70 (described in more detail in a separate section below) respectively contain data and information, and computing instructions in the form of graphs, tables, equations, text, unit-strips, work sheets, spreadsheets, templates, macros, other language programs, procedures, tracers, sketches, schematics, data connecting devices, and storage and display configuration objects. The data, information, and instructions are encoded in a variety of suitable structures specifically designed for the natural computing system, as will be described below. The subsystems 60 and 70 may include magnetic and optical information storage media, and/or memory cards.

It will be appreciated by those skilled in the art that, although their specific forms may be varied, items 10–70 are an essential part of the preferred system and environment, and that the invention involves a method of utilizing and relating these items, as well as means including the illustrated items for implementing the method. The method is not a mathematical algorithm, (despite the phrase computational system and environment), nor can it be fairly characterized as a series of mental steps, an expression of a law of nature (despite the phrase natural computing), printed matter, or a method of doing business. In fact, no new mathematical algorithms or laws of nature are presented herein. Also, although source code is not listed herein, each of the examples given below will be easily implemented by those familiar with the high-level object-oriented languages referred to above, with the assistance of the flow charts and other illustrations presented in the accompanying drawing figures.

II. Tables

One of the key features of the natural computing system is the representation of tables by a plurality of objects, which represent the decomposition of the table into the following parts: table structure, table caption, table header, table body, table foot-notes, and table other-notes, as will be explained below. Employing standard object-oriented programming methods, a table class is defined which consists of abstract data types for each of the table parts, namely, table structure, table caption, table header, table body, table foot-notes, and table other-notes, the table caption, table foot-notes and table other-notes being in the form of pointers to strings.

A. Basic Table Structure

The table structure defined here holds the key to a wide variety of computing possibilities. A table is first divided into a number of cells, which have a geometric disposition reflective of actual physical tables. These cells form the elements of rows and columns. Unlike conventional practice, however, in which cells are all defined to be of identical data type, and to form an array, so that each cell can be referred to by its row and column position, the present invention identifies the cells by their geometric positions with respect to one another.

Figure 3:
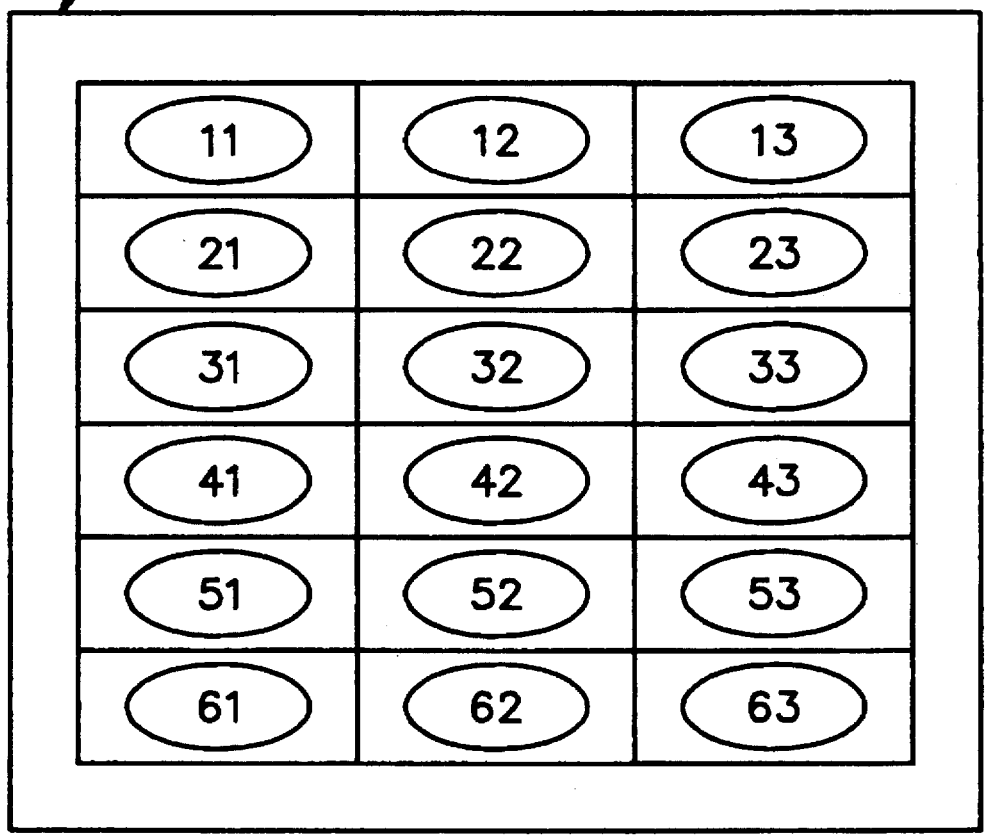
Figure 4A:
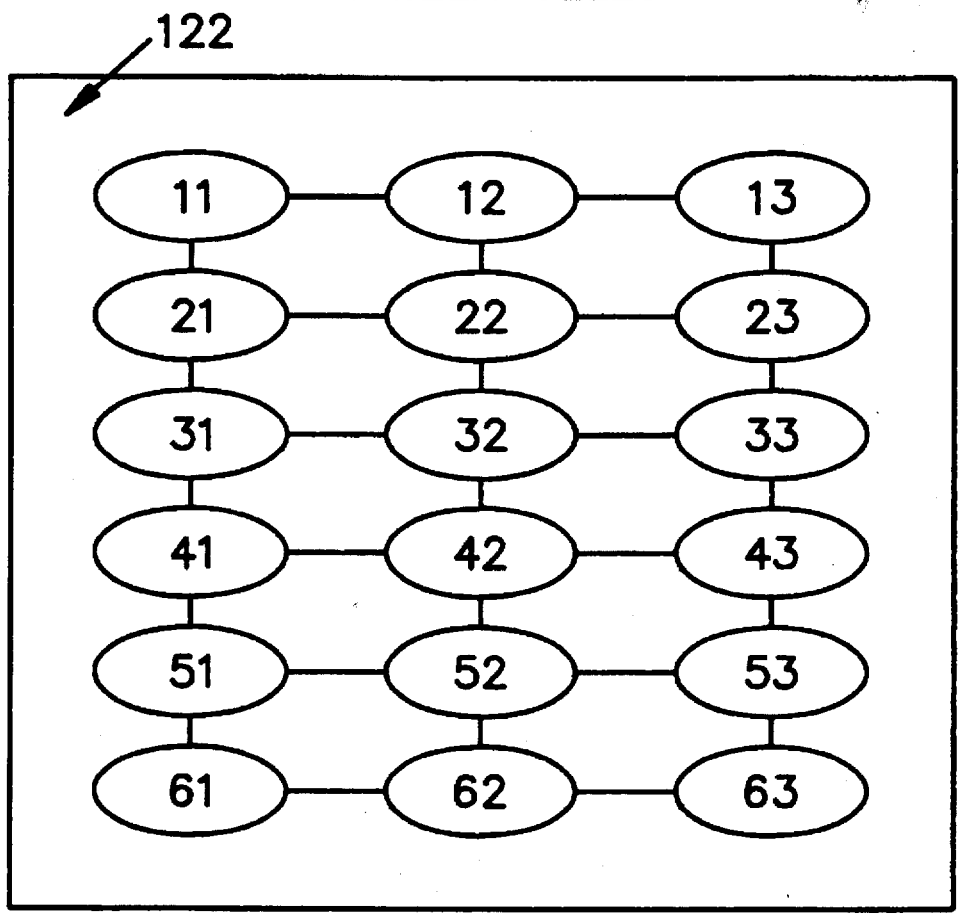

An exemplary table 120 is shown in FIG. 2, and its cells are numbered as shown in graph 121 of FIG. 3. For example, cell 11 represents the portion of the table containing the column heading, "Fluid", cell 12 represents the portion of the table containing the column heading "Viscosity SSU", cell 21 represents the portion of the table containing the entry "Diesel Oil", and cell 22 represents the portion of the table containing the entry "32". The cell connections are shown by representing the cells in the graph 122 of FIG. 4A. For example, cell 11 has cells 12 and 21 adjacent to it, while cell 22 has cells 12, 23, 32, and 21 adjacent to it.

Figure 4B:
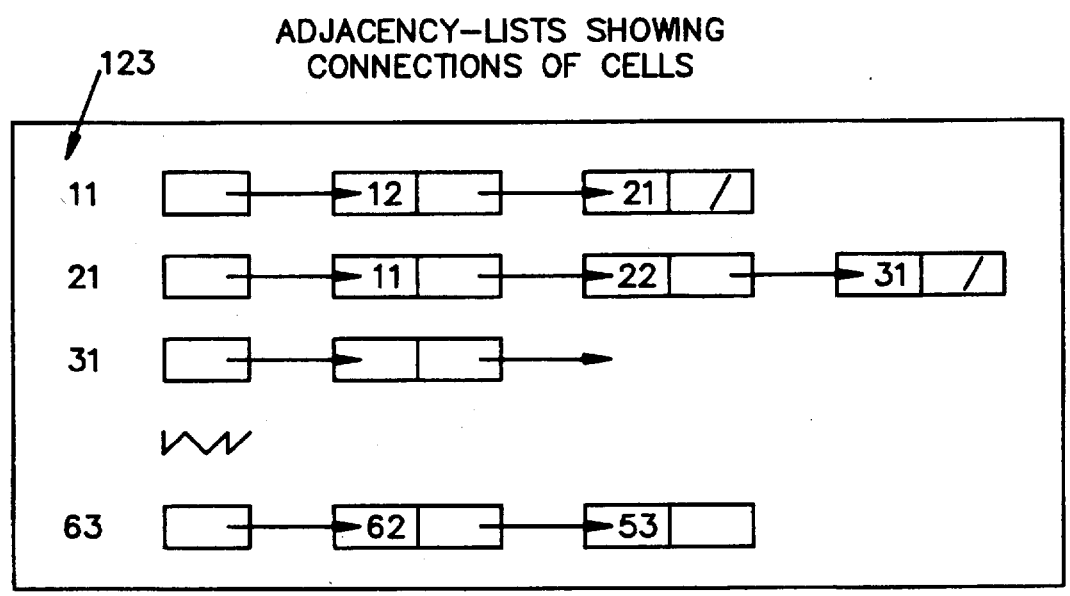

The complete enumeration of each cell and its adjacent neighbors is represented by the adjacency-list of FIG. 4B. Those familiar with adjacency-list representation will appreciate that the tables as represented in this invention are a smaller subset of a broader category of conventional graphs. Rather than using unrestricted vertex to vertex connection by means of arcs, a vertex in a table is connected only to its immediate neighbors. Thus, the representation chosen may be thought of as a list of sub-lists, each sub-list consisting of a table cell (a vertex in the graph) followed by a sub-list that contains all the neighboring cells of the cell preceding the sublist. Preferably, the adjacency-list for a table is an ordered list, the sublist being ordered according to the position of the table cells (lead element) in the cell by column first and then by row.

B. Storage of Data and Information in Memory 60

Figure 5:
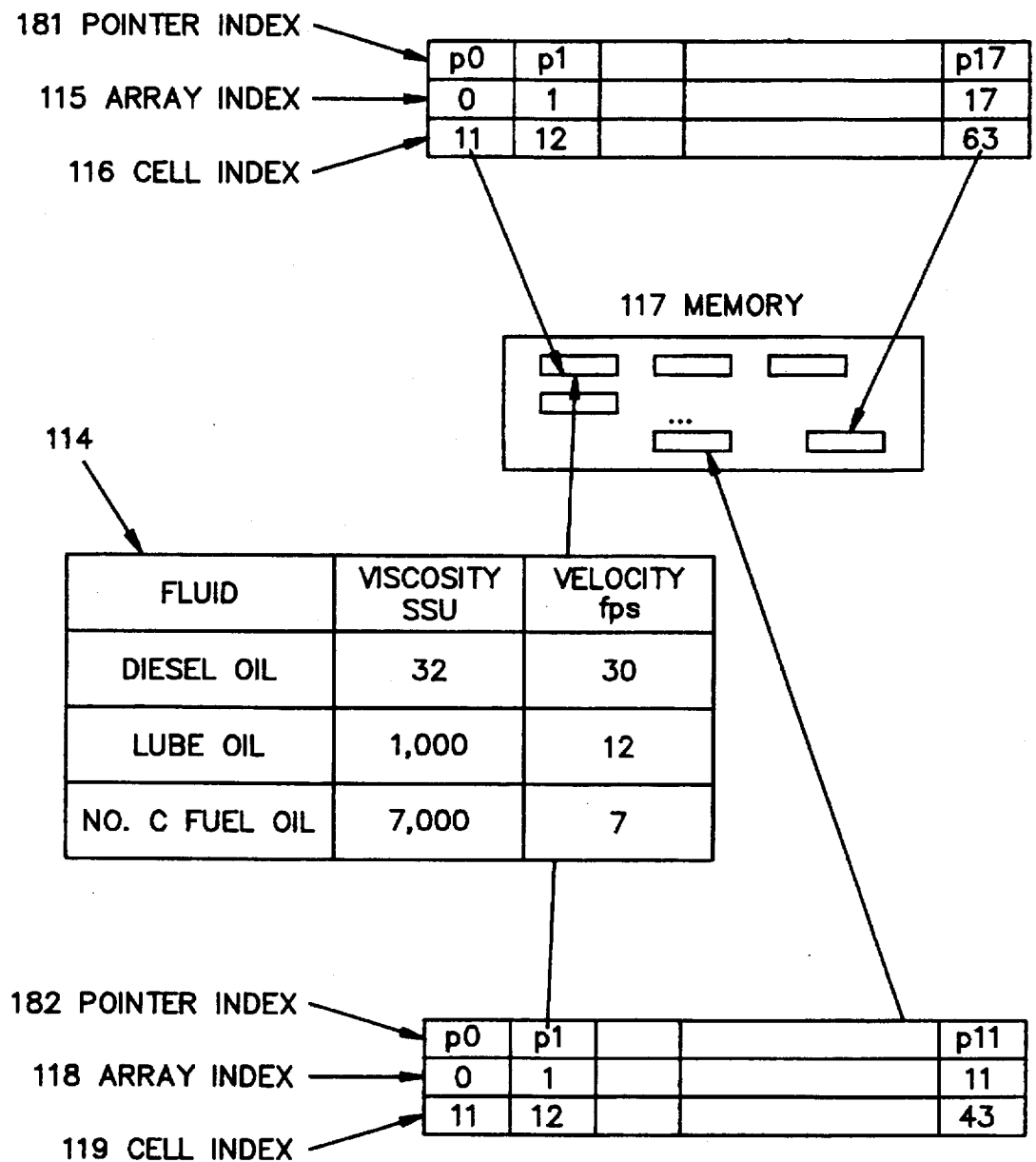

As shown in FIG. 5, table 120 (FIG. 2) may be represented by a one-dimensional array 115 of size 18. Each element of this array contains the cell numbers of indexes 116 of all of the cells in the table. These cell indexes are ordered such that each of the cells points to a location in a RAM or ROM 117 (memory 60 of FIG. 1C) that stores the contents of the cell via pointer indexes P0, P1 ... in an array. These three arrays, 181, 115, and 116 are tied together for this table. FIG. 5 also shows a second table 114, which is actually a truncated version of table 120 and which is represented by an array 118 of size 12, the elements of which point to cell indexes 119. The pointer indexes are captured in the array shown in 182. In this particular case, since the cells are a subset of those in the previous table 120, a subset of the same pointers are used.

Thus, in this embodiment, tables are represented by an array which stores an ordered arrangement of cell numbers, which point to pointers, which in turn point to the contents of the cells in memory. The table's adjacency list, by describing the connections between the table cells, allows the table to be laid out.

By separating the cell location in the table and the contents of a cell, a variety of advantages are realized. The adjacency-lists contain pointers to any of a variety of data types in memory, thus allowing a table to represent dissimilar types of data, just as tables in text books and other publications do. Since the location and value are disconnected, a particular value in memory can be pointed to by cells belonging to more than one table. In fact, different objects can point to the same data in memory. Thus, one can develop and write functions and computer programs that interpret the cell values based on a given problem context and provide a given value when queried, allowing the tables to be used in the same manner as tables in books.

C. Cell Variations

Since the example shown above is rectangular, one can argue that a simple two-dimensional array could have been used to represent the cells. However, actual tables in books come in all shapes and contain a variety of types of values.

Figure 7A:
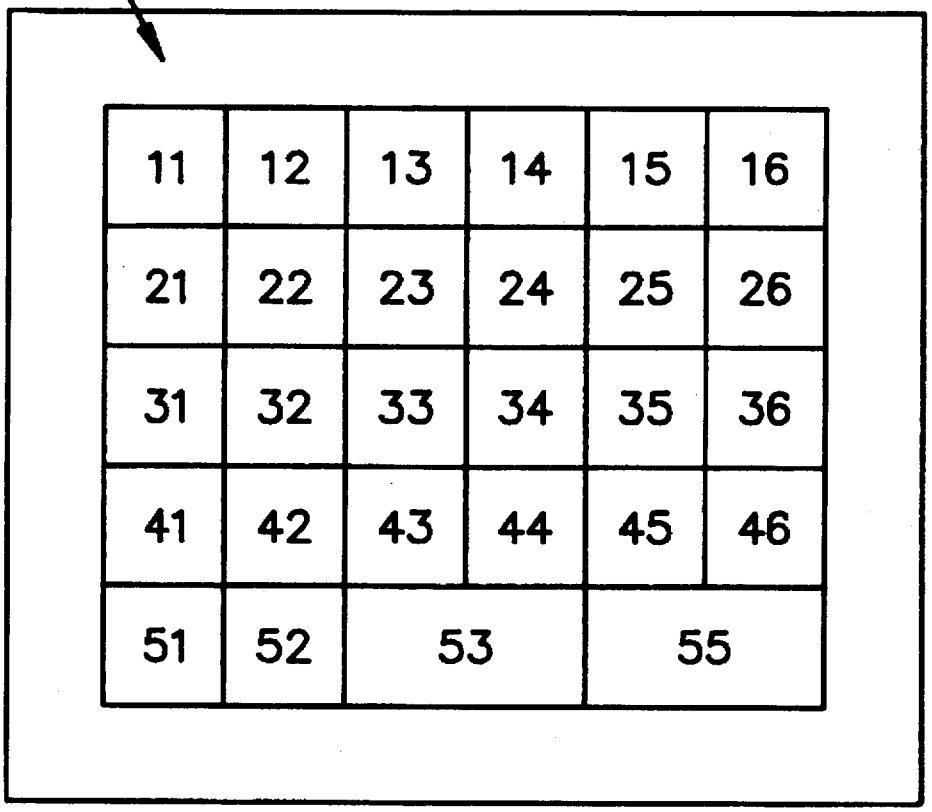
Figure 7B:
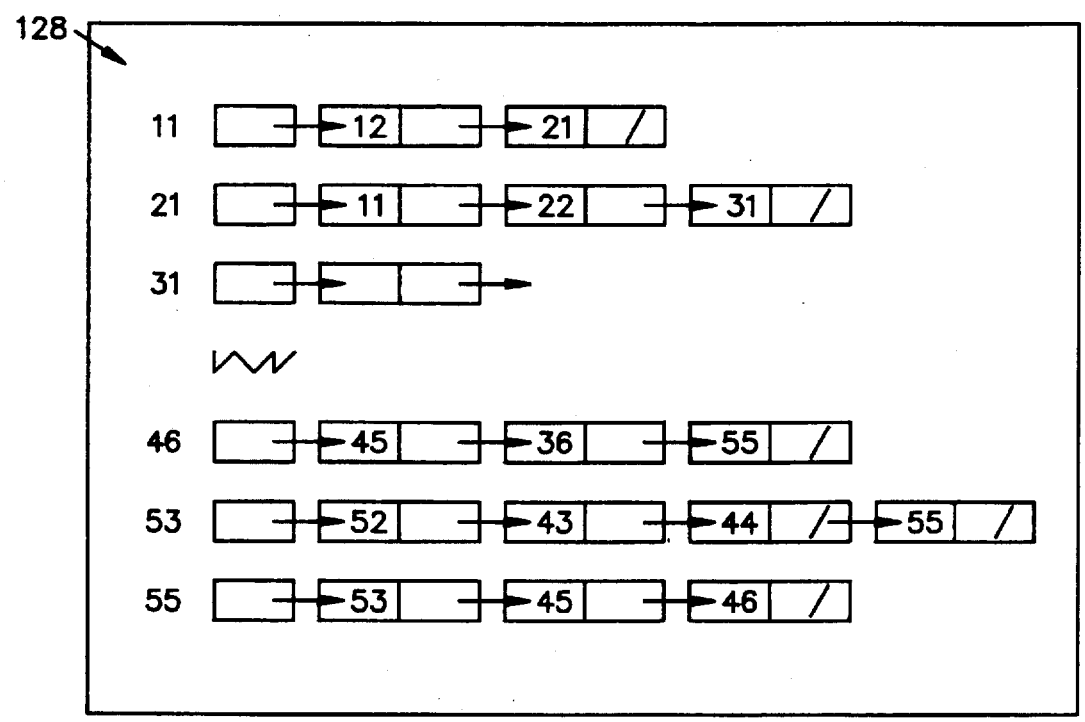

In some instances, for example, several cells are coalesced, as illustrated in FIG. 6. The cell connections for this table are shown by including the cells in a graph 127 of the type shown in FIG. 7A. The corresponding adjacency-list representation 128 of this table is shown in FIG. 7B. Only portions of the adjacency-lists that are different in structure from that in the previous example am shown in FIG. 7B. These cells are hereinafter referred to as siamese multiples to designate that several cells have been glued together.

Figure 9:
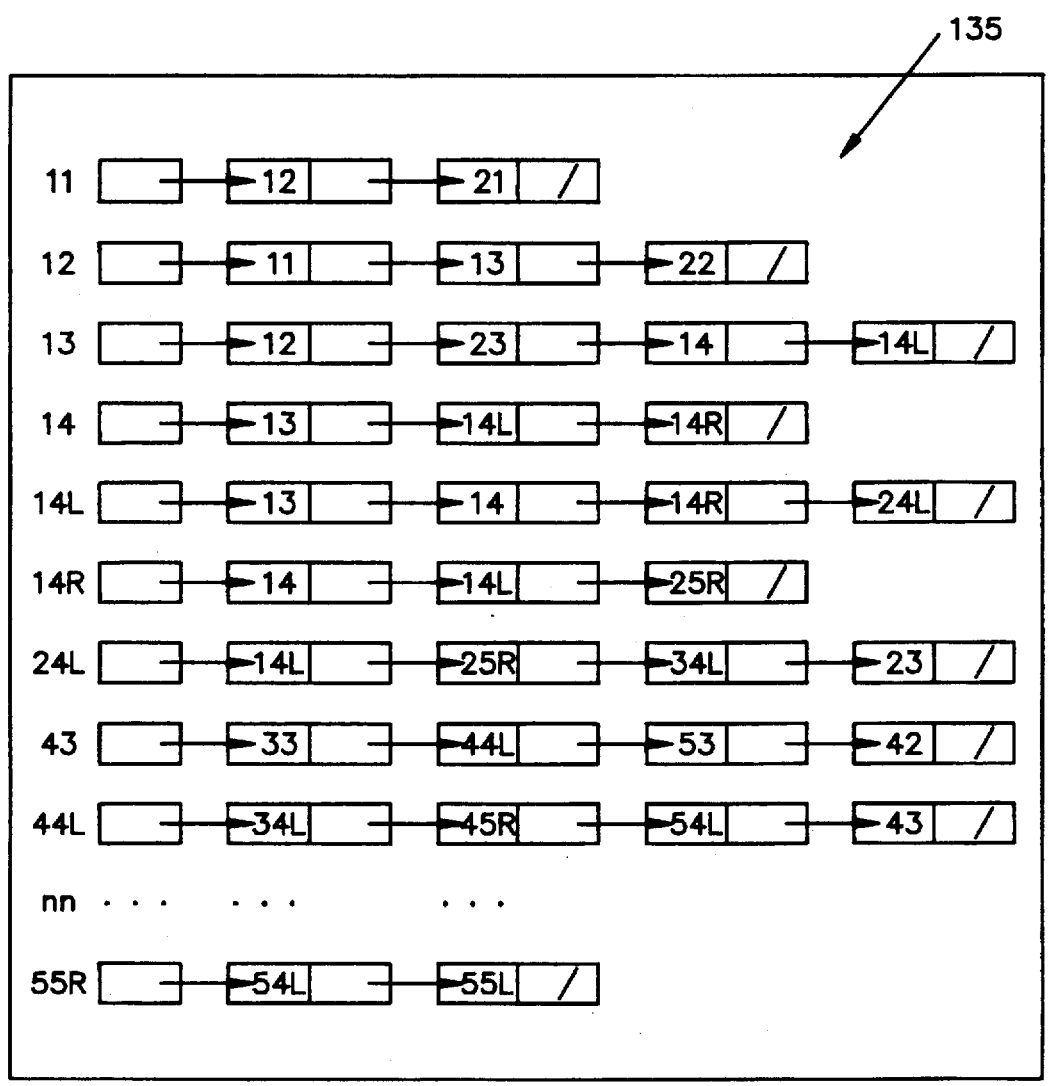

Another often-found arrangement of cells in tables is shown in FIG. 8A. In this arrangement, a column bifurcates and develops multiples. The branching, or the development of multiples is indicated by reference numeral 131 in table 130. As a first step towards the development of a representation for this kind of a table, a graph representation 132 is shown in FIG. 8B, with the branched cells denoted by reference numeral 133. The adjacency list representation for this type of table is shown in FIG. 9.

Those skilled in the art will appreciate that the examples provided so far of column coalescing and column bifurcation apply equally well for row coalescence and row bifurcation, and for cases where both row and column alterations take place in the same cell.

D. Multiple Table Parts

In the above examples, the adjacency-list representations are applied to entire table. However, it is particularly table. However, it is particularly advantageous to apply separate adjacency-list representations to multiple table parts. For example, a separate adjacency-list representation may be applied to the table header and the table body, This is extremely beneficial as operations and manipulations can be carried out on these parts independently of each other. As every table user knows, the table header and table body serve distinctly different functions and therefore possess unique characteristics. FIG. 10 illustrates an example of a table 140 with a table header 141 and a table body portion 142.

Figure 11:
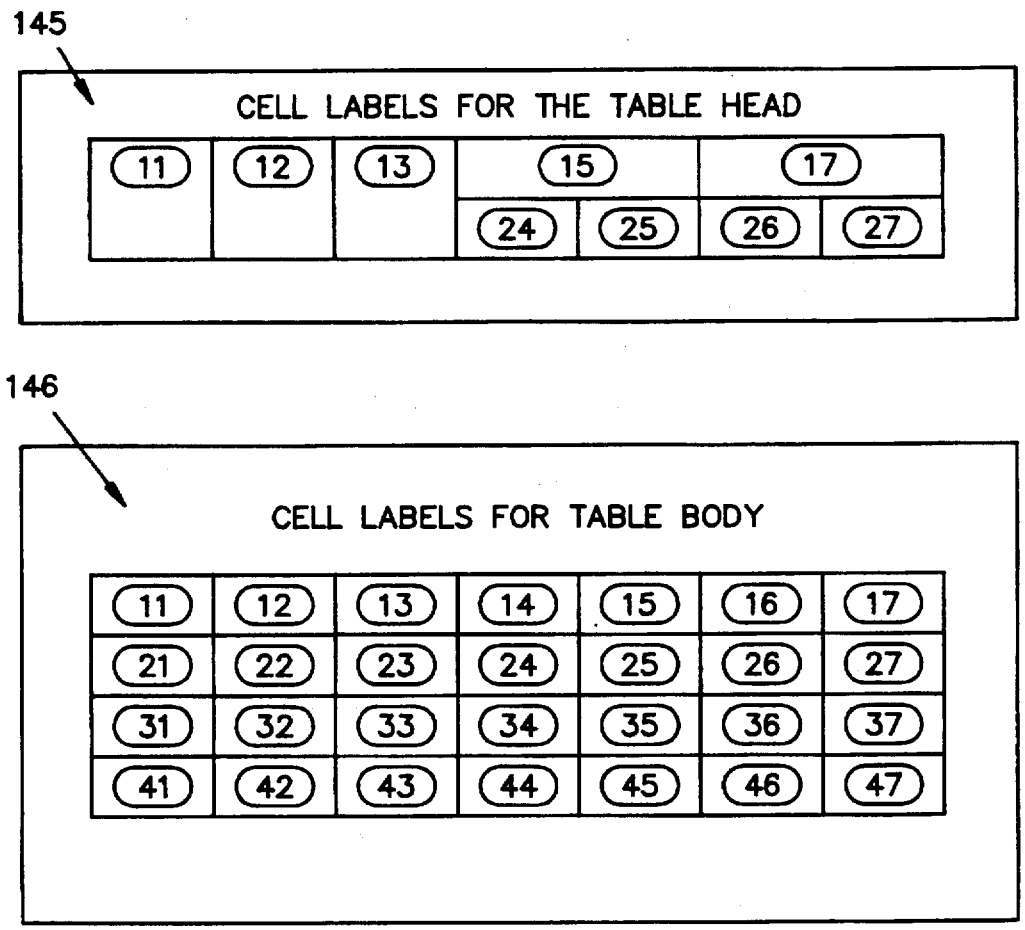
Figure 12:
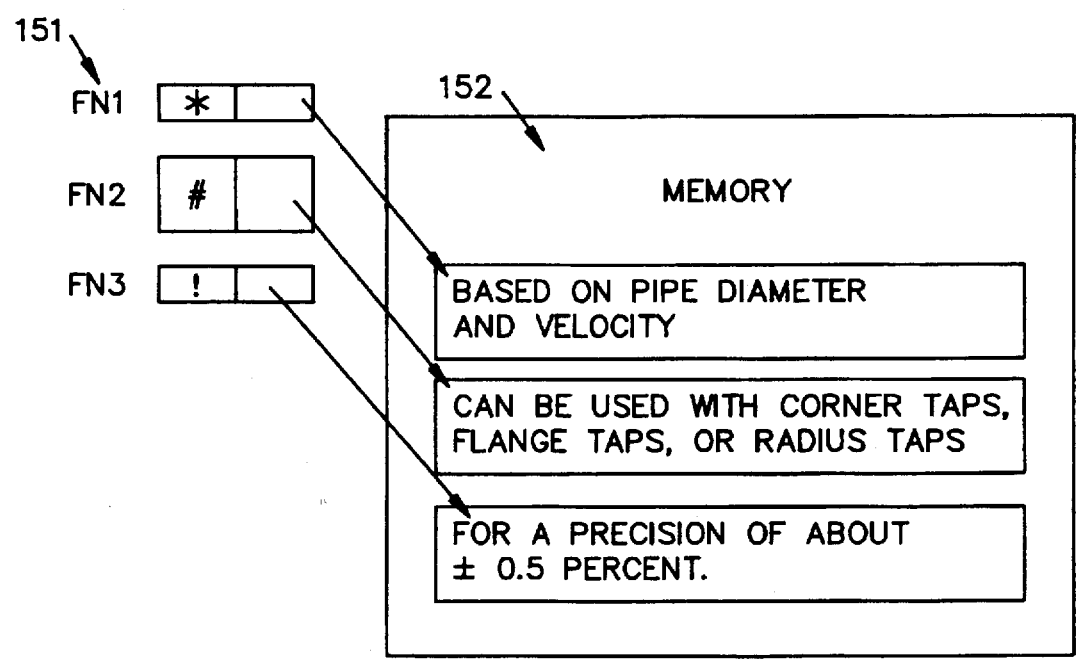

Two separate graph networks are developed for the table header 145 and the table body 146 shown in FIG. 11. Cell numbering is adjusted such that at the interface of the table header and the table body, there is a one-to-one match in the number of columns. Adjacency lists can be developed based on these separate cell numbers. The footnotes in the table of FIG. 8A are represented by footnote objects 151, which point to regions in memory where the footnote information can be found as illustrated in FIG. 12.

E. Table Manipulation

Using the convention where i is the row index and j is the column index, and the element MN represents the last element in the table with M rows and N columns, the adjacency list for each cell can be represented by appending a list to the cell number as follows:

$$ij \rightarrow ((i-1,j,\ i,j+1,\ i+1,j,\ i,j-1)),$$

with the conditions that $i \geq 1$, $j \geq 1$, $i \leq M$, and $j \leq N$.

Figure 13:
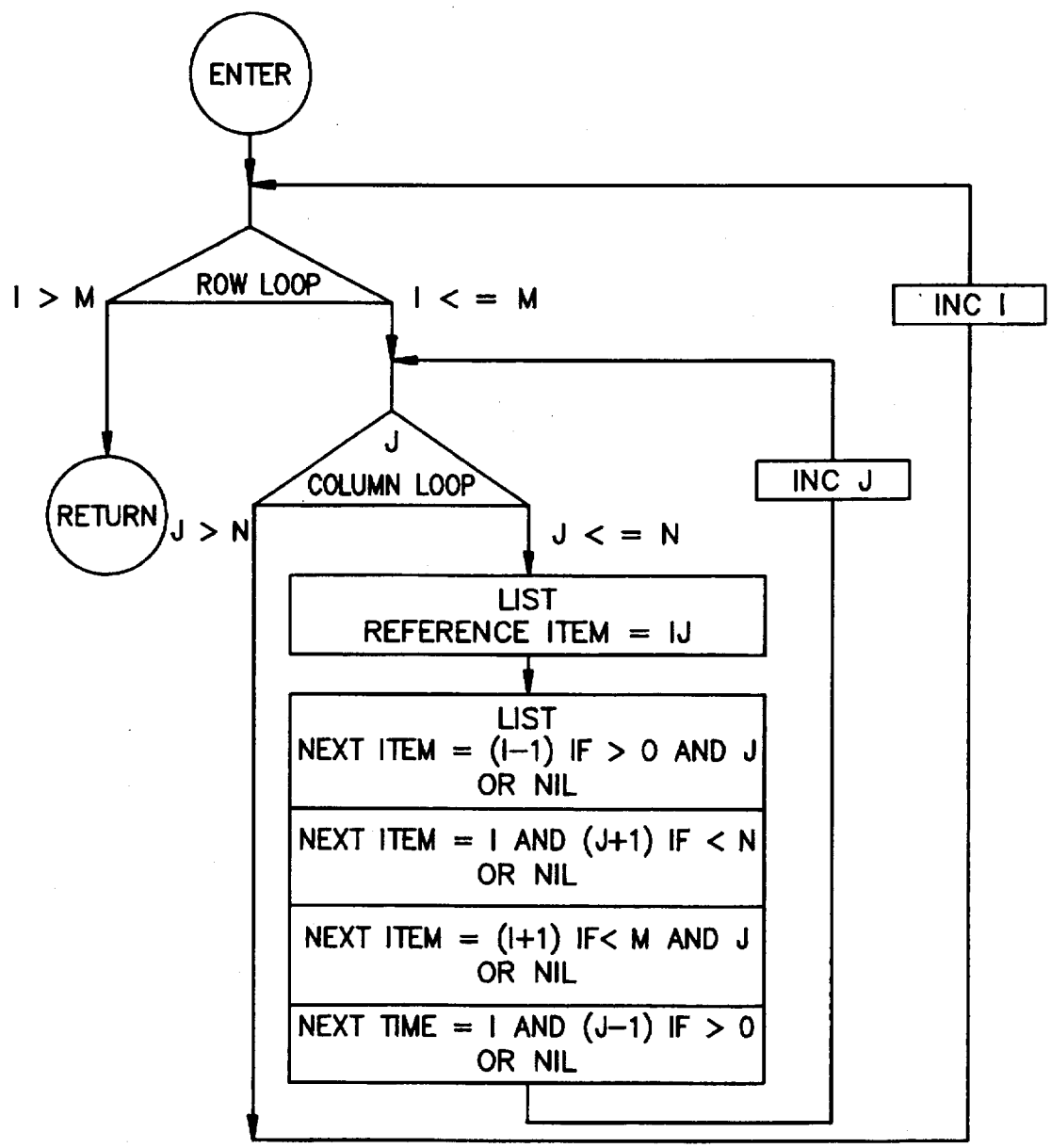

This description is turned into a procedure to develop an adjacency-list by following the computer flow diagram shown in FIG. 13. Proceeding to first index j for each row i, j being indexed from 1 to N, with i ranging from 1 to M, the adjacency list is developed by listing the reference items ij, i–1 j, ij+1, i+1 j, and ij–1, while satisfying the above-mentioned conditions so long as the entry is not a blank or "nil".

1. Inserting a Column

Figure 14:
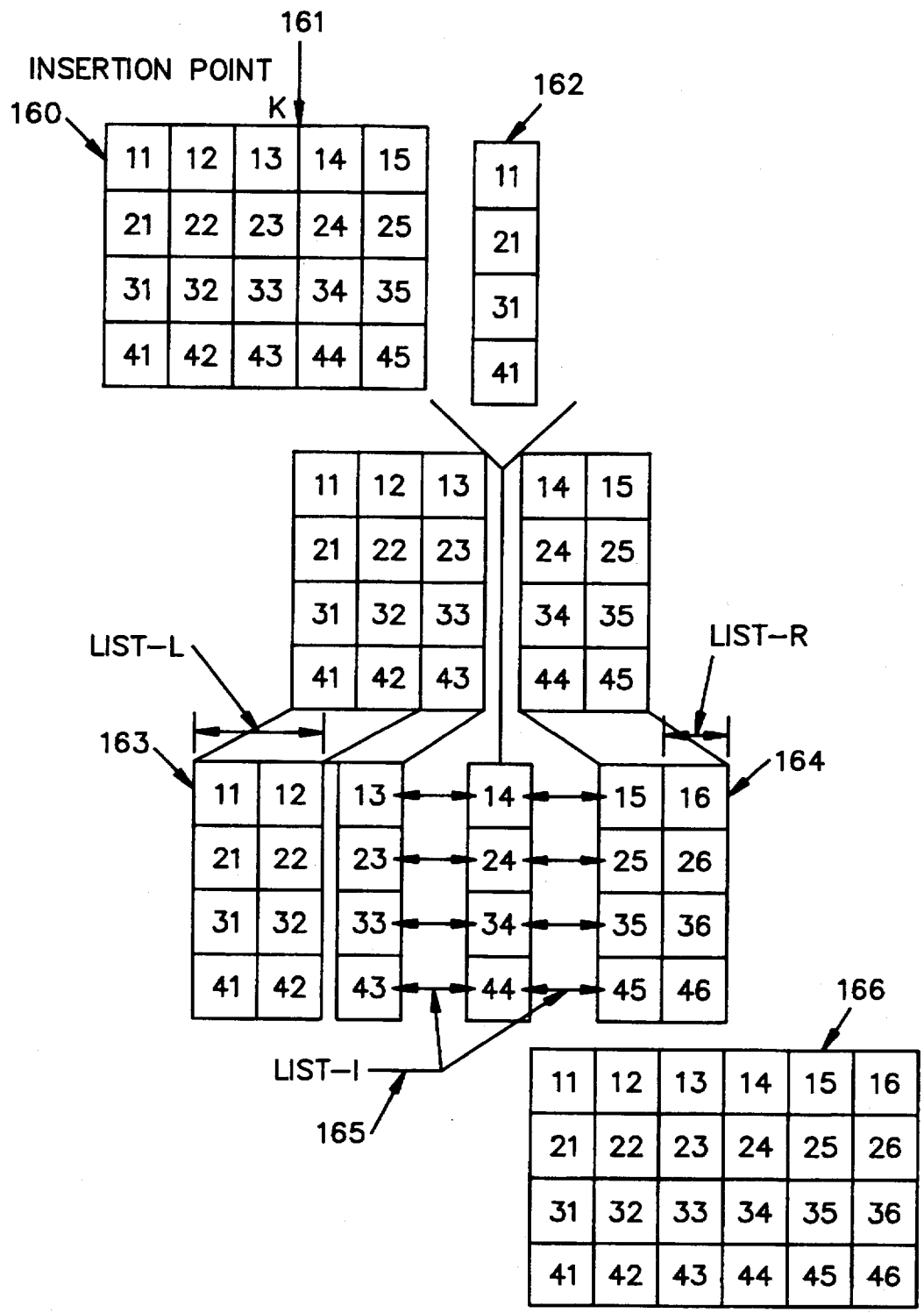
Figure 15:
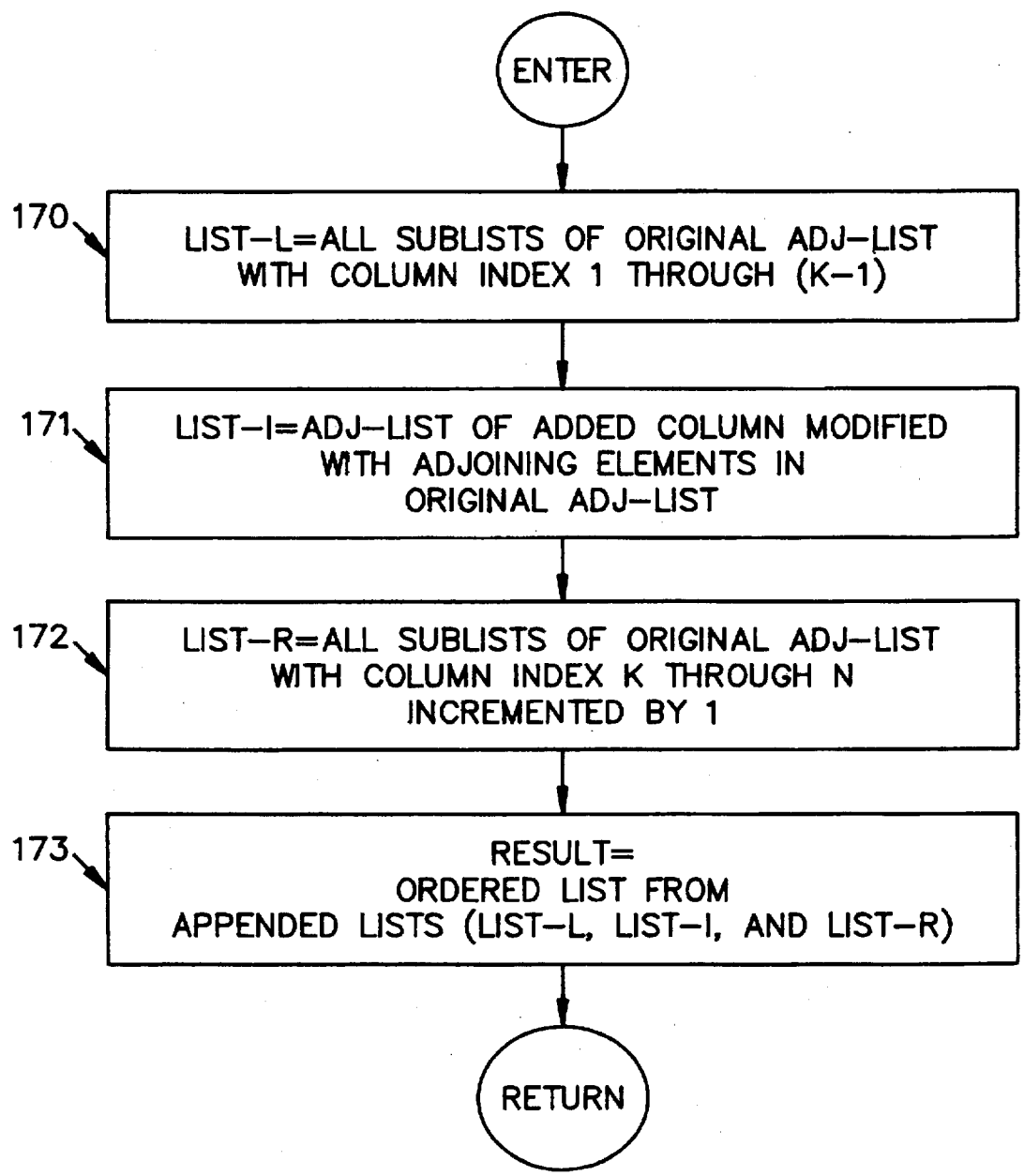
Figure 16:
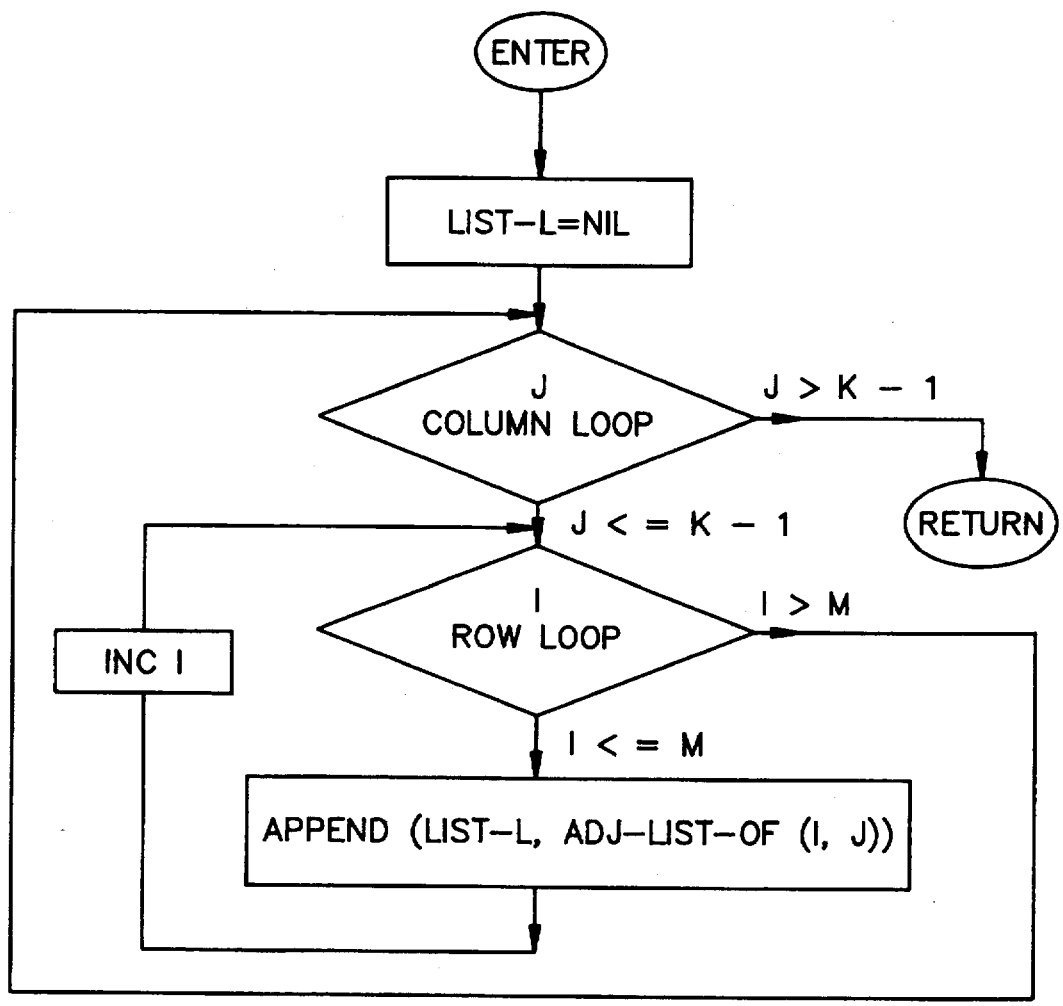
Figure 17:
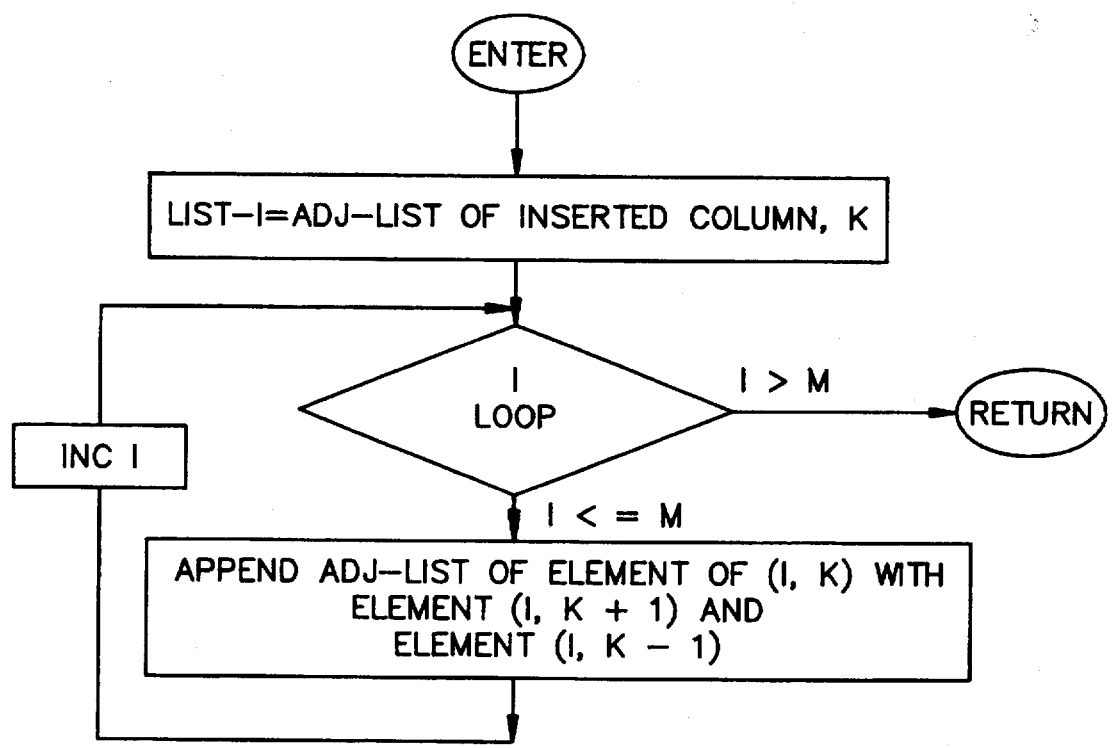
Figure 18:
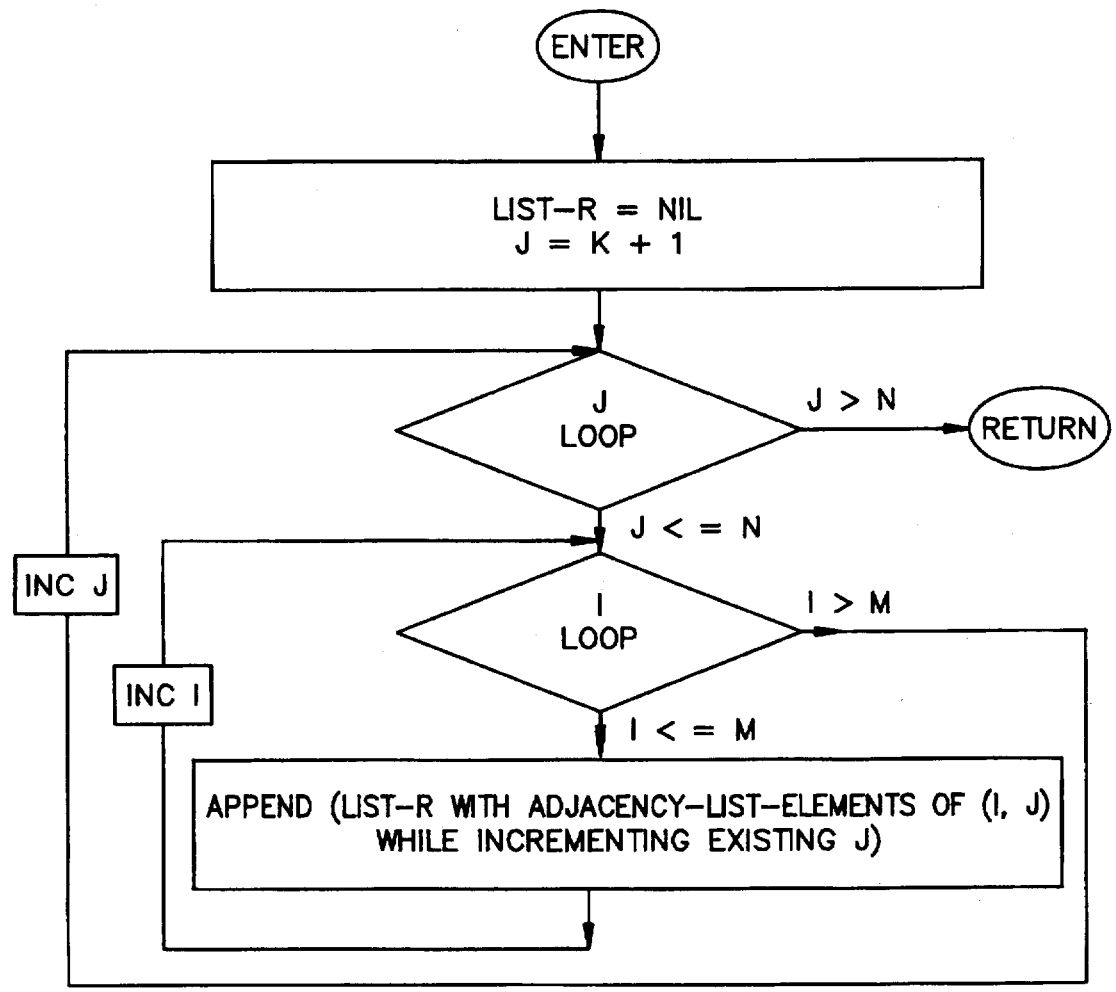
Figure 19:
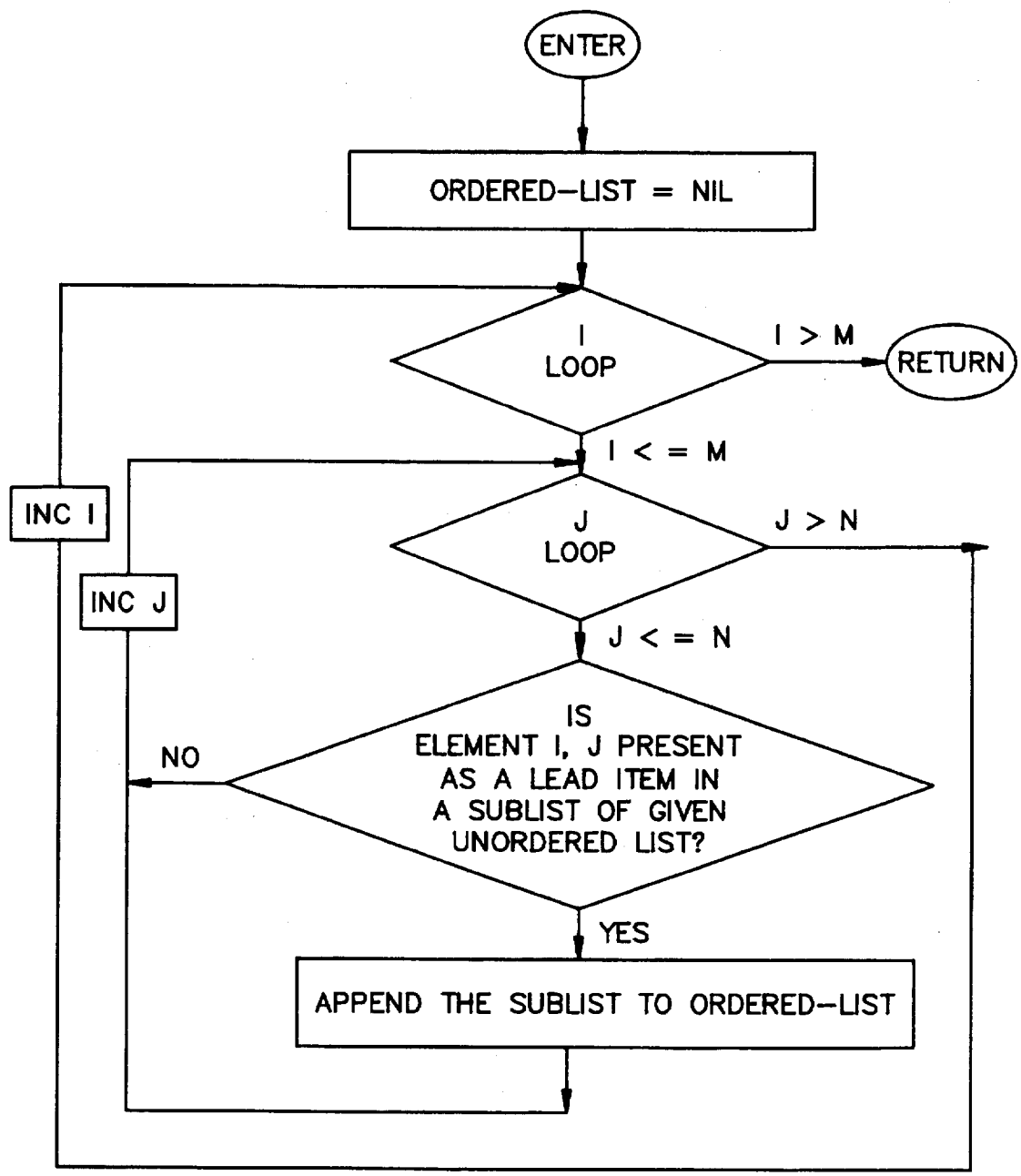
Figure 20:
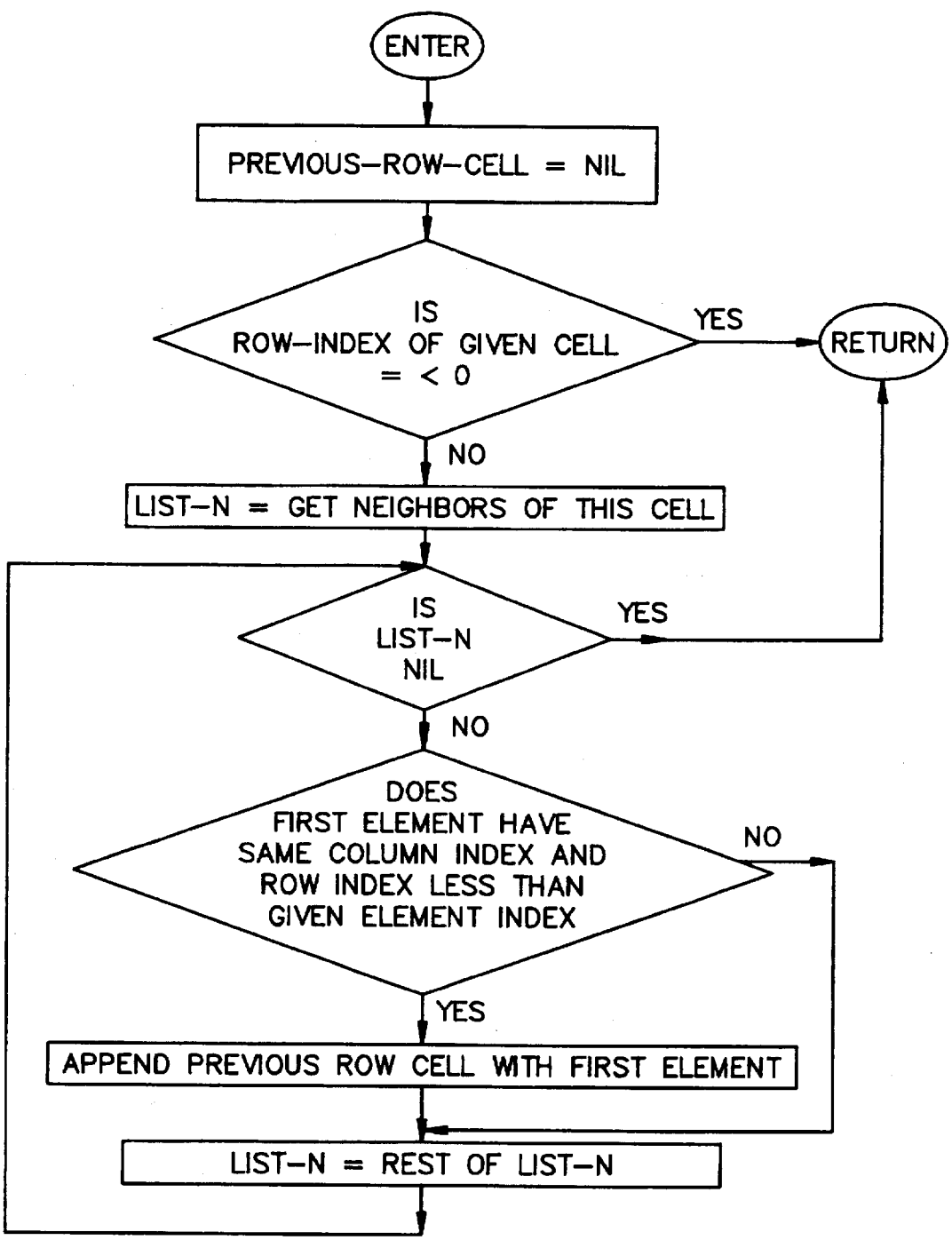
Figure 21:
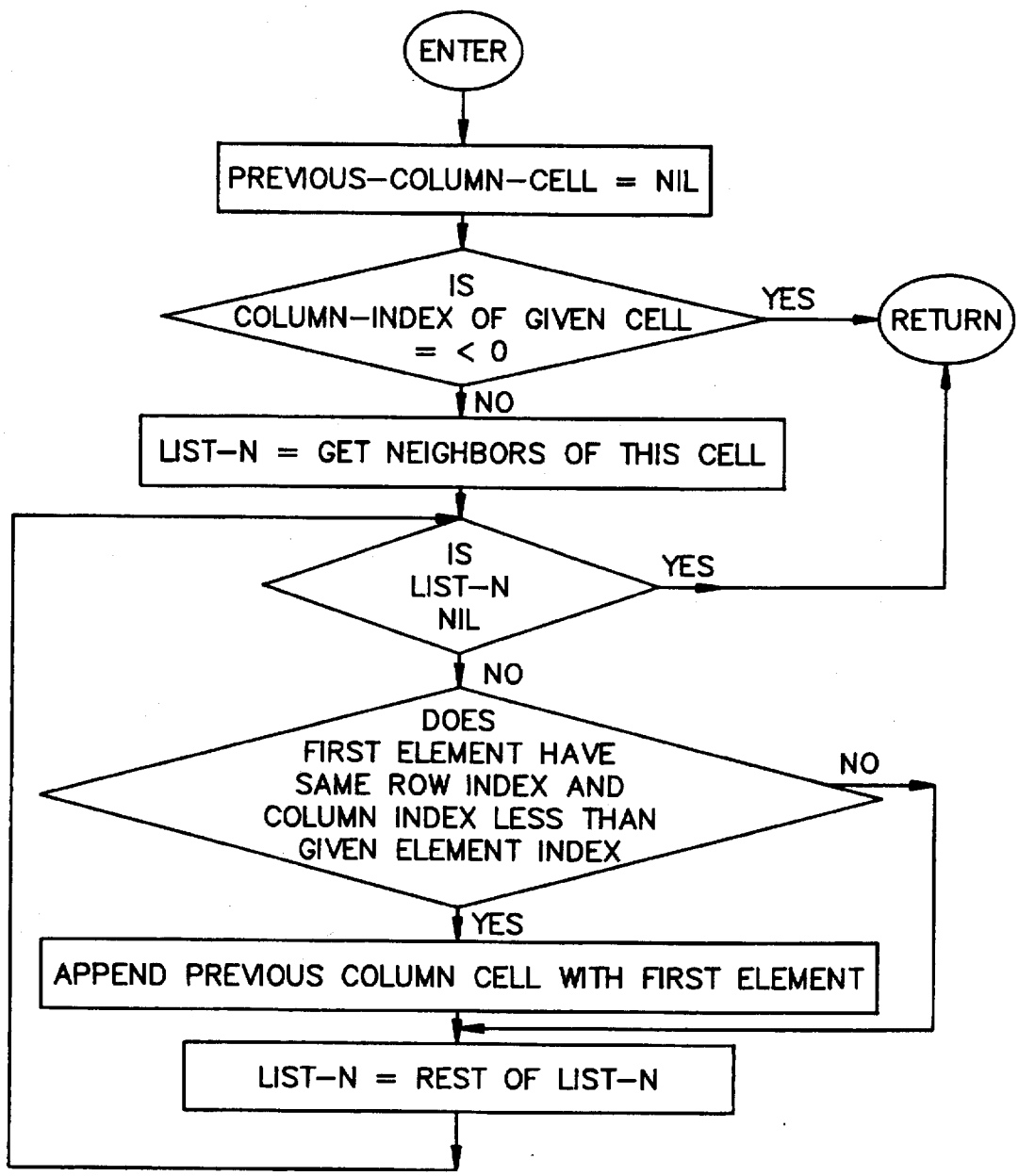
Figure 22:
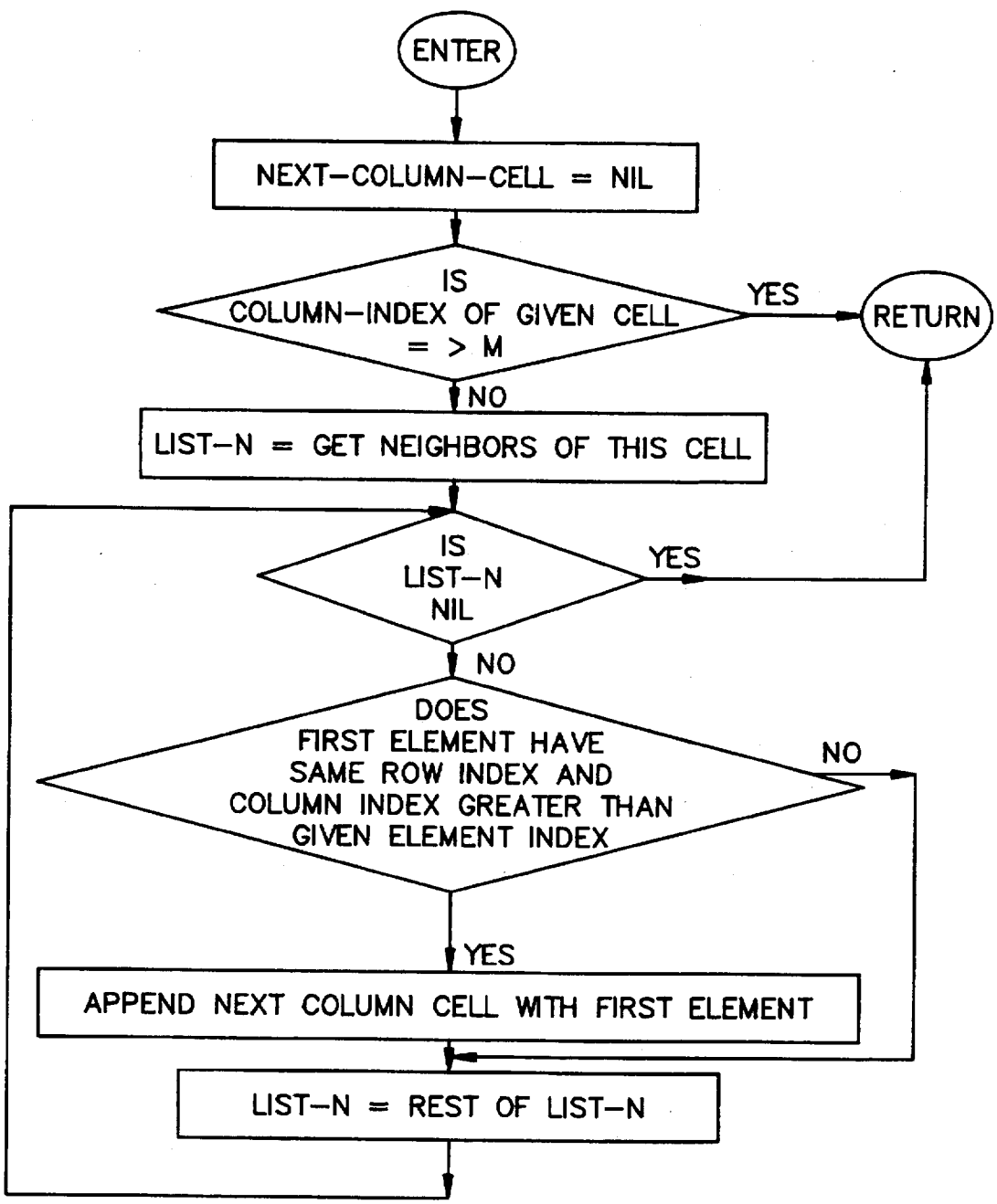
Figure 23:
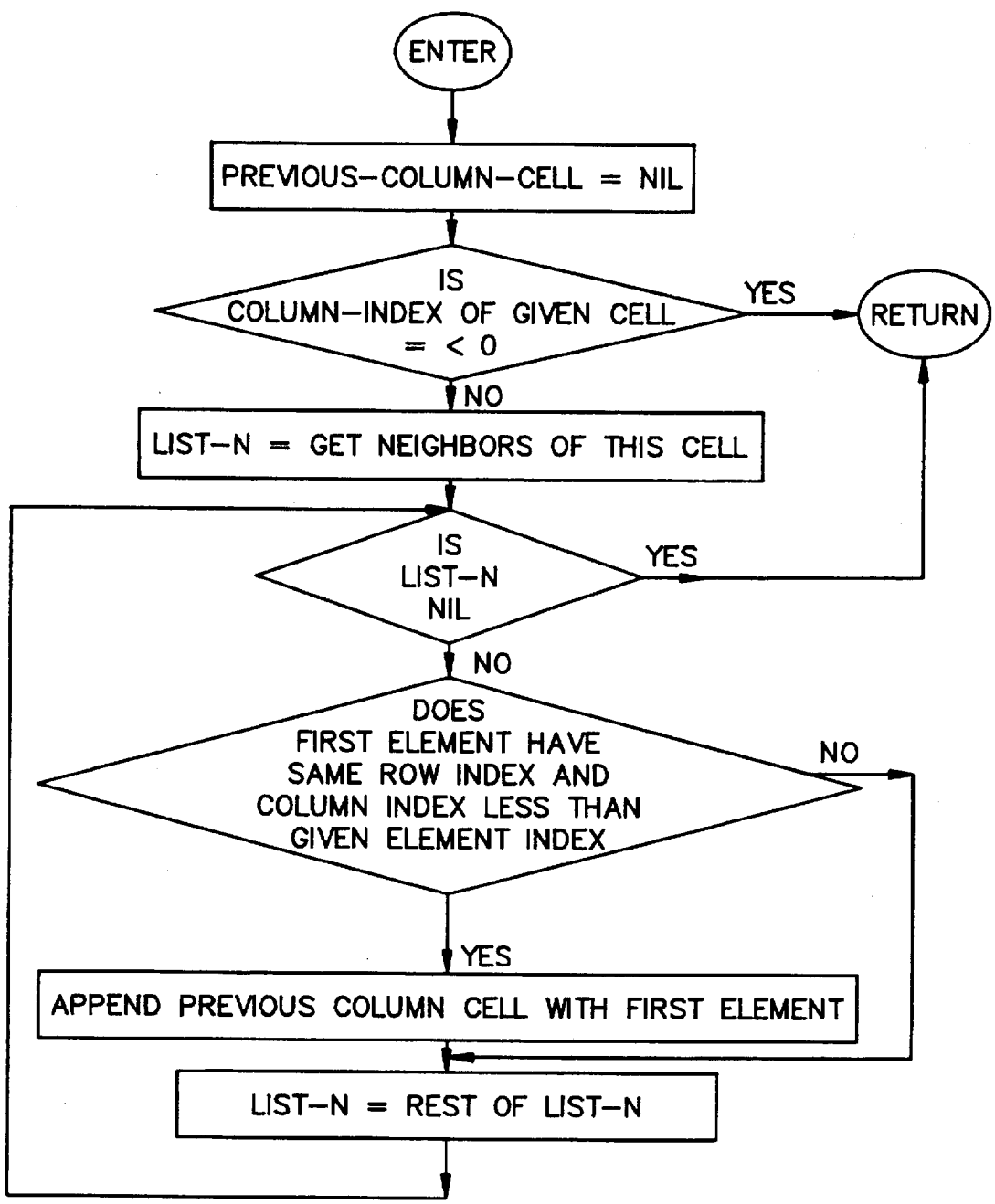

In order to insert a column or delete a specified column, the table is divided, as shown in FIG. 14, into a left portion 163 from column 1 to column K–1, whose adjacency-lists are unaffected by the insertion, a right portion 164, from column K+1 to n, whose adjacency lists are adjusted by incrementing each of the column index numbers by 1, and finally, inserted the column, which takes the column index number K+1 and its stand-alone adjacency lists. The adjacency lists of original columns K and K+1 are modified to show the new row-wise connections as shown at 165. This is illustrated by the flow diagrams of FIGS. 15–19. FIG. 15 shows the four principal steps of creating list L, which are sublists of the original list with column index 1 through k–1, creating list I, which is the adjacency list of added columns modified with adjoining elements in the original adjacency list, and creating list R, which includes all sublists of the original adjacency list with column index K through N incremented by 1. The result is an ordered list from appended list L, list I, and list R. The appending processes are shown in FIGS. 16–19 and are self-explanatory.

2. Locating Cells

When people see tables, they look up and down along columns, and back and forth along rows. In order to endow the natural computing system of the preferred embodiment with the same capability, procedures are given for obtaining a next cell along a row, a previous cell along a row, a next cell along a column, and finally a previous cell along a column. These functions are shown in FIGS. 20–23.

3. Deleting Rows and Columns

Figure 25:
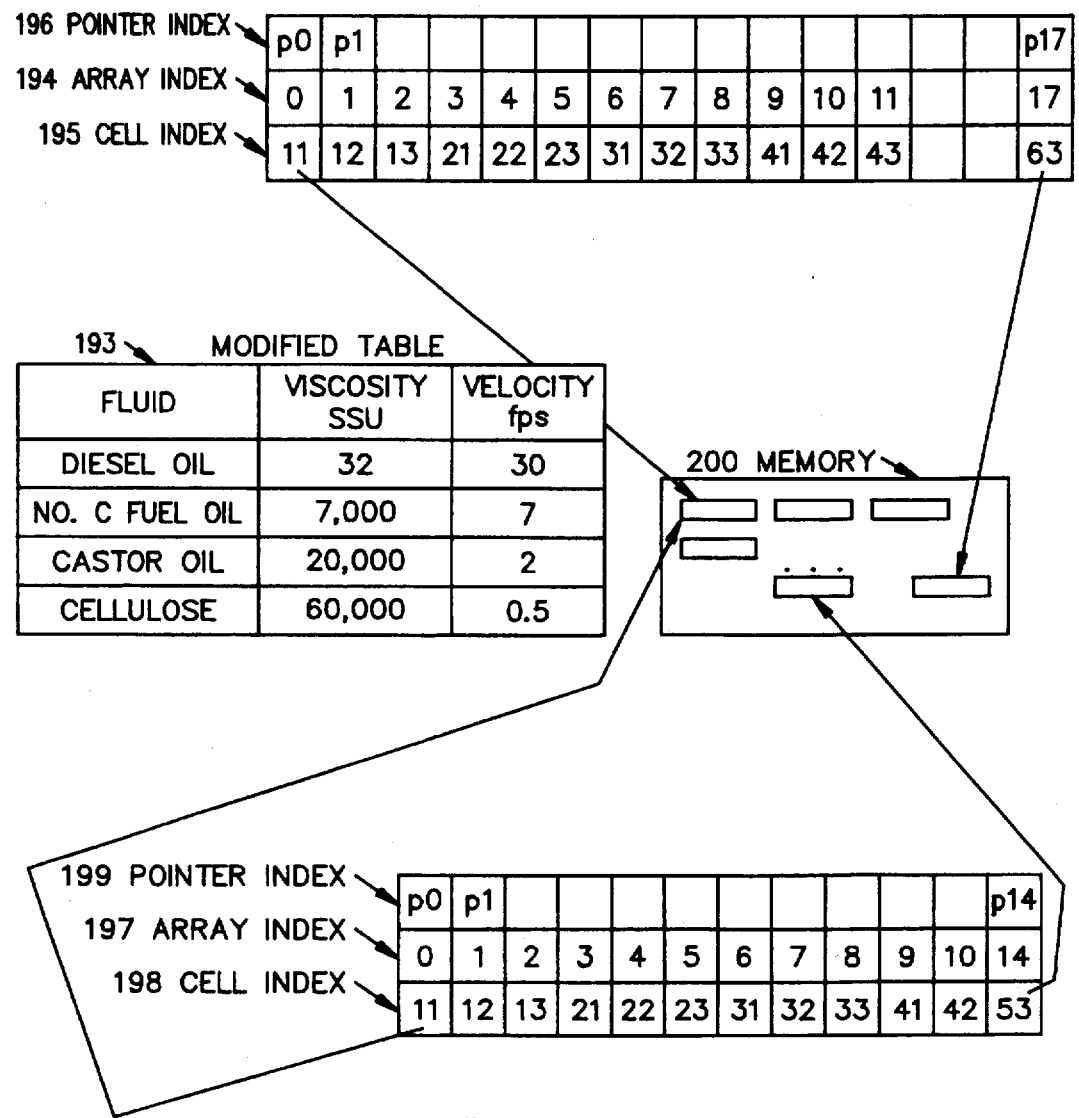
Figure 26:
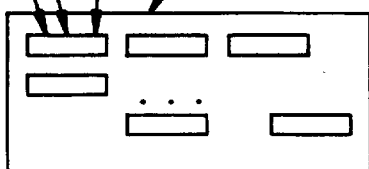
Figure 27:
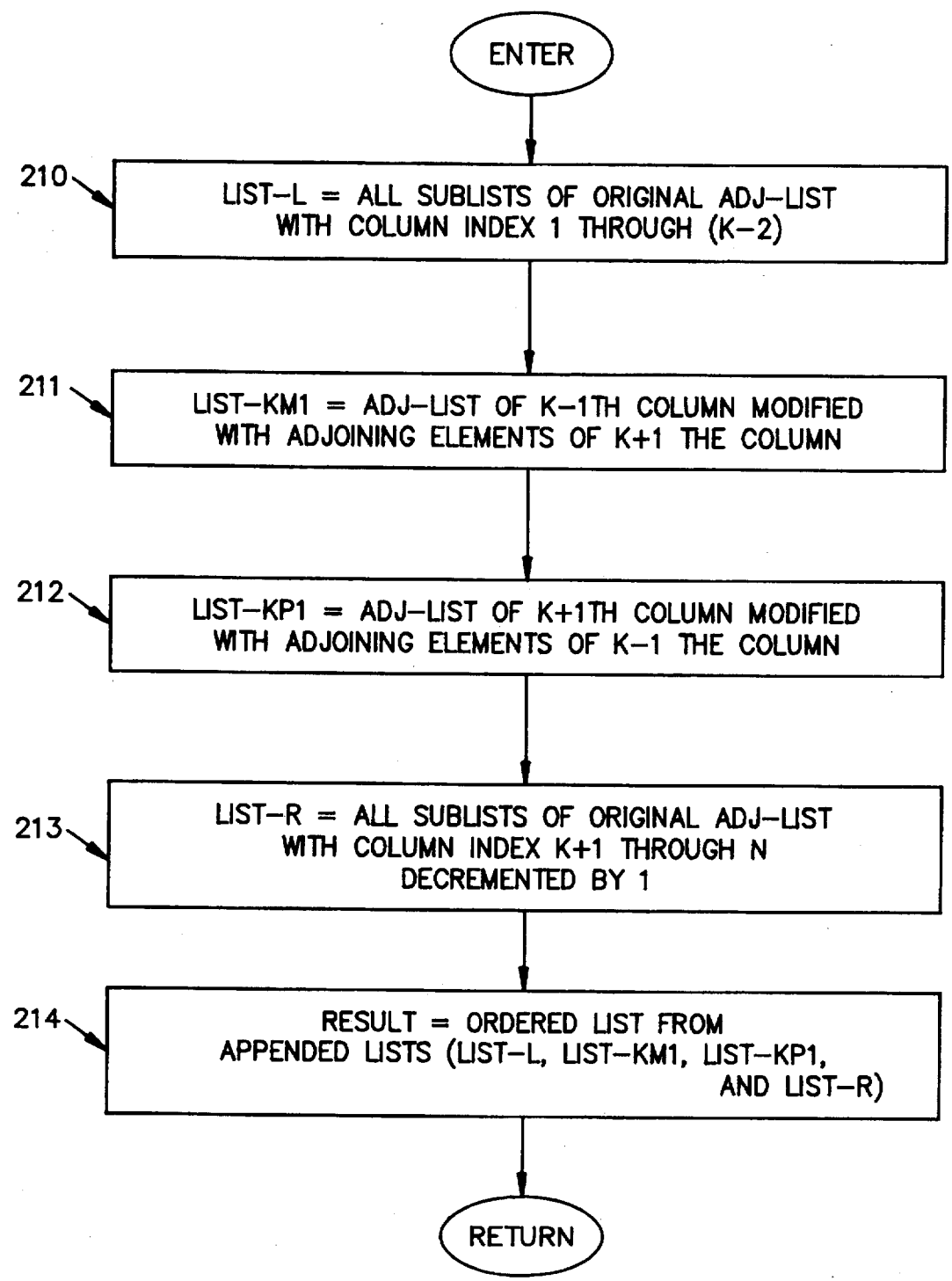
Figure 28:
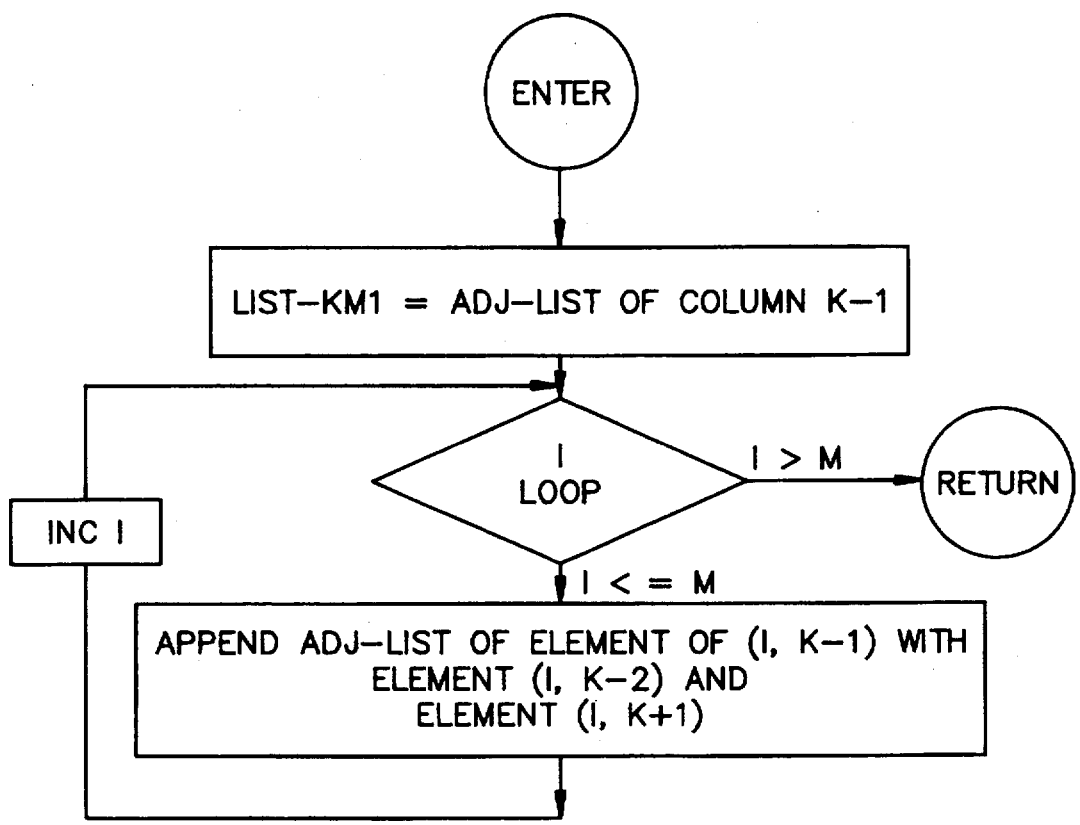
Figure 29:
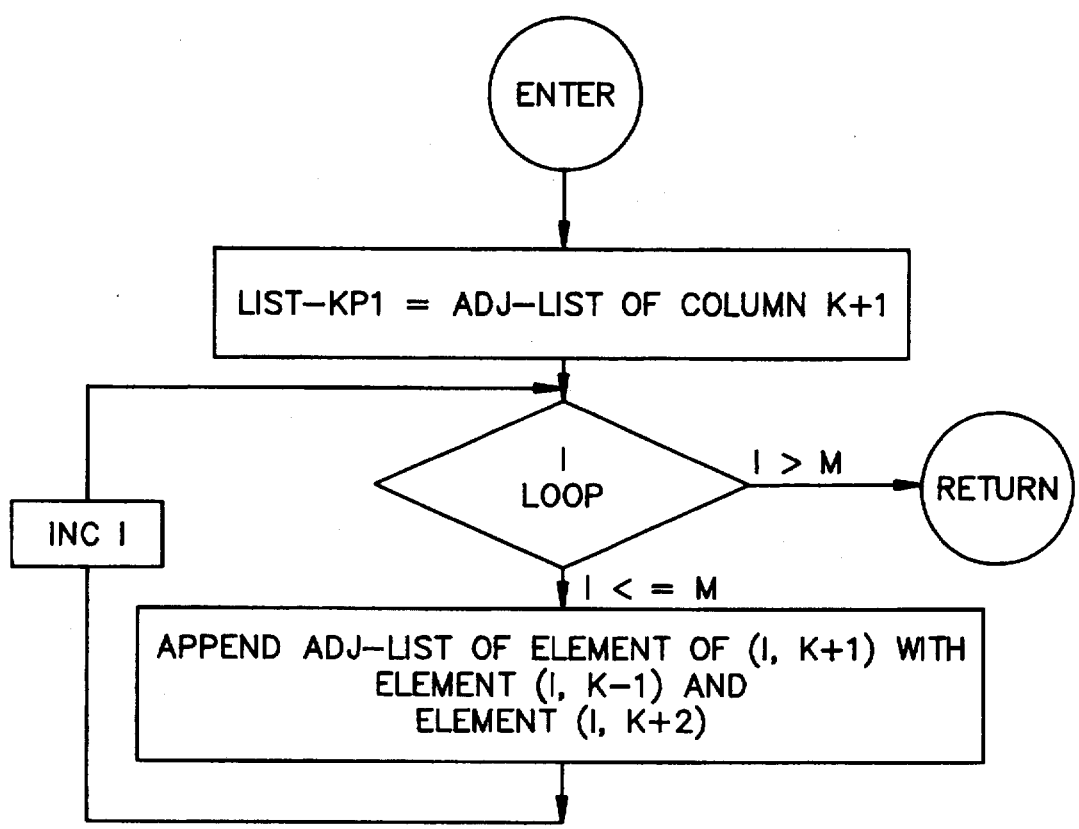

The manner of deleting a row from a table is shown in FIGS. 24–26. In the example shown, the third row is being deleted from the table of FIG. 24. As shown in FIG. 25, cells to be deleted are represented by 31, 32, and 33. The new pointers are a subset of the original pointer set with pointers P6–P8 corresponding to the deleted row consisting of cells 31–33. The representation of the new table therefore appears as in FIG. 26 with the cell index and corresponding pointers removed.

Figure 30:
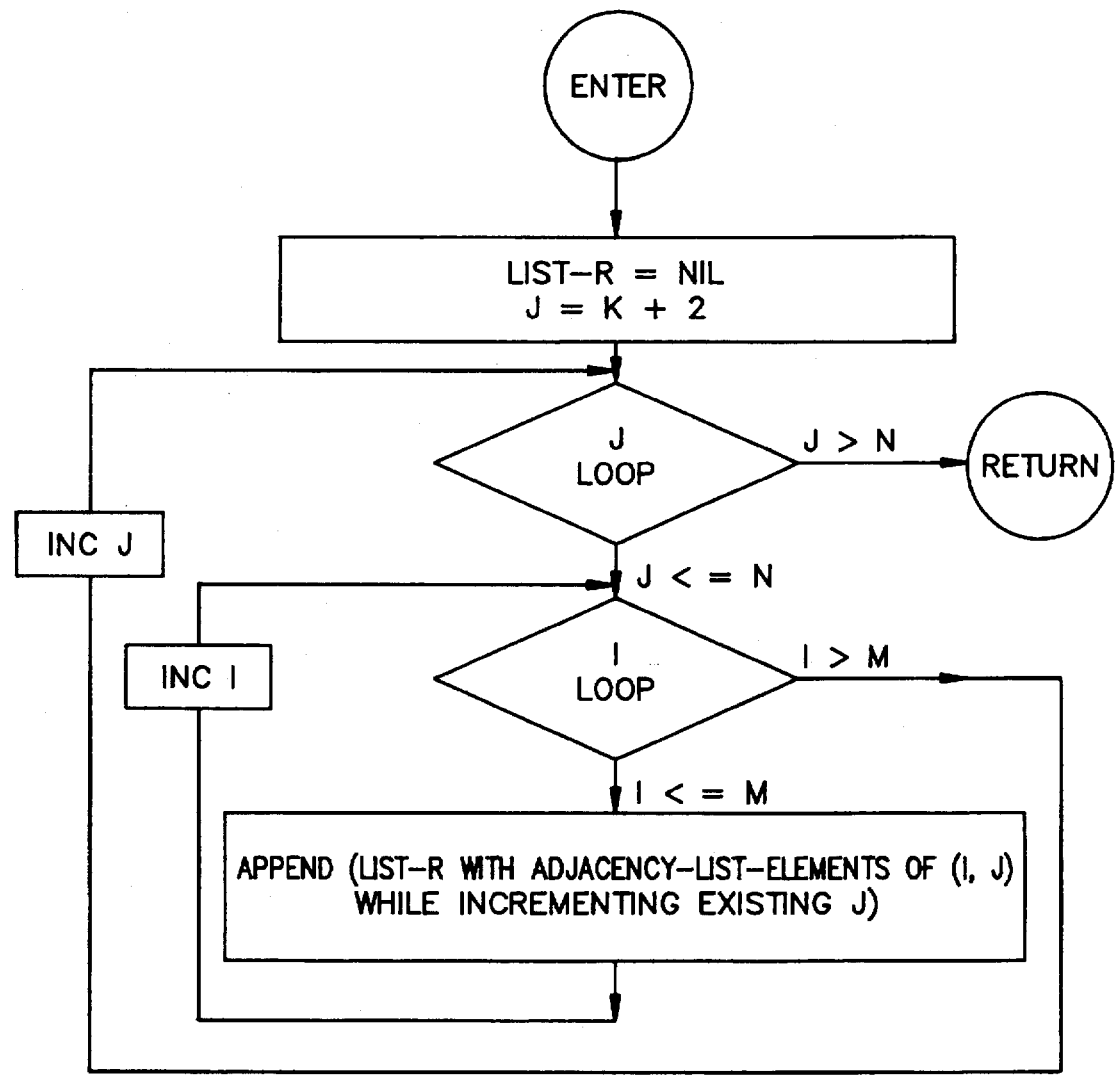

The procedure for deleting a column is shown in FIGS. 27–30, in which column K is deleted. There is no change in the adjacency list for columns 1 through K–2. As with the row addition procedure, a list L is compiled which collects all the sublists for these cells. The cells in column k–1 are modified in step 211, and the cells in column K+1 are modified in step 212. List R is compiled by collecting all sublists from column K+1–N, and each of these column numbers is decremented by 1 so that the new table will have one less column. The procedure for the generation of list R is illustrated in FIG. 30, and it will be noted that it is similar to the procedure shown in FIG. 18. Finally, the sublists, list L, list KM1, list KP1, and list R are all ordered, also as shown in FIG. 30, the ordering process being similar to the procedure shown in FIG. 19.

F. Cell Creation and Manipulation

Figure 31:
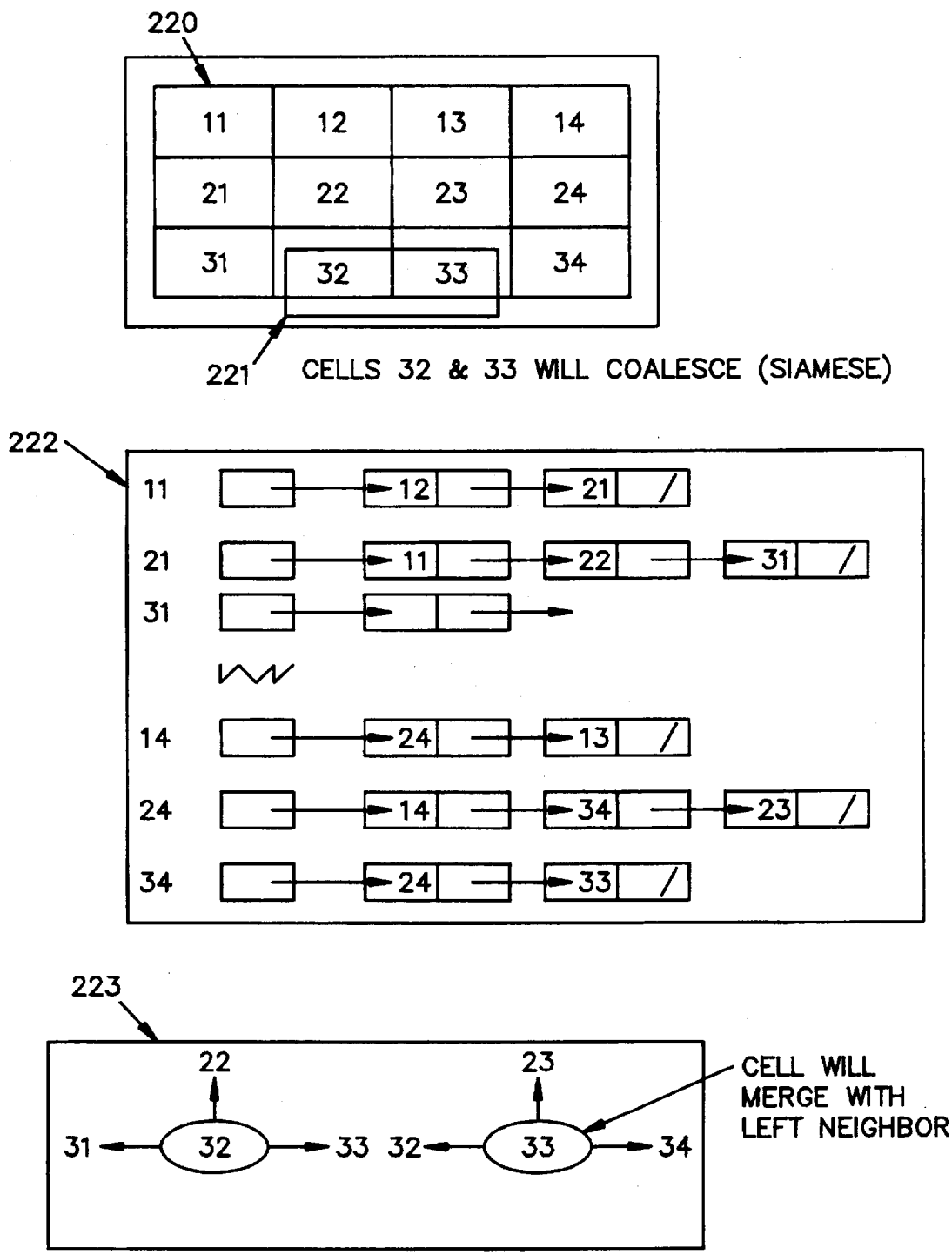
Figure 32:
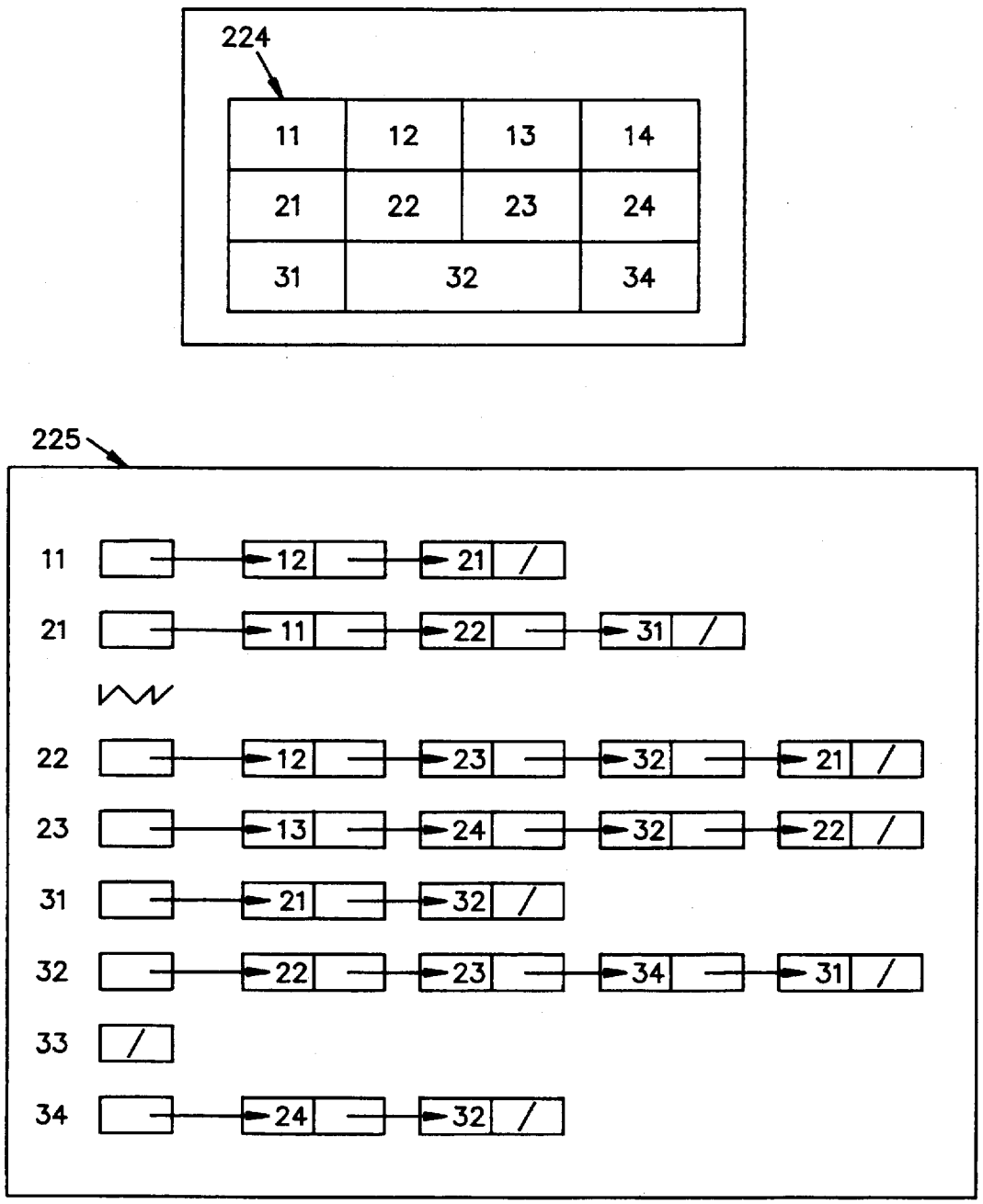
Figure 33:
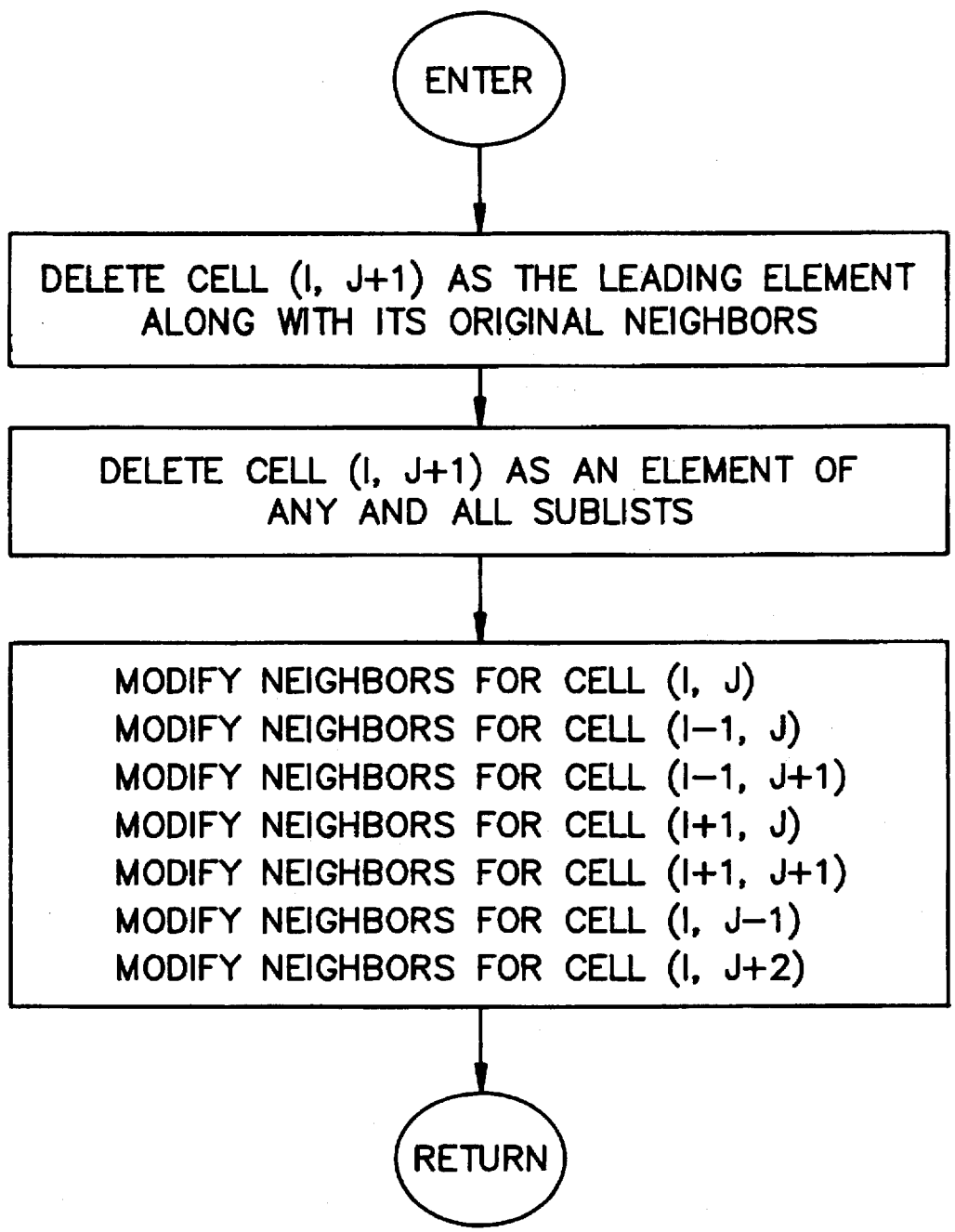

The procedure for creating a siamese cell is shown in FIGS. 31–33. It is essentially the same as the procedure for developing an adjacency list, except that modification of the neighbors for cell (i, j), (i–1, j), (i–1, j+1), (i+1, j), (i+1, j+1), (i, j–1), and (i, j+2) must be carried out. One starts with a rectangular table and selects a row and columns, in order to make a single cell out of the two cells. The adjacency-list representation for the original table and the effect of merging two cells on the local neighbors are shown in FIG. 31. It will be noted that cell 33, one of the cells being merged, does not exist in the new table. Instead, cell 32 has two upper or northern neighbors, namely cell 22 and cell 23. In turn, cell 22 and cell 23 both have cell 32 as the lower or southern neighbor. Cell 31 continues to have cell 32 as the rightward or eastern neighbor but, since cell 33 does not exist, cell 34 has cell 32 as the leftward or western neighbor.

This explanation can be generalized. If cells (i, j) and (i, j+1) merge to become a siamese cell (i, j), then cell (i, j+1) disappears, and the following neighborly relationships will prevail: cell (i, j) will have cell (i−1, j) and cell (i−1, j+1) as the northern neighbors. Cell (i, j) will have cell (i+1, j) and cell (i+1, j+1) as the southern neighbors. Both cell (i−1, j) and cell (i−1, j+1) will have cell (i, j) as the southern neighbor. Both cell (i+1, j) and cell (i+1, j+1) will have cell (i, j) as the northern neighbor. Cell (i, j−1), will have cell (i, j) as the eastern neighbor and cell (i, j+2) will have cell (i, j) as the western neighbor. In this generalized example, cell indexes are further restricted so that i≦M, i≧1, j≦N, and j≧1. The procedure for creating a siamese cell by merging consecutive cells into adjoining rows is similar except that the cell in the higher (southerly) row disappears.

Figure 34:
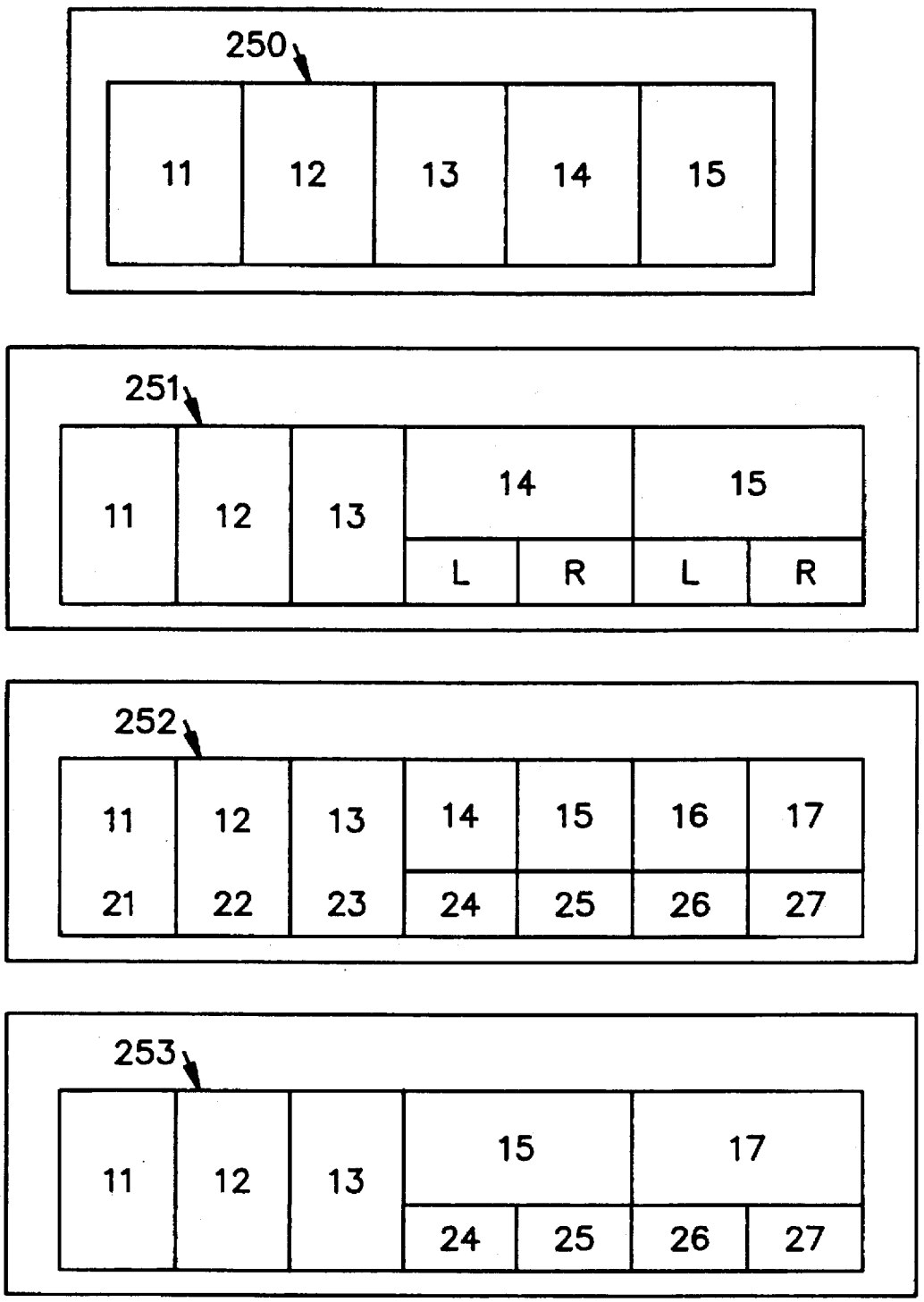
Figure 35:
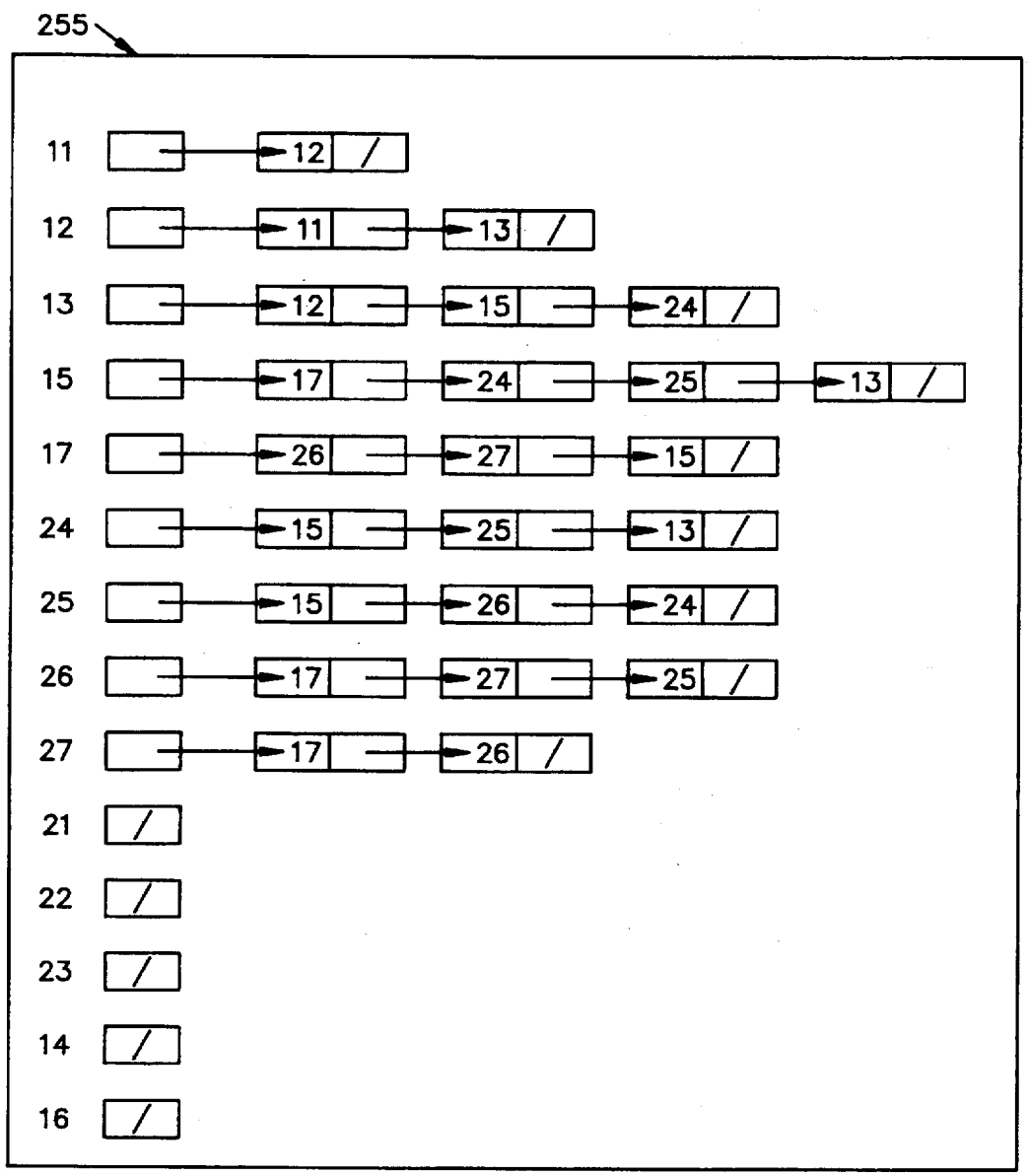

In order to generate twin-columns and twin-rows, for example for the table shown in FIG. 10, which has twin columns in the table header at two locations, one must undertake the steps shown in FIG. 34. One begins with a five column and one row table 250, adds a twin column L and R each to the fourth and fifth column, 251. Essentially, one is adding another row under cells 14 and 15. In order to balance the rows, another row is added to the entire table. Cells 21, 22 and 23 are indicated in italics and separated from the northerly neighbors by a dashed line indicating that these will be siamese of the northern neighbors, i.e., these cells will not exist in the table. Cells 14 and 16 are also introduced as siamese of their easterly neighbors and will also not appear in the final table. The table has seven columns and two rows, with five cells absent, as indicated by null neighbors in the adjacency list. The cells 11, 12, and 13 are row-wide siamese cells, and the cells 15 and 17 are column-wise siamese cells. The final display shape of the table is shown at 253. The adjacency list for this table can be generated by successively implementing the four steps of FIG. 34 and as represented by reference numeral 255 in FIG. 35.

G. Data Representations

Figure 36:
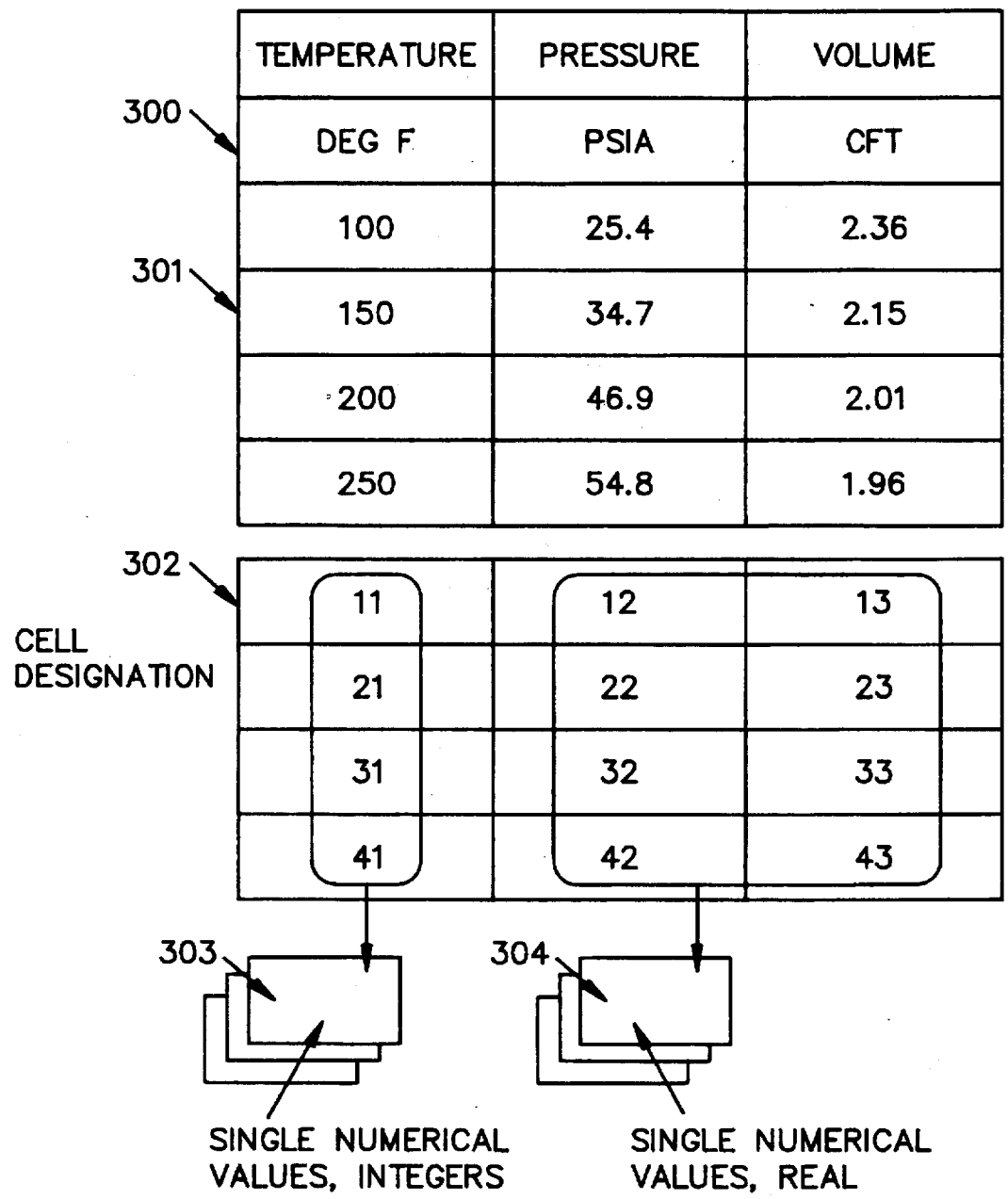

FIG. 36 shows an example of a table with a table header 300 and a table body 301 in order to illustrate the manner in which each cell is represented. The cells in the table body are given cell numbers 302, as explained in the previous description. Some cells, such as cell 11, contain a simple integer of value 100. Similarly, other cells such as cell one contains a real or floating point number of value 25.4. This can be accomplished by defining a cell as a data type that will contain a number either integer or real. This is the simplest case of a cell description.

Figure 37:
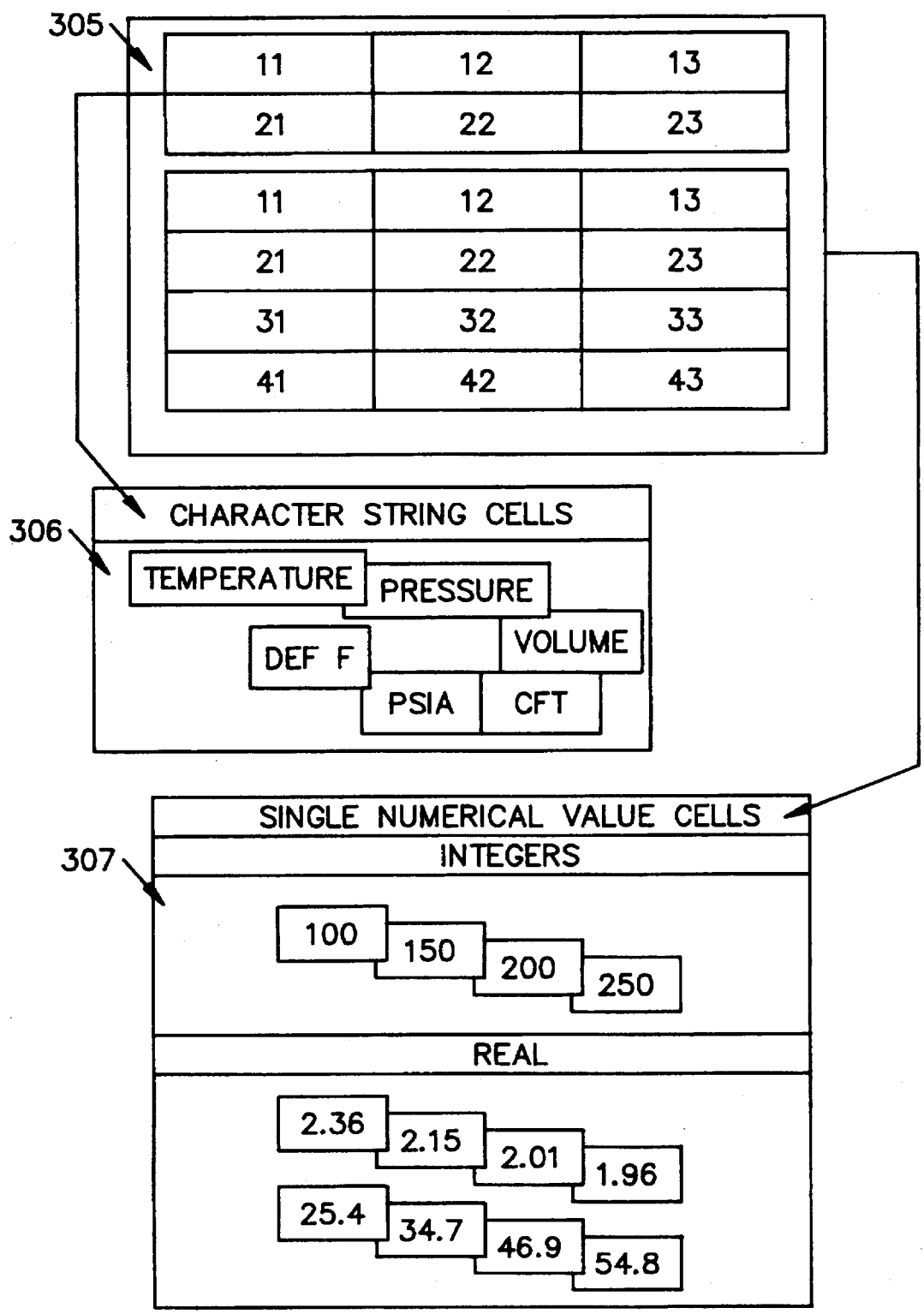

The more complicated situation is presented by the cells in the table header 300 in FIG. 36. These values are all character strings. In the case of a simple table such as the one illustrated in FIG. 36, three types of cells can be used to represent all of the table cells, as shown in FIG. 37. In this figure, cell designations 305 are appropriately connected to the character string cell type 306 and simple numerical integer and real cell type 307.

Figure 38:
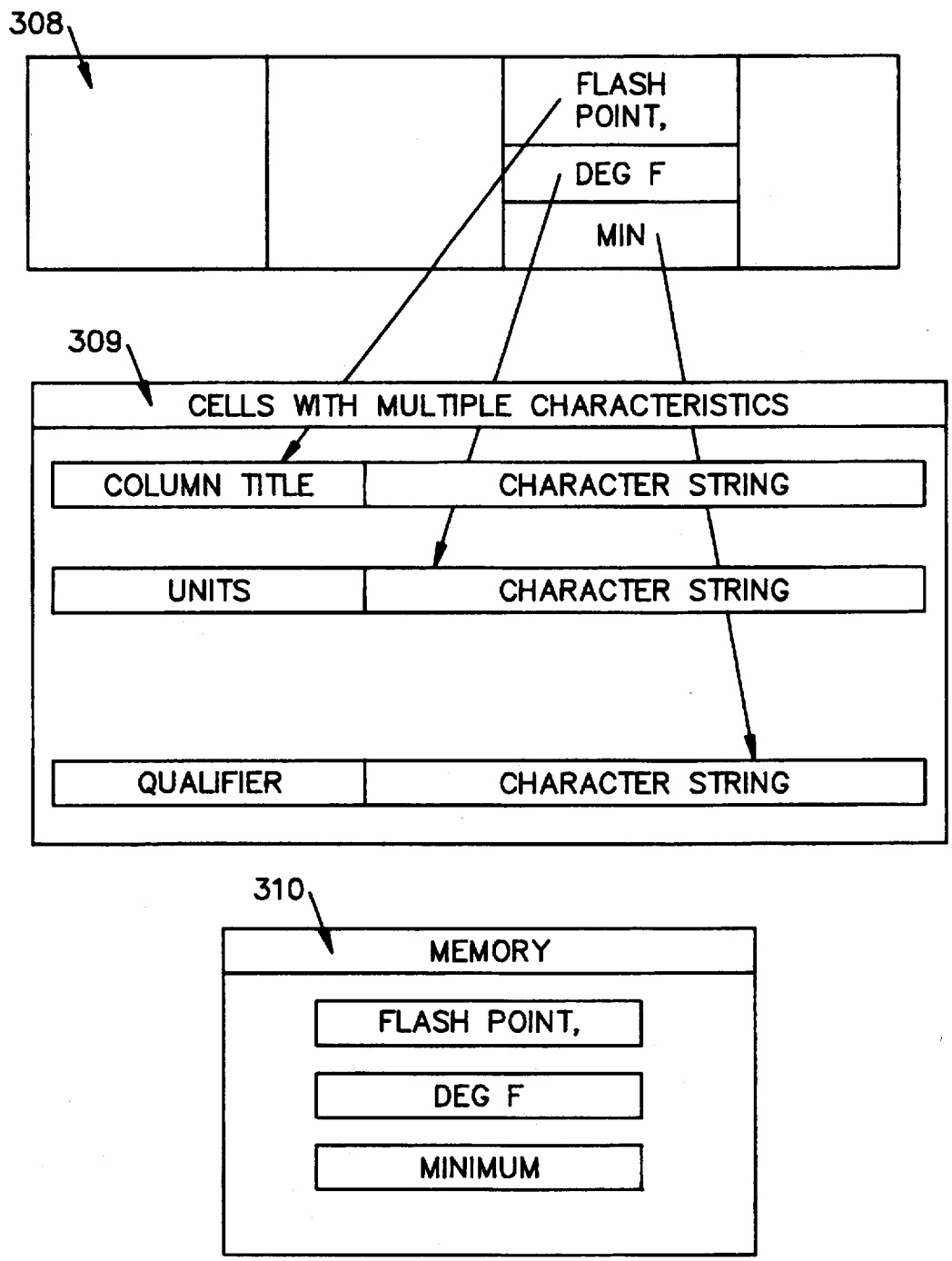

The above representations are, however, still overly simplistic. Real books contain more complex tables rich with semantic meanings. FIG. 38 shows a cell 308 from a table header in which three characteristics are grouped in a single cell: 1) a character string representing a column heading, 2) units of quantities in that column, and 3) a qualifier for the column heading. This is represented by a cell type 309 that has three subparts, each a character standing. The actual string values are shown in memory 310.

Figure 39:
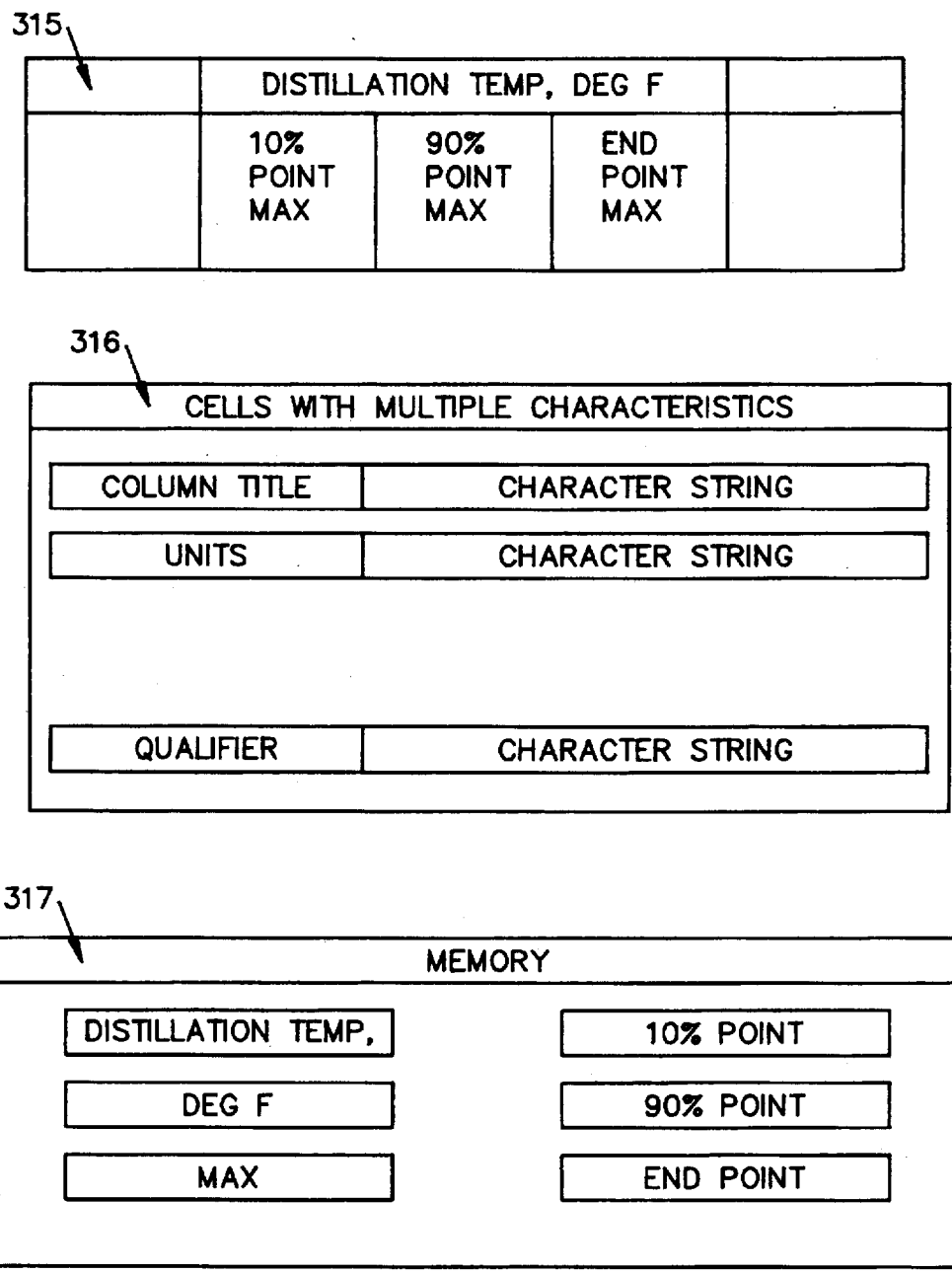

Humans are so adaptive that they learn new types of tables and understand new representations by looking at new examples. FIG. 39 shows a table where a single cell along a single line presents header information and units, as in table portion 315, in which a single cell contains the phrase "(DISTILLATION TEMP, DEG F.)" Moreover, in this example, under this cell, there are three column-wise multiple cells that derive or amplify the heading. These are "10% POINT MAX,""90% POINT MAX," and "END POINT MAX." In order to be able to represent these types of information, cell types 316 also as shown in FIG. 39 are defined. The information in memory is shown at 317 of FIG. 39.

Subtables present numerical information and qualify it as indicated by reference numeral 321 in FIG. 40. Here, the table header 320 is separated from the table body 321 for clarity. Yet another type of cell with a numeric value and an attached qualifier (example "100 OR LEGAL") is defined to handle this case. It will also be appreciated that a numerical value may be absent and only a qualifier such as "TRACE" may be presented in a single cell.

H. Blanks

Tables may contain blanks and writers use different notations to represent them. However, the writers differ in what they mean by a blank. FIG. 41 shows two types of blanks. One is a complete blank, where there is no value typed at all, and another is a set of three dots, ". . . ".

From a computer representation point of view, a blank is different from a value that is not defined. A blank is actually a value that is defined but has no definite value. Either the writer or the user, or some intermediate interpreter, has to provide a meaning to a blank if a meaningful computation can be processed with the blank. The preferred representation of blank is to use a constant BLANK or any symbol used by the author interpreted to mean BLANK. An example of a table body 325, including a cell 326 representing a blank, and its value in memory 327, are all illustrated in FIG. 41.

I. Footnotes and Captions

As indicated above, one of the unique features of the natural computing system and environment is the manner in which tables are represented by a plurality of objects, rather than as a simple matrix or grid, which allows a much more useful display and greater flexibility in using the tables.

In textbooks and handbooks, information in a table is often best qualified or amplified by means of footnotes. The cell to which a footnote applies carries a symbol, a letter, or a number which is explained in the footnote. When a user reads a table and obtains a value, the value needs to be qualified as indicated by the applicable footnote. The representation of cells with footnotes is an important facet of table representation.

FIG. 42 shows a table 330 in which footnotes are indicated at 331 and 332. Cells with footnote symbols are defined by means of a structure 335 in which cell information in the form of numerical values or character strings, the footnote symbol, and a pointer to the character string that carries the footnote value are represented. The values are stored in memory as indicated by a block 337 in FIG. 42.

The table caption is another important feature that needs to be represented. As shown in FIG. 43, a table caption 340 is represented by means of a structure 342 which includes a character string and any footnotes 341 attached to the caption, and pointers which lead to character strings in memory 343. This example also illustrates the possibility of using the footnote to refer to another table. A pointer to the other table can easily be included using the methods and structure of the preferred environment.

J. Multiple Information Within a Cell

FIG. 44 illustrates the common situation in which a cell of a table carries multiple sets of information. The table header cell 350 carries two variable names, VALUE-PRIMARY and VALUE-PARENTHETIC 351 while the table-body cell 352 carries two numeric values corresponding to each of these multiple values. The memory 354 shows all four values.

Similarly, a cell may contain not just single values, but a range of values, for example, between a minimum and a maximum. FIG. 45 shows an example 360 of a table with ranges of values along with the representation of cells 361 and the values in memory 362.

Figure 46:
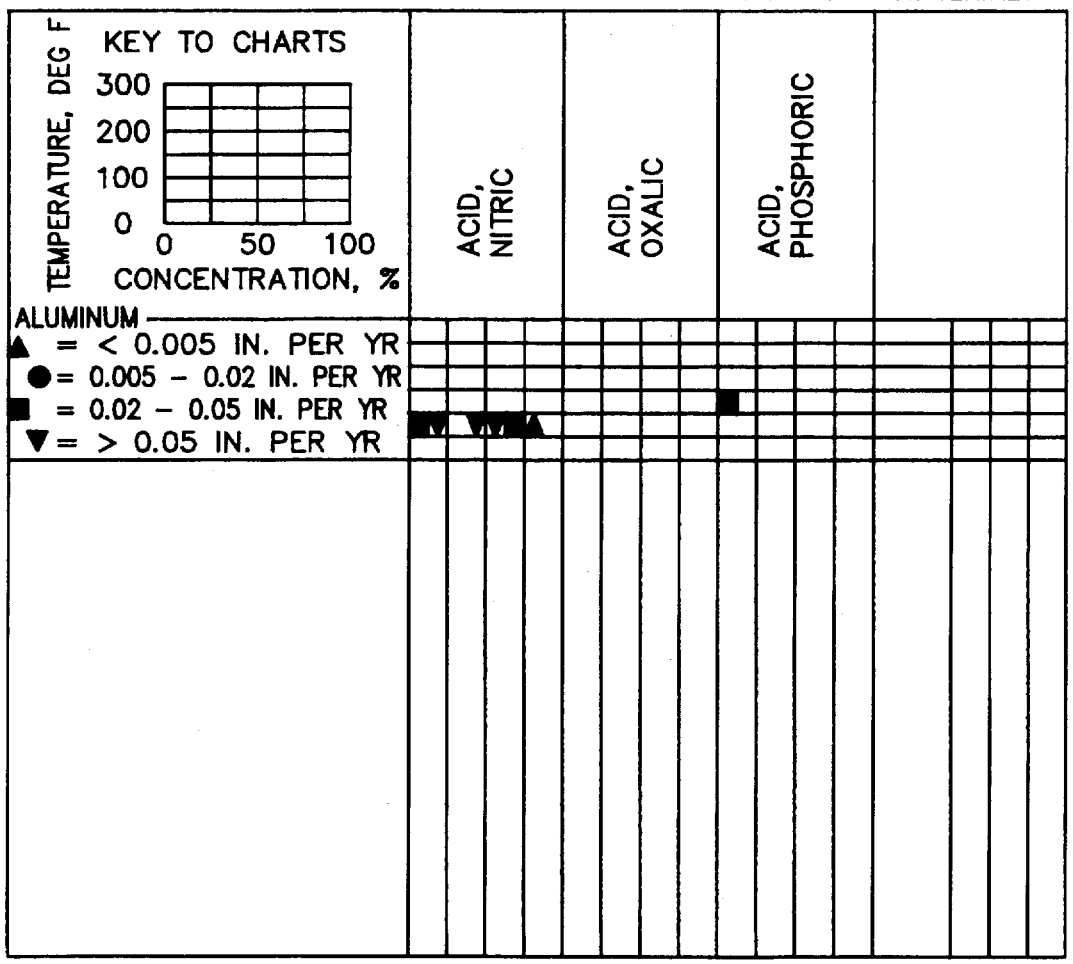

In addition, tables cells may contain graphic symbols, as illustrated in FIG. 46, equations, relationships in terms of other table cells, as in a spread sheet, and so forth. In each of these cases, the cell is easily represented by means of an appropriate pointer which points to the graphic symbol, equation, or relationship. In addition, tables may contain text which does not follow the table cells, but which still may be represented by appropriate pointers included with the table.

K. Display of Tables

In general, as will be apparent from the above description, tables are presented in terms of horizontal and vertical lines intersecting perpendicularly, creating rectangular cells where one would find or display values. The horizontal and vertical lines may be referred to as table grid lines. These lines follow the columns and subcolumns and the rows and subrows. Wherever there are Siamese-cells, the grid lines or cell rectangles are modified appropriately. In addition, there are some exception to the usual table format where the grid lines are partially or completely absent. For example, the business section of the daily newspaper contains stock market prices and performance but there are no horizontal lines separating each stock name entry. In the proposed environment, this is conveniently treated as a special case where the user input determines a display format. Each table type, represented by table 370 in FIG. 47, carries its display format information and a structure 371 appropriate to the table type.

L. Input/Output

FIG. 48 illustrates the ease with which the above-described tables may be utilized using a simple menu of the type which is easily programmed by one skilled in the art using standard menu-creation program routines. The table can either be called up for display purposes and used as a table, with the Show option on an Action menu, or called up for interactive use with the Interactive-Use operation on the Action menu. If the Interactive Use option is chosen, an input window and an output window are provided, such that if the user types in a value into the input window, the output window displays the output. The output may be a single value or a set of values depending on the particular table in use and the display choices are defaults set for the output window. In the examples shown, a set of two values, variable names and units have been output. As new values are input, the output values change.

The Interactive-use facility both serves to inform the reader what the output values would be for a given table and, more importantly, allows a developer or user to configure windows so that they can be connected to other features in building procedures and programs. The interactive-use option can also be utilized to test the table object for its isolated behavior, for example by testing for and identifying minimum, maximum, and other singular values. Thus, inadmissible input values can be determined before a table is utilized in procedures. This facility helps to isolate problems at the level of the object and allows the table to become a responsible or self-disciplined object, i.e., the table knows its limitations and does not cause errors to propagate to other parts of a procedure or program. Although not shown in this example, when a table allows interpolation or extrapolation, interactive use can help the user to ensure that the interpolation or extrapolation yields appropriate and meaningful results.

Figure 49:
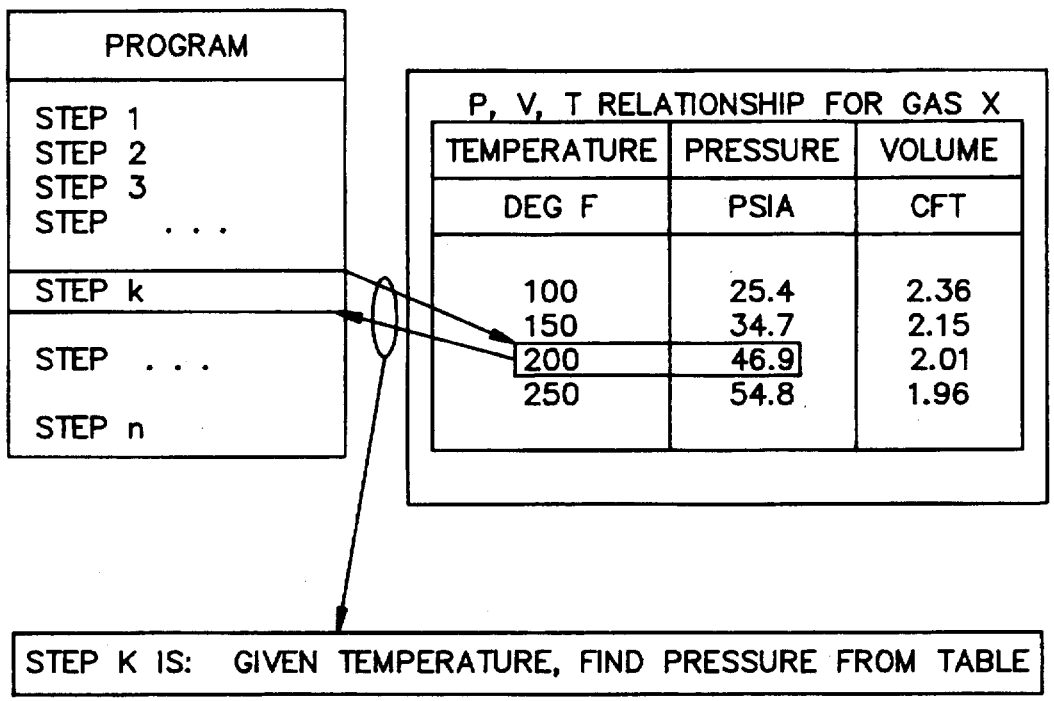

FIG. 49 illustrates the use of a table in a program. This function is called up by the Program Use option on the Action menu, which results in the provision of two focal objects, one the focal program and the other the focal table. The table is inserted into the program at step k. At the end of step k−1, a value (in the given example, a temperature value) for the input to the table becomes available. During step k, at the time of program execution, an output value (pressure) is computed from the table. This value is then passed on to step k+1 of the program.

FIG. 50A shows the preferred general procedure for inputting values to fill in a table. In this option, a developer or user is provided with a list of parameters in the blank table so that values can be typed in. For example, the caption, column headings, units and a matrix of values are input into a simple table. The system allows several types of classes of tables to be predefined and choices to be made from among them. In addition, a developer or user can modify the tables and use any modified class of tables.

Figure 50B:
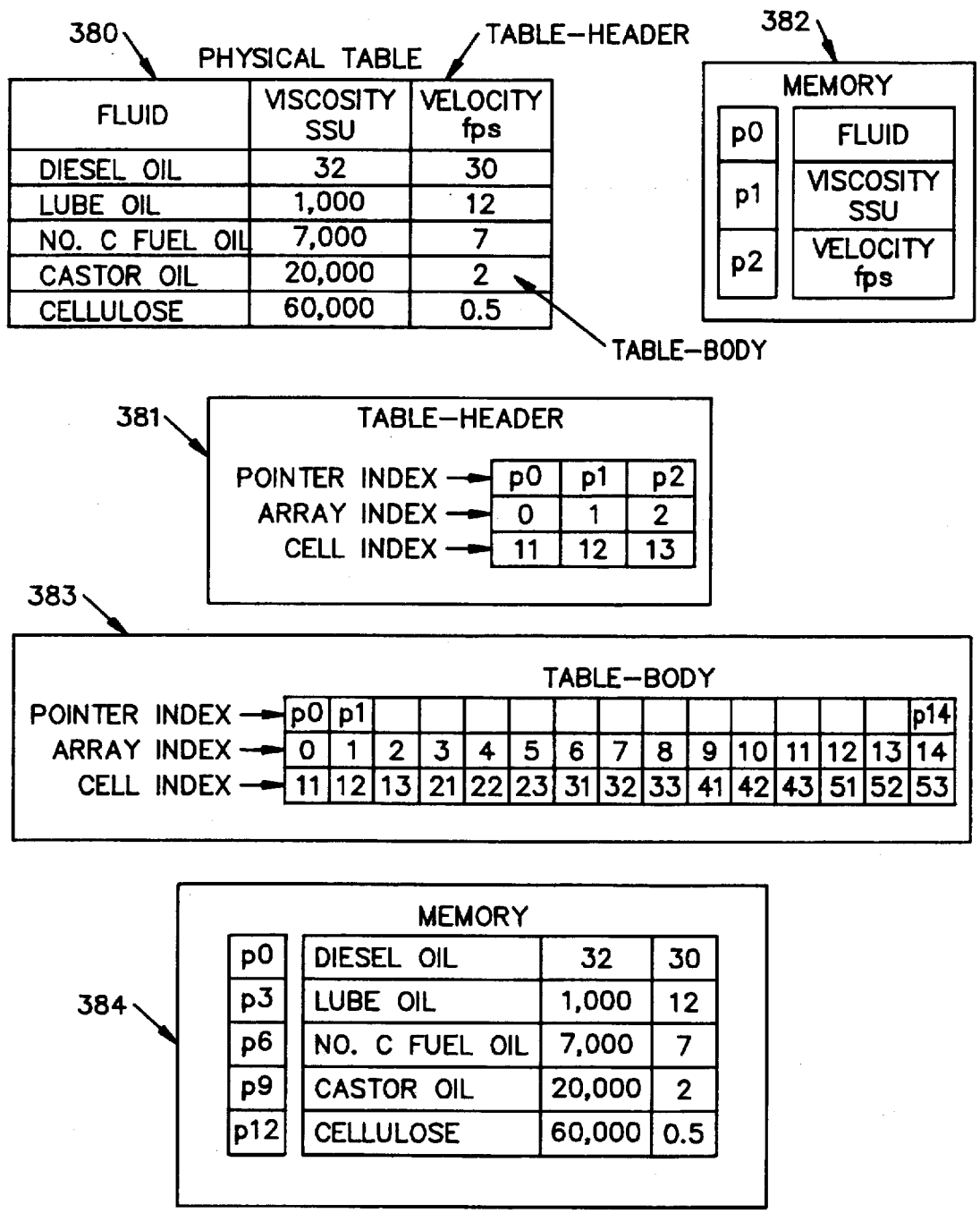
Figure 50C:
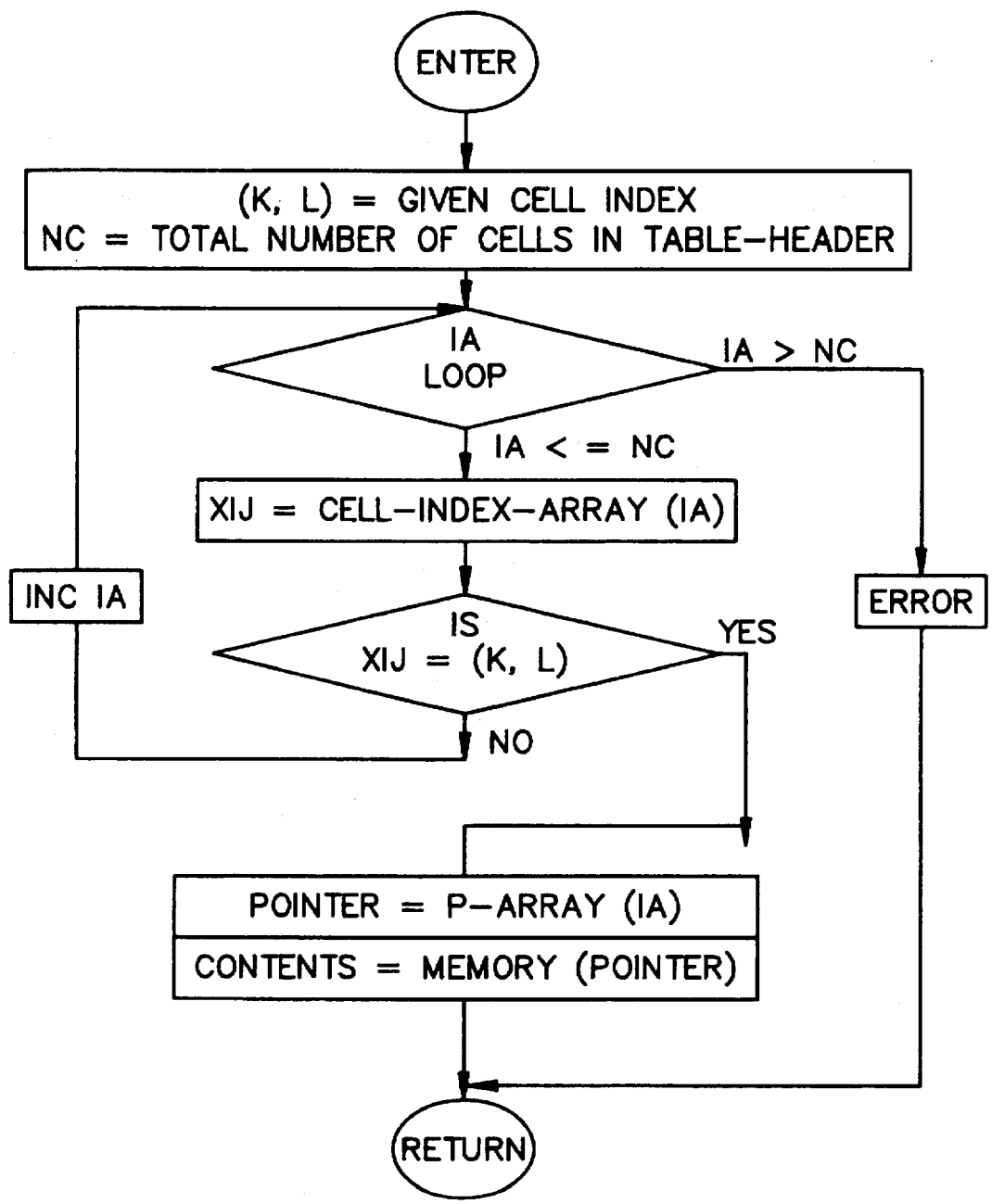

In order to obtain values contained in a cell, given a cell index, thereby facilitating retrieval of a pointer and through the contents from memory, as illustrated in FIG. 50B, a physical table, 380, is represented by three vectors with pointer-index, array-index and cell-index for both the table header, 381, and a table body, 383. In memory, the table-header, 382, and the table-body, 384, are represented in association with the memory pointers. In both the table-header and the table-body, an array index connects the cell index and the corresponding pointer into memory. Whenever the need arises to access the memory, one first needs to access the pointer, which can be obtained by getting the index which is cross-referenced to the cell index as shown in these vectors. FIG. 50C shows the flow diagram for the procedure to get the contents from memory for a given cell index in a table-header while FIG. 50D shows the flow diagram for the same procedure for a table-body.

Figure 50D:
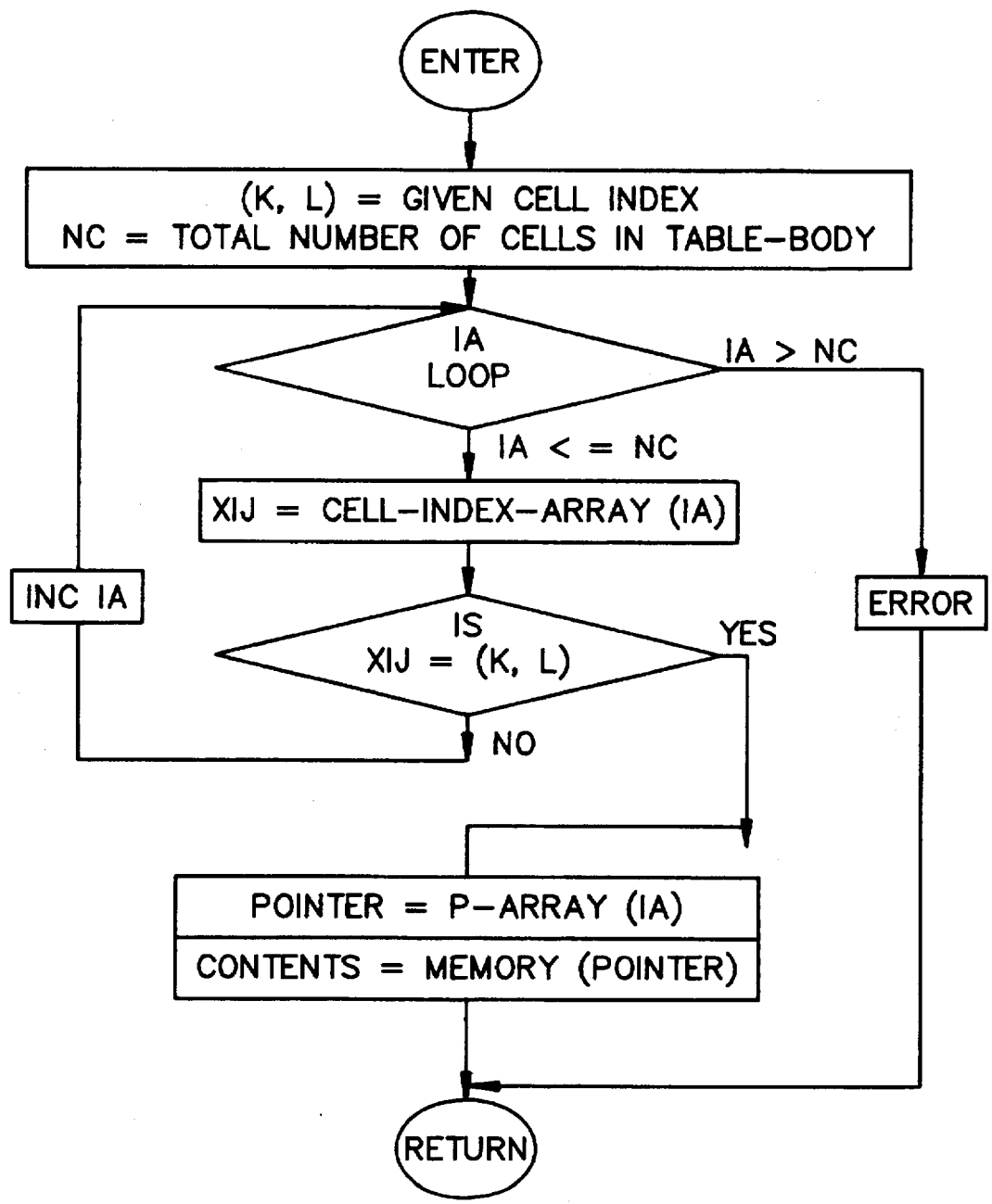
Figure 50E:
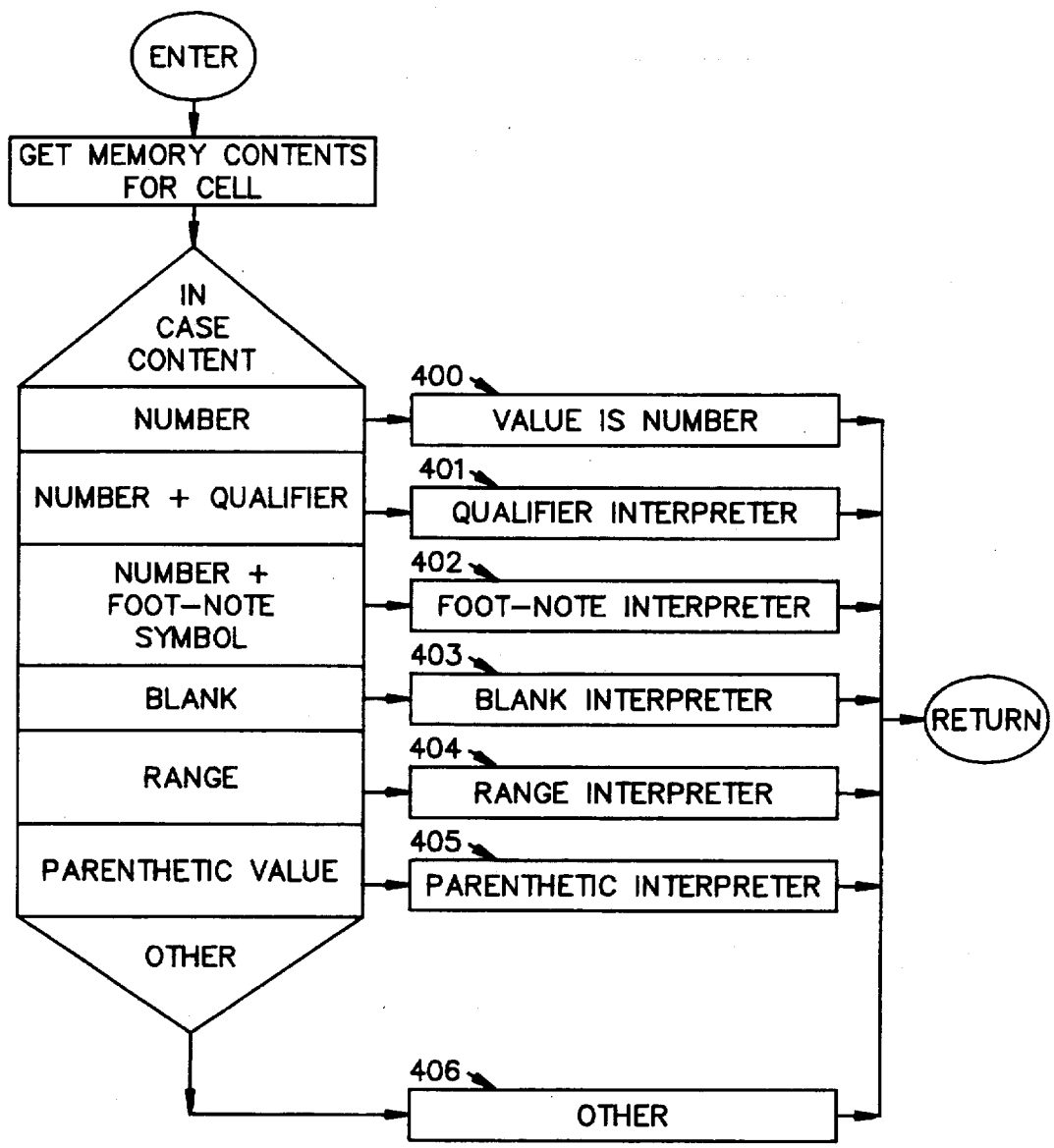

Following the procedures outlined either in FIG. 50C or in FIG. 50D, one can obtain the raw contents of any cell (in the table header or table body). The next step is to interpret them. The nature of the raw contents of a cell, determines the interpretation of the cell value, as shown in FIG. 50D. If the value is a number, it is returned (step 400), unless, as shown at 401, the contents are a number and a qualifier, in which case a qualifier interpreter is invoked or, as shown at 402, the contents consist of a number and a foot-note symbol, in which case a foot-note interpreter is invoked. As shown at 403, if the contents are a blank (or a symbol indicating a blank), a blank interpreter will be invoked, while, as shown at 404, if the contents are a range of values, a range interpreter will be invoked. Finally, as shown at 405, if the contents are a parenthetic value(s), a parenthetic interpreter will be invoked and, if the contents are other values, another application specific (extended) interpreter will be invoked.

The qualifier interpreter, 401, consists of an array of qualifiers and a corresponding array of numbers. The qualifier interpreter compares the qualifier encountered in the contents and returns the matching numerical value. These two arrays are input by the domain expert or specialist that is inputting the particular table. The Natural Computing environment, for its part, notes the qualifiers and requests the domain expert or specialist to provide what numerical values are to be used in a calculation for each of the qualifiers.

The foot-note interpreter, 402, is somewhat similar to the qualifier interpreter. The foot-note interpreter goes to the foot-note pointer and retrieves the given numerical value. In some cases, a foot-note merely serves to describe the value rather than change the numerical value. The blank-interpreter, 403, retrieves a default value specified by the domain expert or specialist for a blank cell. If there is no default value for a blank, the assumption will be that the value will either never be called for use in calculation or it the blank will be interpreted as zero. These options are presented to the table developer as a precaution about the use or misuse of table values. The range-interpreter, 404, interprets a range of values and outputs the low and high values, as well as a single value for computations where only a single value is needed for calculation. A developer (domain expert or specialist) provided formula is used for the returned value. It could be the first value, the second value, the arithmetic mean, etc. The parenthetic-interpreter, 405, receives the contents which will consist of a regular value and a value in parenthesis. Both values are available for output. One of these two values is returned based on the context, as understood from the table header. Finally, if none of these cases are true, a special other interpreter, 406, will be invoked. These other interpreter(s) allow for the system to expand to include other types of table-cell representations. These representations need to be programmed as extensions before a domain expert can use them.

Figure 50F:
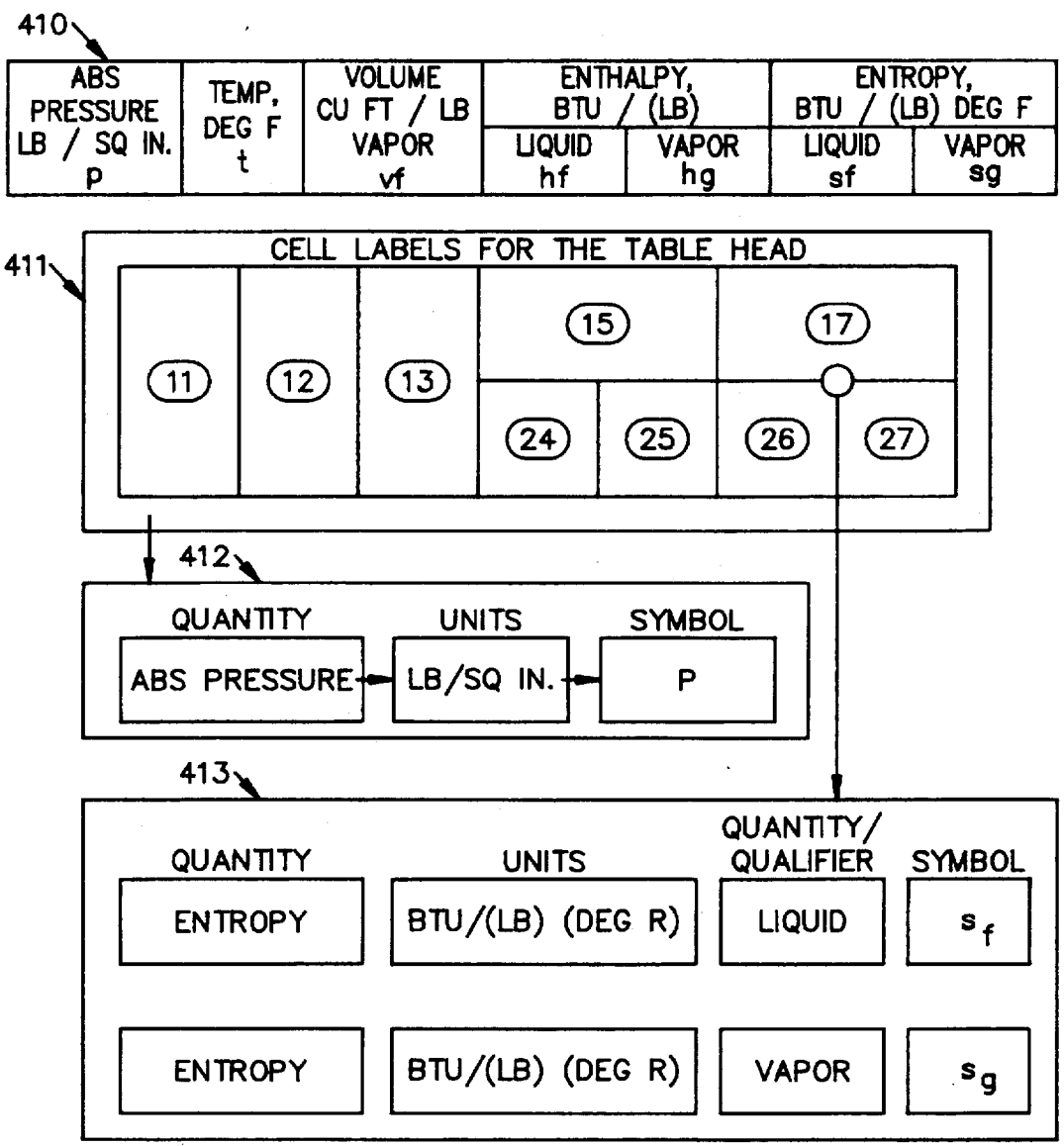
Figure 50G:
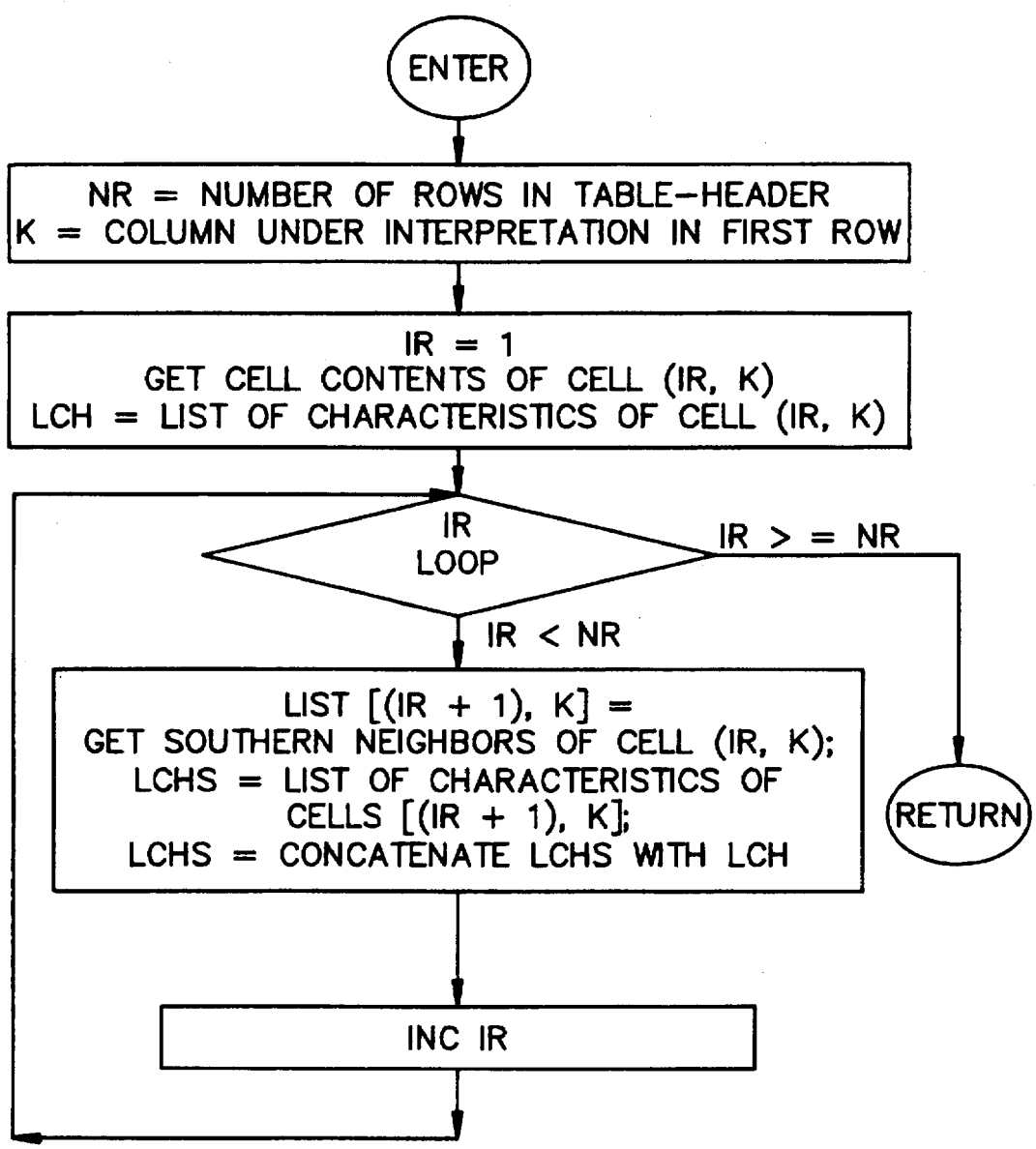

In general, contents of a cell in a table header are character strings or numbers and the values can be returned directly. However, table headers are interpreted so that several cells are read and interpreted together. For example, the table header discussed above in connection with FIG. 10 is actually interpreted as 7 columns, three of which are interpreted, as shown in FIG. 50F. Element 410 in FIG. 50F is the table header and element 411 is the cell designation, which is repeated from FIG. 11. Cell 11 is interpreted in the manner indicated by reference numeral 412. Examination of the table indicates that cell 17 and cell 26 are to be interpreted together, as is the set of cells 17 and 27. The latter set is interpreted as indicated by reference numeral 413. In this scheme of interpretation, the contents of a cell are initially inspected for 1) quantity or description, 2) units, and 3) symbol. It is relatively easy to discern these factors because the cell will be multiple-valued. The cell representation will carry the characteristic name (such as units) and the value [such as (Btu/(Lb) (Deg R)]. The key point to note here is that since two cells along a column are interpreted together, the southern cell amplifies the description given by its northern neighbor. In the example, 413, one gets two descriptions 1) entropy of liquid with symbol $S_g$ in [Btu/(Lb) (Deg R)] and 2) entropy of vapor with symbol $S_g$ in [Btu/(Lb) (Deg R)] units. This procedure is shown in the flow diagram of FIG. 50G. It will be appreciated that a columnar table-header is always interpreted as a number of headings, the number being equal to the number of columns there are in the last row of the table header. As pointed out earlier, at the line where the table header and the table body join, the number of columns in both of these parts of a table should be equal. This is why this number is important in interpreting the number of columns in the table header. Although this discussion focuses on columnar table headers, the procedure is similar if the headers are row-wise. In some types of tables, there will be both column-wise and rowwise headers, in which case this process is carried out in both directions.

Figure 50H:
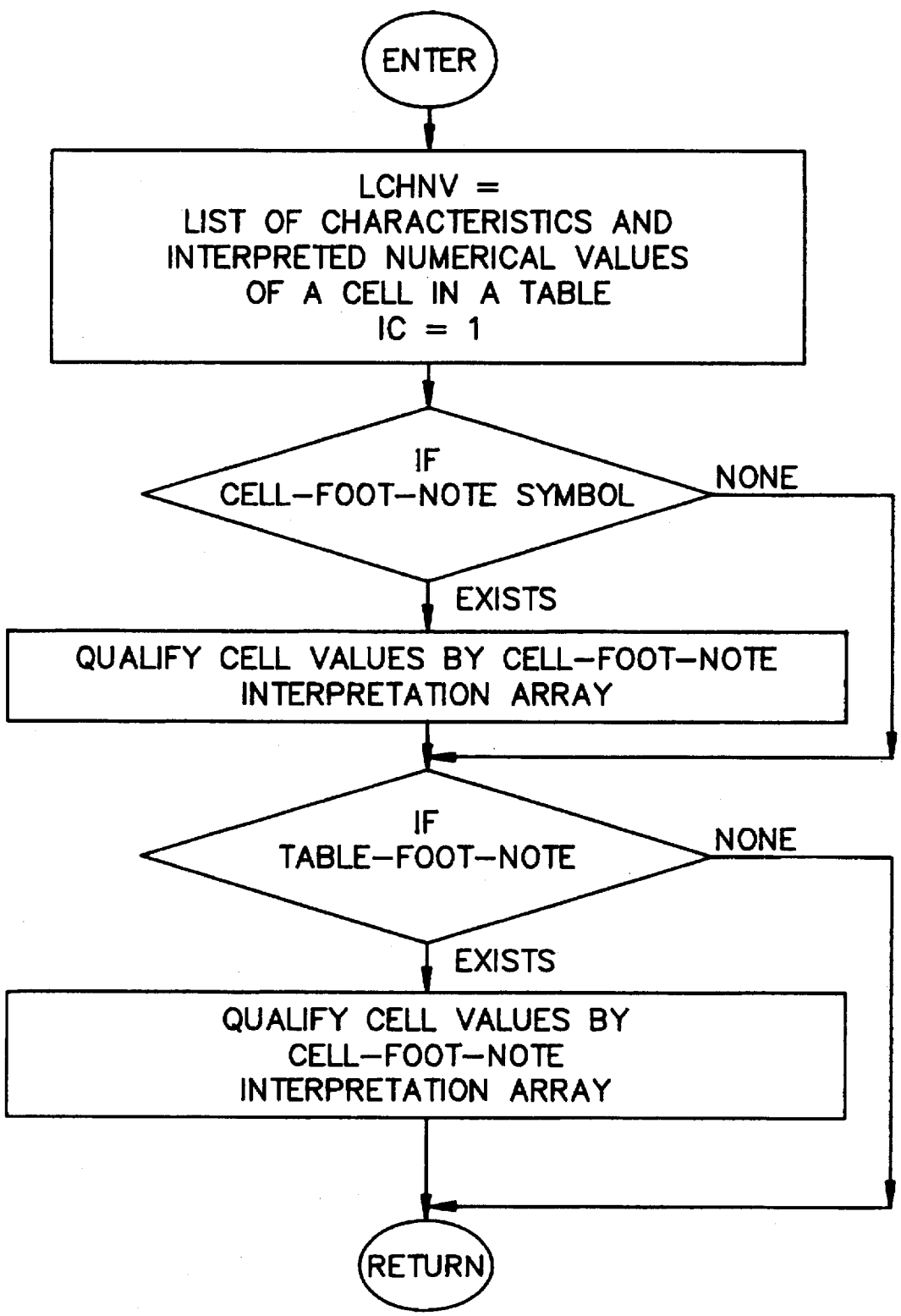

As explained earlier, humans do not read cell contents independently of either the column (or row) heading, or the table foot-notes. Consequently, one needs to go through additional steps to further qualify the interpretation obtained from the above steps. FIG. 50H shows how the previously interpreted cell values are qualified by cell foot-notes and table-foot-notes in sequence.

Figure 50I:
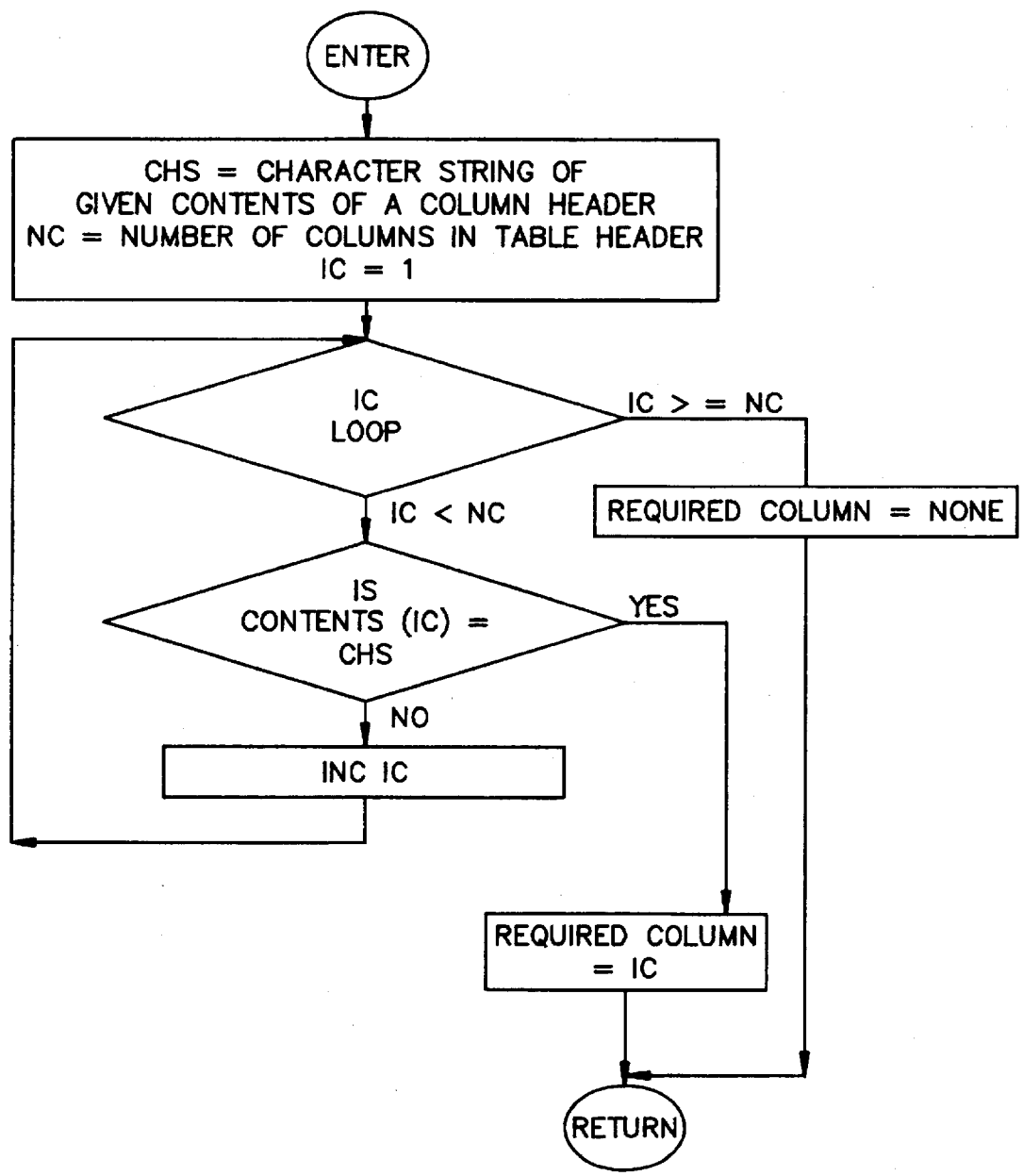
Figure 50J:
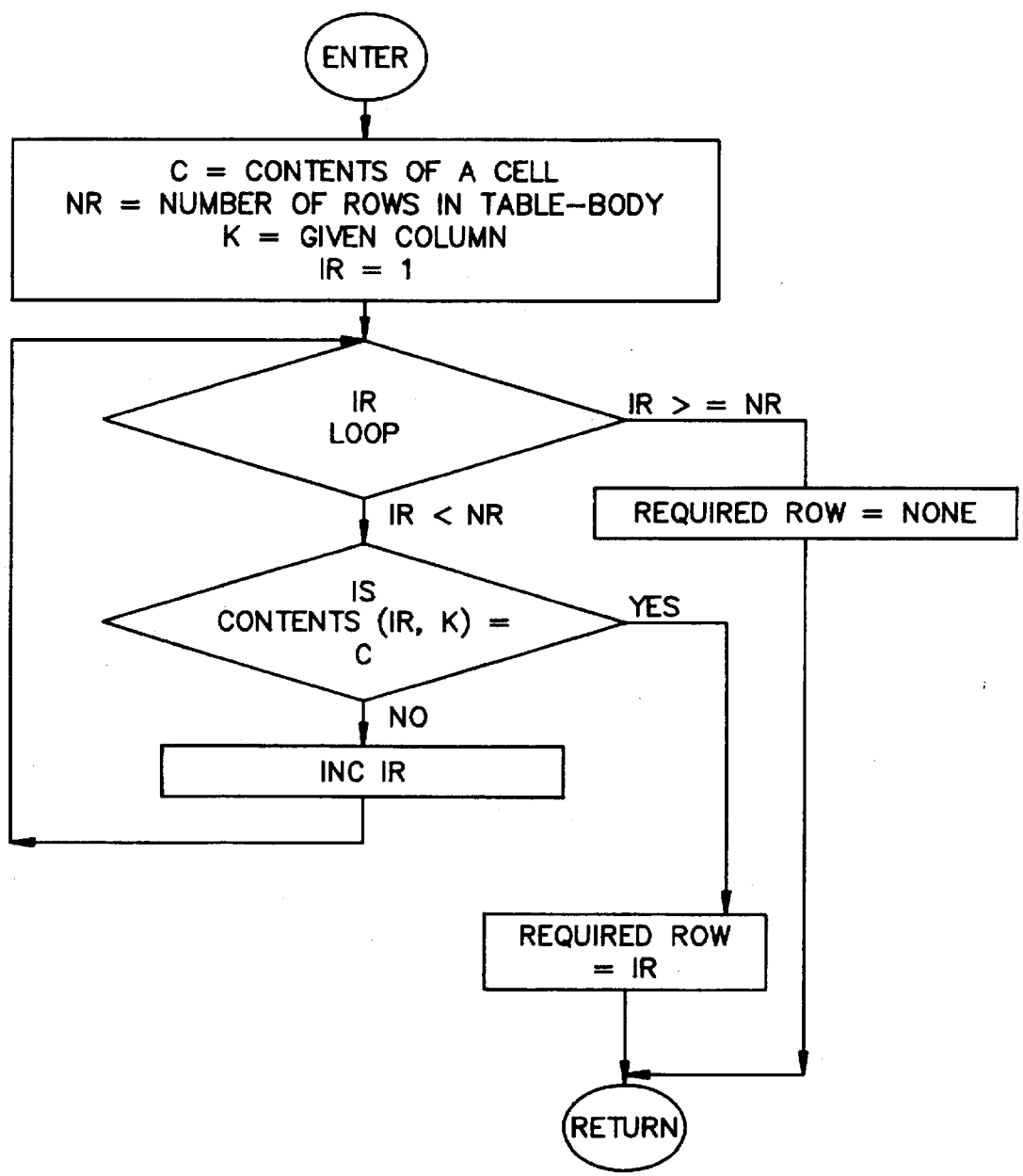

The methods and procedures described thus far can be considered direct methods because they provide the contents of a cell or description of the heading of a column. However, methods for indirect (or reverse) queries are also needed. For example, if a given tabular-column heading is given, one should find out the column number to which it belongs. Intuitively, one would see that it is done by comparing all the headings in a given table, and where a match occurs, identifying the column number. The procedure for this method is shown in FIG. 50I. Likewise, if a value of an item in a table body is given, one can determine the row number. The procedure for this method is shown in FIG. 50J.

Figure 50K:
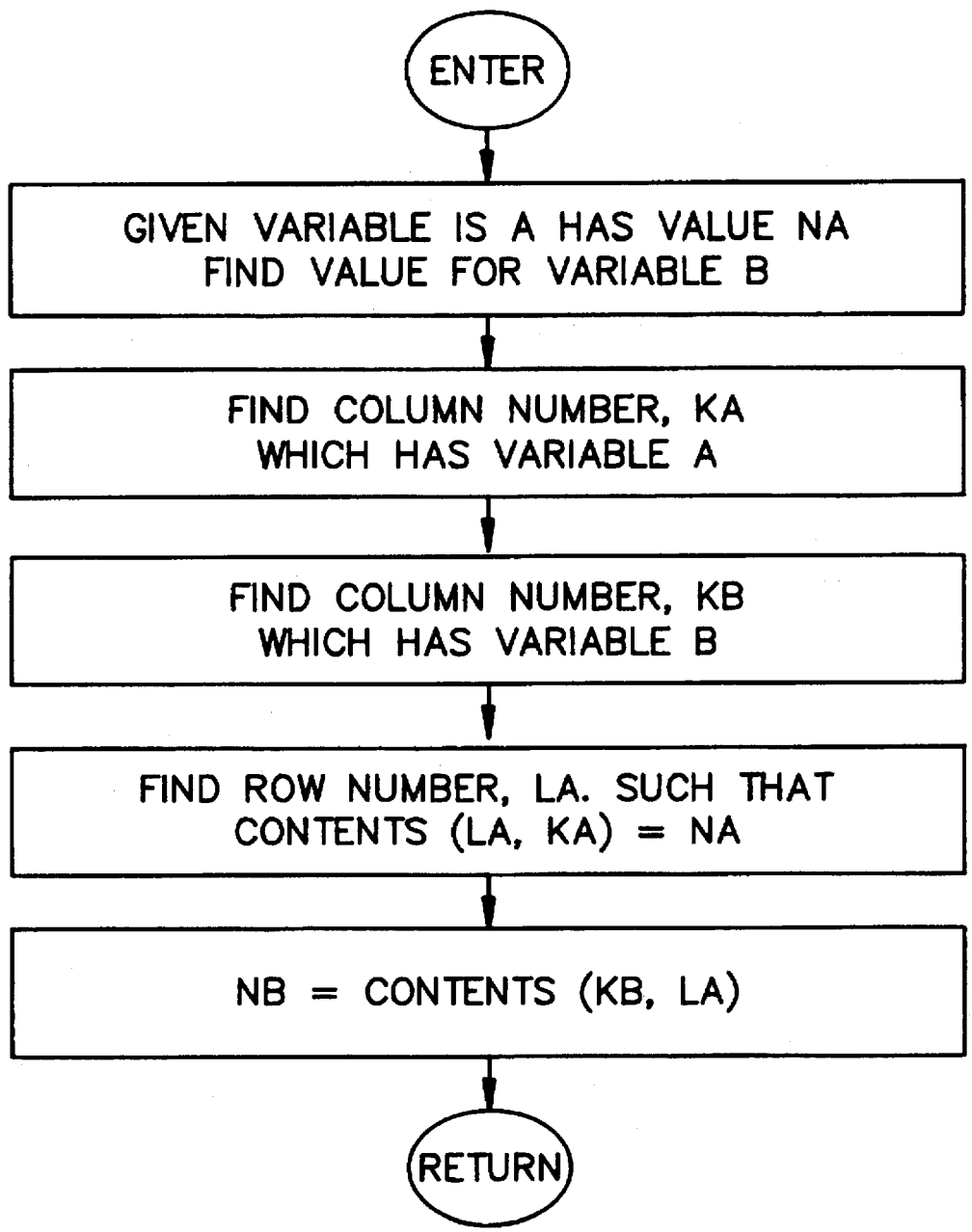
Figure 50L:
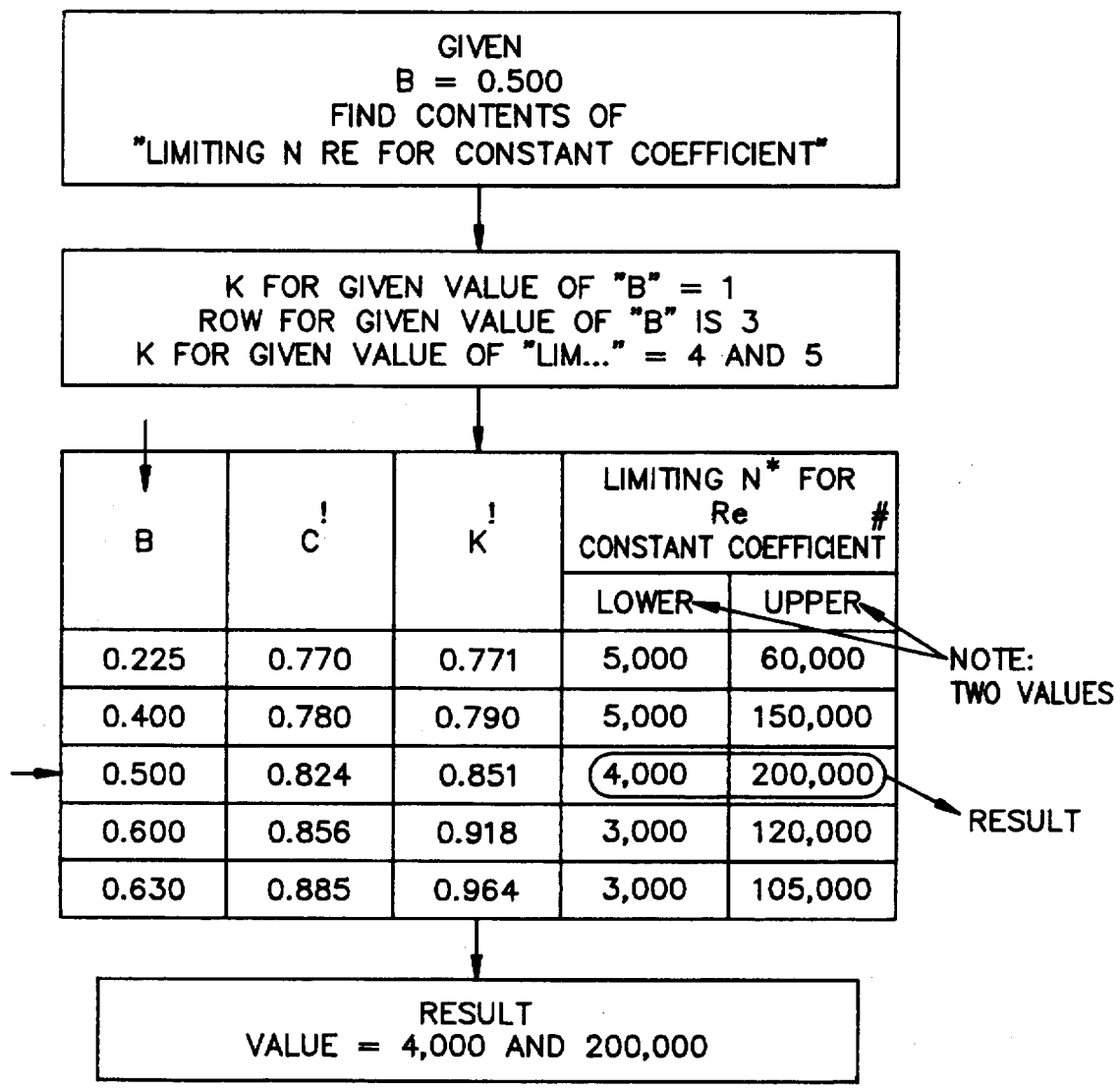

Having defined methods for representing tables and manipulating them, it is now time to define methods to utilize tables. In general, the simplest and most basic function in the use of tables is the obtaining of a designated column or row. Since a table consists of the table header and the table body, the system asks for the designated column in each of these two parts of a table. Together, these two parts will give us what the item is about and a set of values. This procedure is shown in the flow diagram of FIG. 50K. The method shown in FIG. 50K allows tables to be queried by combining the two procedures outlined in FIG. 50I and FIG. 50J. For example, one can ask what the value of valuable B is, given that the value of the variable A is NA. The method involves first finding out the table-header column number, KA for the variable A, and the table-header column number, KB for the variable B. Next one finds the row number, LA is where column KA in the table-body contains the value NA. Then, one asks for the value at row LA and column KB in the table body. FIG. 50L shows an exemplary use of this procedure with a table being queried.

Figure 50M:
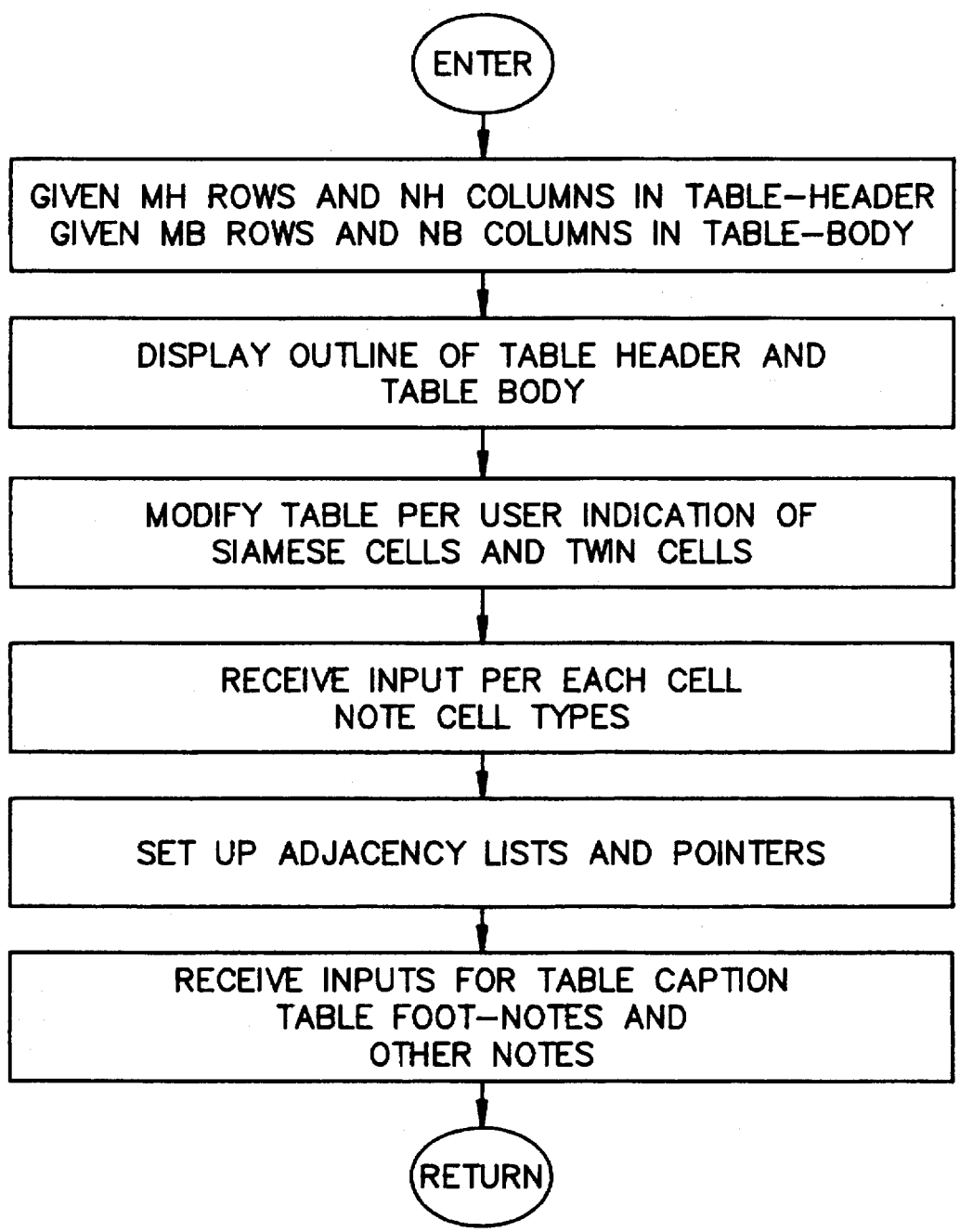

At this time, we will describe and discuss the procedures for inputting information and data into tables. When a user (usually a table developer, who has knowledge of the domain) wishes to input a table, a display of the table structure (parts of the table) is presented. When a table-header or table-body is chosen by the user, a query will be presented to input the number of rows and columns and a rectangular table symbolizing the number of rows and columns will be displayed. At this point, the user can change the table-header and table-body to respective ones containing any number of Siamese cells and twin cells. The table object will track and preserve the structure desired and developed by the user. An outline of the table-header and the table-body are presented, so that the user can go to any of the cells and input cell information or data. FIG. 50M shows the steps to input information or data into a table.

Initially, a simple cell will be assumed by the system, but, based on the data inputted by the user, the cell-type will be changed and the appropriate type will be recorded as a property of the table. If table-foot-note symbol(s) are used, the user will be requested to provide foot-note information. At any time during the creation of a table, the user can traverse the cells and input or change the information in the cells. When the input process is completed satisfactorily, the user signals the completion of the table input and the table is stored by the system.

Figure 50N:
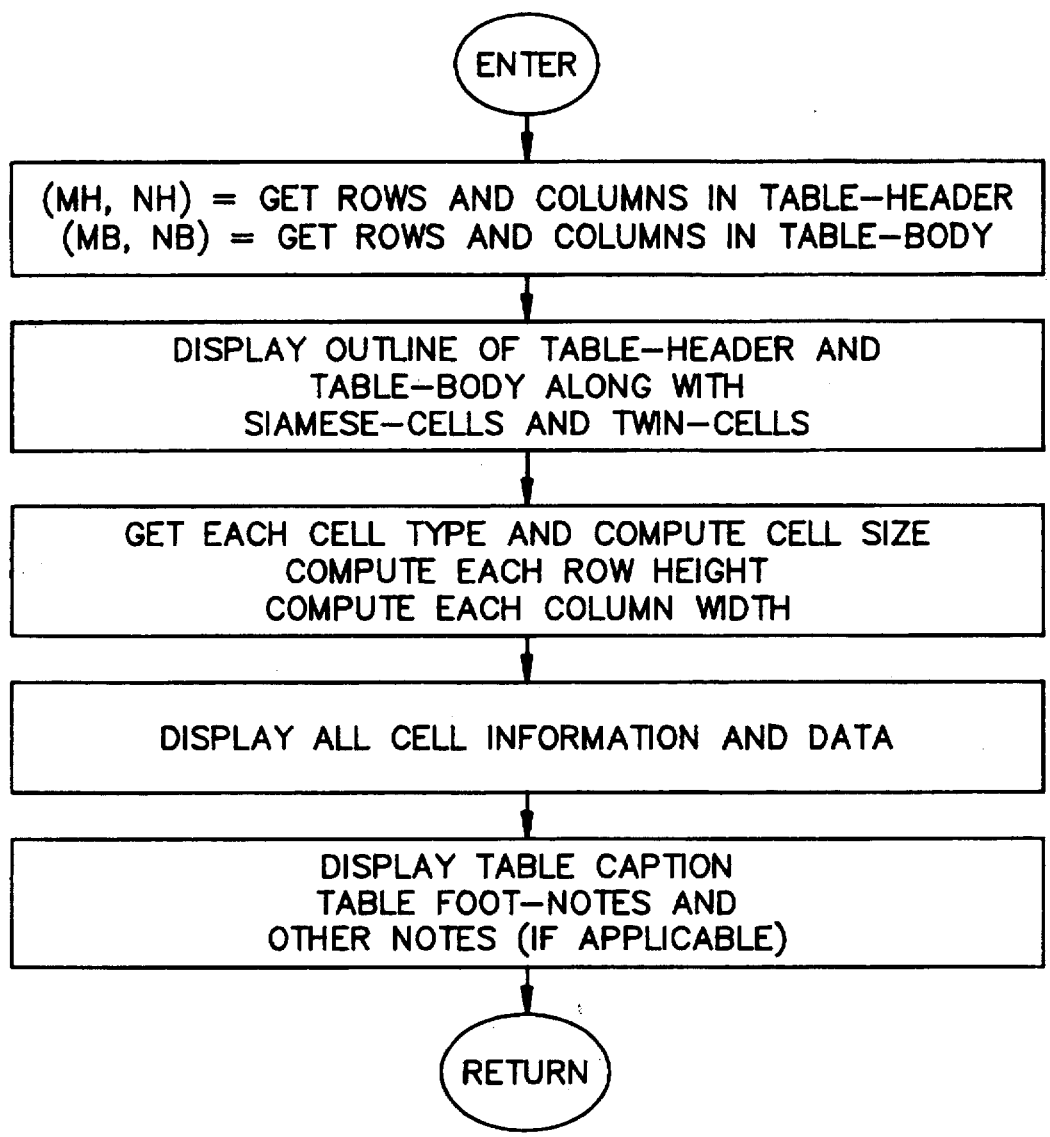

When a user wishes to output a table, the table structure and the table form are first displayed, followed by the data and information in the table. In order to display a column, all of the cells in a column are identified, and then the maximum width required to accommodate all the cells in that column is found. Similarly, the height of each row is computed by calculating the maximum height or depth of any cell in that row. Siamese cells and twin cells are appropriately displayed. Foot-note symbols and foot-notes are also added to the display. This procedure is shown in FIG. 50N.

When a user chooses to edit a table, if the particular user is authorized to edit the table, the table information is displayed on the screen and the user will be allowed to input the table information that is needed to be altered. In order to display a table on the screen or to print it on paper, the attributes of table grid lines (width, color, show or hide, style), characters (font, size, underline, bold, shadow, italic, justification), table background color and cell background color, and highlighted areas must be assigned. Following the standards of object-oriented programming, as will be explained further below, the table as a whole will possess these attributes, which means that all cells will inherit them. A given row, column or cell can be given alternatively unique attributes as an exception. A table will be located in physical display by the coordinates of its left hand top corner. When a user wishes to move a table, new location coordinates will be specified. Ordinarily, a table will be displayed (or printed) based on its full-scale size, but, a user may wish to zoom in or zoom out by choosing a different scale.

Figure 50P:
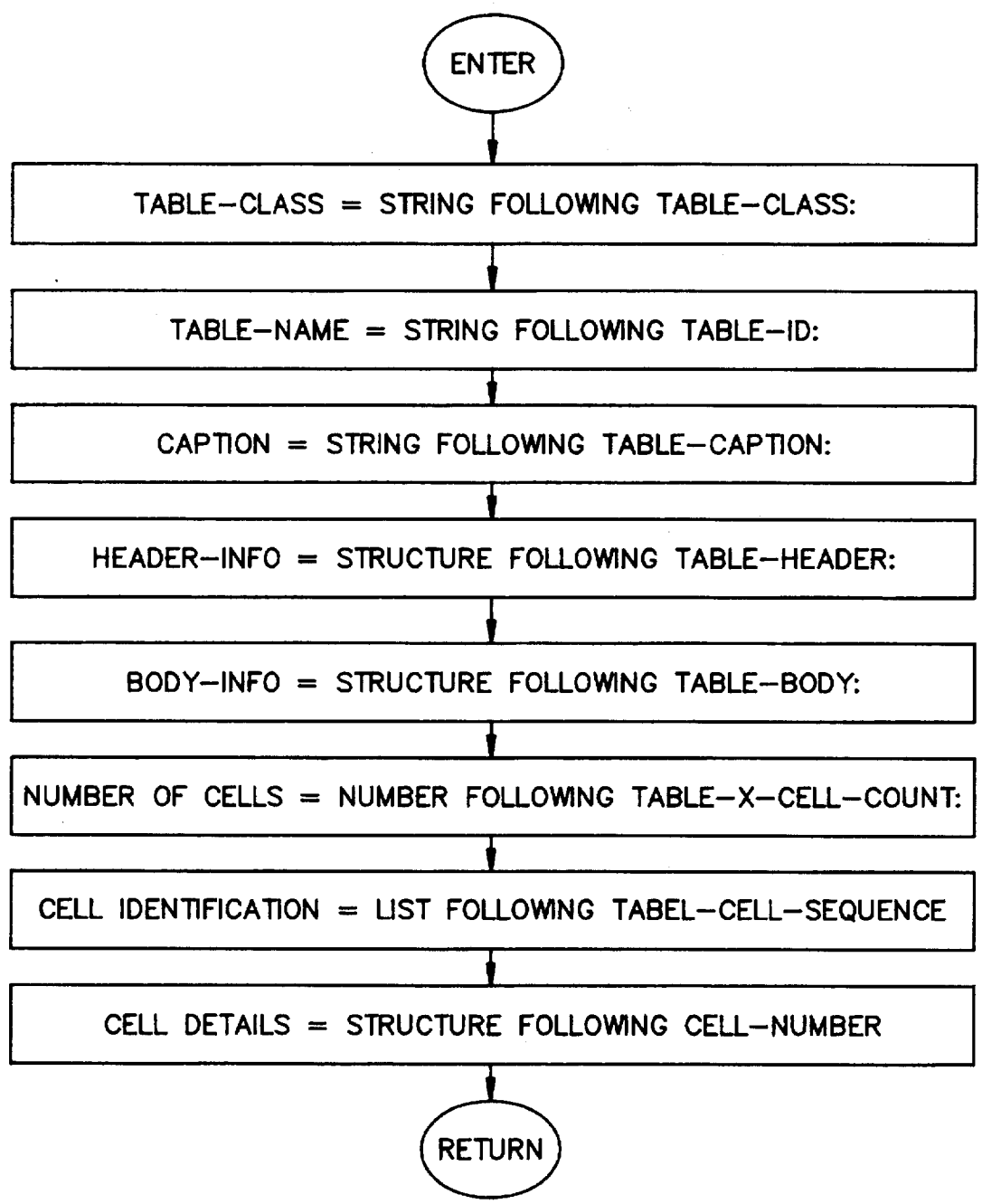

The location of a table within a document will be defined when the Natural Computing feature, Text, is discussed below in Section VIII. Suffice it to state at this time, that a document may have a number of tables embedded in the document by means of special character string symbols representing T0, T1, etc., each referring to a sequential I.D. of the table. Each table, in turn, is also stored as structured records with key words and character strings containing data and information, as shown in FIG. 50O. A table interpreting program (FIG. 50P) sets up these structures and data and information into the adjacency-lists, cell-I.D.s, and pointers as discussed previously in connection with FIGS. 5 through 9.

Figure 50Q:
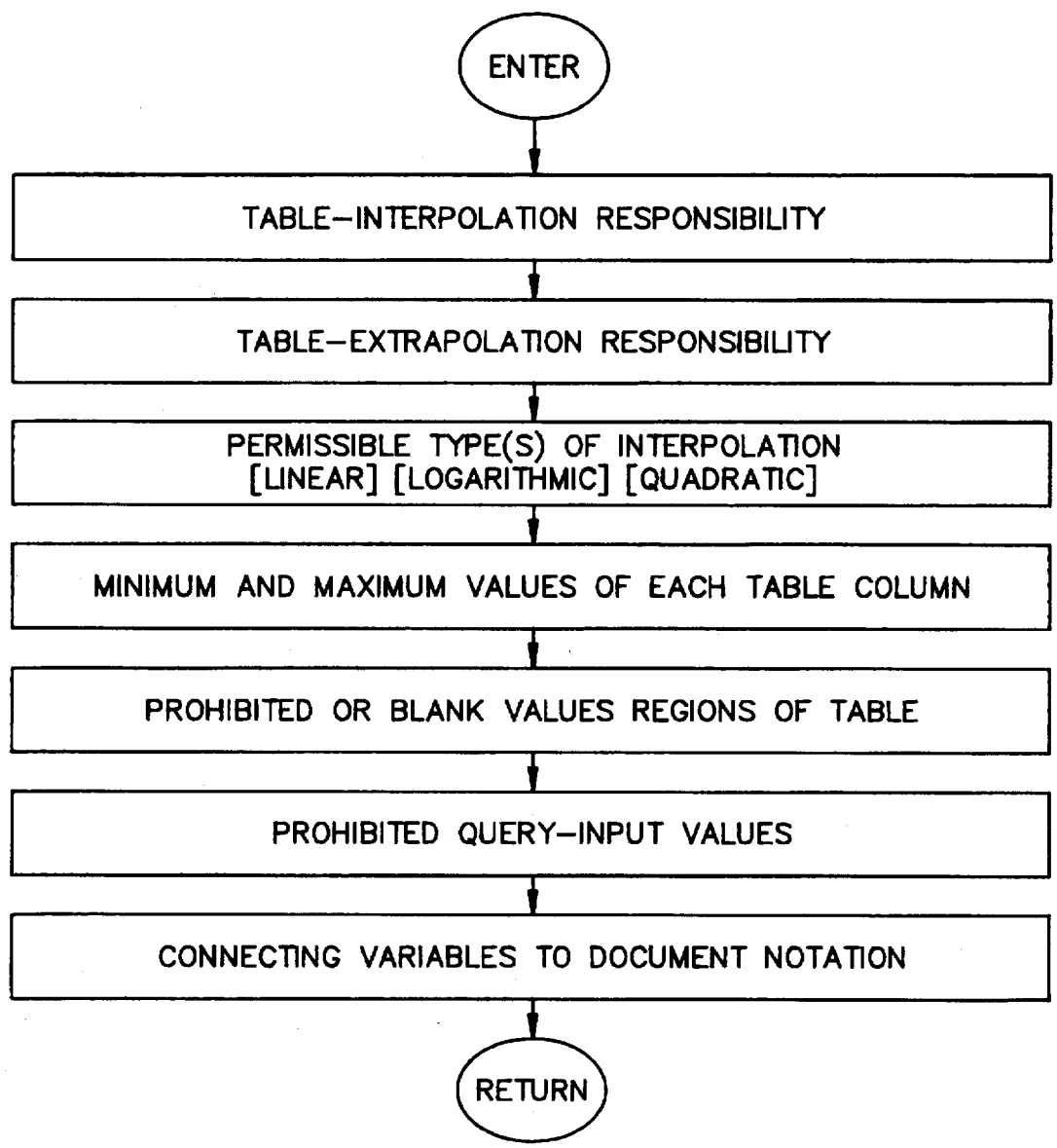

Furthermore, a table monitor (parts of which are described in more detail below) ensures that a Natural Computing table behaves responsibly and does not allow the table to be misused by a naive user. For example, whether interpolation or extrapolation with a given table will be allowed is known to the monitor. If extrapolation is allowed, the monitor knows the limits (minimum and maximum) by each column (or row). If interpolation is allowed, the permissible type of interpolation (linear or logarithmic), will be captured in the monitor. It is the monitor that will capture the units for each column (or row) and relay the units to the units monitor of the document. If a table-header contains a variable, the monitor connects that variable to the list of notation of the document. Similarly, if a table header contains units, the monitor connects that variable to the list of units. Thus, the monitor provides the important function of establishing connections between variables, notation and units. These units values are very important when a table is recalled by a user and input values are provided. The justifier ensures that the appropriate units are used. For example, if a user specifies units of miles for a given variable, X, while the units in the table for that variable X are yards, the given X is multiplied by the appropriate conversion factor (1760 in this case) before entering X into the table for an answer. The number of significant digits to be displayed in each column (or row) will also be under the control of the monitor. FIG. 50Q shows table monitor functions.

Standard or blank tables that users can call in and fill in data and information are readily available in the Natural Computing environment. FIG. 50R and 50S show weekly, and monthly columnar tables, respectively, that can be readily called and used.

Table protection is also an important consideration. Several categories of table protection are available. These categories include: 1. Reference tables, 2. Text tables, and 3. Work tables. Reference tables are those found in reference books such as the Physics Handbook, Mechanical Engineer's Handbook, Plumbing Engineers Handbook, and so on. These books usually contain tables that carry reference data. Users are not allowed to change them. However, the authors of these Reference Handbooks should be able to change them. Hence the protection will depend on the user's declaration. If he/she is the author of a reference book, he/she can alter the tables. If not, he/she will not be allowed to change the tables in these books, although he or she can make a copy of a reference table and make changes to that copy. On the other hand, the Textbook table can be changed by the author of the textbook and not by any other user, and the work table which a user is allowed to create, edit and change at will.

An observation of a textbook reveals that all of the tables are listed in a list of tables at the front of the book. In a given document, all tables are collected together as a table "pack". A textual list or a graphic list, as a pack of cards, is presented to show the tables contained in a given document. With this facility, one can call for and observe only the tables, independent of the text into which the tables are embedded. This facility also allows a table pack to be imported or exported across documents. FIG. 50T shows an example of a table pack. FIG. 50U shows an example of a list of tables. Standard table manipulations can be defined that would add or subtract two or more tables and yield a result table. As a matter of convenience and elegance, such manipulations are defined and implemented in code at the adjacency-list level, transparent to the user. For example, to add a given seven tables representing value sets for seven days of a week, the user merely issues a command to add those seven tables. The Natural Computing Environment ensures that proper adjacency-list values are added and results set up.

As suggested previously, in order to implement the above-described table representations, a table object must be thus defined. Using object-oriented programming paradigms, the table object is defined as a class. A basic table class represents a simple type of table, and several derived classes are defined that allow for any type of table encountered in most situations as described above. The table object has other objects as component parts. These objects include column headings, row headings, and cells or elements. Each of these objects is, in turn, represented as a basic class and derived classes to cover special cases. Foot-notes, special notes, source references, and other qualifiers are defined as element classes. Together, all these objects allow for most common tables to be completely represented as objects.

The above representations easily allow a collection of table functions to be defined. Analyzing and synthesizing tables are the main functions, but some additional functions are Display, Query-Element (for finding an element at an intersection of the row and column), Copy (for copying the contents and structure or the table to another table), and Result (for finding a value from a table, given a column heading and value and a query-column heading). Other functions may include Find-Column-Heading for comparing, searching and finding a given column heading, Find-Column-Value, for comparing, searching and finding a given value in a specified column, Find-Units, for finding the units of an element by indexing the column heading or units heading, Find-Foot-notes, Interpolate-Value, and High-Value, for connecting a value from a table to a procedure.

When a developer or user wishes or chooses to develop a table of a certain type, the environment presents various predefined table templates and expects the user to type in the value. Other functions may also be included to allow tables to be created from other means. However, the table is created, an instantiation of the table objects is made, given a name, and stored in memory 70 of FIG. 1C, and the name is entered into a dictionary as well as in a list of tables. Significantly, it may also be given one or more references to text where it can be embedded, as will be explained below in the section on text.

It is this combination of a hierarchy of classes of objects and methods that define table representations and connects them to other features. As those skilled in the art will recognize, such an environment does not require domain specialists to predefine the domain. No a priori procedures and domain-specific terminology are used, and either a developer (who need not be a professional programmer) or the end user can input data into the tables using predefined table templates. The environment includes predefined methods for operating tables in which manipulation of data and information in the tables requires no special skills or knowledge of any programming language. There are no hidden pieces of information that are not visible in the tables.

III. Graphs

The preferred computer representation of graphs, like that for tables, allows manipulation and utilization of the graphs in a manner that resembles the manner in which printed graphs are manipulated and utilized. The users do not need to know any programming in the conventional sense to operate these graphs. Non-professional programmers such as engineers, scientists, analysts or managers can work with them as though they are dealing with graphs in books.

Figure 51:
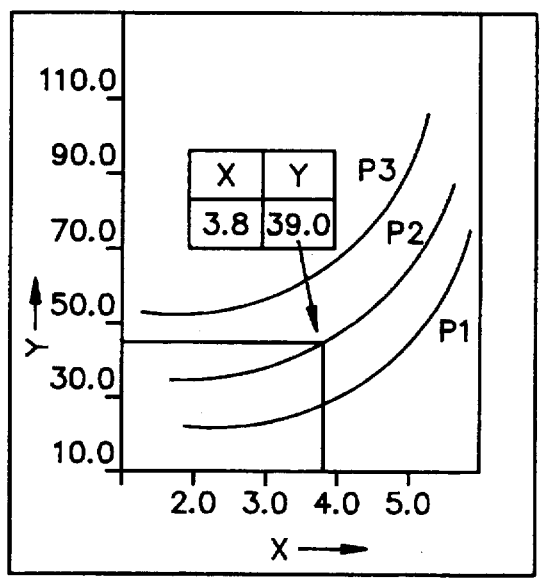

FIG. 51 shows a typical menu available to a developer or user. Again, the user chooses the Show option from the Action menu and Graphs rather than tables feature from a Features menu, causing a graph to be displayed. Developer or user choices on the menu are indicated by highlighted bars on the menu. In the example shown, the graph has three curves representing a relationship between variables x and y for several parametric values, P. Both the x and y axes show scales. A cursor location on the graph can be displayed in the form of vertical and horizontal lines passing through the point where the cursor is active at the time. A property window is also displayed superposed on the graph, the values in the property window corresponding to the point represented by the cursor position. The Show option on the Action menu permits the user to browse or inspect the nature of a graph and perhaps make a selection or some computational decision.

Figure 52A:
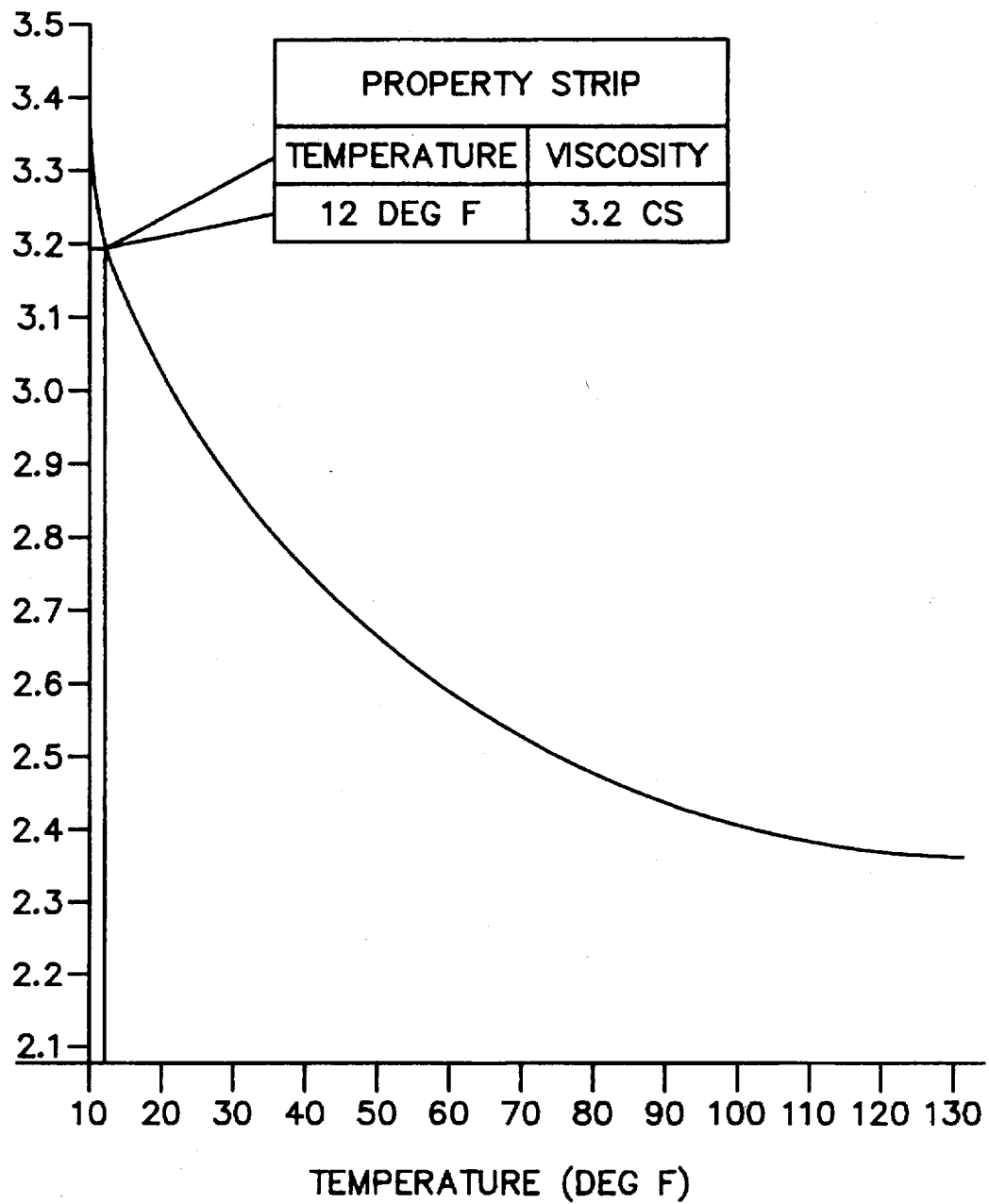
Figure 52B:
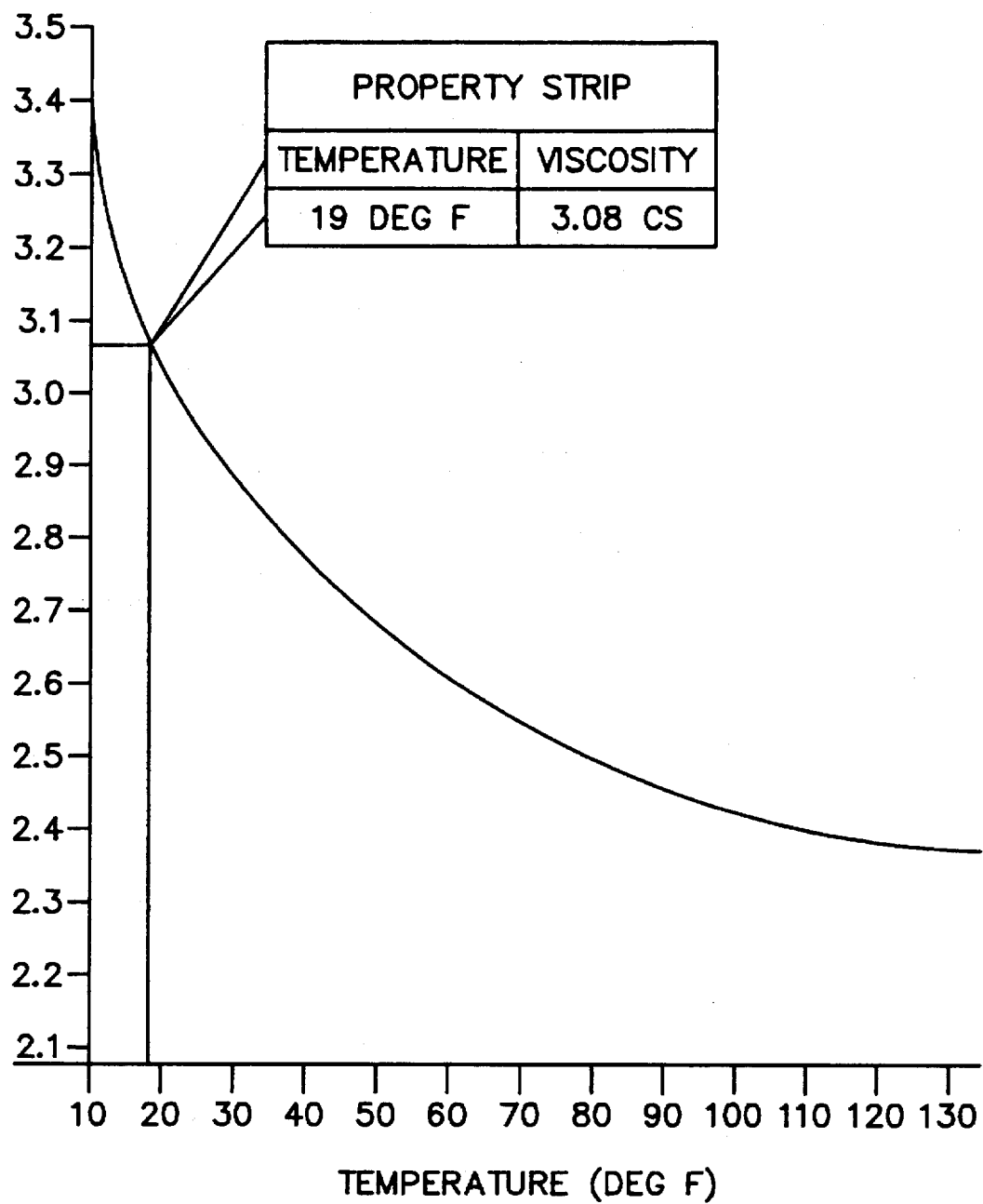
Figure 52C:
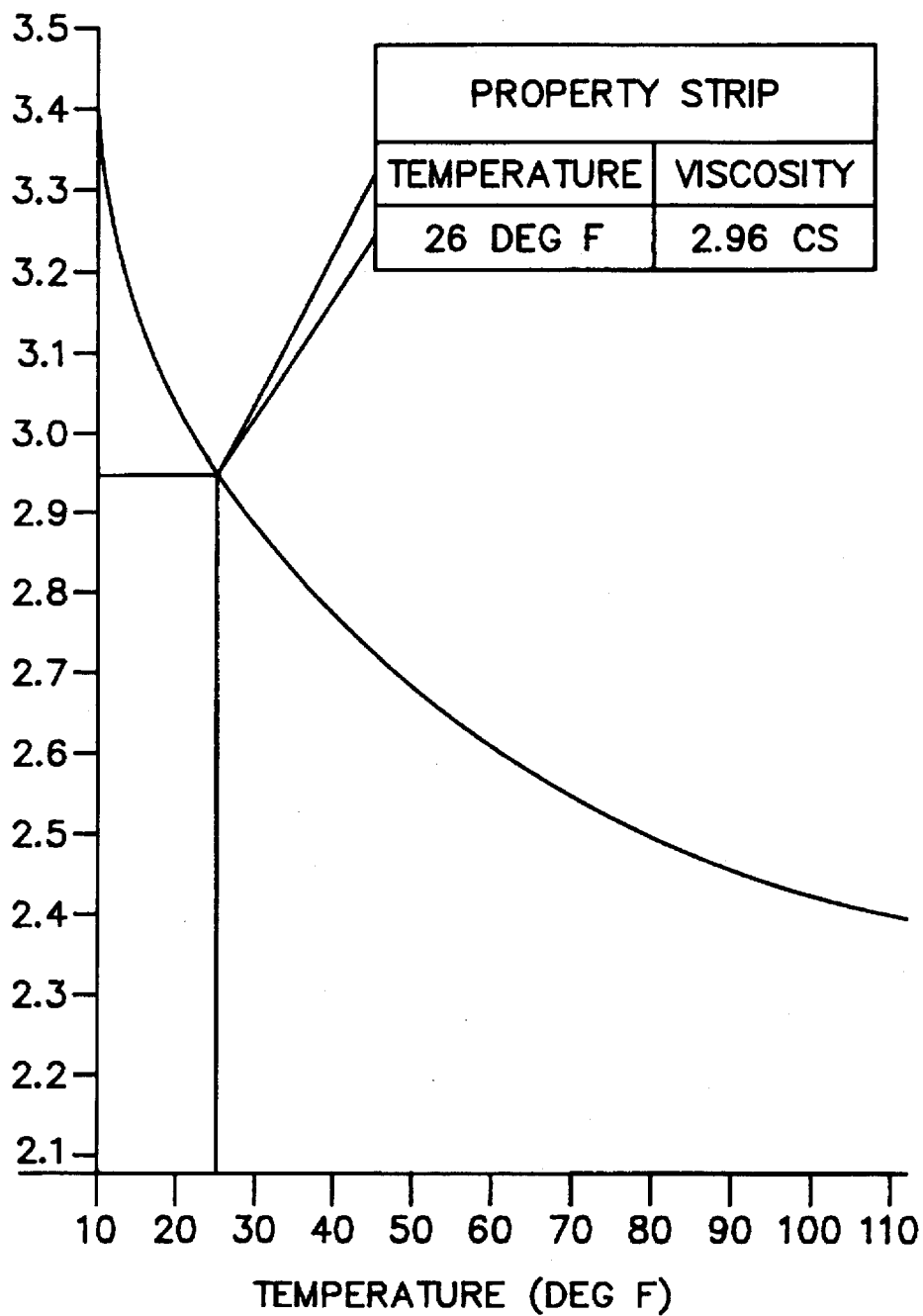

Once a graph is displayed with proper choices on the menu, appropriate movement of the cursor alters the focal point on the graph. A new property window with the corresponding values represented by the focal point referenced by the cursor is also displayed. FIGS. 52A, 52B, and 52C, for example, show three different positions of the cursor on an exemplary graph of oil viscosity as a function of temperature. Property changes in the windows on these graphs are also noted.

Figure 53:
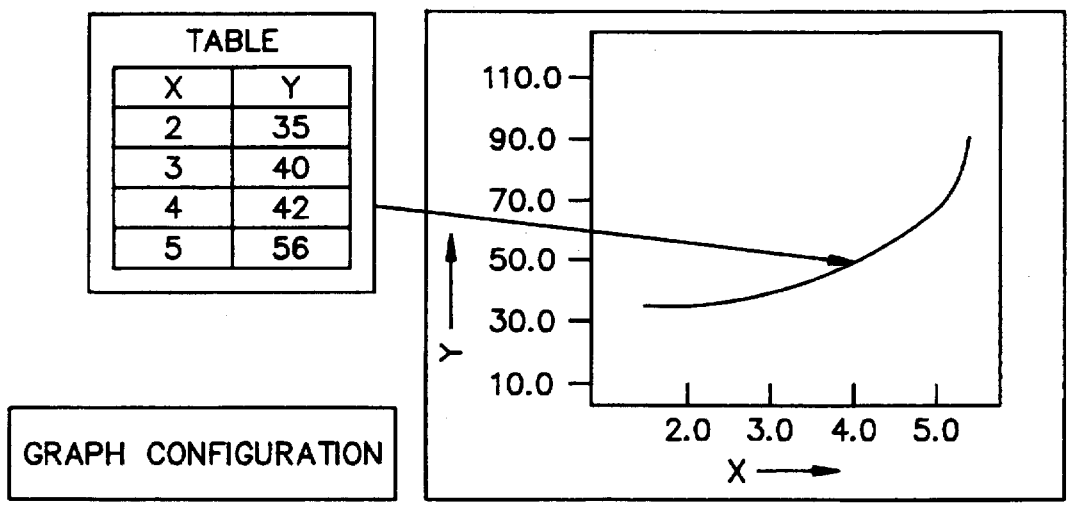

FIG. 53 illustrates a method of constructing the graphs from a given table of values. The values are typed into a table or an values input into the table from memory. Based on the values input into the table, scales and other parameters in the graph configuration are chosen, and a graph is interactively generated. Graph construction involves setting the coordinates of the origin, x and y scales, the types of scales (linear, logarithmic, and so forth), and line, caption, and other configuration information.

Besides inputting data in the form of tables, construction of graphs can also be specified in the form of an equation. When this option is chosen, an equation strip of the type described below in the next section is presented for inputting the equation. It is also possible to input the graph by other means, such a "cut and paste" from a prestored set of equations, or by scanning a graph from a paper with the help of a digitizer using existing scanner technology, with a window optionally provided for this possibility. If a scanner is used, the values for the graph may advantageously be set up in a tabular form after the points are digitized.

Figure 54:
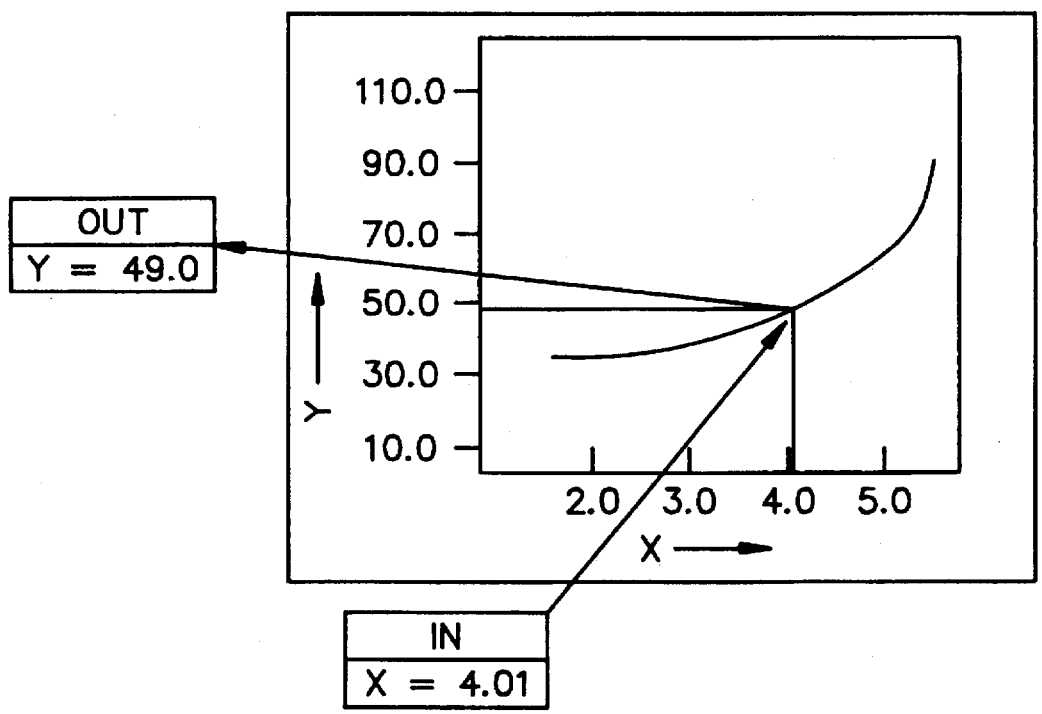
Figure 55:
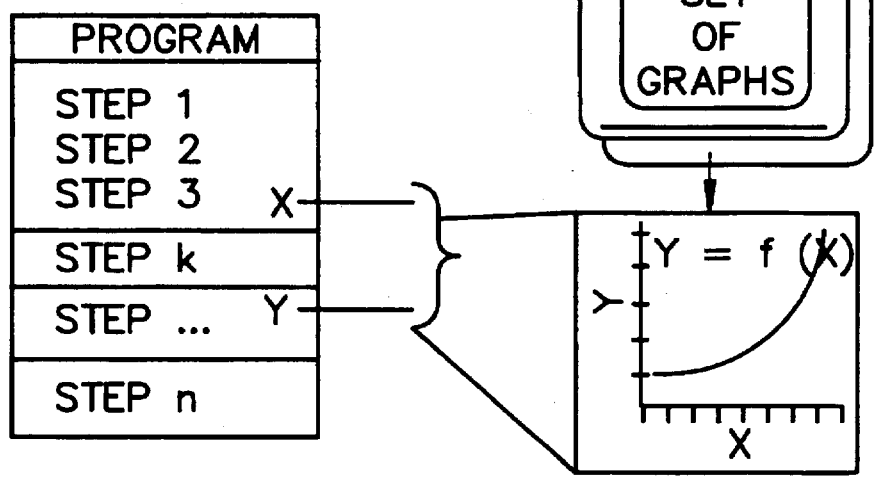

The Interactive Use option for graphs constructed either as described above or chosen from memory enables values to be read from the graph by either inputting a value into the input box, moving the cross-hair cursor along the graph, as shown in FIG. 54, or using the graph in a program as illustrated in FIG. 55. The graph can be used in a program by, at an appropriate point in the program, using the specific graph called for in the user's solution approach. As illustrated in FIG. 55, the input to the graph is obtained in step k−1, and step k of the program returns the value y from the graph back to the program for use in step k+1.

Figure 56:
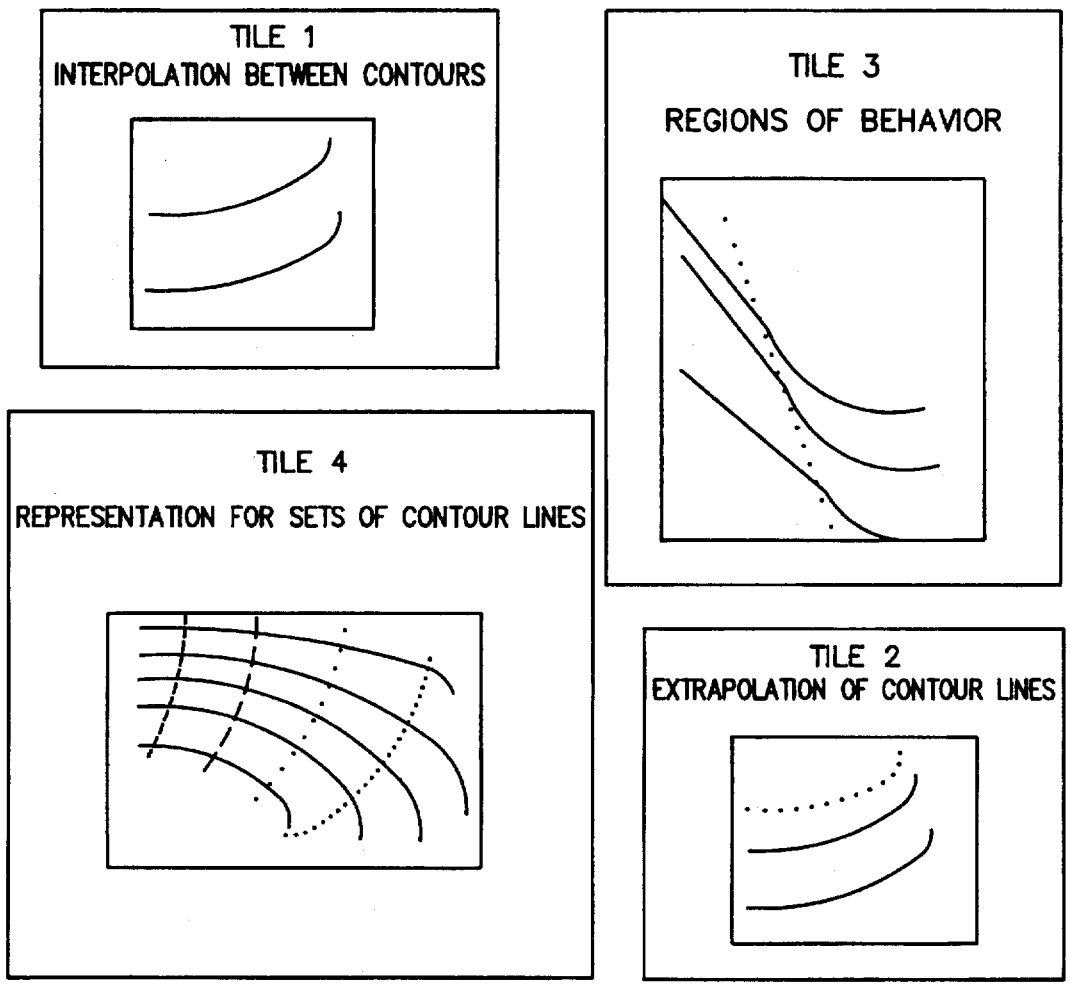
Figure 57:
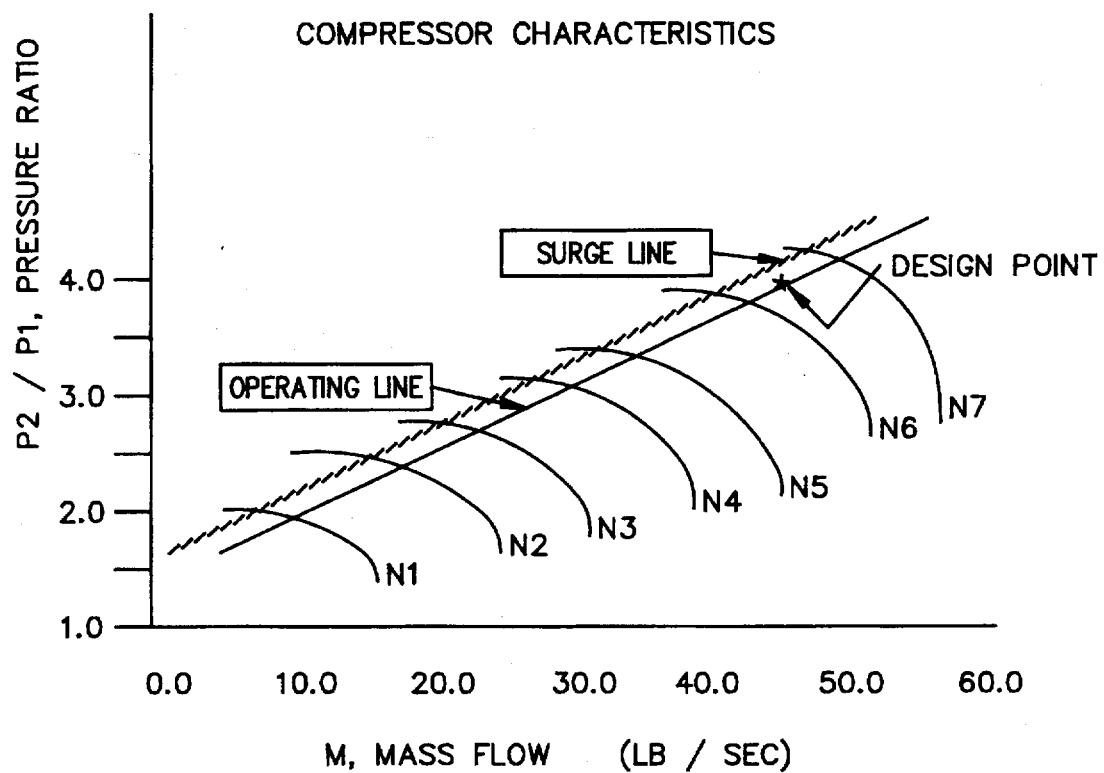

While the approach shown in FIG. 55 may not result in any increases in program efficiency, it is an entirely intuitive approach to a problem and does not require blind-faith in black box code. Instead, as shown in FIG. 56, instant understanding of the problem can be obtained from the graph, particularly if appropriate labels are added as shown in FIG. 57. By decomposing the graphs into objects, as shown in FIG. 58 and 59A, complex graphs with a variety of interesting and useful features can be created. For example, as illustrated in FIG. 59B, a graph may consist of several lines, with each line carrying a parametric label or value. Alternatively, the parameters may be represented by geometries, or on a figure inserted into the graph, for an especially visual and explanatory representation.

As those skilled in the art will appreciate based on the above description, not only does the natural computing system provide textbook representations of graphs, but the ability to manipulate the cursor can also facilitate understanding of the graphs thus represented and provide curve reading functions normally carried out by human readers. As illustrated in FIG. 59C, for example, a cursor can be locked on any one curve in a multiple curve graph, or the cursor can by used to provide intercepts between parametric curves. These facilities provide the computer user with the same facilities that are now available only on a paper graph.

Thus, in summary, with the use of graph representations, a graph object is defined. Using object-oriented programming paradigms, the graph object is defined as a class. A graph class represents a simple type of graph, and several derived classes are defined that allow for any type of graph encountered in most situations. The graph object has other objects as component parts, and these objects include curves, scales, labels, grid marks, captions, property window steps, and so forth. Each of these objects is, in turn, represented as a basic class and derived classes to cover special cases. Foot-notes, special notes, source references, and other qualifiers can be defined as element classes. Together, all of these objects allow for most common graphs to be completely represented as objects. A collection of graph functions are defined for manipulating these objects. When a developer or user chooses to develop a graph of a certain type, the environment represents various predefined graph templates and expects the user to type in the values. Other functions allow graphs to be created from tables or input directly via a scanner. Such an environment does not require domain specialists to predefine the domain. No a priori procedures and domain specific terminology need to be given to a professional programmer. Either a developer or the end-user inputs data into predefined graph templates. The environment includes predefined methods for operating graphs and, consequently, manipulation of data and information in the graphs requires no special skills or knowledge of any programming language. There are no hidden pieces of information that are not visible in the graphs.

IV. Equations

FIG. 60 shows a screen in which the Show and Equation options have been chosen from the Action and Features menu respectively. In this example, an equation along with all of its properties is shown. The top box shows the equation itself and is supported by a table of notations, a table of units, and a table of predefined constants for the variables in the equation. A developer or user may opt other display representations to abridge this information. The purpose of the Show option is again to inspect the item before invoking it into a procedure or for some other use.

FIG. 61 shows a screen in which interactive use is chosen. This allows the user to provide input values and obtain a result value. In this case, the equation is first displayed, variables and operators are separated, and cells are provided to input values for variables. A question mark appears where the result value will be placed when all the necessary values are given to the equation. The equation object is set up to know when all values have been provided that are needed for a successful computation.

When a user wishes to set up an equation, the corresponding Set Up option is chosen on the Action menu. A typical Set Up display is shown in FIG. 62. Blank templates are provided for input of information. As the variables are typed in, they also appear in the respective tables for indicating notations, units, and predefined constants. When all the fields are filled in, the equation object is complete. If necessary default values can be supplied for appropriate information. The unit table allows the units to be checked and, if any inconsistencies are found, the user is alerted and given a chance to rectify them.

Figure 63A:
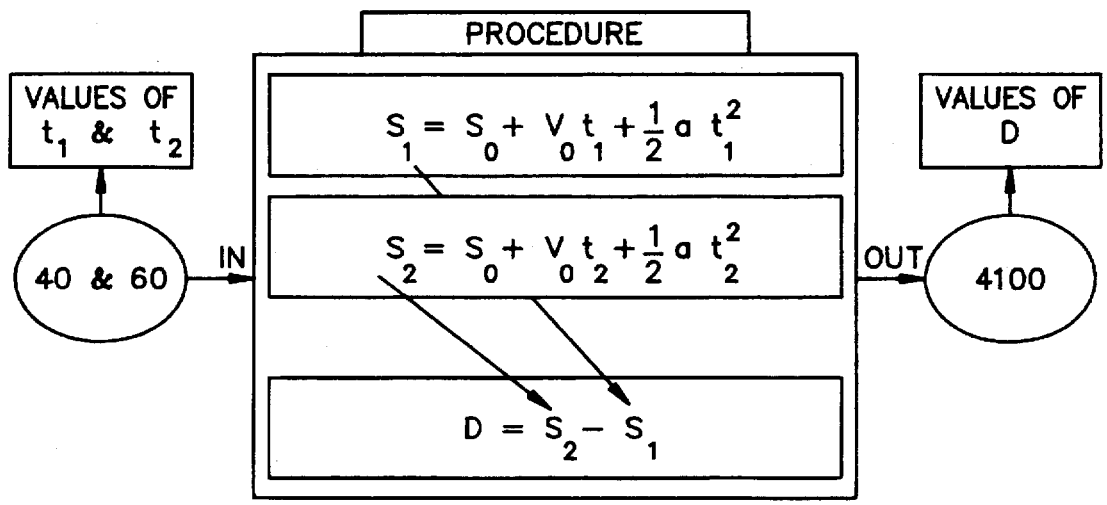

FIG. 63A shows the use of an equation in a program or procedure. Several equations are spliced into the program or procedure, the equations are recalled and connections between the variables in the equations are established. In the Example shown, $S_1$ and $S_2$ are first defined by means of the two separate equations while the third equation for the valuable D calls for the values of $S_1$ and $S_2$. In this case, where equations for $S_1$ and $S_2$ are similar, the equations can be copied from one another and new variables typed in for the old variables. It is possible to input values for all of the variables needed for the procedure or program and test them while building the equations. This method has the advantage of testing each equation as it is developed, allowing the user to inspect and evaluate limits and discover idiosyncracies in matching equations.

Figure 63B:
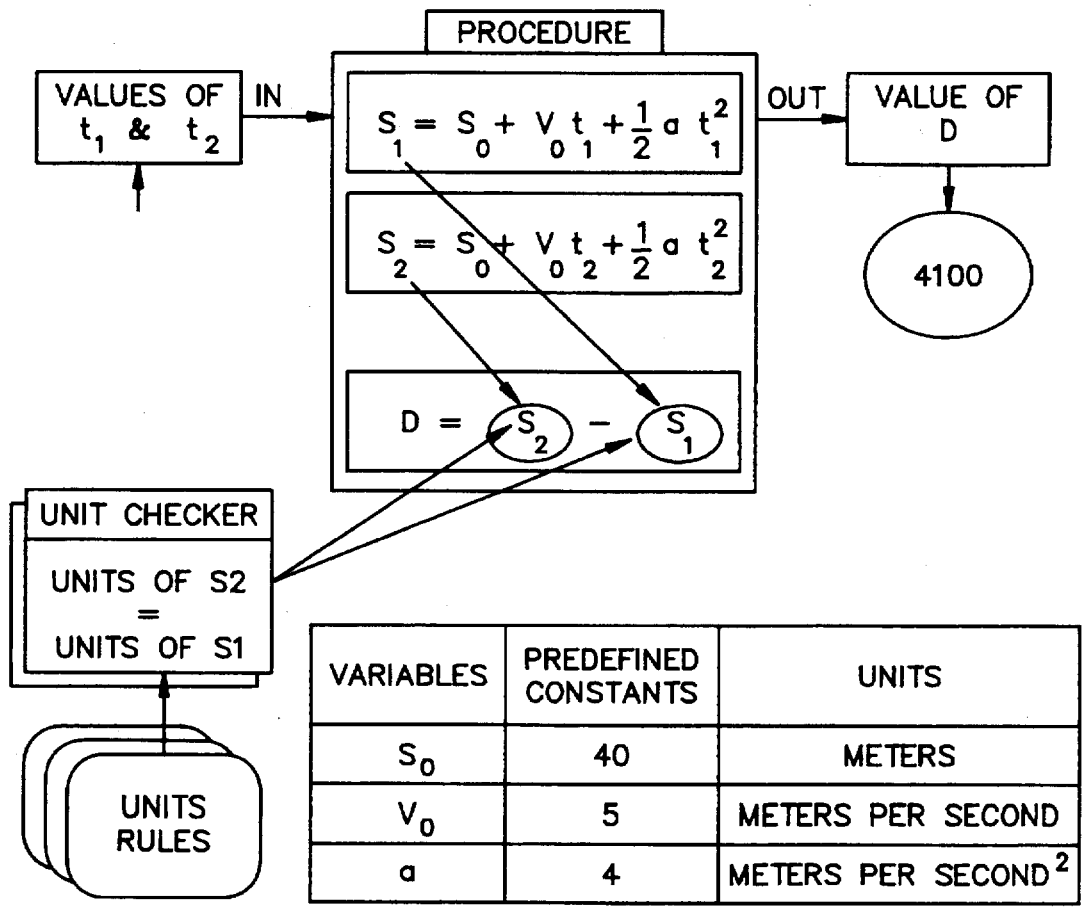

Testing is further facilitated by the Justify option, illustrated in FIG. 63B. The Justify function causes the rules for units checking to be called in and the mathematical operations in the procedure to be checked for consistency of units on each side of the equal sign, removing a common source of errors in writing equations.

Figure 63C:
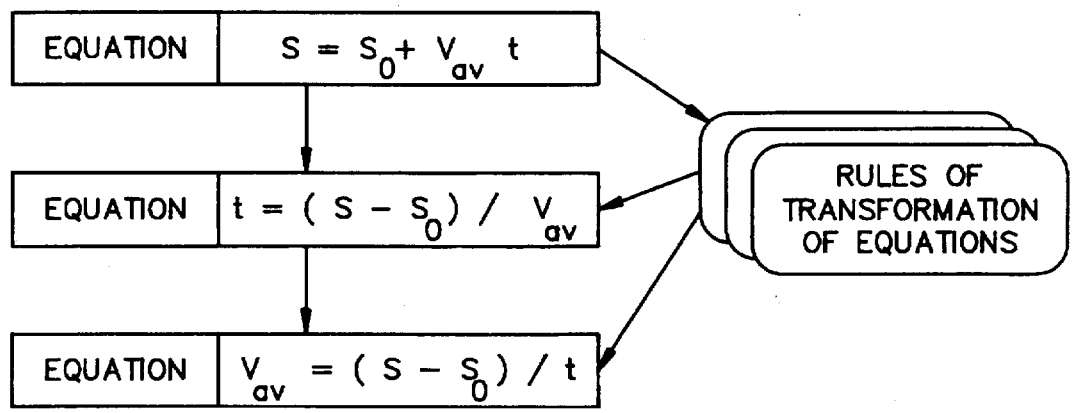

Errors also occur frequently during algebraic manipulation of equations. In this respect, the natural computing system offers an improvement over paper and pen computing by automating the transformation of equations, using a set of simple algebraic equation transformation rules programmed into the system, as illustrated in FIG. 63C.

Other features or options which are not shown, but which those skilled in the art will easily be able to implement, include a functional display which represents the equations by function, and a Rearrange option for rearranging an equation using algebraic manipulation. The Rearrange option is particularly useful because use of this option allows one to study or discover such characteristics of an equation as the existence of both real and complex roots, which a programmer might otherwise overlook. In addition, a trace function can be used with the Equation feature, as will be described below.

Figure 64:
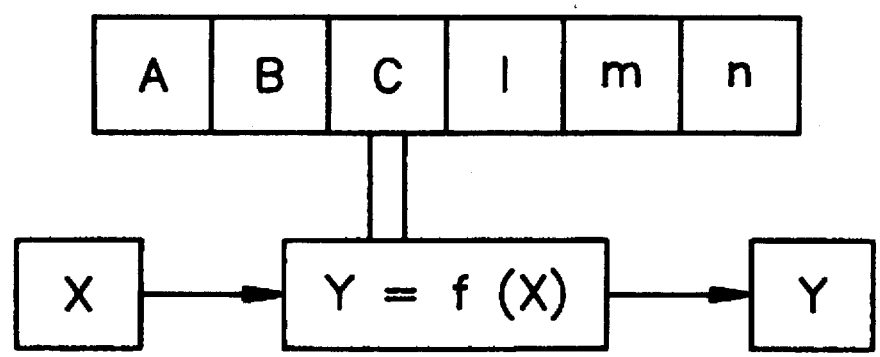
Figure 65:
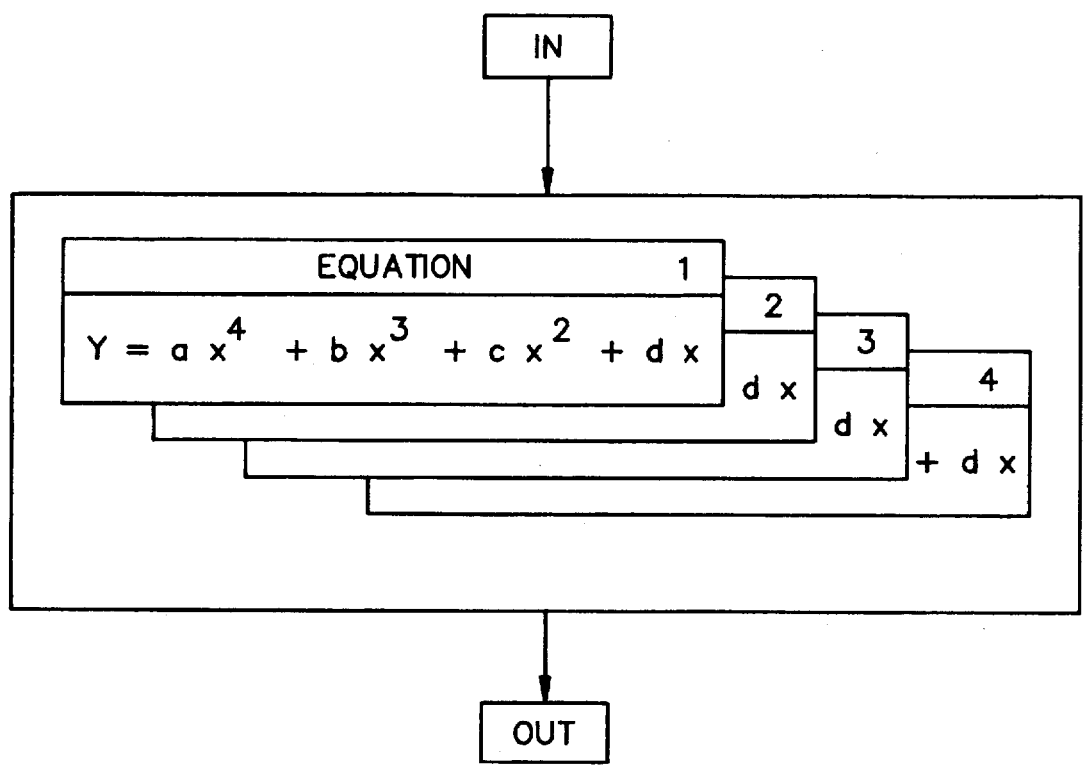

FIG. 64 shows how an equation is presented for ease of handling. An equation consists of a dependent variable, Y, one or more independent variables (X) and a number of constants. An algebraic equation is made up of a number of terms which are related in some specific way represented by a set of operators, e.g., +, −, *, /, and so forth. In the representation shown in FIG. 64, the equation can be shown functionally as some operation that will yield a value for the result variable, Y, provided the set of constants and an input value for variable X were specified. As shown in FIG. 65, the equations can then be connected such that an initial input will lead to a final output.

Figure 67A:
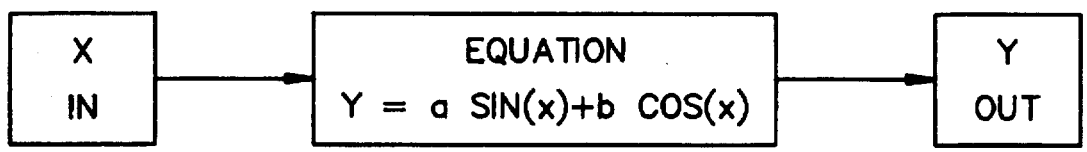

FIG. 66 shows a complete representation of an equation in tabular form. In this figure, the top row shows the equation with all the variables and operators in the correct sequence. The second row shows constants, and the third row shows units. It will be appreciated that notations can also be added in an additional row. The advantage of this representation is that all the values can easily be seen in one simple structure. FIGS. 67A and 67B show other diagrammatic representations of an equation. The user can choose any combination of these forms for display during development and use of the equations.

Figure 68:
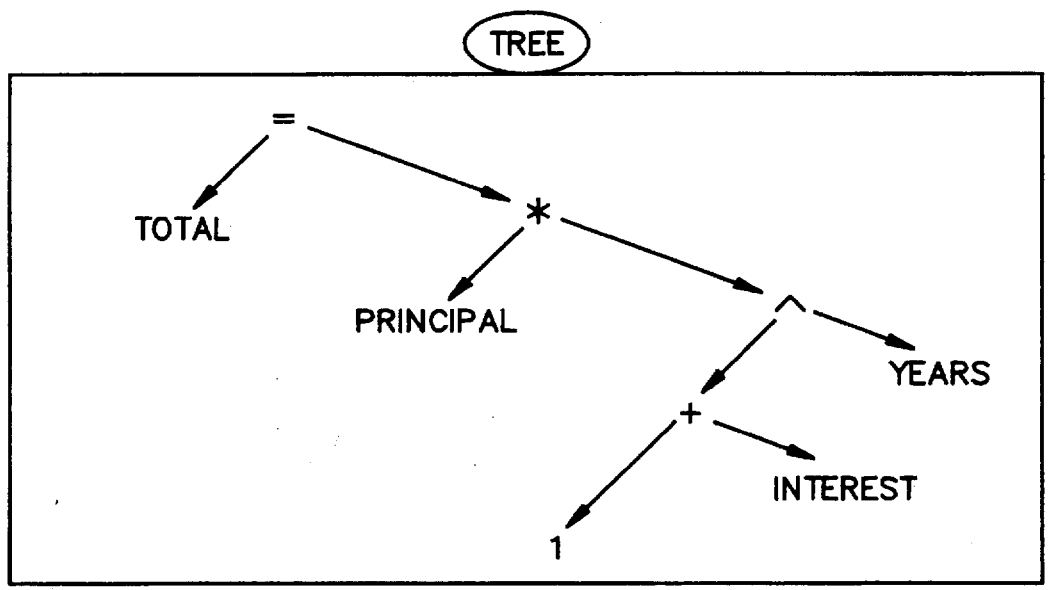

One way to represent an equation is in the form of a tree, as shown in FIG. 68, in which the equation:

$$total = principal * (1.0 + interest*years)$$

is represented. The tree representation allows the development of adjacency lists, and thus when the user wishes to change one or more variables in the equation, only the item in the list needs to be changed. By giving a new name to the list and making it part of the equation object, one achieves the ability to instantiate new variables during development or use of a computational procedure.

Figure 69A:
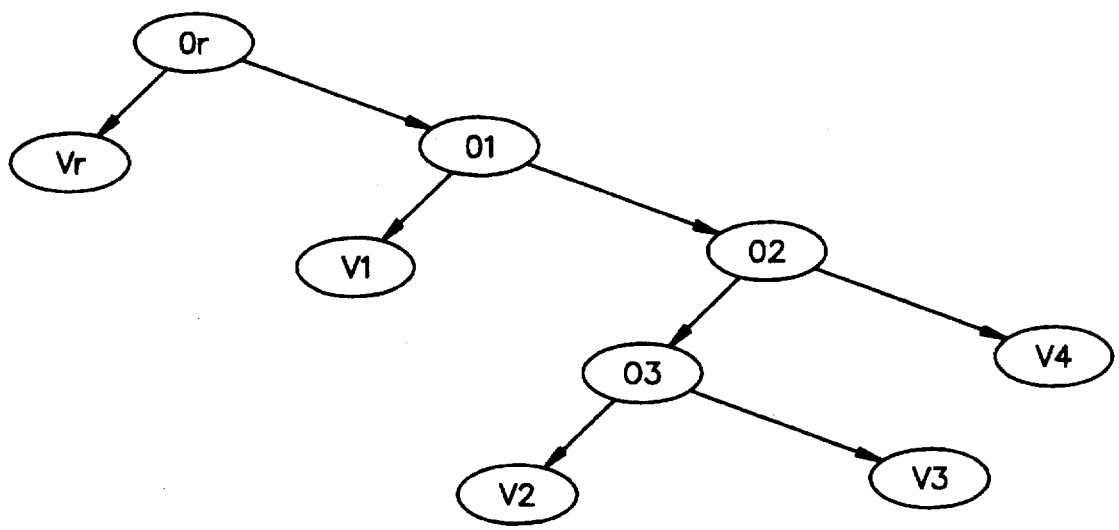
Figure 69B:
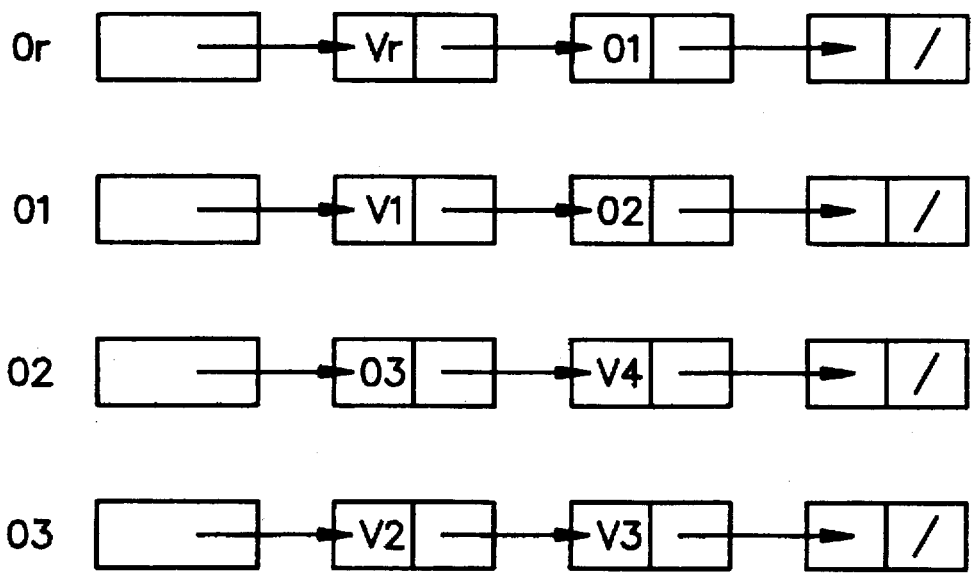
Figure 70:
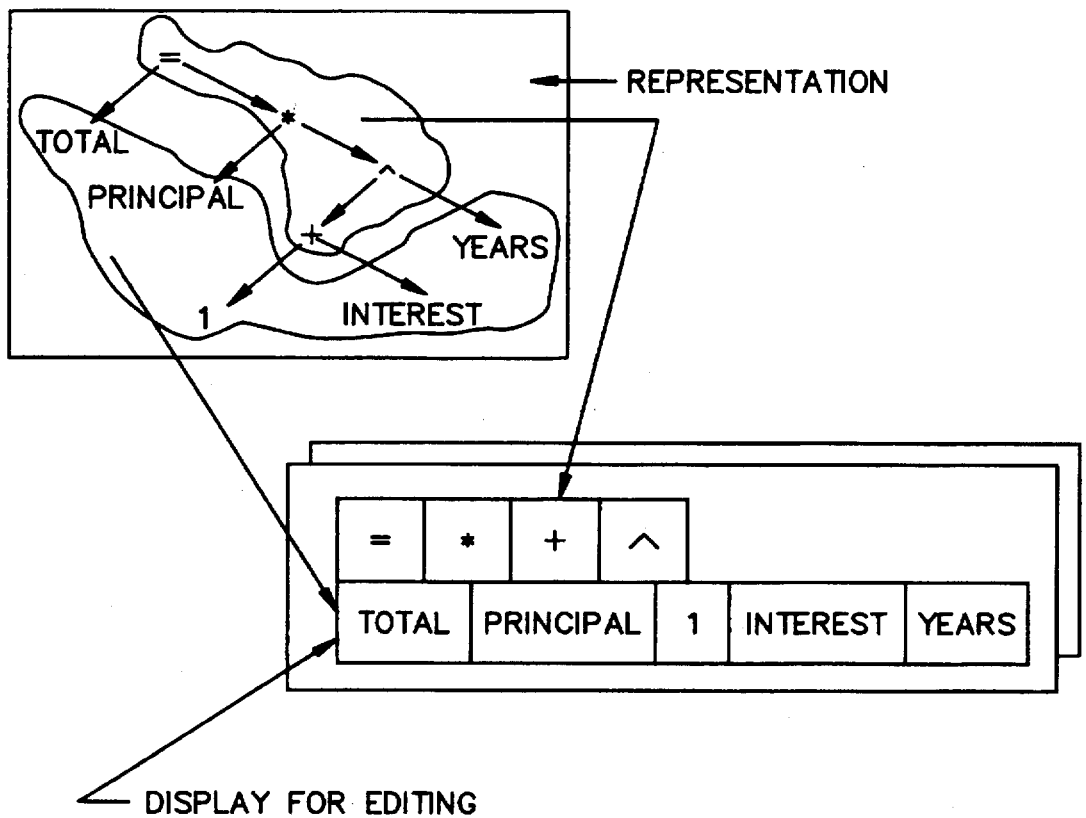

FIG. 69A shows the graph-theoretic representation of the equation and shows the various operators and variables at the vertices. The adjacency-list representation is shown in FIG. 69B. FIG. 70 shows the connection between the graph-theoretic and display representations.

With the use of these equation representations, an equation object can be defined using object-oriented programming paradigms. As is the case with graphs and tables, the equation object is defined as a class, the basic equation class representing a certain type of equation. Several derived classes can be defined that will allow for any type of equation encountered in most situations. The equation object has other objects as component parts. Each of these objects is, in turn, represented as a basic class and derived classes to cover special cases. Foot-notes, special notes, source references, and other qualifiers can also be defined as element classes. Together, all these objects allow for most common equations to be completely represented as objects.

Manipulating the objects is a collection of equation functions. The main functions deal with analyzing and synthesizing equations. When a developer or user wishes to develop an equation of a certain type, the environment presents various predefined equation templates and expects the user to type in the values. Other functions allow equations to be created through other means. When an equation is created in this fashion, an instantiation of the equation object is made. The equation object is given a name, stored, and the name entered into a dictionary as well as a list of equations. The object is also given one or more references to text where it is embedded.

Again, it is the combination of a hierarchy of classes of objects and methods that define equation representations and connect them to other features. Such an environment does not require domain specialist to define a domain, and no a priori procedures and domain-specific terminology need to be given to a professional programmer. Consequently, manipulation of data and information in the equations requires no special skills or knowledge of any programming language. There are no hidden pieces of information that are not readily visible in the equations.

V. Work sheets and Spreadsheet Strips

FIG. 71 shows a screen that allows setting up of a work sheet. In appearance, it is a rectangular grid with end rows and end columns, each element being defined in terms of some computation. Values can be piped, connected, wired, or channeled in from other tables, graphs, equations, or work sheets. Formulas can be set up and values computed by using algebraic combinations of values in other cells in the same work sheet.

FIG. 72A shows an example of a work sheet set up to estimate college costs. A particularly useful feature in this work sheet is that example values are presented alongside the steps. The work sheet refers to values from tables 5.1–5.3, shown in FIGS. 72B and 72C. The example expects that a user shall select only an integer number of years and the inflation rate percentages given in the tables and thus, for example, step 1 of the work sheet may have a restriction that the number of years be an integral number as in the tables.

FIG. 73 illustrates the setting up of the work sheet to compute the heating value and stoichiometric air requirements for a multicomponent gaseous fuel. This work sheet consists of a simple tabular form with eight columns. The number of rows is not predetermined. Various columns and elements are obtained as follows: in setting up the work sheet, symbolic values (names) for chemical components are specified as input and shown in column 1. These symbolic names have to correspond to those in the table of FIG. 74 by defining a connection. Each element of the fourth column is obtained by multiplying an element in the second column by the corresponding element in the third column, i.e., by defining a formula. The fifth column is obtained by table look-up. The sixth column is obtained by multiplying corresponding elements in the fourth and fifth columns. Column 7 is also obtained from the table of FIG. 74 in column 8 by multiplying columns 4 and 7.

A variation of the work sheet which has more general applicability is the spreadsheet strip. This is similar in appearance and functionality to currently available spreadsheets, but are generally small in size and a plurality of them can be instantiated and named within a procedure or a program. They serve the important function of allowing connections from one calculation to another. Since a principal objective of the invention is to enable a user to mix equations, tables, and graphs, the spreadsheet step is useful because it allows results to be manipulated as they are conveyed from one feature, for example a graph, to another feature such as a table. The structure of the spreadsheet contains the values or formula that compute and display values in those cells. Those familiar with conventional spreadsheets will readily recognize and be able to implement the functions of the illustrated spreadsheet strips.

Figure 75A:
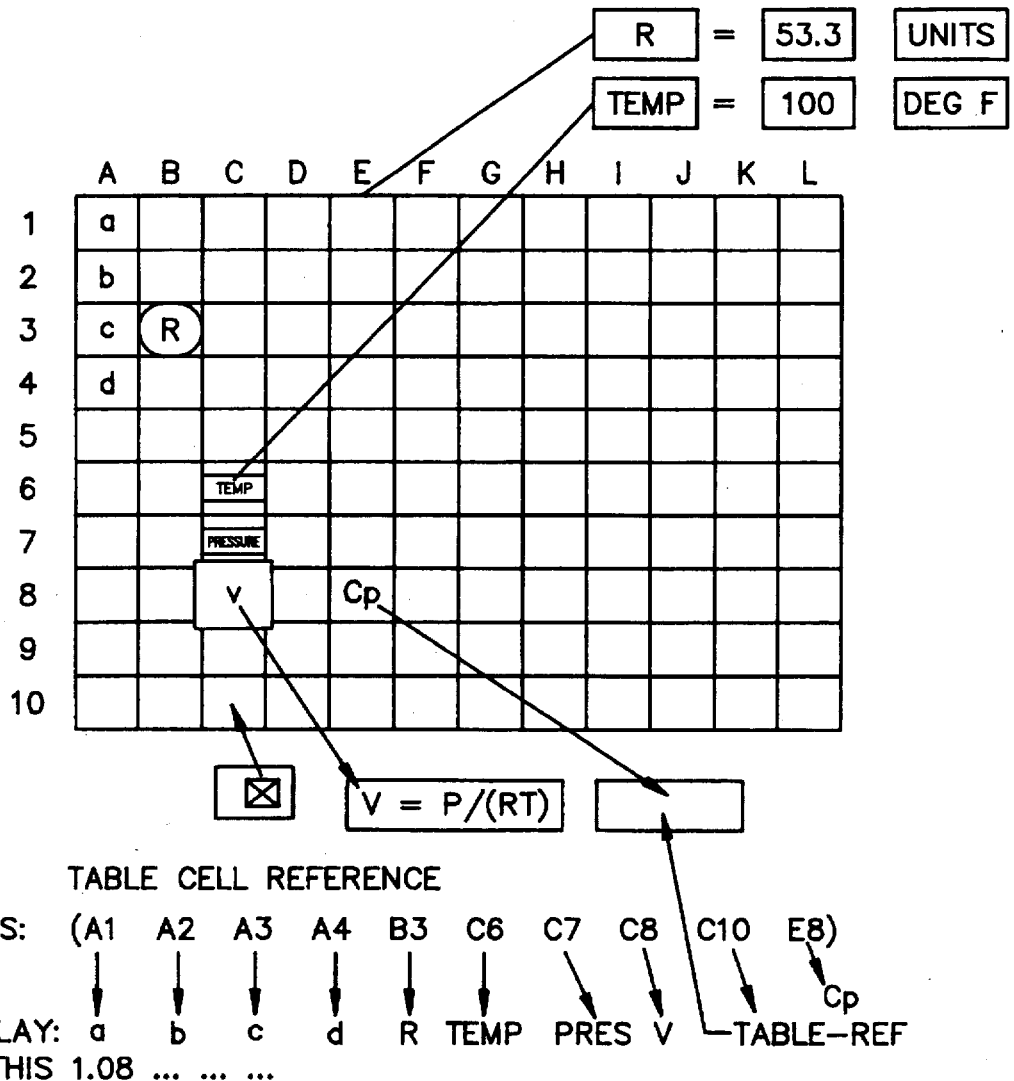

FIG. 75A shows a spreadsheet strip with certain values already inserted into the cells thereof. The structure of the spreadsheet contains the values or formulae that compute and display values in those cells.

Figure 75B:
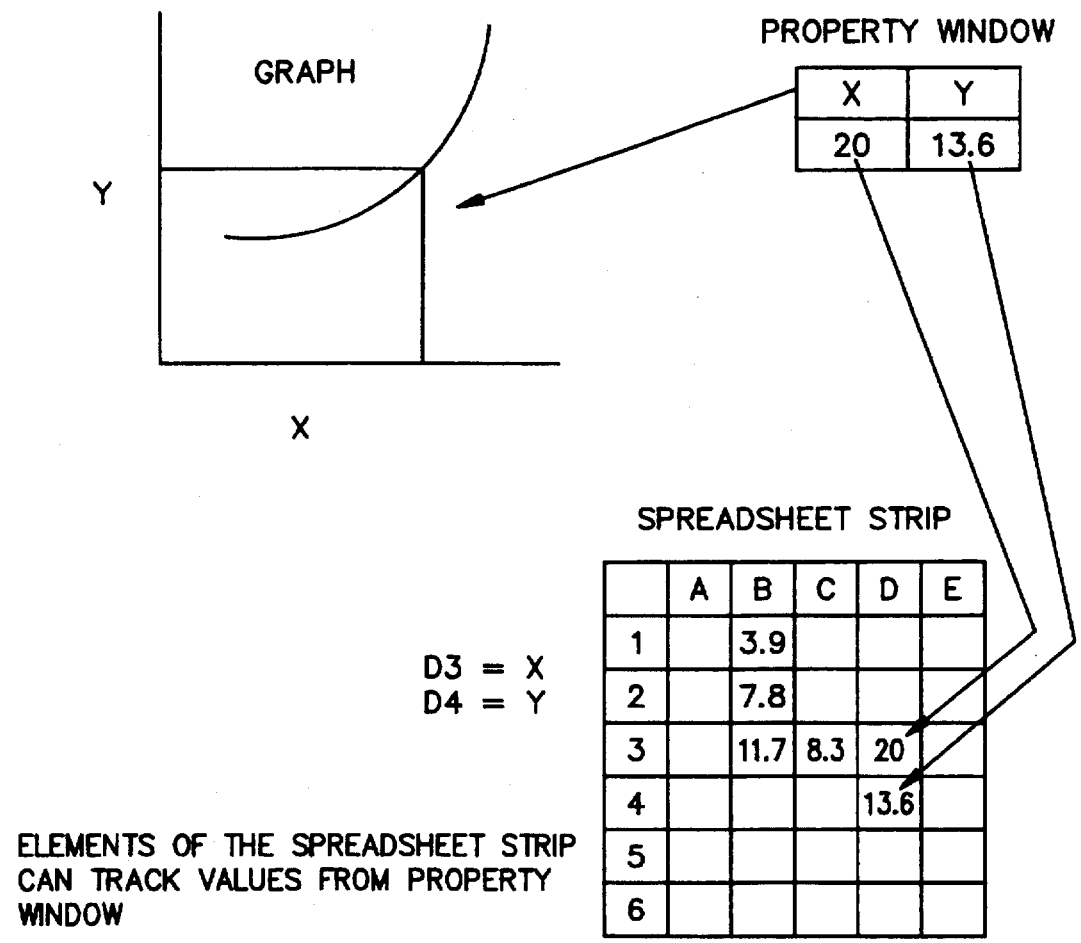

FIG. 75B shows an example of a graph object with its property window and a predefined spreadsheet strip. Values from the graph, through the property window, are piped or connected to cells in the spreadsheet strip. This example illustrates how the values fin a in a program, and the advantageous modularity of the preferred natural computing environment. Spreadsheet strips also have the ability to justify units and warn a user when incompatibilities are detected, and present a convenient and visual way of providing for combining and separating various branches in a computational algorithm.

FIG. 76 illustrates the structure and components of a spreadsheet strip. As described above in connection with tables, adjacency-list representations serve the spreadsheet strips well and are equivalent to representations of the simple tables. Additional cell names are referenced, fixed and stored. Each cell is labeled by a combined letter and numeral combination such as A1, A2, . . . B1, B2, . . . , and so forth. Each cell is an object in its own right and points to the contents and other descriptions stored in memory. Initially, when a spreadsheet strip is created, each cell points to a blank. Thus, as a new spreadsheet strip is displayed, only blank cells are shown. As values or formula, or other pointers, are typed in, the cells are filled up.

The spreadsheet strip object also includes methods for drawing and displaying spreadsheet strips, connecting values into and out of the spreadsheet strips, and like any other object in the preferred system, provides for labels, titles, units and their consistencies, storage methods, dictionary, glossary, list of contents, and index entries. Also included are all the methods required to manipulate a spreadsheet strip object, its instantiations, and its derivatives.

One particular case of a spreadsheet is a property window strip. The property window strip is defined as an object and is made part of the graph during development and instantiation of the graph. Although it can be represented as an adjacency-list, an alternative and simpler representation may be preferred. Such a simpler representation is shown in FIG. 77, and is based on the fact that property window strips usually have only three rows, the first row representing the variables, the second representing units, and the third representing values.

Using these work sheet and spreadsheet representations, appropriate objects can be defined, and using object-oriented programming paradigms, the objects are defined as a class. A basic work sheet or spreadsheet strip class represents a simple type of work sheet. Several defined classes can be defined that will allow for any type of work sheet and spreadsheet encountered in those situations as described above.

The work sheet object will have other objects as component parts, each of these objects in turn being represented as a basic class and defined classes to cover special cases. Footnotes, special notes, source references, and other qualifiers are defined as element classes which together allow for most common work sheets to be completely represented as objects. Manipulating these objects are a collection of work sheet functions. When a user wishes to develop a work sheet of a certain type, the environment presents various predefined work sheet templates and expects the user to type in the values. Other functions may be included which allow work sheets to be created through other means, such as by scanning an actual work sheet. When a work sheet is created, and instantiation of the work sheet object is made, it is given a name, stored, and the name entered into a dictionary as well as into a list of work sheets. It is also given one or more references to text where it is embedded.

Vi. Natural Computing Unit Strips

A technique known to all first year science and engineering students is to verify an equation by checking for the correctness and consistency of units. A convenient way of accomplishing this is the units strip. With the aid of the units strip, the user can ensure that units are consistent at each step of a calculation procedure, and avoid the effort and time spent trying to find conversion factors since the system will contain essentially all the fundamental units and conversion factors. The units strip also facilitates derivation of other conversion factors.

FIG. 78 shows a menu screen and a units strip illustrating the simple example of units conversion from days to seconds. Just as text books contain units conversion factors at the end of a chapter or section, the preferred environment contains a list of units strips. A developer or user can inspect them, choose the ones needed, and invoke them for use in a procedure.

Figure 79:
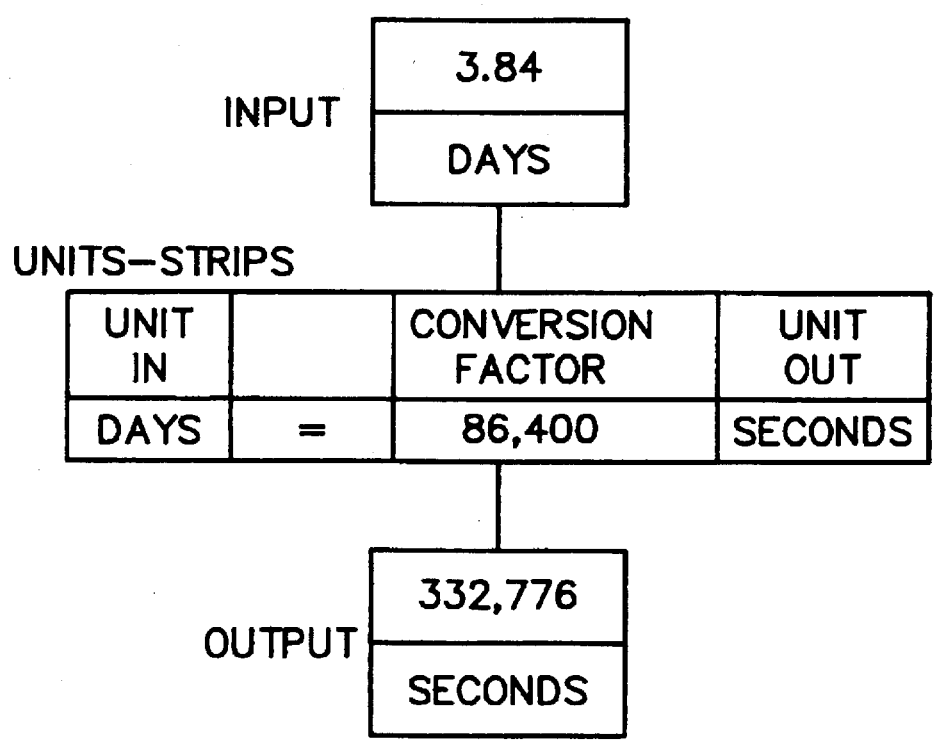

FIG. 79 shows menus for interactive use of a units strip. One can recall a units strip, enter values for one unit in the input box and obtain a converted value for the other units in the output box.

Figure 80:
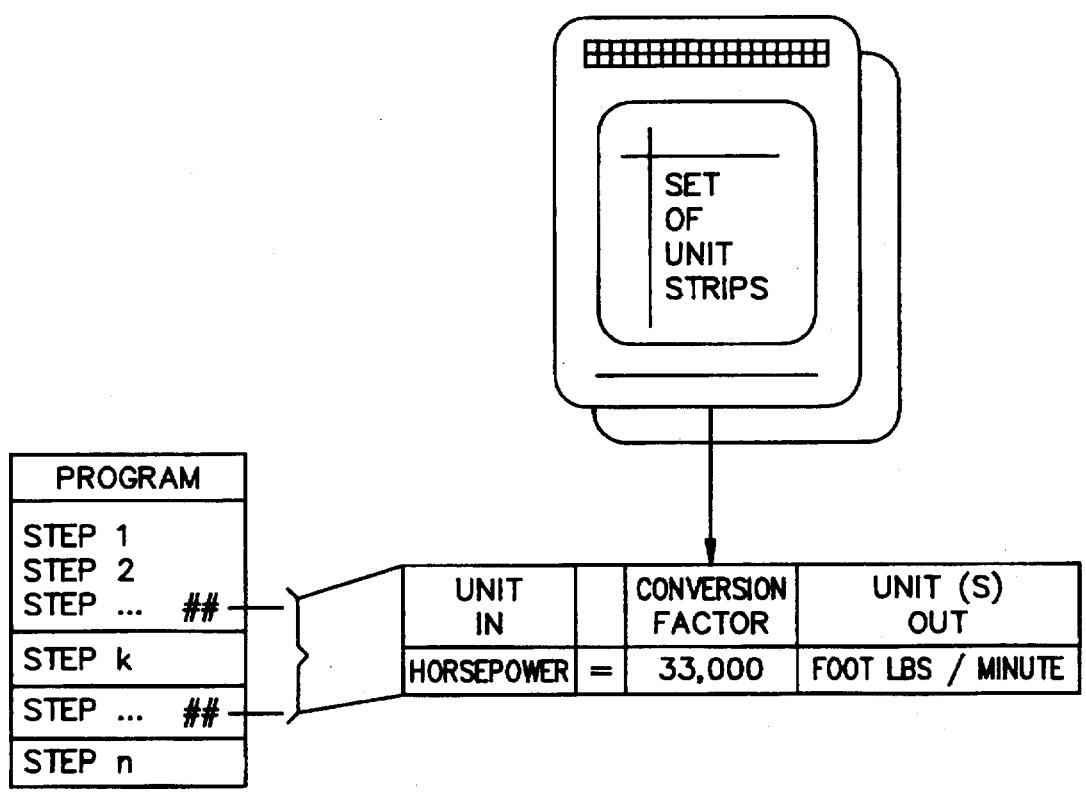

FIG. 80 shows use of a units strip in a program. During the development of the program, a number of steps were put together. At an appropriate point in the program, certain units are encountered, at which time the user accesses a set of units strips from memory and focuses on the one that makes the necessary conversion at each location. A specific units strip is recalled and patched as the intermediate step (step k in the program shown in the Example of FIG. 80), and the program essentially treats the units strip as an equation. The variable available at step k−1 is multiplied by the conversion factor, a new value obtained in step k, and the new value is passed on to step k+1. The program continues with the numerical values changed, thus ensuring consistency of units. Units conversion can be from a single unit to another single unit, from a single unit to multiple units (e.g., horsepower to ft.-lbs./min.), or from multiple units to other multiple units (e.g., lbs./in.$^2$ to kg./m$^2$).

Figure 81:
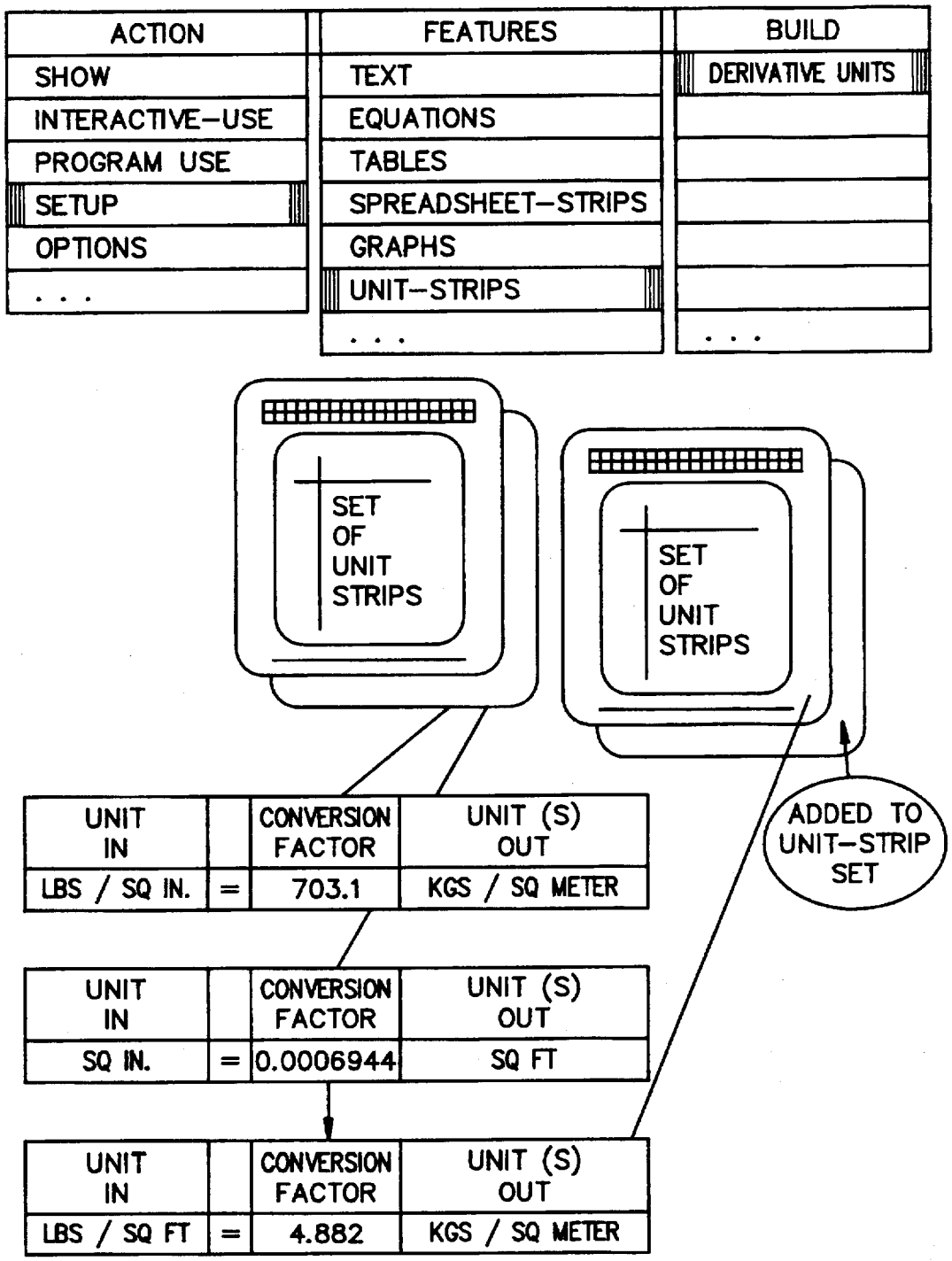

FIG. 81 shows a facility by which a developer or user can create derived units strips from existing units strips. Depending on the problem and the anticipated usage of unit types, a developer or user may invoke existing units strips and by suitably manipulating them, develop new units strips and save the final units strips for later use in a program or procedure. It is also possible to create new units strips and save them.

An index of units in the environment is preferably provided to assist the user in showing what units already exist in the system. Thereafter, other units can be constructed and stored under a given name. The system will preferably have a dictionary of basic units such as length, mass, force, and time units and their equivalents.

Unit consistency is checked by utilizing some basic rules. Examples of these rules are:

1. If the operator is a "+" or a "−", then units of variables should be the same, or should differ by a constant factor. For example, in the term a+b, a and b should have the same units. If a and b are in compatible units, such as feet and inches, then a or b is multiplied by, or divided by, a conversion factor of for example 12. If, on the other hand, a and b are in incompatible units such as feet and pounds, then the system will alert the user of the inconsistency in units.
2. If the operator is an exponentiation, then whatever variable follows the exponentiation, i.e., the exponent, must be dimensionless.
3. If the operator is a division or multiplication operator, then the units must be compounded accordingly.
4. If the operator is a predefined function, units of the arguments should also be predefined, for example, trigonometric and logarithmic functions take on dimensionless arguments and yield dimensionless results.

Units strips are represented as objects as shown in FIG. 82. Graph-theoretic and adjacency-list representation is chosen to be a convenient way of representing the units strips. FIG. 82 shows a sample equation, and its tree representation. The Figure also shows a general units strip tree with operators, units, and conversion factors. In this representation, the operator 01 is always the equal sign, while the operator 02 is something else. Ui and Uo are the input units and the output units respectively, and Cf is the conversion factor. With the use of these units strip representations, a units strips object can be defined. Using object-oriented programming paradigms, this units strips object is defined as the class, the basic units strip class representing a simple type of units strip, and several defined classes being defined that allow for any type of units strip encountered in most situations as described in the foregoing description.

The units strip object also has other objects as component parts. These objects include basic unit types, and fundamental units. Each of these objects is, in turn, represented as a basic class and derived classes to cover special cases. Special notes, source references, and other qualifiers are defined as element classes. Manipulation of the objects involves a collection of units strip functions, which are essentially equations.

When a user chooses to develop a units strip of a certain type, the environment presents various predefined units strip templates and expects the user to type in the values. Other functions allow units strips to be created from other means. When a units strip is created in any fashion, and instantiation of the units strip object is made, the object is given a name, stored, and the name is entered into a dictionary as well as the list of units strips. It is also given one or more references to texts where it is embedded.

VI. Templates and Macros

Despite the advantages of the preferred natural computing system and environment over conventional applications programs, which result from simulation of the natural manner in which persons solve computational problems using tables, graphs, and equations, those skilled in the art will recognize that certain features in conventional programming may also be made available to the user in the preferred environment. These features include conditional statements (if-then-else, do-loop statements, case statements, and so forth).

This is made possible through the provision of features like macros and templates. FIG. 83 shows a template for if-then-else statements, also known as conditional statements. Utilizing object oriented languages such as "C++" or Smalltalk, these conditional operations can be programmed as objects, For example, one can define a class of IF operations, using a representation such as that shown in FIG. 84A that expresses the conditional statement as a structure which can be implemented in an object form. As a result, each time a user wishes to use the conditional statement, the object can be invoked and the appropriate value is provided.

The IF object requires three values: an expression to be tested, and two result expressions. Alternatively, in place of the two expressions, two pointers where the result will be found, or where the execution should go, may be provided.

Figure 84B:
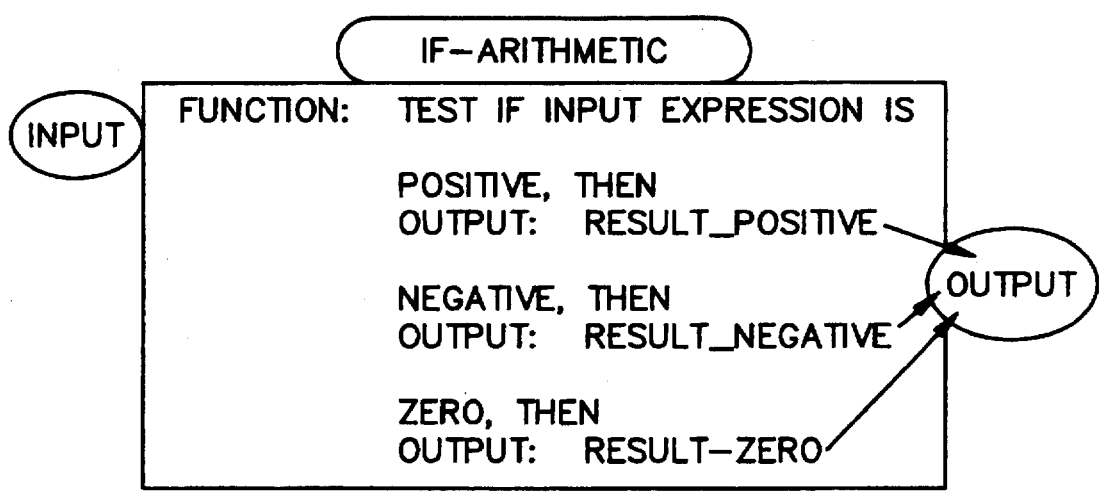

One can define several subclasses of the IF-class to accommodate all types of IF statements. As shown in FIG. 84B, one subclass of the IF operation will be the IF arithmetic class. This object, upon receiving a message, checks the expression and provides results depending on the value of that expression. The illustrated example shows how a conditional statement has been turned into an object operation in the environment of the subject invention rather than a detail in programming. As will be described in more detail below, when different objects are connected with conditional paths, the conditional objects are extremely useful.

Another important conditional statement is the Switch statement, also known as the Case statement. This statement is similar to the IF statement, but has more optional outputs. The definition of the switch object consists of a switch or case value to be tested and, depending on the result of the test, several actions which can be taken. This leads to the definition of the Switch or Case object as a subclass of the IF class.

Figure 85:
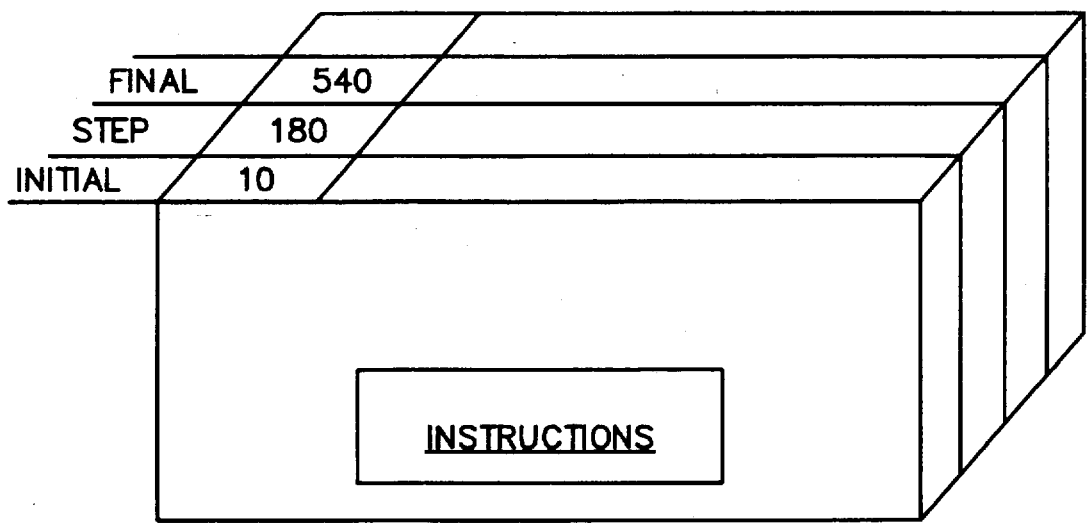

FIG. 85 shows a template for a Do loop, also known as a While or For loop. The template provides for three values of the loop control (initial and final values, and step or increment), and for a calculation procedure. The system starts the loop with the initial value and computes the expression, increments the loop control variable value by the step or increment value, and repeats the computation in the expression until the final value is reached.

By representing a Do loop as an object class, a program step is converted into an elegant object class. The Do loop class has a structure that will accommodate the loop control values. The object checks its state, the value of the loop control variable, and behaves accordingly. Finally, when the loop needs to be exited, it passes control to the appropriate other object and destroys itself or that instantiation. Similar subclasses can be defined for other repeat statements.

Figure 86:
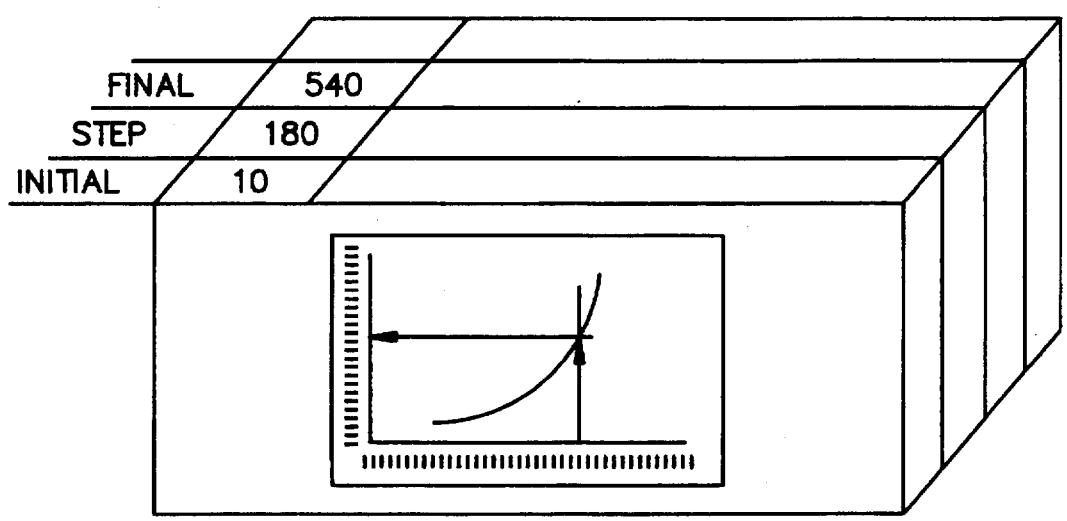

Advantageously, the natural computing system makes it possible to substitute a graph in place of the calculation in the loop, as shown in FIG. 86. For example, if one wants to read a number of values from the graph, the Do loop representation or use of a Do loop object will simplify the specification. The input values are defined by or in the terms of the Do loop control variables. In general, this concept can be extended to include any combination of equations, tables, graphs, other templates, and procedures within the loop.

The concept of macros can be extended to a variety of other conventional calculations. For example, macros are required for calculations involving complex numbers. In order to take care of such calculations, a series of classes is defined, starting at the lowest level with the definition of objects that represent complex numbers. Thereafter, several operations can be defined as methods extending the same operations with real numbers, a technique known as overloading in the C++ language.

Figure 87:
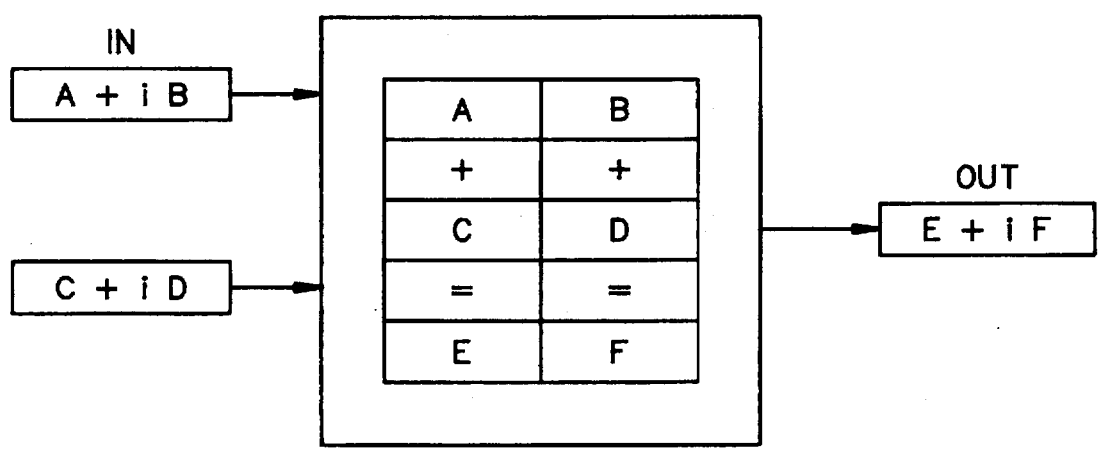
Figure 88:
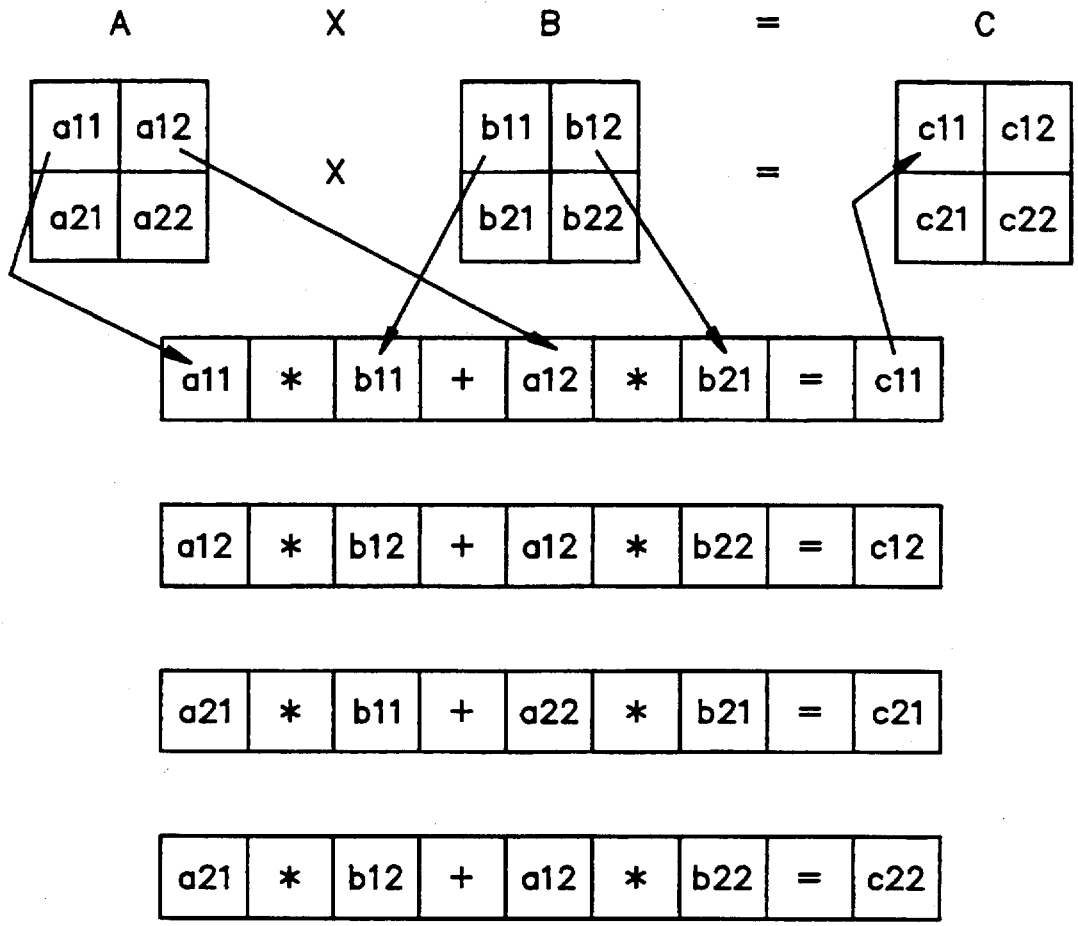
Figure 89:
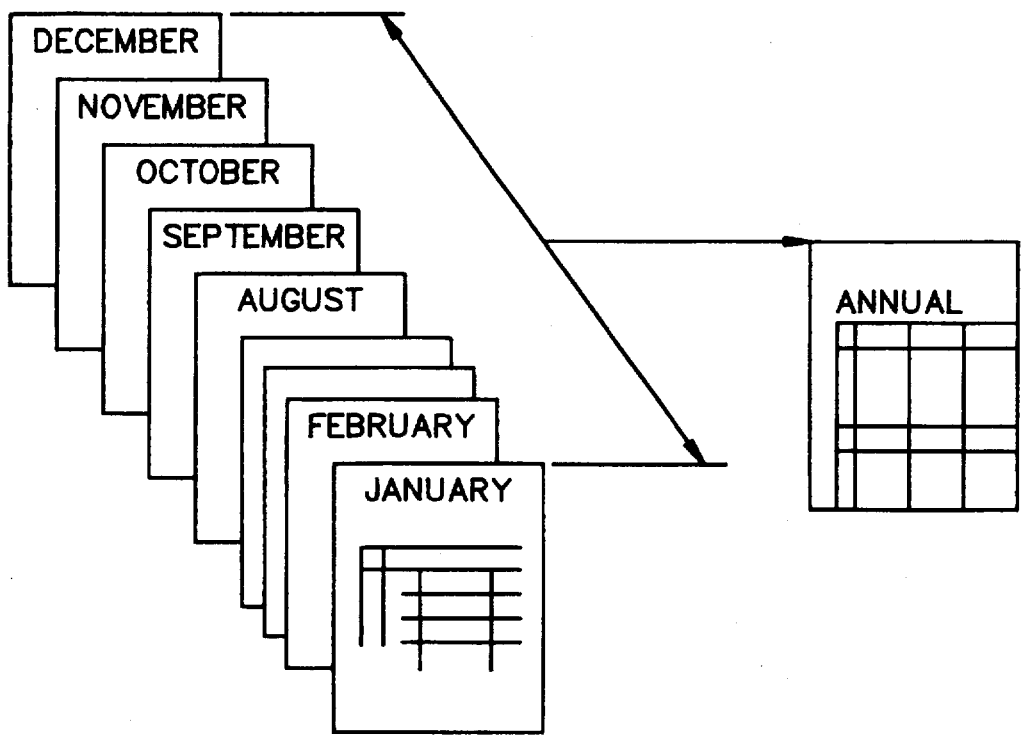

FIG. 87 shows how an object macro can be defined to manipulate complex numbers. Each of the objects in the macro, representing a certain operation, also contains functions for display of the results while the operation is in progress. This is for the purpose of increasing the visibility of the operations. As explained below, such a display can be invoked or suppressed as the developer or user desires. The objects provide choices so that users can choose visibility or speed as appropriate to their needs. Similar macros can be used to facilitate matrix manipulation as shown in FIG. 88. FIG. 89 illustrates a different type of macro which involves the addition of 12 tables, each representing monthly data, to obtain a total for a year. This macro repeats the operation of another macro that consists of adding two tables at a time.

Figure 90:
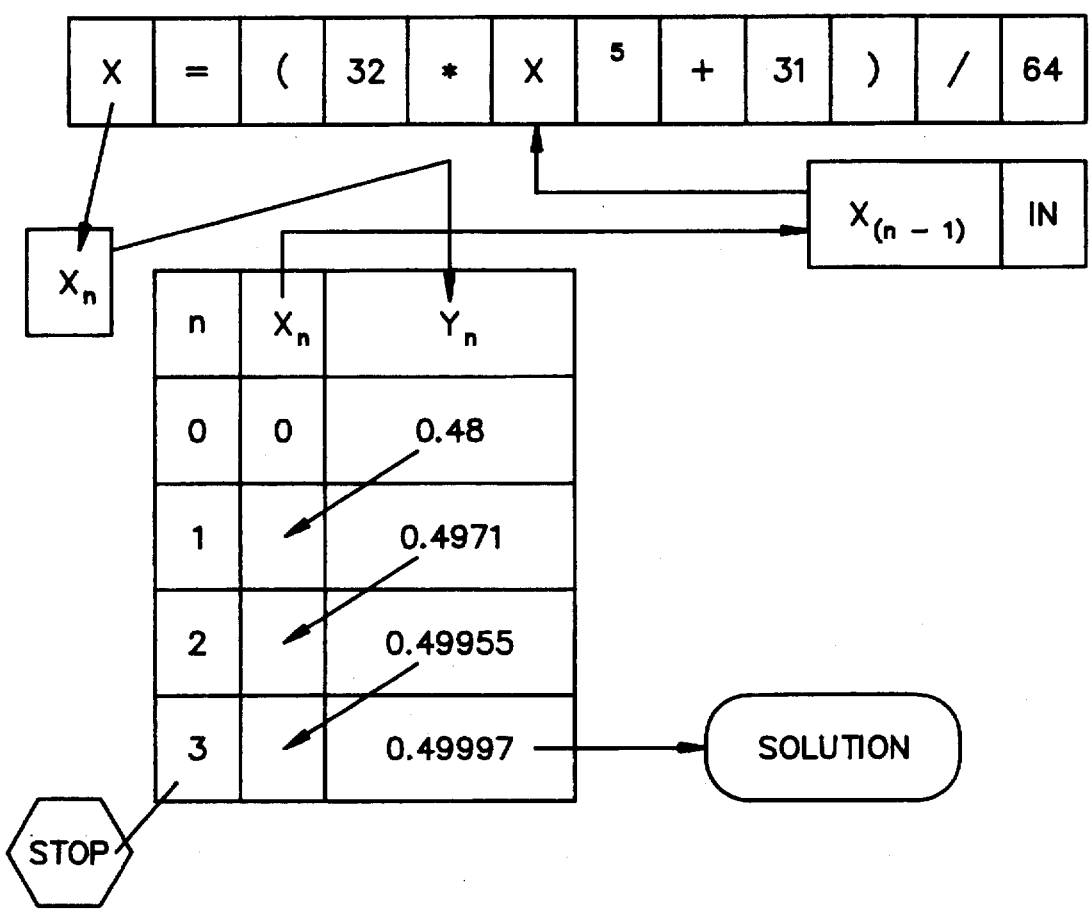

More generally, macros can be developed to set up procedures to carry out a variety of iteration problems, such as the one shown in the example of FIG. 90. In FIG. 90, equation 1 is input and the problem must be solved through iteration. The given equation is restructured as equation 2, a macro set up so that one can start with an input consisting of any estimated value of the X and obtain a resulting value of X. The accompanying table compares the two values and continues iteration until the error is within a given limit. FIG. 90 also illustrates connectors that pass values, and program control. In general, the macro facility allows an analyst to develop a procedure, identify a number of salient operations, and represent the operations, subprocedures, and finally the procedures as object classes. When the developer instantiates these objects, templates for the entire process are set up.

Those skilled in the art will appreciate that, although the object oriented paradigms used herein are well-known, the process combination of those paradigms described above is both novel and non-obvious, and possesses a number of advantages over current arrangements including the advantage of not requiring any knowledge of the domain variables and values in order to develop a procedure for solving a problem.

VII. Forms and Flowcharts

Figure 91:
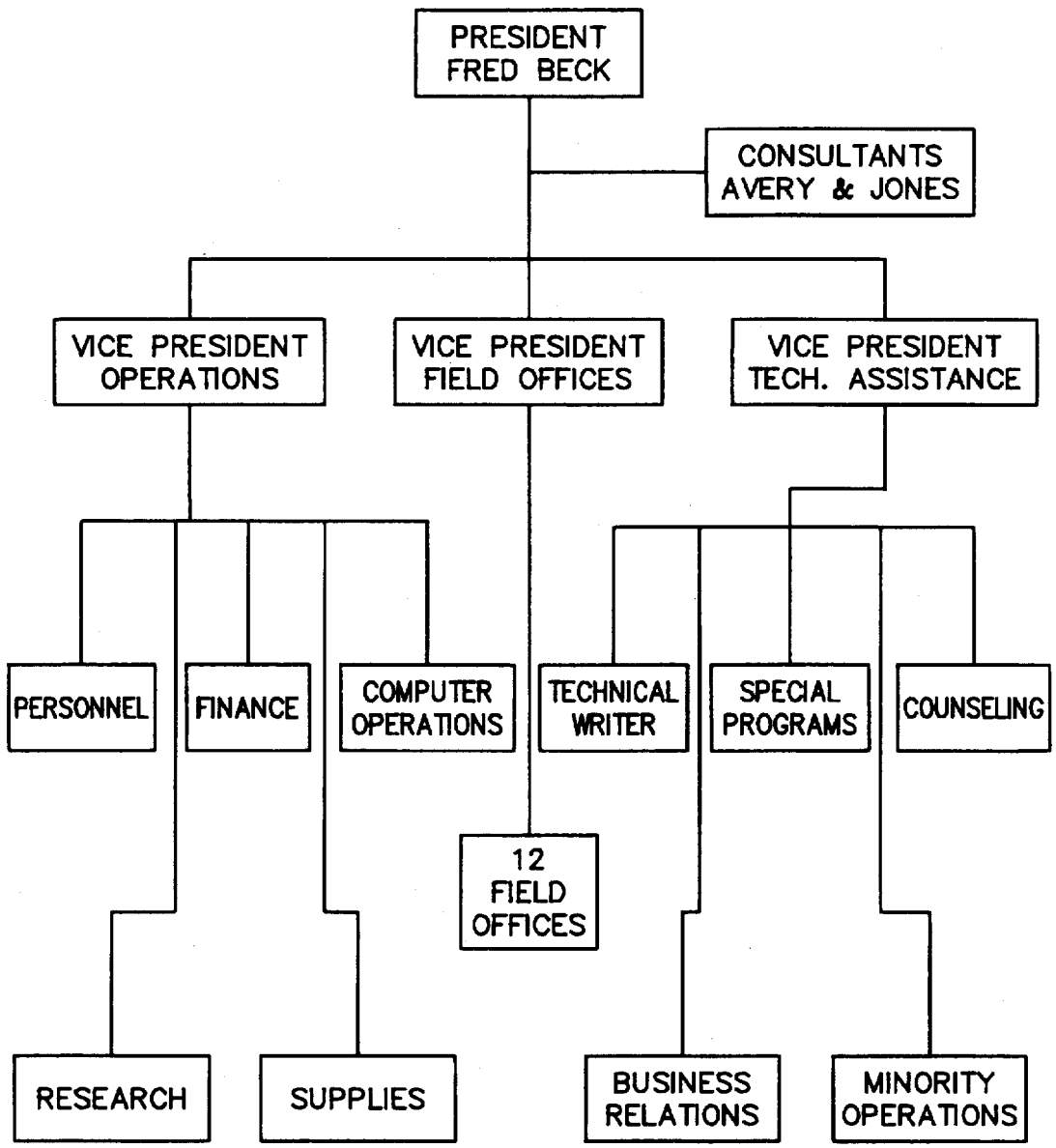

One of the objectives of the preferred computing system and environment is to address as many object representations that occur in books as possible. One such object representation which has not yet been addressed is the organizational chart, an example of which is illustrated in FIG. 91. Representation of this type of network graph is easily accomplished.

Figure 92:
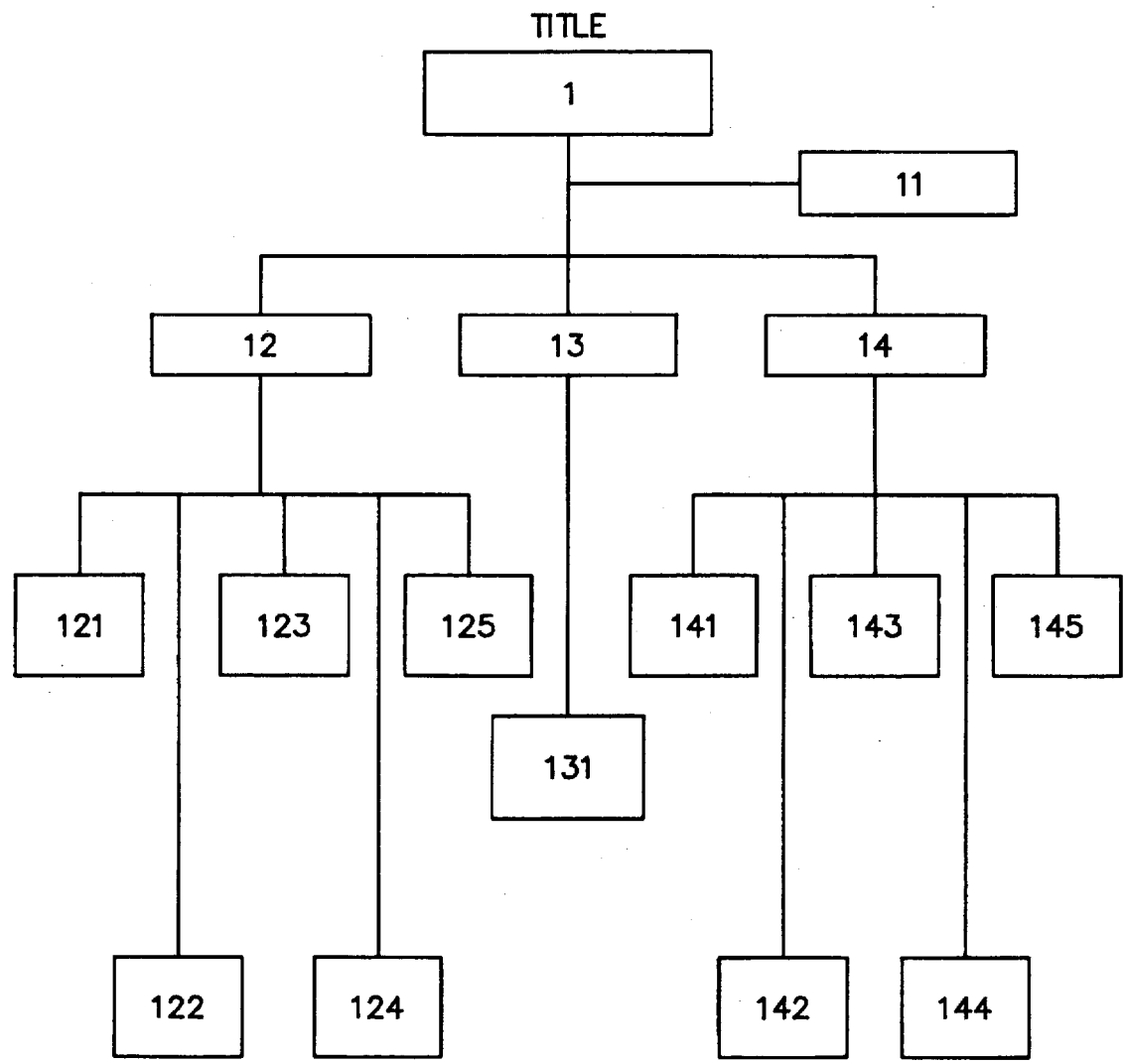
Figure 93:
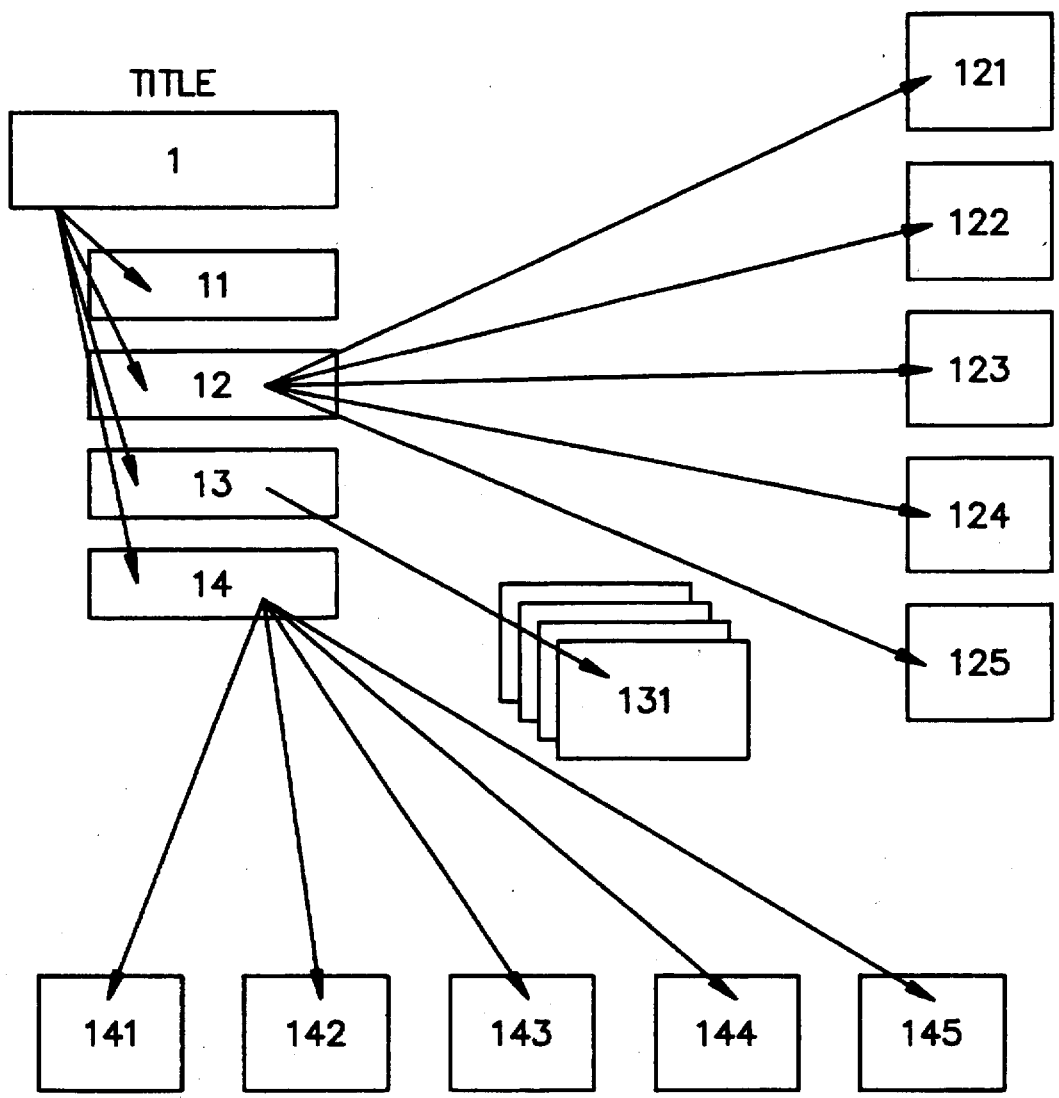
Figure 94:
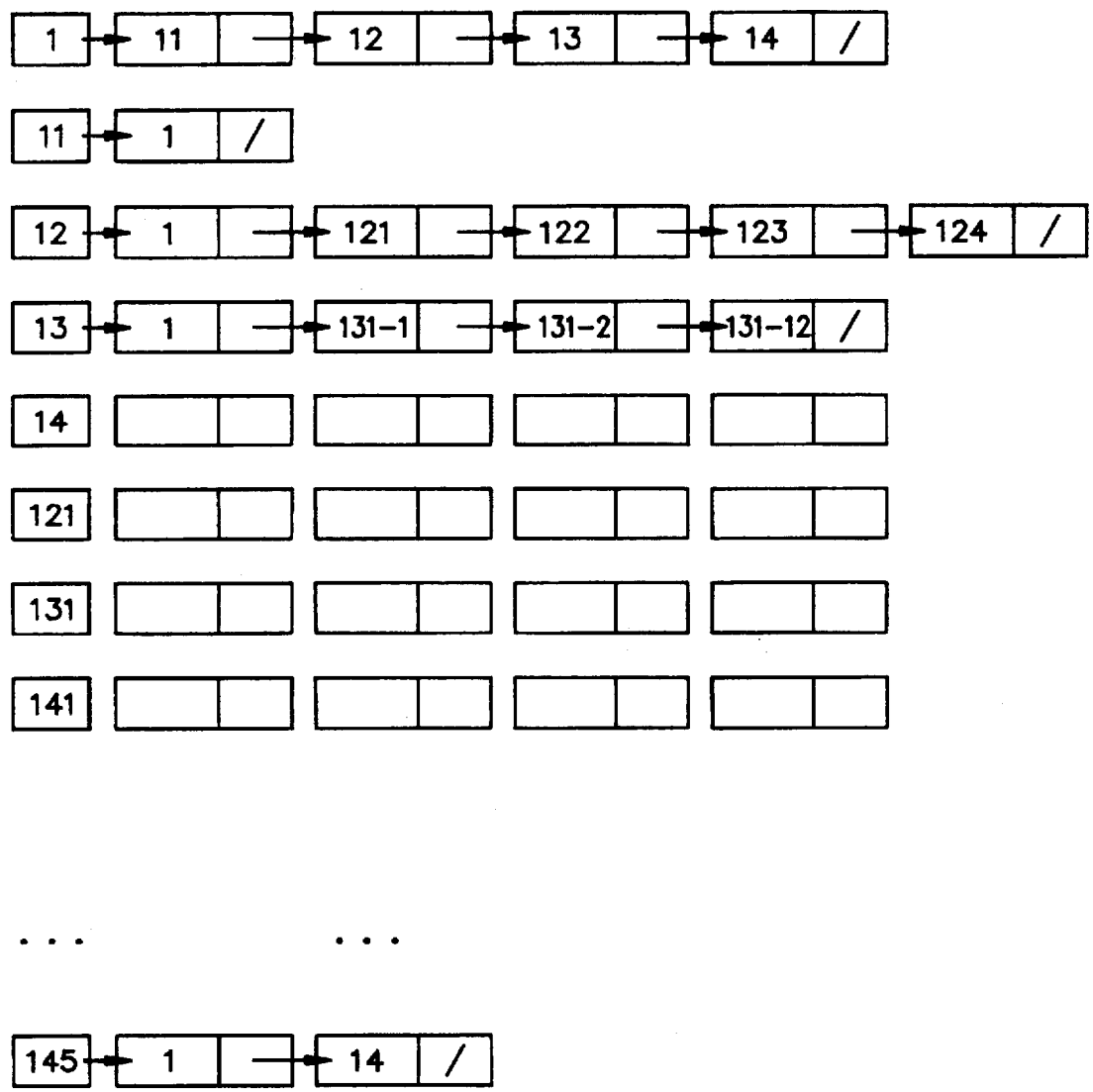

In the above explanation on tables, the tables were represented as a kind of network diagram and stored as adjacency-list. A flowchart of the type shown in FIG. 91 can also be represented in a natural way as a network and stored as an adjacency-list, by converting the flowchart using block numbers shown in FIG. 92 to a graph of the illustrated FIG. 93, and finally represented as an adjacency-list as shown in FIG. 94.

Forms are also a variant of tables. FIG. 95 shows a form (a) where the various fields are identified, marked and numbered. In the same figure, at (b), an equivalent table is presented where the fields are identified and the information is presented. In addition, FIG. 95 shows a list representation of the form. Just as in the case of tables, the information in the forms is represented as belonging to a cell and the cell or field is in turn referenced. By noting the position and size of the cell, the relative disposition of the items on the form are displayed, tracked and manipulated. The forms object is thus defined as a class and a structure is given to it.

Figure 96:
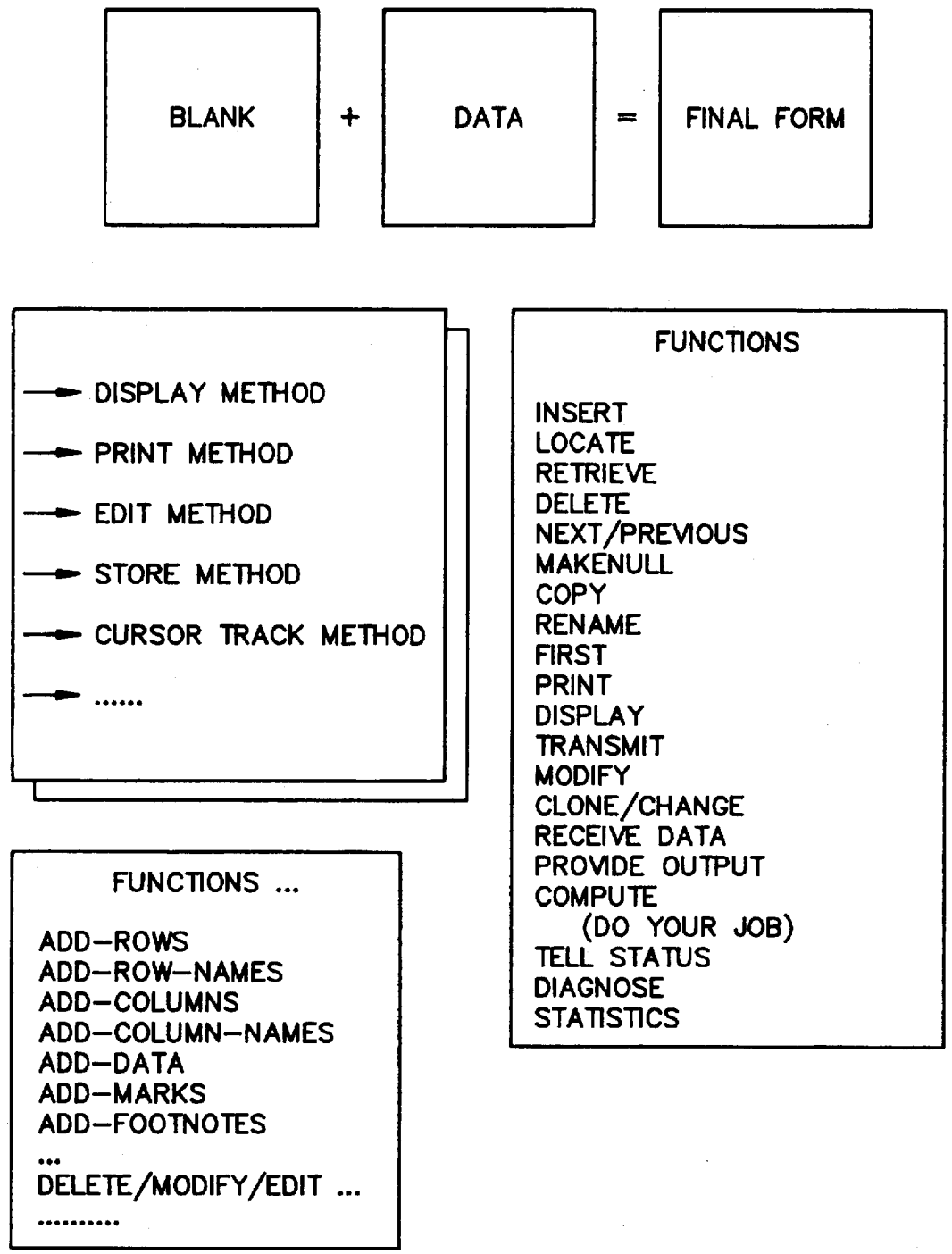

The forms object is built up of several objects. A blank form is defined with the display formats and permanent fields. The data or values are then obtained from the appropriate column and the display is constructed. The two displays (blank form and data) are merged and a final form is displayed. This process is illustrated in FIG. 96, which shows the components of functions that make up the forms object.

In summary, as described in this section, templates and macros can be defined for most of the commonly used computational paradigms such as conditional statements, loops, networks, complex numbers, matrix operations, and forms. Each macro or template is defined as an object class. Variations from the base class are defined as defined classes following the object-oriented language paradigms. All operations involved in the templates and macros are defined as functions or methods. Because of these facilities, the user does not have to write any code, nor is there any need to predefine requirements for a programmer. The user needs to identify the macro needed in a particular problem solving situation, selected, instantiated, and provide the necessary data and information pertaining to his or her domain or application.

VIII. Text

In contrast to conventional computational techniques, text plays an important part in the subject computational system and environment. The reason for such an important role is that text explains what the equations, graphs, and tables stand for. Text is an integral part of any natural computational scheme involving equations, graphs, and tables, and it is the separation of text from the calculational features that is most responsible for the unexplainability of traditional computing. In technical literature, text is dotted with equations, graphs and tables. Engineers and scientists read the text, comprehend the method of usage of information in these features, and solve their problems utilizing the information available in the equation, graphs, tables, and other calculational objects.

Figure 97A:
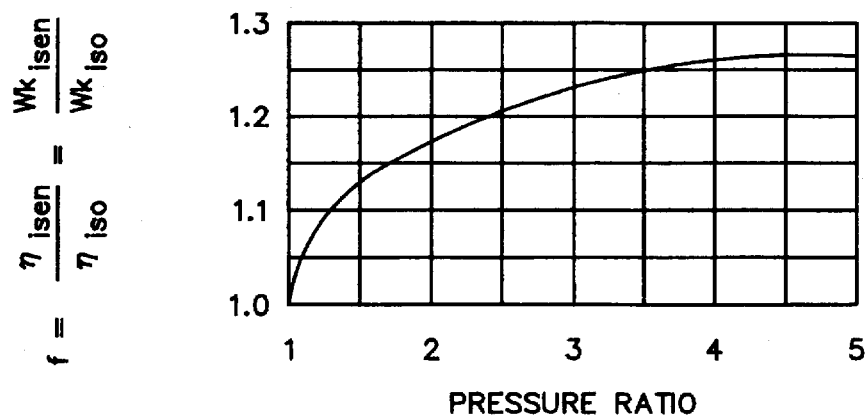

Consequently, it is important to preserve the text and calculational objects in their natural state or relationship, thus preserving contextual understanding. In the present computational system and environment, the computational objects are maintained as part of the text and are live and active as objects that will perform computations when invoked. An example of text with an equation, graph, and table is shown in FIGS. 97A and 97B.

Figure 98:
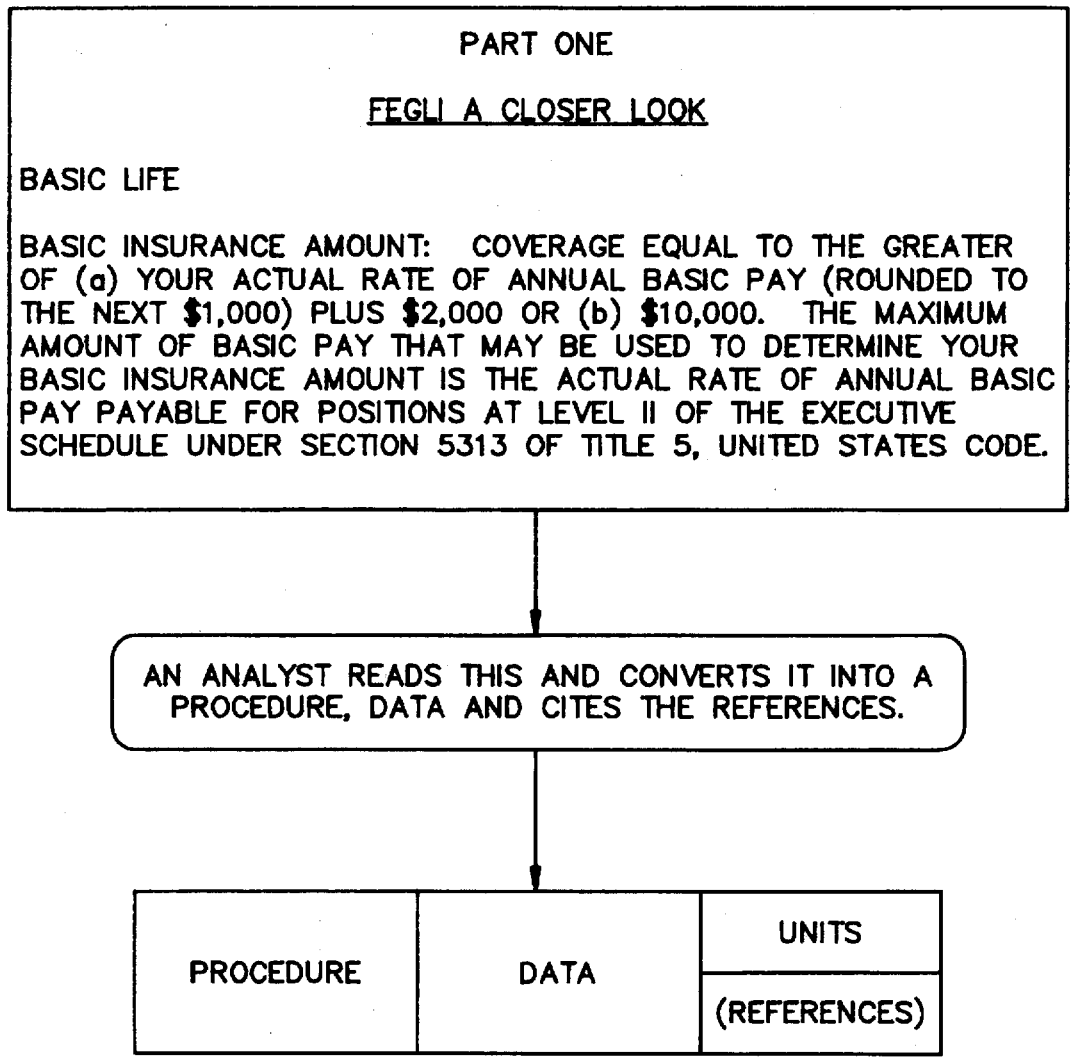

Quite often, people use text to read, interpret what they read, and develop computational procedures, and/or extract data. FIG. 98 shows an excerpt from a document that describes certain life insurance information. In this document, the conditions for coverage are outlined. If a user is interested in setting up a procedure to calculate the "basic insurance amount," he or she needs to understand the information and data and interpret it as a calculation.

In the preferred computation system and environment, the text is reproduced in a form that is accessible and, additionally, the user can construct a procedure utilizing the data and information in the text. The procedure will be maintained or stored as part of the text and thus, when the text is accessed, the procedure is made available, either routinely or optionally. Just as word processors allow parts of texts, graphs, or other parts of texts to be cut or copied, such a procedure object can be cut or copied into other documents or procedures, and values from the computational procedure can be pasted into the text.

Figure 99A:
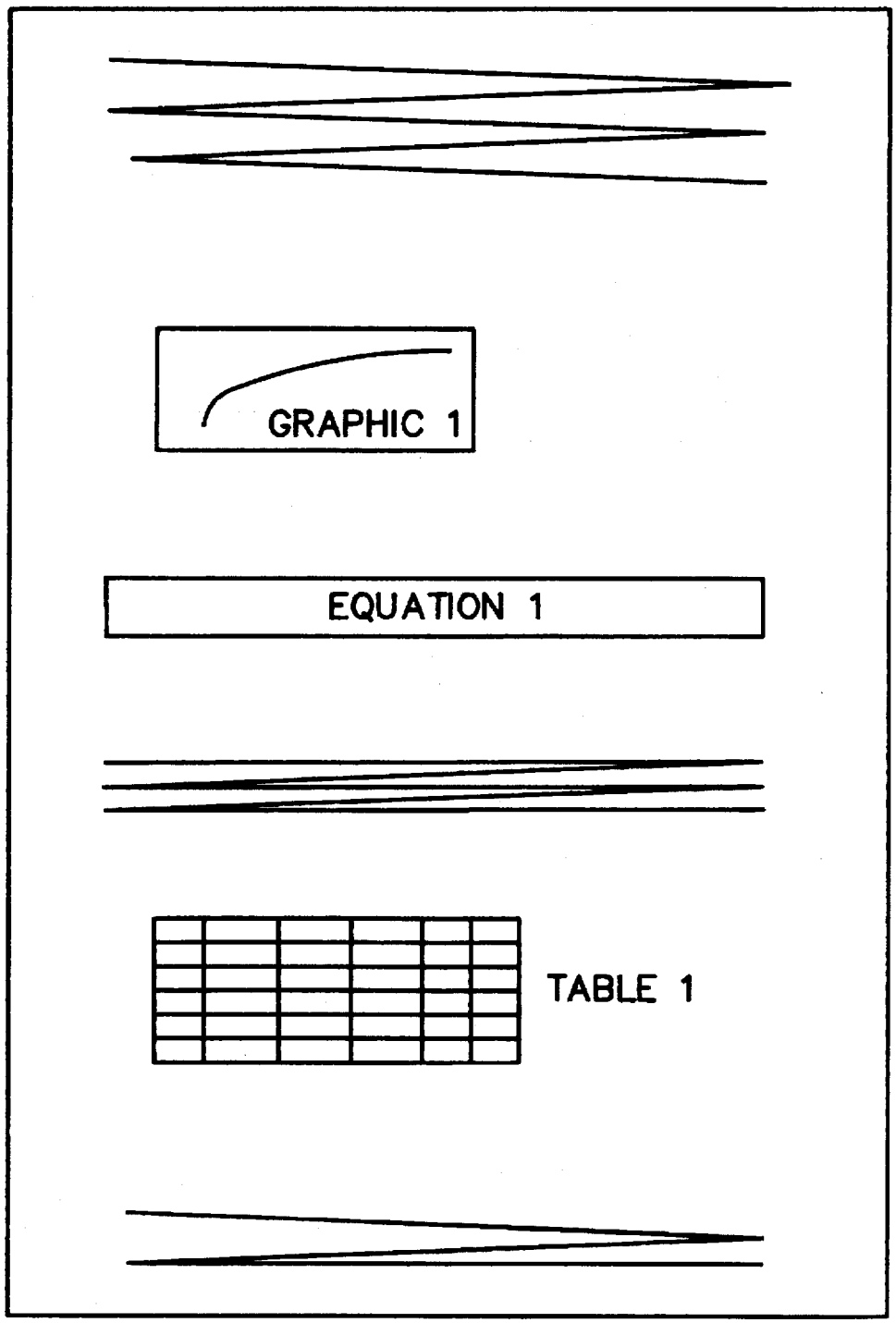

For example, values from any of the above-described feature objects can be used to develop form letters in which values from tables are located and pasted into the text. Conversely, items of data in the letters can also be processed to be available for other procedures. In general, a given text may be either created or scanned and preprocessed into a suitable format for natural computing. A typical text format would appear as shown in FIG. 99A and its computer representation in the form of a list of lists as shown in FIG. 99B.

Figure 100:
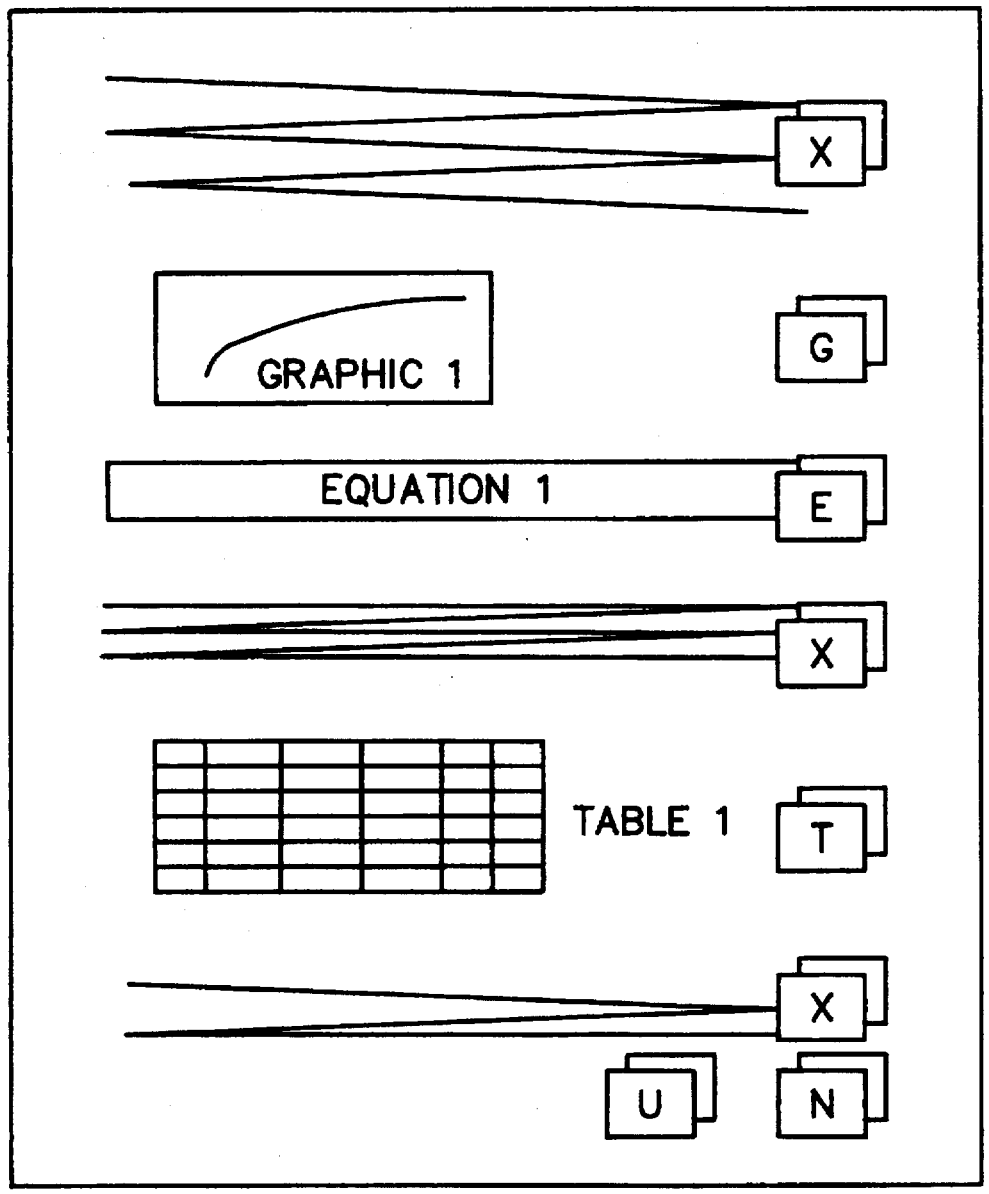

During processing of text into the preferred format, all of the graphs, equations, data, tables, units, and notations to be included in the text are marked, stored in memory, and allocated pointers. These can then be recalled in the form of a list or lists showing their locations in the text such that when text is being read, a particular calculation feature, for example, an equation, can be recalled and interactive-computing operations can be carried out if desired. Alternatively, when a table is being used, its source text can be recalled to see the context in order to understand the significance of the table. For example, those objects which are in feature form and available for use in a calculation can be highlighted as shown in FIG. 100.

Figure 101:
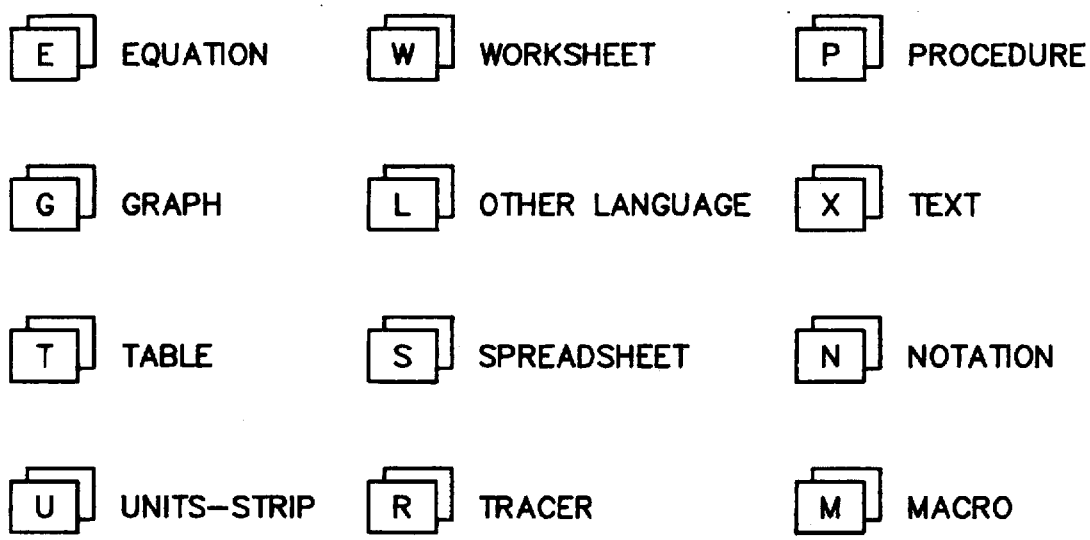

It is possible that not all tables, graphs, and equations in the text may be in a suitable format for manipulation, and thus the reader will have to judge its value. In this situation, when a reader encounters a graph in a text, hidden symbols can be made visible as illustrated in FIG. 100 to reveal if the particular draft is available as an object for manipulation. Likewise, when an equation, a table, or a draft is being used in a calculation, the embedded or referenced text can be accessed by activating the text objects. FIG. 101 shows a list of symbols which can be employed in showing the embedded objects.

Thus, text plays a significant and integral part of the preferred computational system and environment, in contrast to traditional computing. Those calculational features that are already converted to objects which can be called into use can be displayed in terms of symbols. By highlighting and invoking a symbol, a particular object can be selected and readily used in a computation.

It is anticipated that this will make possible the development of references which have the form of traditional handbooks or textbooks, but in which all of the equations, tables, graphs, and so forth are actually objects which can be utilized by the reader of the text in order to explain the text, test the reader's knowledge, or apply the text.

IX. Interfaces to Other Programming Languages

Despite the advantages of the preferred computational system and environment, it is anticipated that there will still be a need for traditional computing language environments, primarily for two reasons:

First, billions of lines of code exist in the numerous programs currently relied upon. Therefore, to be effective, any new system has to work with existing systems. Second, as a high level language environment, the preferred computational system and environment depends on lower level languages for procedures that are feasible at the machine level. Therefore, the natural computational system and environment preferably includes interfaces to programs developed in other languages.

Figure 102:
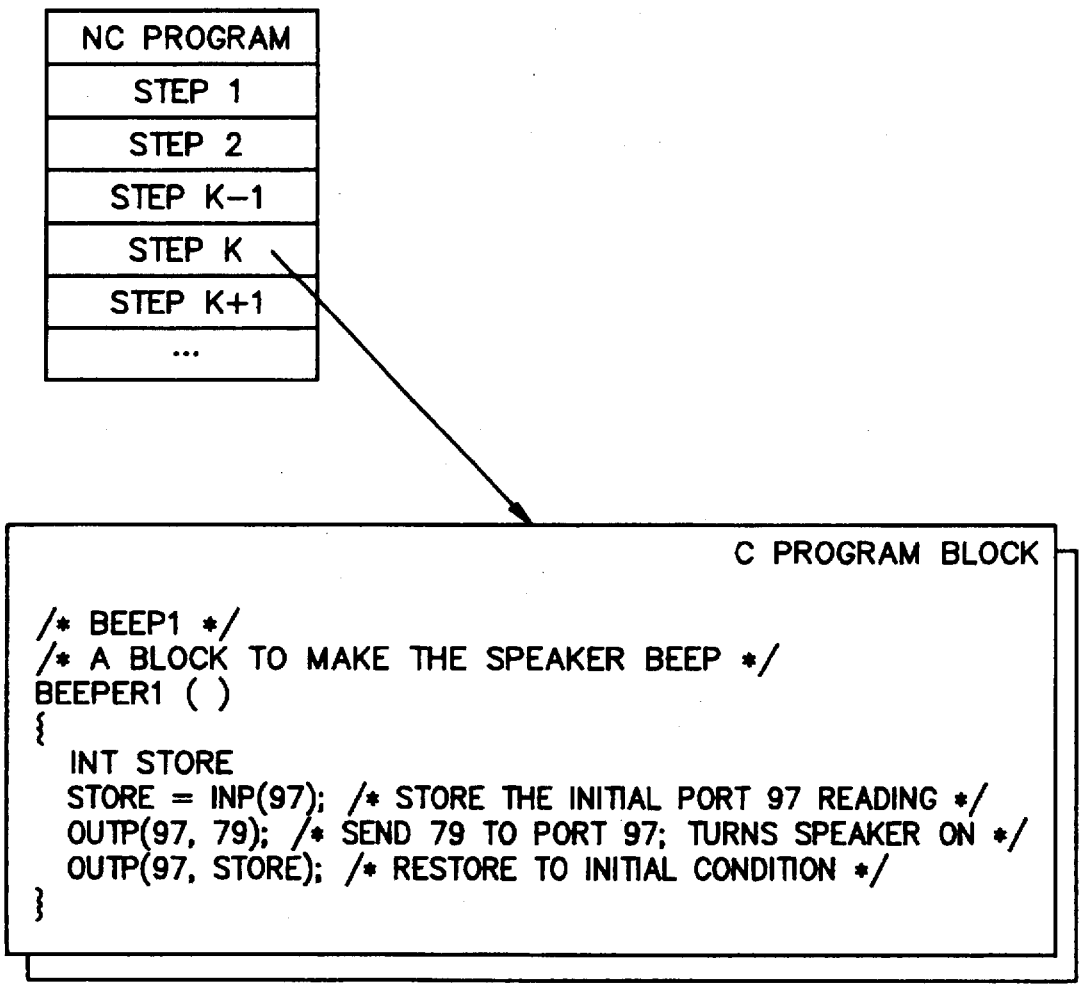
FIGS. 102 and 103 are diagrams illustrating the use of interfaces to other programming languages in the preferred system and environment.
Figure 103:
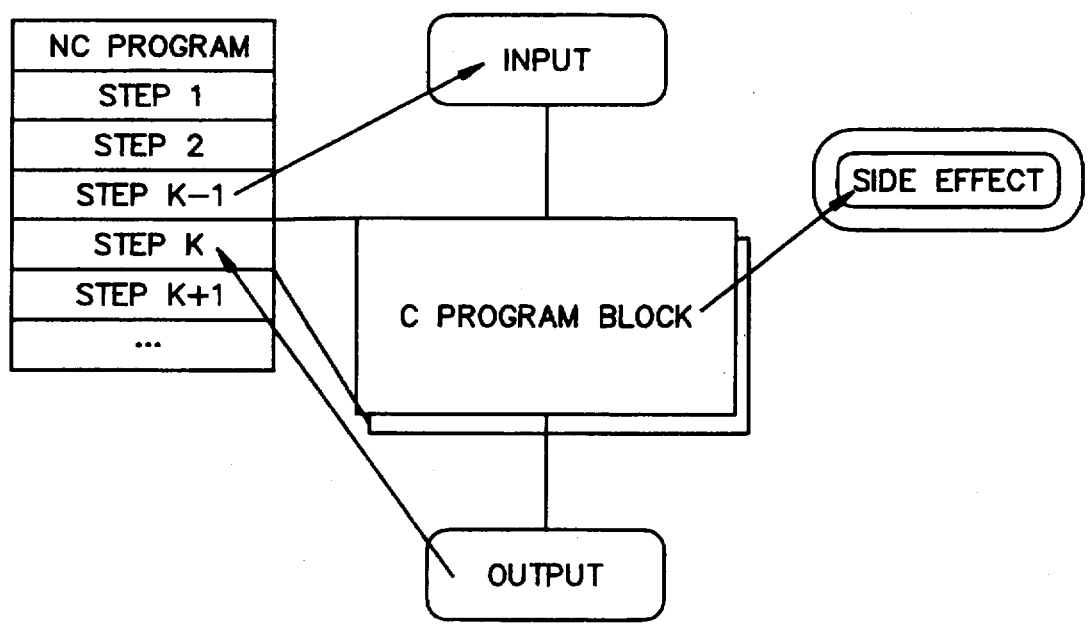

Such interfaces are in the form of black boxes that can be inserted into a procedure as whole steps. FIG. 102 shows a typical example of a C language code (procedure) used as a block in a program operating in the preferred environment. Although the above example shows the simple C language block illustrated in source code, it is possible to provide a block in any traditional language, data base, or spread sheet environments. In general, when another program block is inserted into the preferred system as shown in FIG. 103, the resulting program will embed the source code as well as the executable code. This combination has the advantage that the object code can be linked, called or executed, while at the same time the source code provides visibility (to the extent that a low level traditional computer language can provide visibility).

X. Integration of Various Features into Procedures—Pipes or Connectors

Figure 104:
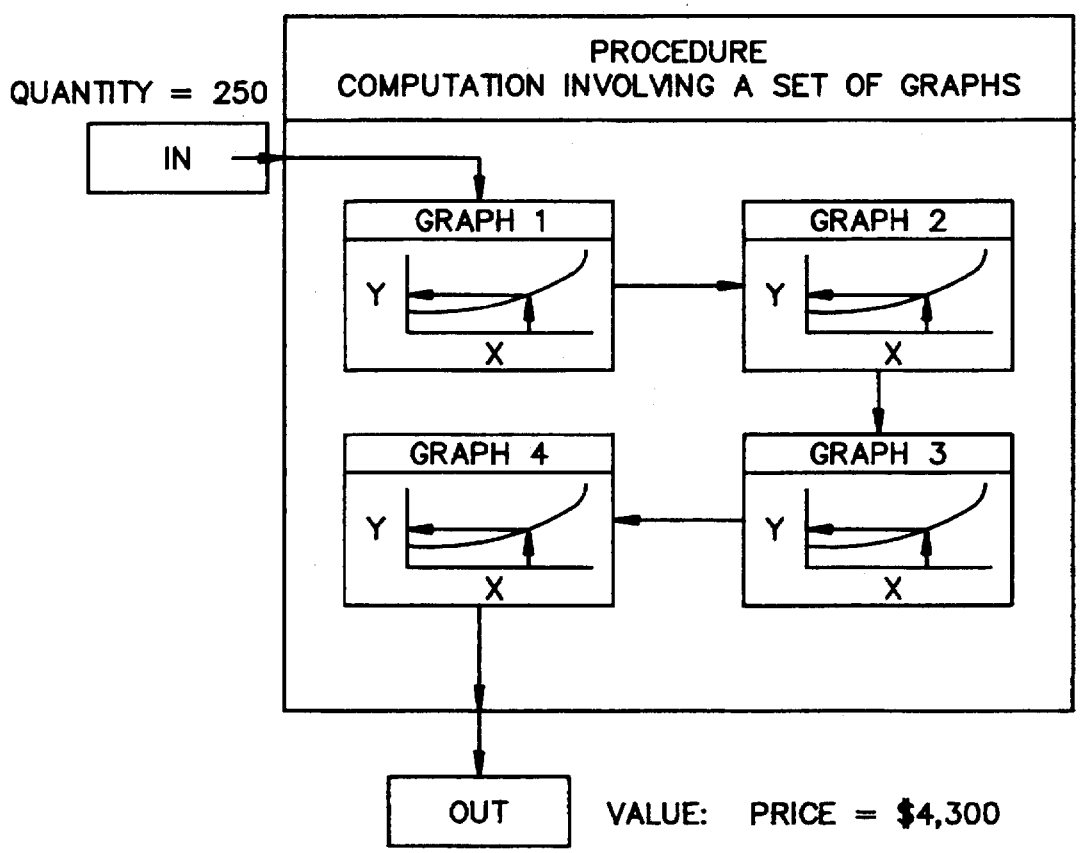
FIGS. 104–111 are diagrams illustrating the integration of features into procedures in the preferred system and environment.
Figure 105:
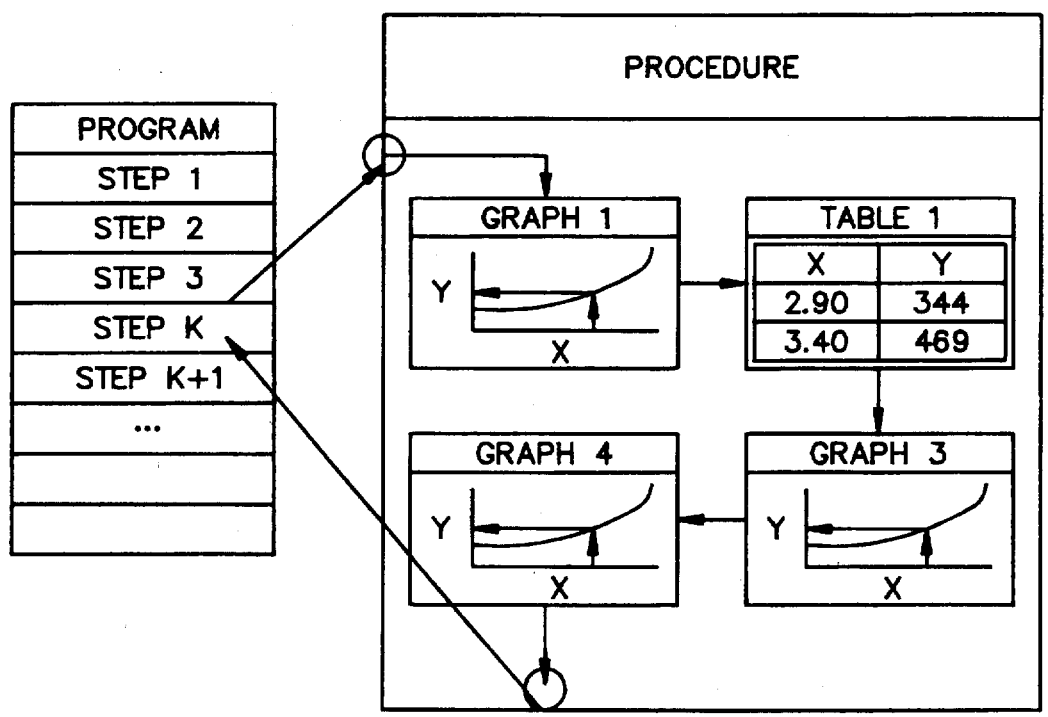
Figure 106:
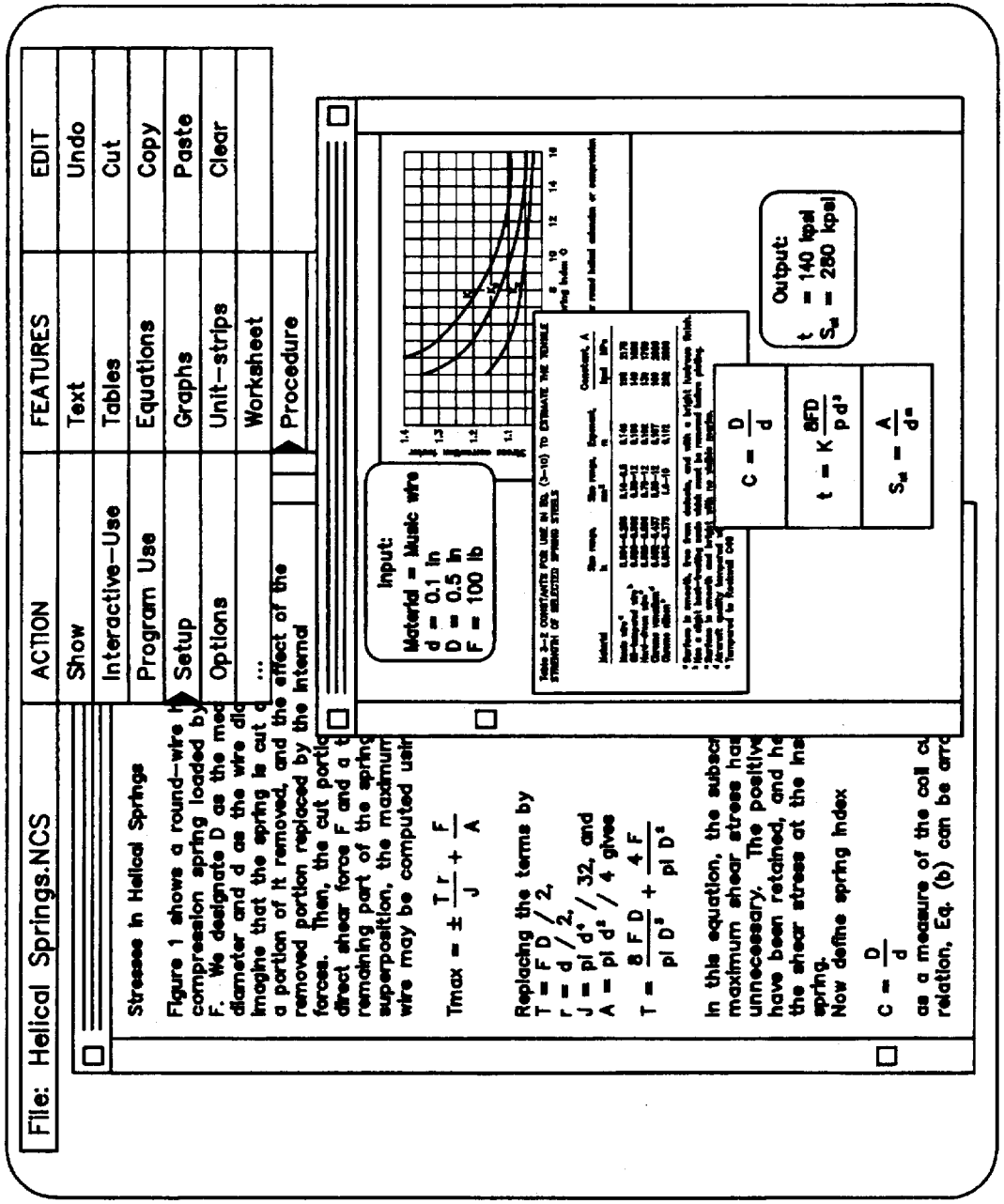
Figure 107:
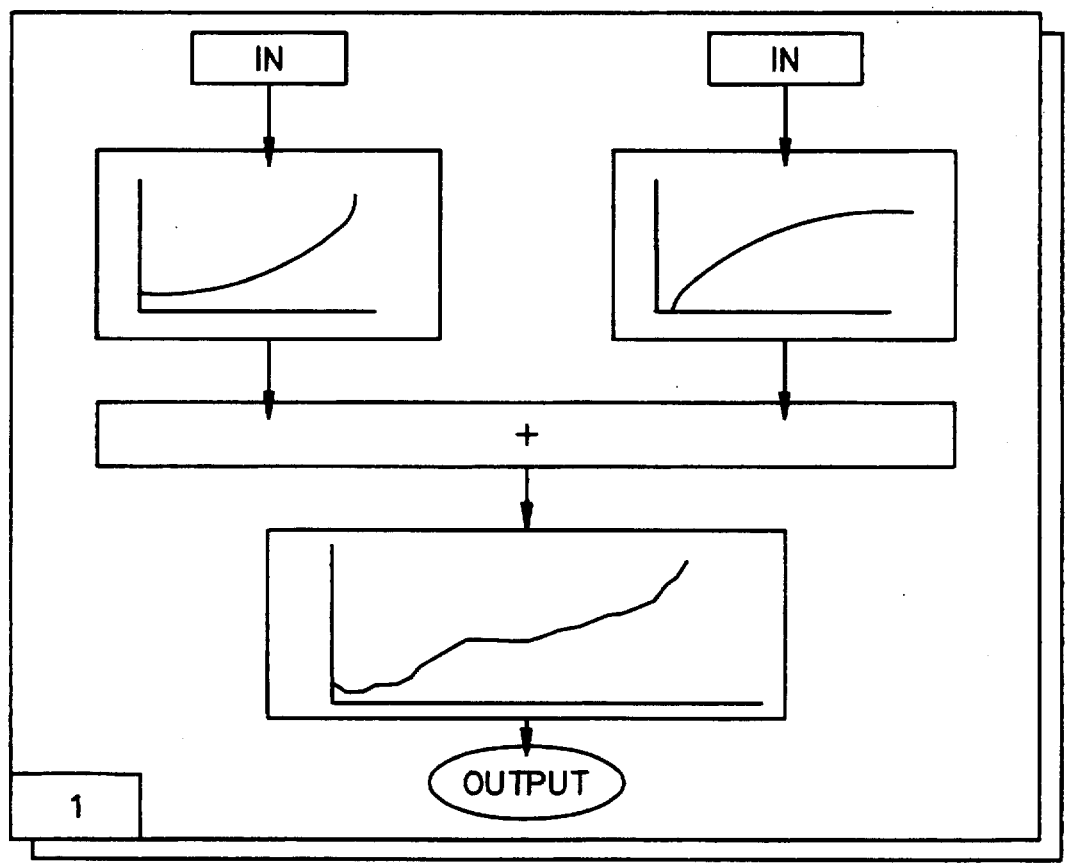

By procedure is meant the combination of features. For example, FIGS. 104 and 105 are examples of procedures involving the use of a series of graphs to solve a problem. FIG. 106 shows a procedure with graphs, tables, and equations while FIG. 107 shows an example of a procedure involving parallel computation. Finally, FIG. 108A shows a list representation of the procedure of 107 using pipes of the type described below.

Figure 108B:
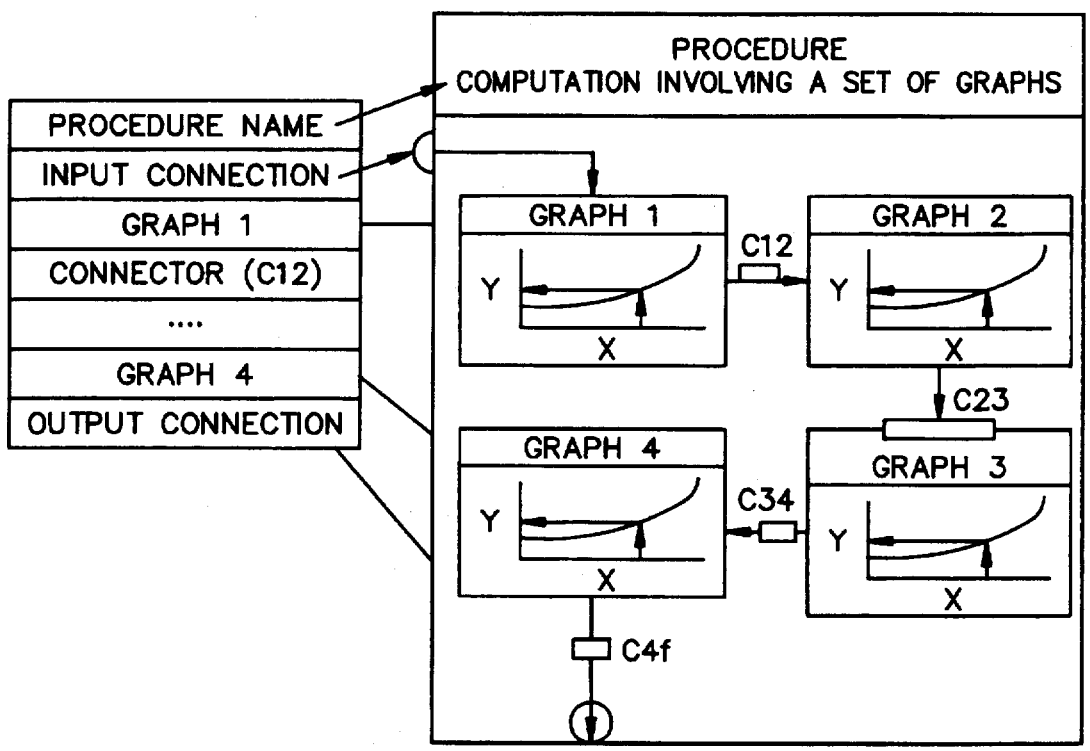
Figure 109A:
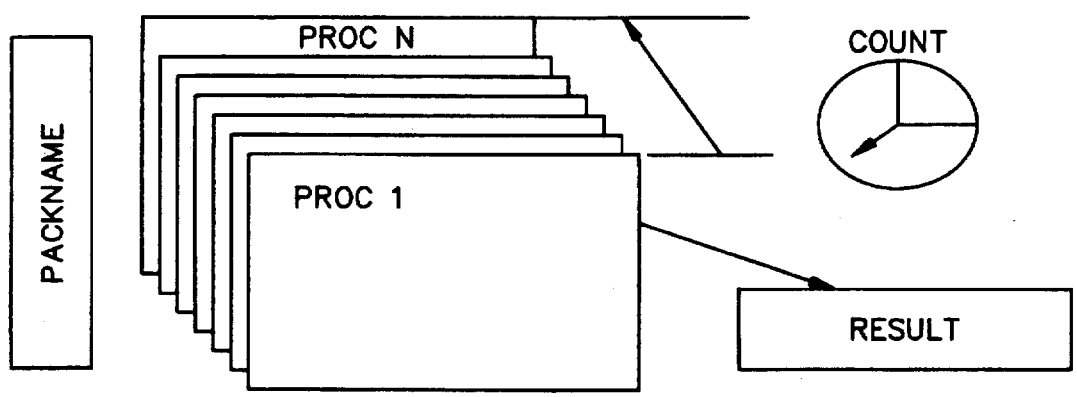

FIG. 108B illustrates a template for setting up a procedure, the template allowing the user to type in the name of the proposed procedure and a series of graphs or other calculational features including other procedures. On the right side of FIG. 108B is shown a series of graph objects, any number of which can be cut and pasted from or to the box in which the graph objects are positioned. The individual procedures can then be stored in the form of a pack so that users can access the pack and use any of the procedures for use in a computation, as illustrated in FIG. 109A.

Figure 109B:
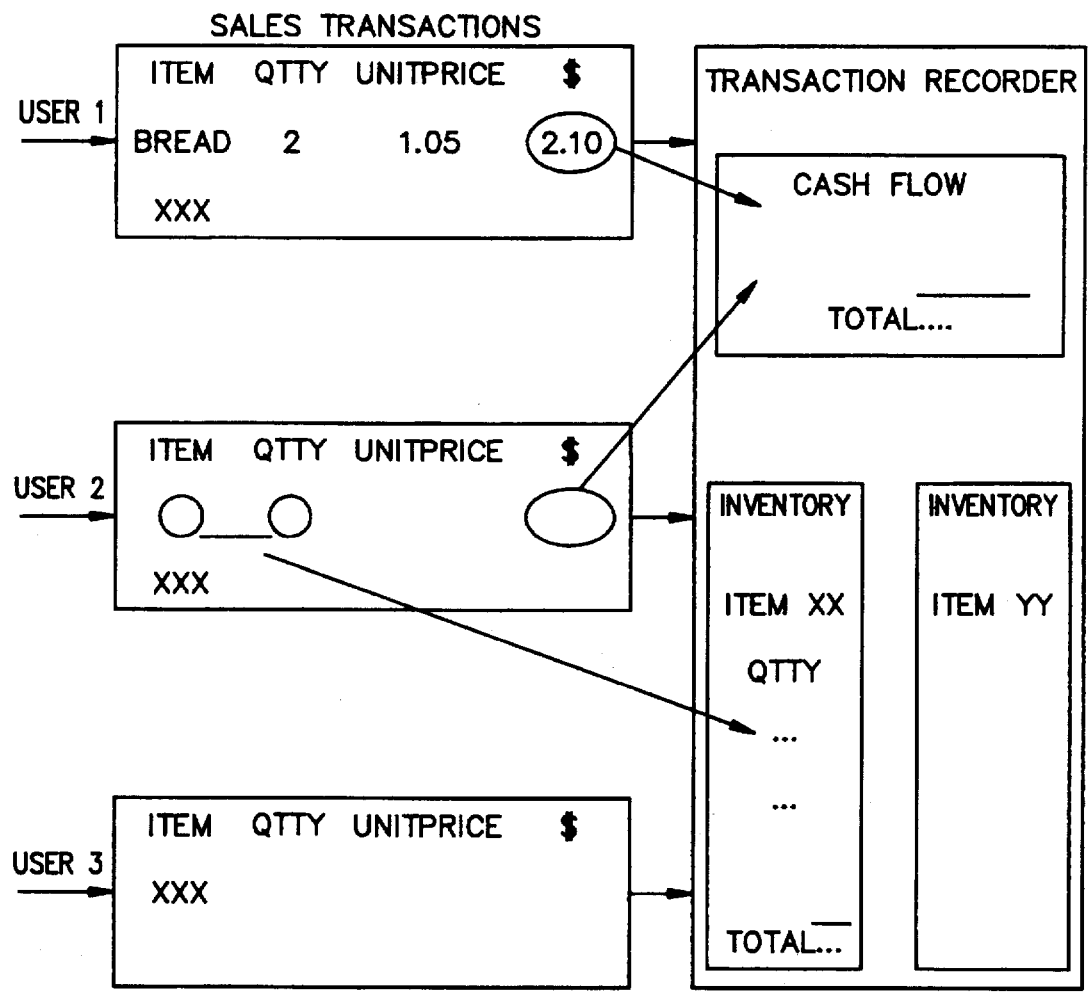

An Example of an implementation involving parallel procedures is shown in FIG. 109B. The procedure shown in this Figure is an accounting and inventory system which treats sales receipts as tables and allows a salesperson to fill out the tables at checkout. A preset procedure copies and pastes the appropriate values into the transactions area, with cash totals being carried into cash flow tables and inventory tables taking care of stock items.

Pipes or connectors play a key role in allowing variables and values to be transferred from one object to another in a procedure. Each pipe or connector has a name, and at least an incoming variable reference and an outgoing variable reference. Thus, the pipe consists of, at least, a list of three values preceded by a pipe reference. An example of a simple pipe object is:

pipe, pipe # nn, donor-list, donee-list

Figure 110:
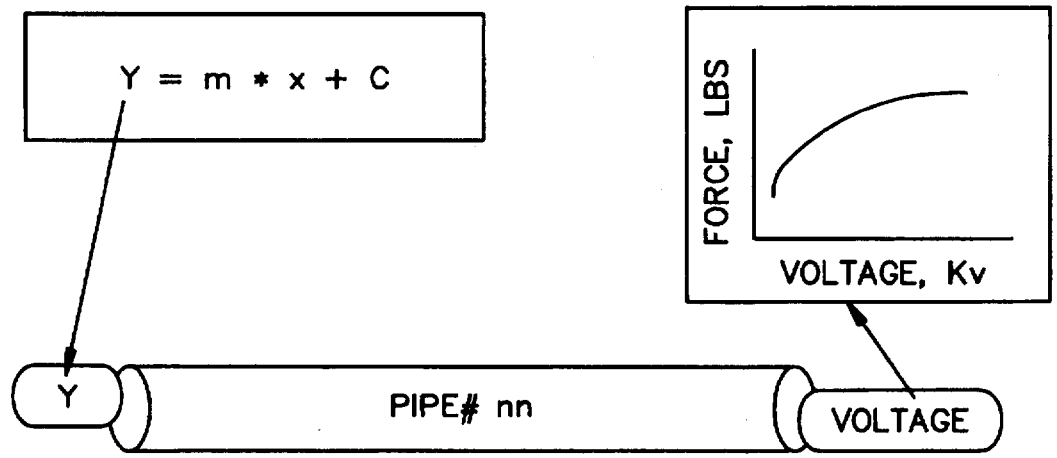

The first term in the list identifies it as a pipe or connector. The second item gives it a pipe or connector identifier. The next two lists show references to the incoming variables and the outcoming variable or variables. This is shown pictorially in FIG. 110. The pipe shown in FIG. 110 connects the output Y from an equation to the input "voltage" in a graph.

Figure 111:
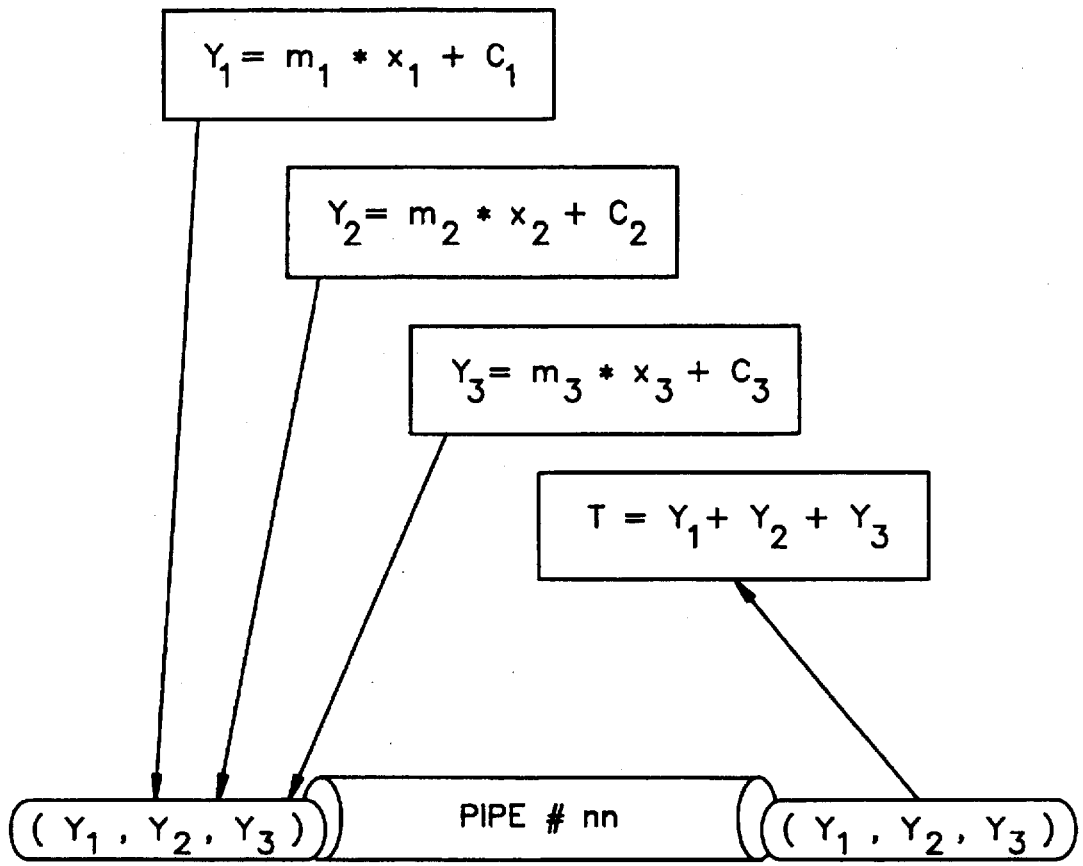

When there are multiple donors or donees the pipe structure identifies who donates what to whom. This is shown in FIG. 111.

With the use of these procedure representations, a procedure object can be defined. Using object-oriented programming paradigms, this procedure object is defined as a class, with a basic procedure class representing a simple type of procedure. Several defined classes are defined that allow for any type of procedure encountered in most situations as described in the foregoing description.

The procedure object will have other objects as component parts. These objects include the procedure name, the identification number, and component objects and pipes that connect the various objects. Footnotes, special notes, source references, and other qualifiers are defined as element classes. Together, all these objects allow for common procedures to be completely represented as objects, with a collection of appropriate procedure functions for manipulating these objects.

When a user wishes to develop a procedure of a certain type, the environment presents various predefined procedure templates and expects the user to paste in other relevant objects and type in the values. Other functions allow procedures to be created from other means. When a procedure is created in this fashion, and instantiation of the procedure object is made, it is given a name, stored, and the name entered into a dictionary as well as the list of procedures. It is also given one or more references to text where it is embedded. Such an environment does not require domain specialists to predefine the domain nor, a priori, procedures and domain-specific terminology to be given to a professional programmer. The user inputs data into procedures using predefined procedural templates, the environment including predefined methods for operating procedures. Consequently, manipulation of data into information in the procedures requires no special skills or knowledge of any programming language, and there are no hidden pieces of information that are not visible in the procedures.

XI. Tracers

A tracer is an essential part of any good programming environment. It is used to trace the path followed by a program in order to aid the user in debugging and fixing the program, if the program fails to run or fails to produce a desired result. Even in the case of successful programs, a trace can have beneficial side effects. For example, one can take a successfully assembled program and make changes to its variables, data, or procedures using the tracer to permit incremental alterations. The tracer can also help in obtaining programs that are slight variations of one another.

Figure 112:
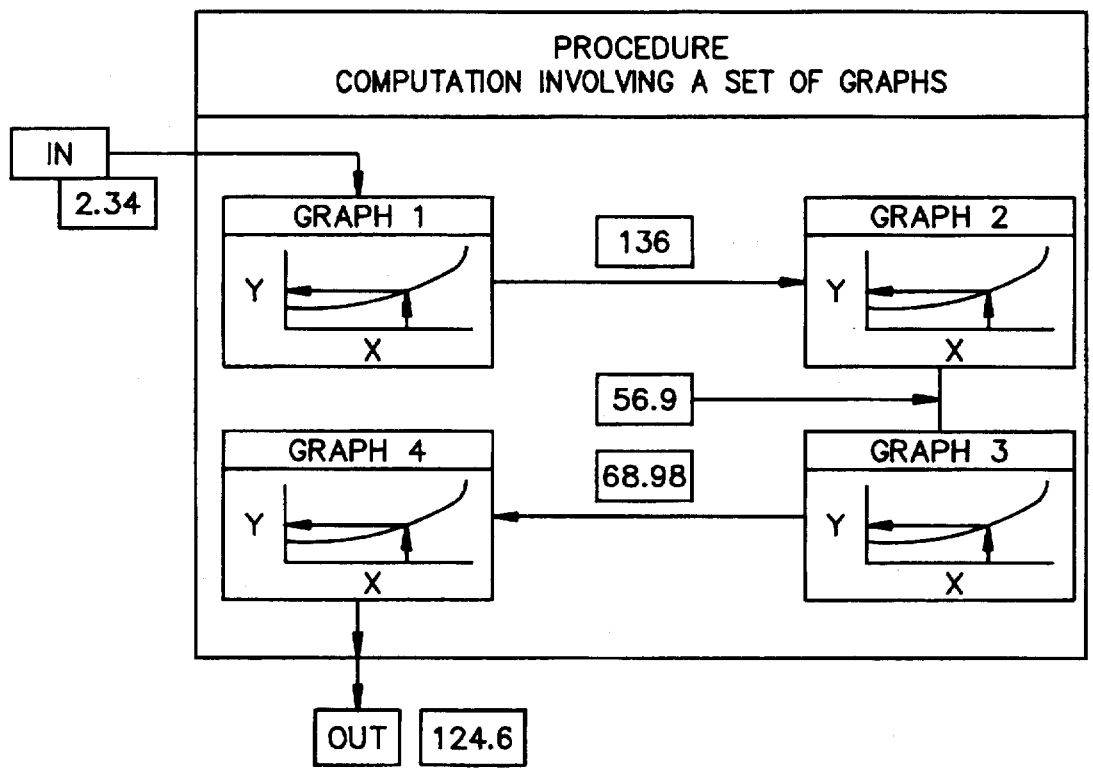
FIGS. 112 and 113 are diagrams illustrating the inclusion of tracers in the preferred system and environment.

A tracer in the preferred environment operates on all procedures, macros, other calculational features that make up a program. It is represented as an object class that consists of a list of lists, and has pointers to procedures and other objects that make up the program along with pipes or connections and intermediate results that are passed between calculation objects along the pipes or connectors. FIG. 112 illustrates a typical program trace.

Figure 113:
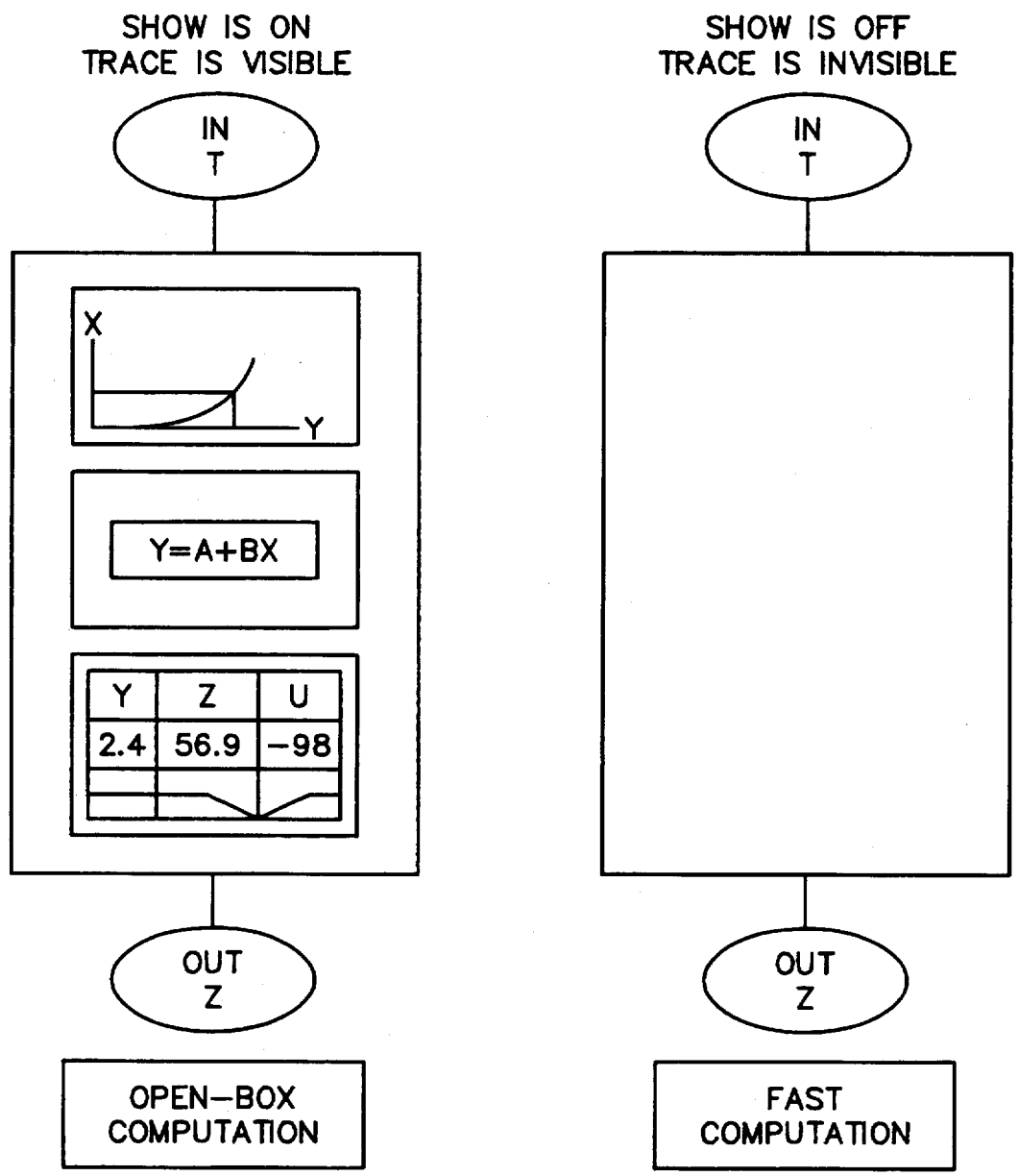

The tracer makes it possible to trace to any level by suppressing traces at lower object levels and activating them at higher object levels, as shown in FIG. 113. For example, a procedure dealing with the multiplication of two matrixes and resulting in a third matrix can be traced at the highest level with only the resulting matrix shown. Alternatively, the user is given the option of choosing to see each row or column as it is being computed or even to view each cell in the resulting matrix as it is being computed. The level of the trace depends on user choice. Ordinarily, one would expect that the lower levels of traces would be used only when objects are being developed.

XII. Schematics and Sketches

Figure 114:
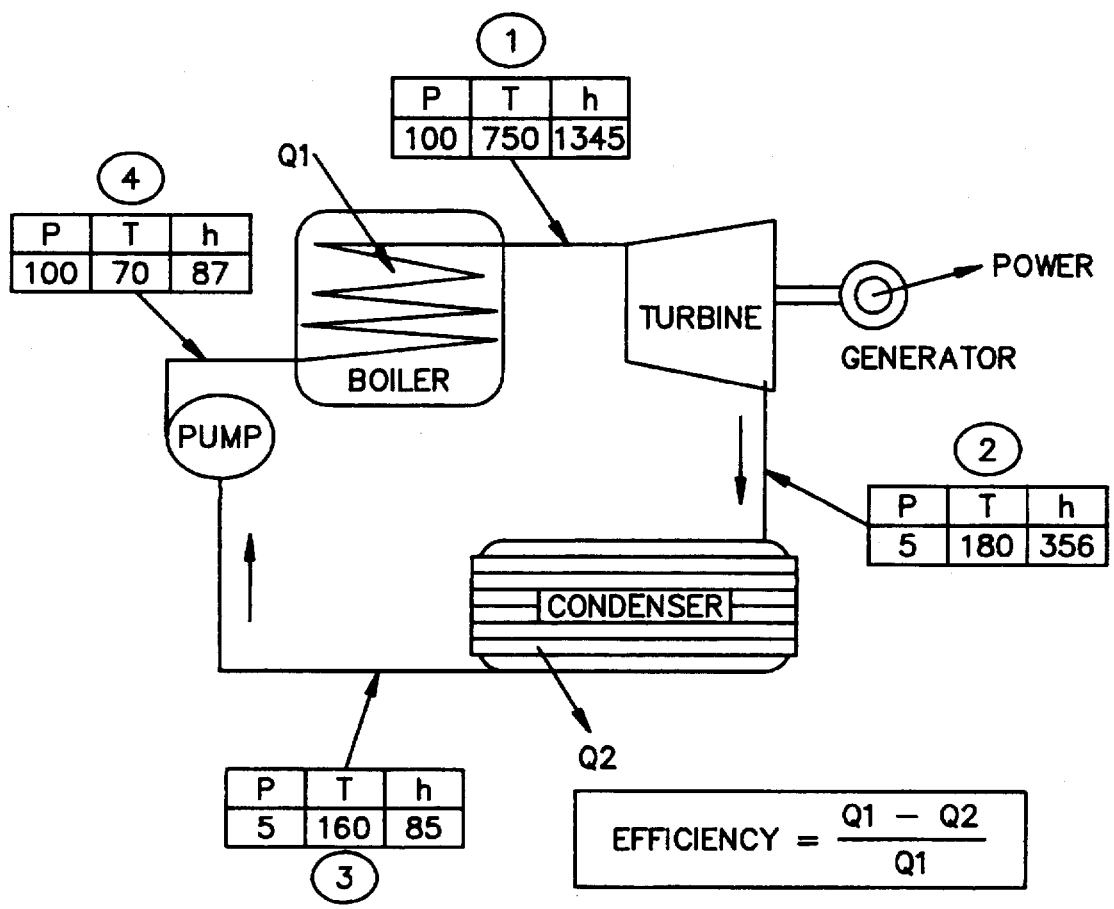
FIGS. 114–118 are representations of the various hierarchical levels involved in integrating sketches and schematics into the preferred system and environment.

An example of a schematic diagram is shown in FIG. 114. This example shows a thermal system which includes several processes. The fluid goes through several states as it moves around into and out of the components that make up the thermal system. The sketch includes property windows which indicate properties and their values under certain operating conditions, and which makes it possible to recall corresponding calculational elements such as equations, graphs, tables, or procedures and connect the schematic thereto. For example, an equation for the efficiency of the system is shown in a box on the schematic diagram of FIG. 114.

Figure 115:
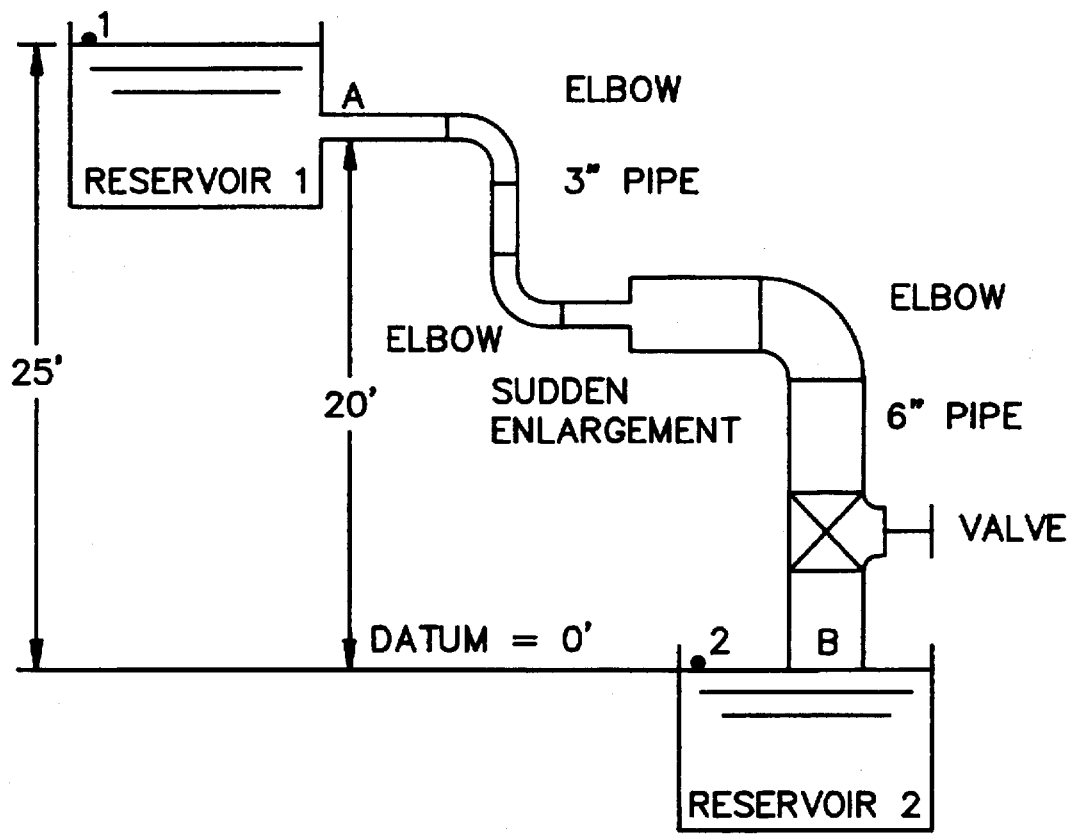

FIG. 115 gives another example of a schematic which illustrates a fluid flow system in which a fluid flows from reservoir 1 to reservoir 2 of the fluid flow, and the sketch makes the calculational methods more understandable by connecting equations and graphs to the pertinent points on the sketch. If the user wishes, the equations or calculational features can be superimposed on the schematic diagram. The key advantage of this facility is in the development of a greater degree of understanding of the corresponding calculational procedures to the underlying process flow, which improves the reliability and robustness of the calculations.

Figure 116:
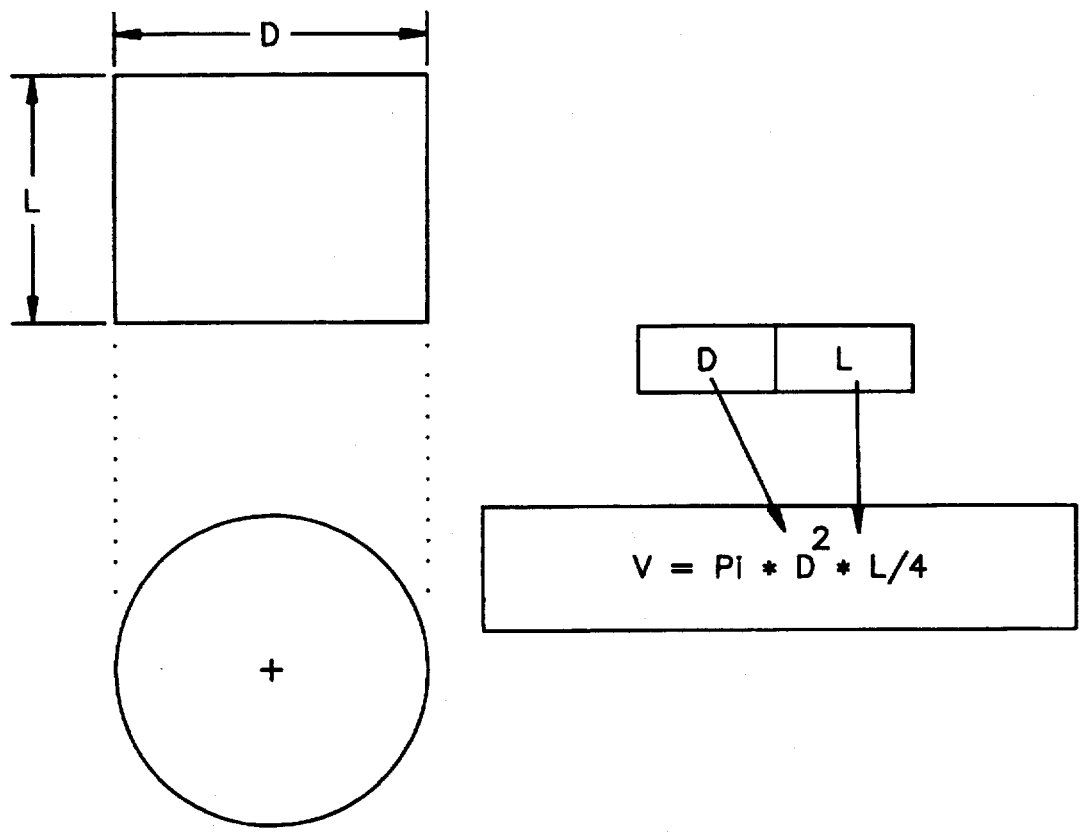

Sketches are similar to schematics. FIG. 116 shows an example of the manner in which a sketch is used to read dimensions into a calculation. Alternatively, the calculation can be used in creating a sketch. The example shown in FIG. 116 illustrates the principle of using sketches in combination with text and calculations. The sketch or drawing in this example has two principal dimensions. They can be connected to an equation as shown in the box in the figure to compute the volume of a cylinder. A user can place the cursor on the diameter (D) and length (L) variables, input values, and see the volume (V) value in an output window. Alternatively, a developer or user may input an equation for the surface area and check to see how the values are developed. A sketch can be embedded into text as in ordinary textbooks, with procedures in turn embedded into the sketch.

Figure 117:
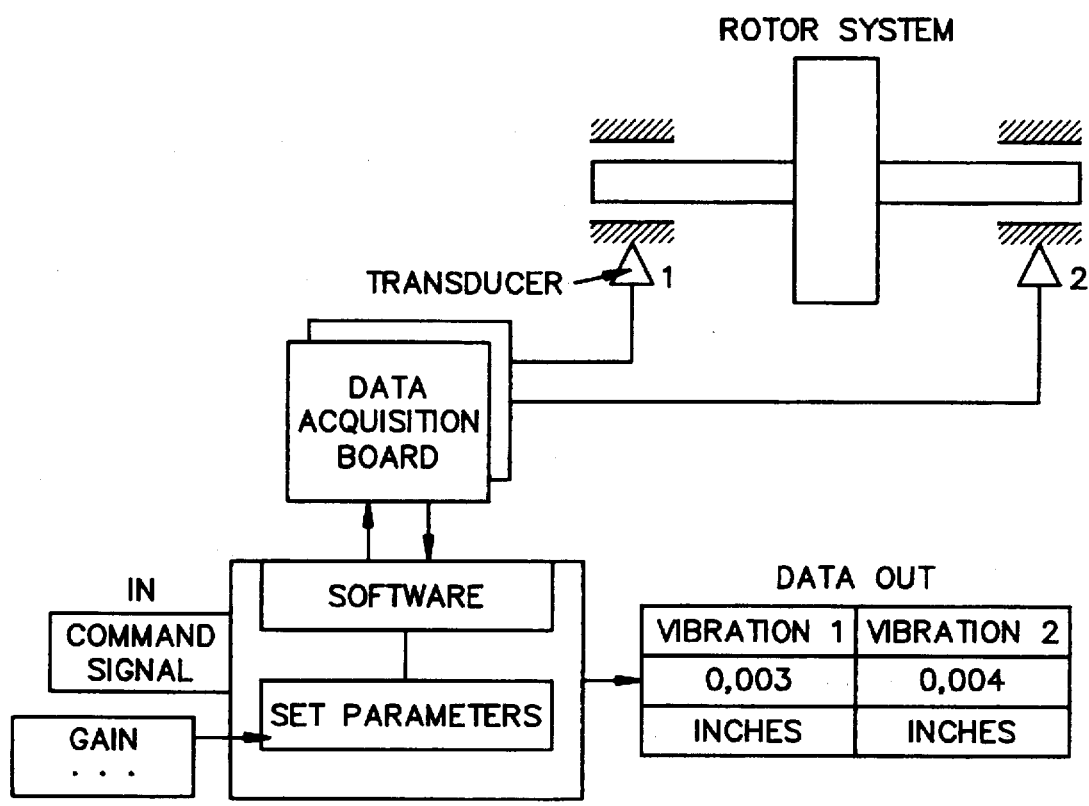

A particularly advantageous application of this feature involves commercial catalogs. Commercial catalogs currently include sketches of parts and give tables of descriptions of the product lines. In such catalogs, the sketches carry dimensions in terms of algebraic values, while the tables show sets of values corresponding to these and other algebraic variables. By presenting such catalogs in the preferred natural computing environment, the use of the catalogs will be greatly enhanced. The schematic facility can also be extended for the purpose of real-time monitoring in control systems as shown in FIG. 117, or as the first step towards building a drawing or computer aided design (CAD), computer aided manufacturing (CAM), or computer aided engineering (CAE) interface.

Figure 118:
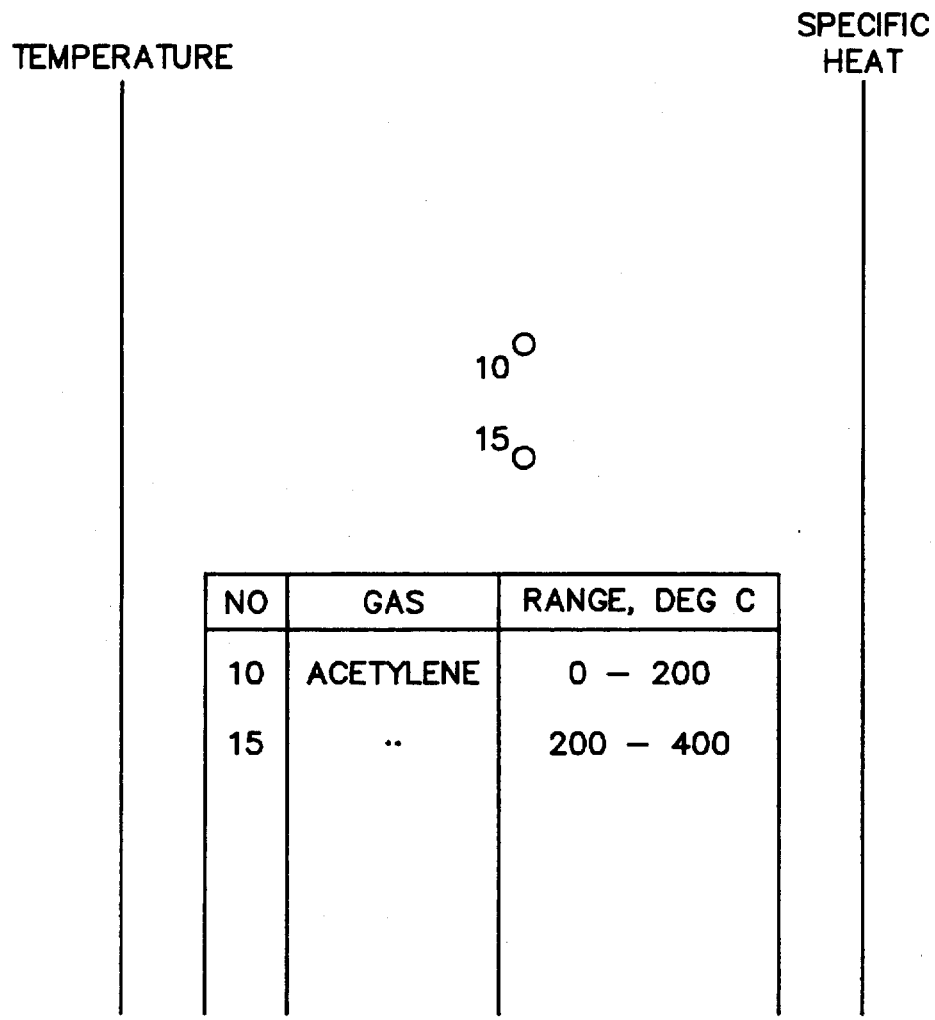

A related type of drawing is the nomograph, which is a graphic device that facilitates calculations. Quite often, nomographs are used in technical and science text books to represent experimental or other empirical relationships. The user draws specific types of lines and/or follows other directions and gets results to specific problems. FIG. 118 shows a typical nomograph. By providing nomograph capabilities, the preferred natural computing environment further simulates textbook capabilities.

XIII. High Level Storage and Display Capabilities

A. Storage of Objects (Memory 70 of FIG. 1C)

Figure 119:
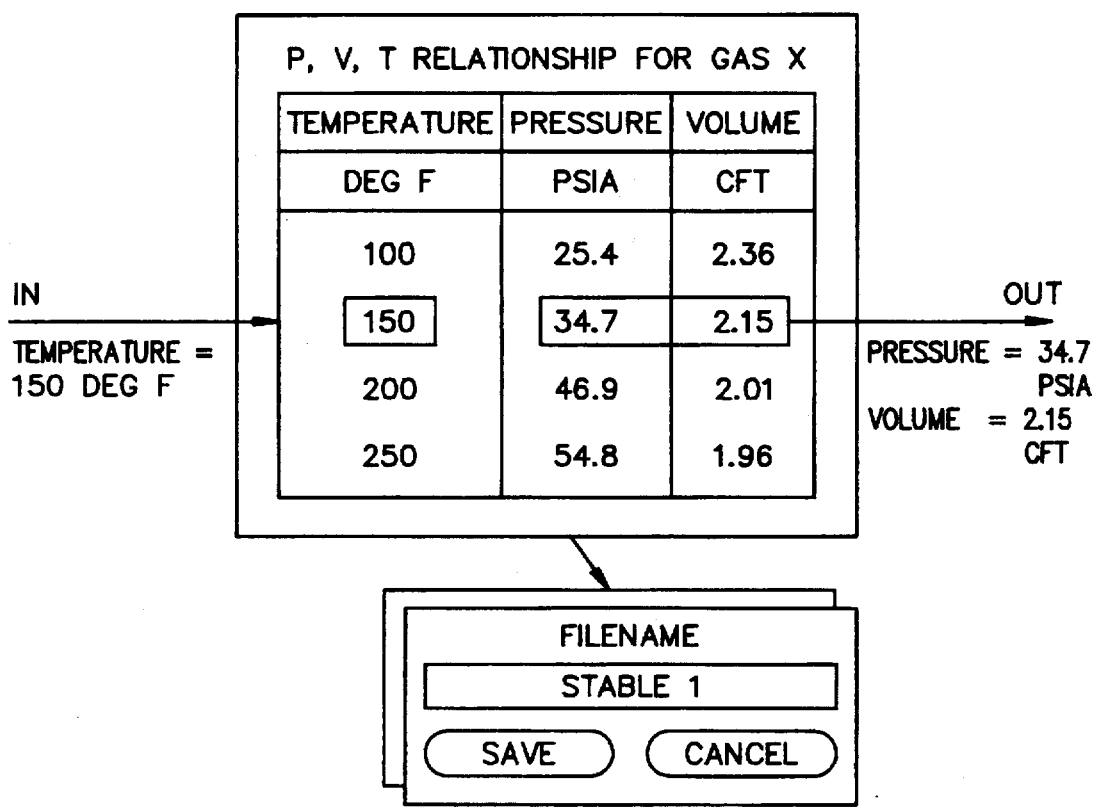
Figure 121:
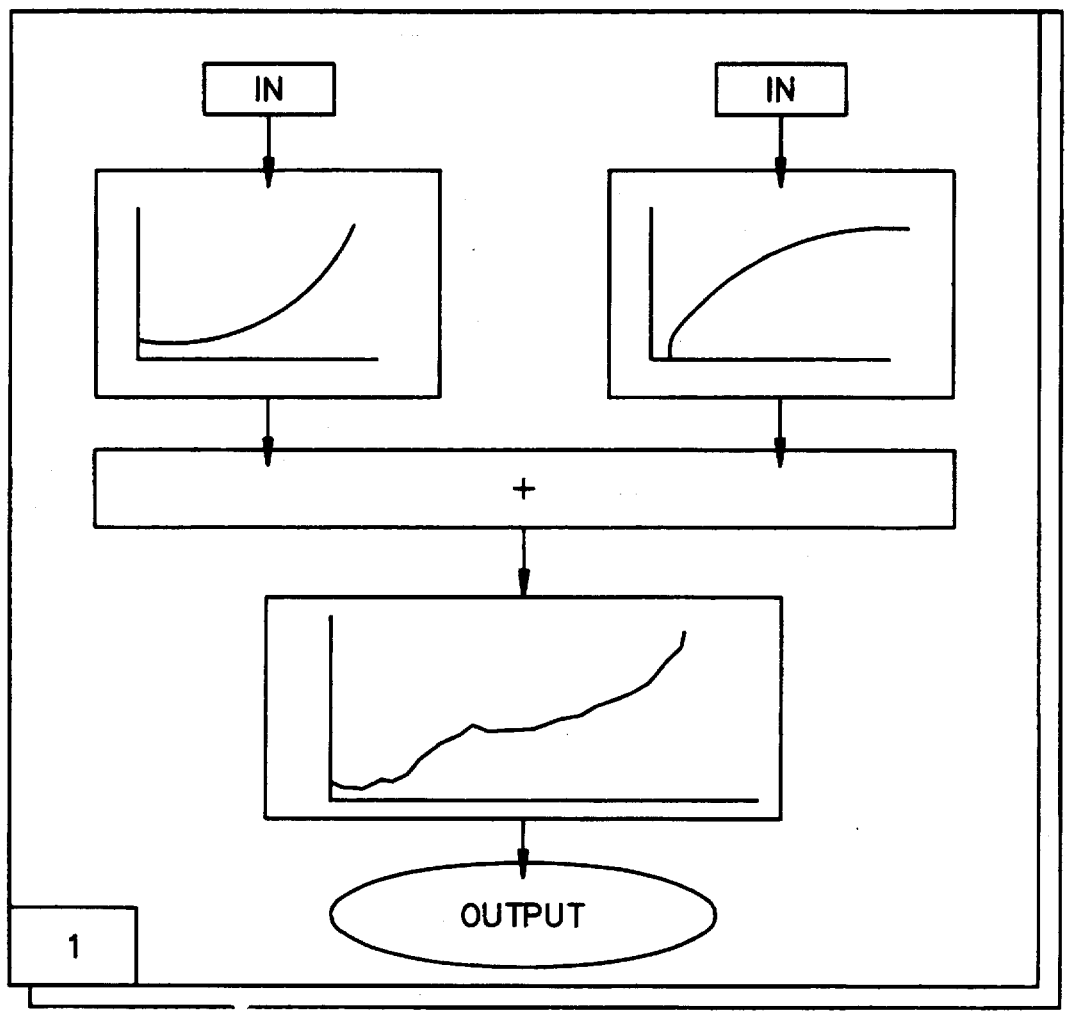

FIG. 119 shows a table to be saved and menu screen after the Save option and table feature have been selected from the Features and File menus, respectively, to initiate storage of the table. A pop-up menu has been revealed to input the name under which the table will be saved. As discussed above, a table object is defined in terms of various other objects and structures. Consequently, storage of the table consists of collecting these objects or references to the objects and storing a structure under the given name. FIG. 120 shows the structures and objects relevant to the storage of a graph object and FIG. 121 shows the process for storage of a procedure object. Since a procedure consists of other objects "graphs, table, equations, procedures, and pipes," a procedure object is stored by storing those objects.

It will be appreciated by those skilled in the art that an object also contains information on how it will be displayed, and such display information is stored simultaneously. However, it will also be appreciated that not all of the information needs to be stored with a particular object. Some information may be stored at the class level. For example, all configuration information can be stored at the class level. In other words, there is a standard display and storage scheme for a class of objects which will be stored with the class object. However, if a user changes any of the standard information, the optional information can be stored at lower hierarchical levels.

Despite the extensive use in the foregoing description of the terms "objects and classes," which are well-known to those skilled in the art of computer programming but which may not be familiar to many end-users, it should be appreciated that no knowledge of these concepts will be required of the user. From the user's vantage point, storage and retrieval of information are carried out solely through use of a table of contents and lists of the figures, tables, and notations, permitting access to these features in the same manner as the contents of a book are accessed.

In fact, in any particular system implementing the concepts described herein, the documents may be organized in what may be referred to as books, within which the text together with associated objects is organized into parts, sections, and subsections in a hierarchy. Lists of graphs, tables, equations, units strips, work sheets, spread sheets strips, templates and macros, other language program interfaces, procedures, tracers, notations, and schematics all can form part of the "book." With such an arrangement, a user will be able to easily determine what objects exist in the system. In addition, the user will know where they are embedded in the system (book) through a page reference or index and glossary having the capability of providing searches through key words. The structure of each object and the functions that connect objects enable a user to navigate and find his or her way through any combination of linked objects.

Figure 122:
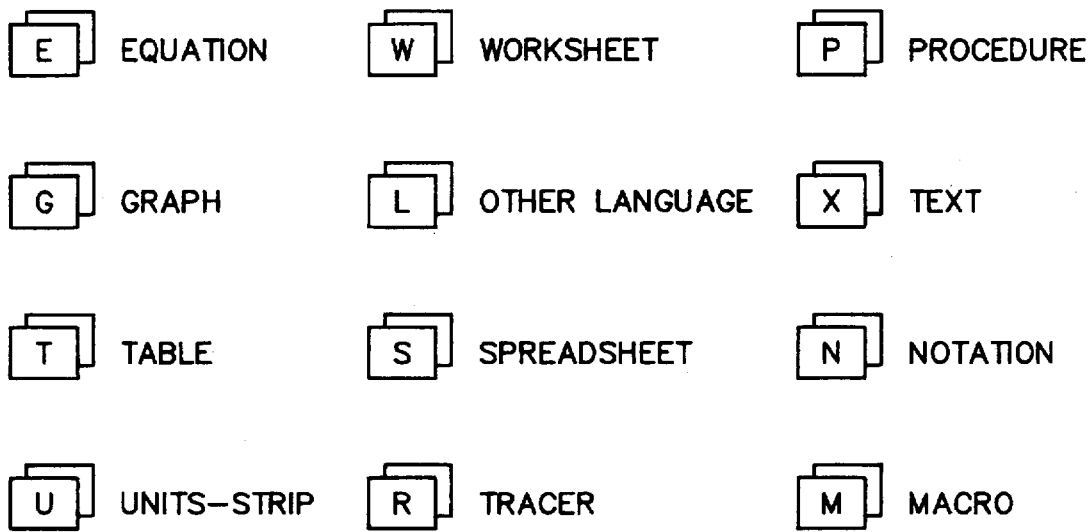
Figure 123:
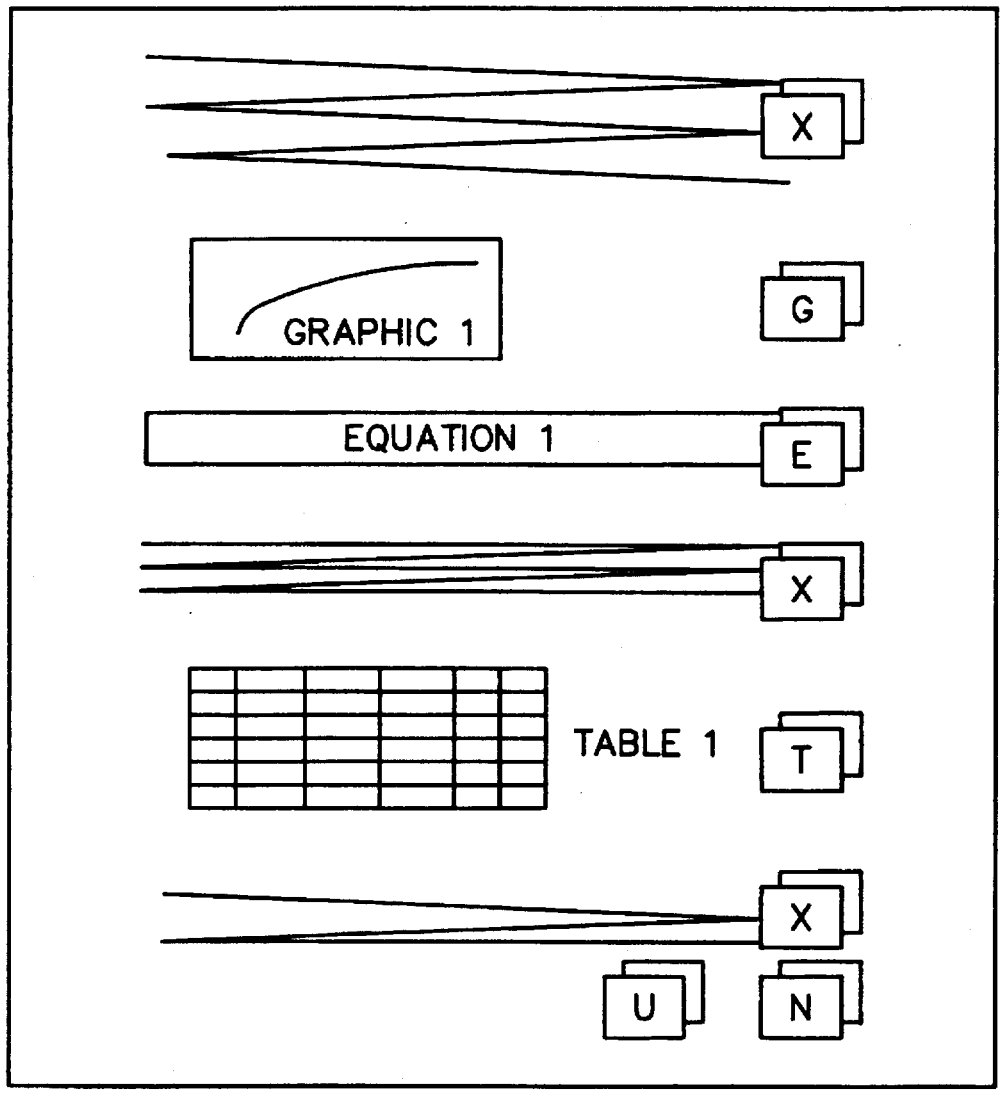

In the Show option for the Text feature, one can recall text and scan it, and see only the text file. In such a text file, the text equations, text tables, text charts, text graphs, and other text objects appear as they would in any natural text. Embedded objects, such as tables, graphs, equations and so forth are not visible in this text only mode, but rather can be made visible by a special menu option which makes them visible in terms of symbols depicting a particular object, as illustrated in FIG. 122. FIG. 123 shows an example of text with the object symbols revealed.

While reading text, the user can highlight and choose an embedded object for a full display of the details of that object because the preferred natural computing system provides for individual storage of objects while simultaneously connecting them to the text source of the object. Also at any time, an object such as a table or an equation can be called or highlighted as a focus object, and used as a computing object as described in the previous sections.

If a user wishes, an object can be chosen (focused) from a list of objects. An illustrative choice of an equation from a list of equations is shown in FIG. 124. While the text is being read, embedded objects are displayed, the equation object is brought into focus, and the focused object is displayed when chosen. Once displayed, the equation object can be used for interactive calculation or for any other permitted use. It will be noted that the illustrated equation object, in turn, may include a display of embedded object symbols (notations, constants, and units) which can optionally be chosen and displayed.

An object can also be chosen more directly from an index, the index containing key words just as in a text book, or from a list of all objects that contain the key word.

B. Display

Figure 125:
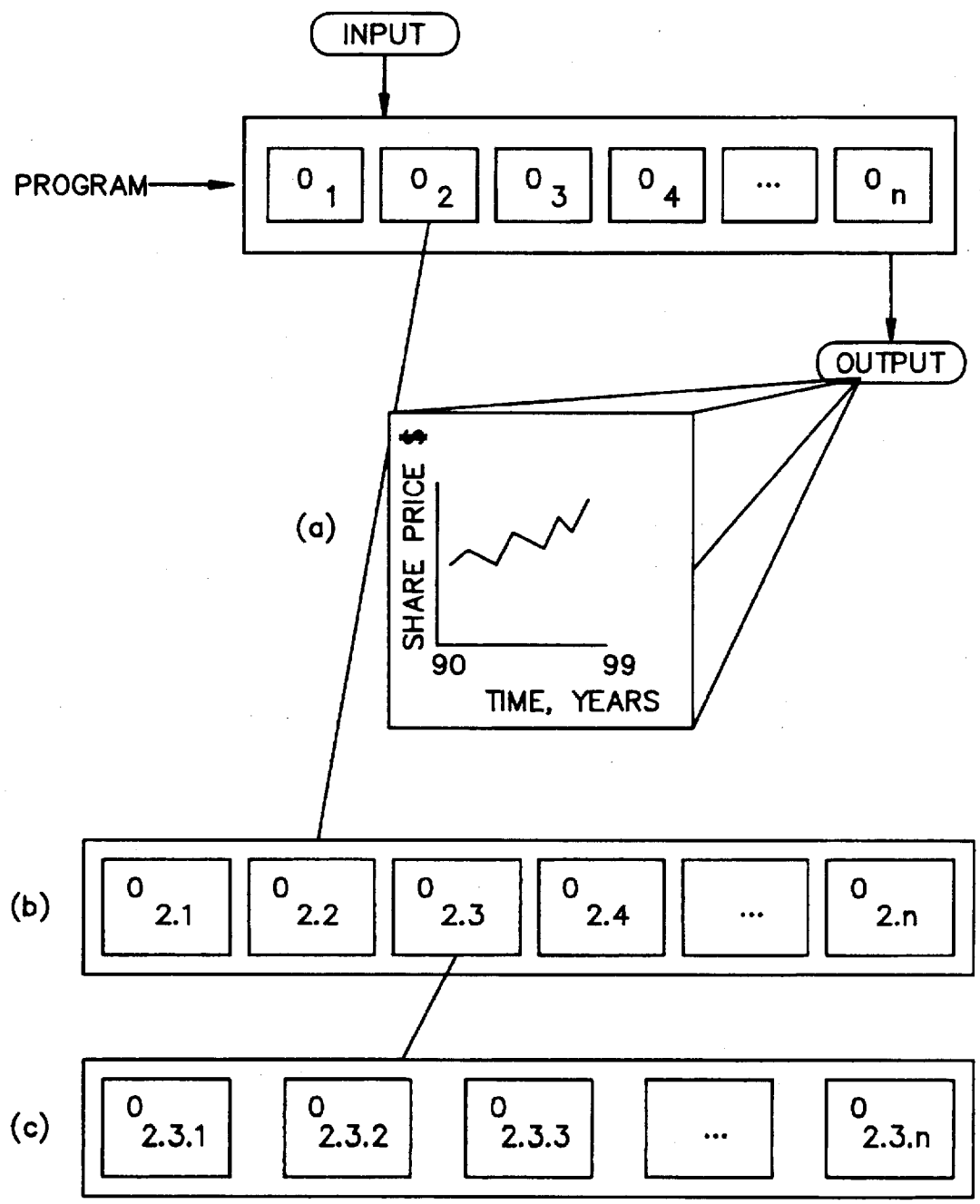

Unlike a traditional computing system which shows a set of final results, and which sometimes may be able to show some intermediate results if appropriate print or display statements are included in the program, the preferred environment includes options for printing or displaying all states at any time without the need for including specific print or display statements in the program. The simplest case, comparable to traditional programs, occurs when only the top level is displayed. This corresponds to the case when the final results are displayed. However, when an object is in a stage of creation, development, and testing, lower levels of display can also be turned on, and as each level is proven, turned off. This arrangement is illustrated in FIG. 125, in which a program is shown as a collection of objects with one input and one output indicated. In this figure, if no lower level display is turned on, only the final output will be displayed as shown at (a). However, if a display of object $O_2$ is turned on, as shown at (b), then the intermediate results are also displayed as the object $O_2$ is executed.

Figure 127:
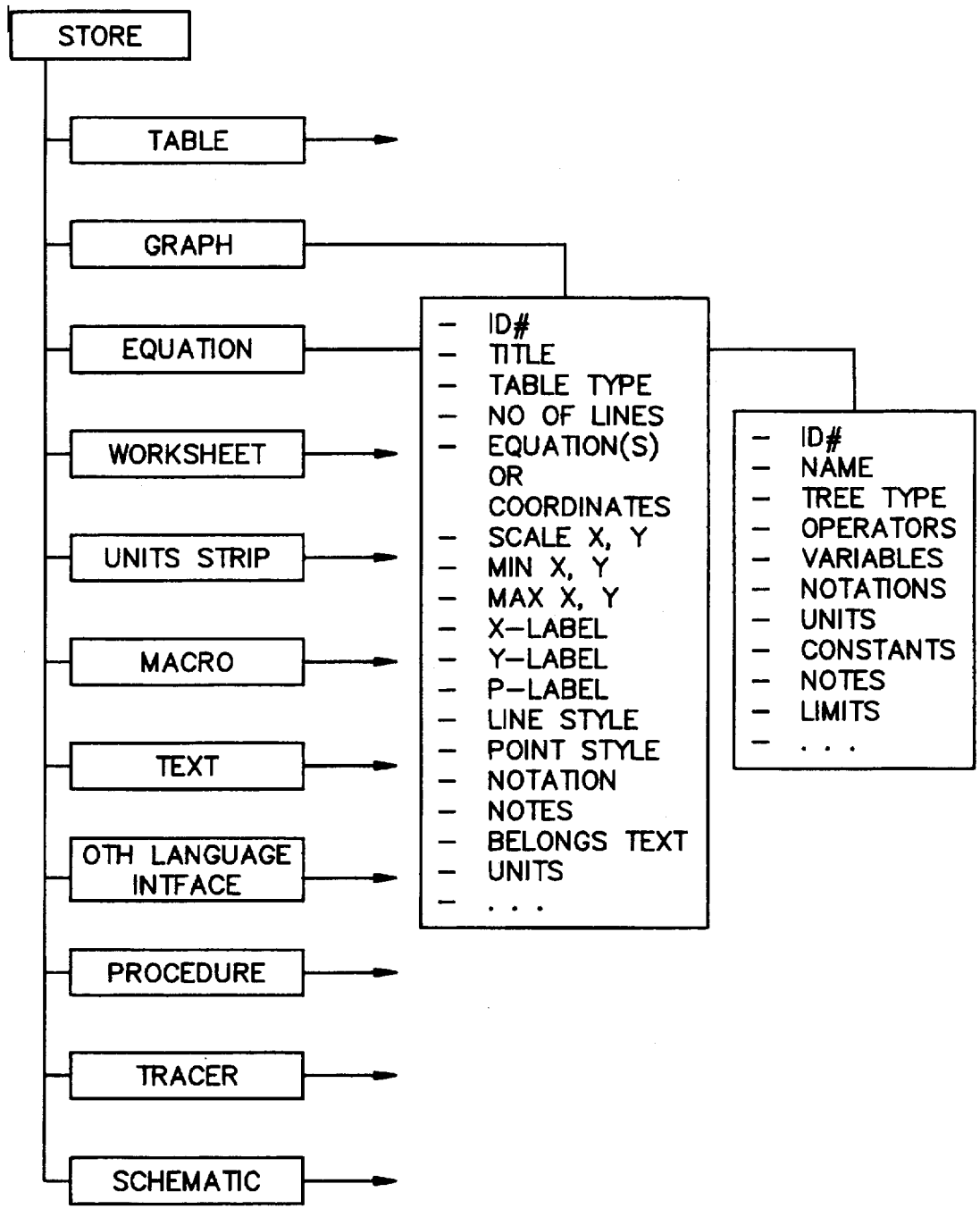

Many notations, constants, units, and other features will be global throughout a textbook and similarly can be defined either globally or locally in the preferred environment at any time. For example, for the situation in which user wishes to copy an equation from a list of equations, and the equation in question does not have its own notation, units and predefined constants, but rather shares them from a master list, procedures are provided to copy the equation and set up its attributes as the whole object is copied in the new object or environment, as illustrated in FIG. 126. FIG. 127 shows a comprehensive hierarchy of objects in storage which permits this option.

XIV. Summary

As a result of the above, people will for the first time be able to use equations, tables, graphs, work sheets, unit strips, and so forth in computers as if they were working on paper. The above-described features can easily be used in combination with procedures and programs without the need for a programmer, and can be embedded in text and recalled and used instantaneously. For the user or the developer of a solution to a computational problem, no further programming is required other than the manipulation of features in an inherently natural and intuitive manner. This represents a quantum leap in the ease-of-use and flexibility of computer computation methods. For the first time, an environment is available in which tools or features are preprogrammed and can be copied (instantiated), data filled in, and computations carried out without the need for any additional programming on the part of the user.

As an example, consider tables. No programming is required to either call a table object, instantiate it, or fill it with data. Once it is filled with data, it is ready to be used, given a name, and/or stored. Several such tables can be created and the tables can be manipulated by simply calling the set of functions that causes the desired operation to occur.

Figure 128:
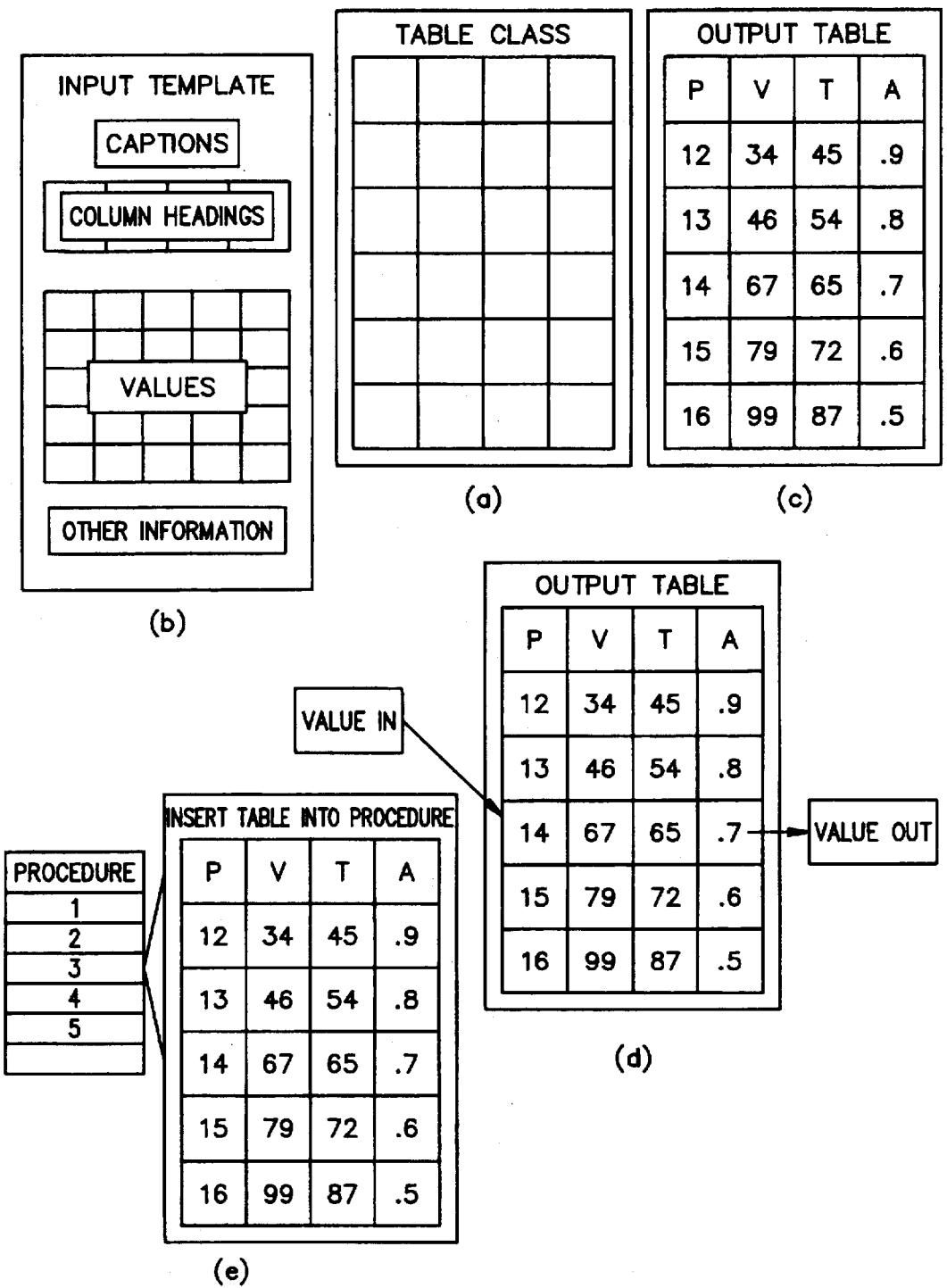
FIG. 128 is an illustration summarizing various tools available to a user of the preferred system and environment.
Figure 129:
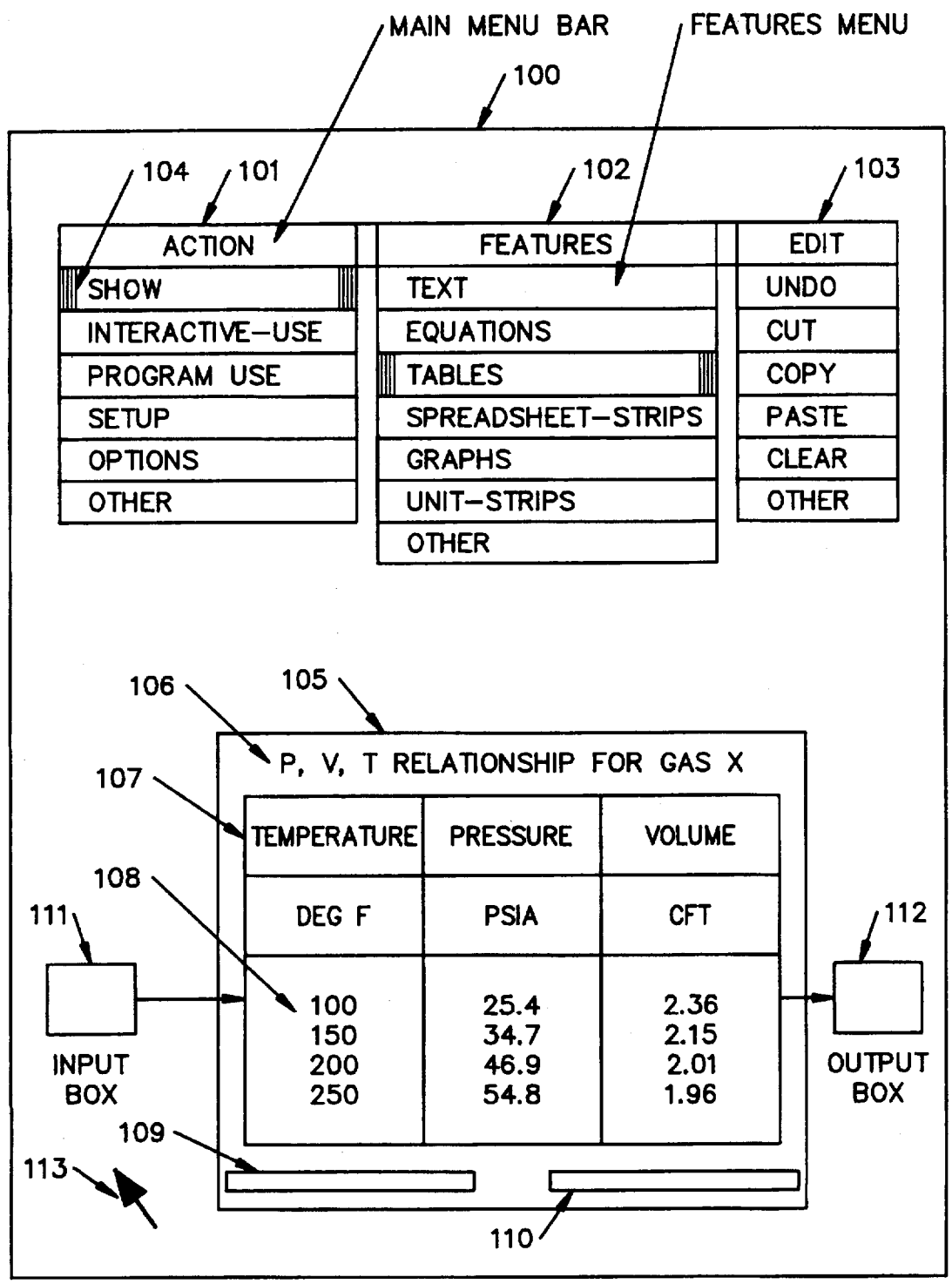
FIG. 129 is an illustration of a typical display screen as it would appear to a user of the preferred system and environment.

Instead of endless lines of opaque code, the user who wishes to develop a solution to a computational problem is presented with tools such as are summarized in FIG. 128. Use of these tools is made even easier by the use of menus, which are easily implemented by those skilled in the art, in relation to the objects. For example, in the case of tables, when the user turns on his or her computer, he is presented with a menu of the type shown in FIG. 129 and simply moves a cursor to call an appropriate action and feature. For example, the menu shown in FIG. 129 includes a main menu bar 101, an arrow shaped cursor 113, and the Action and Features menus on which Show and Tables have respectively been selected. The displayed table, as described in more detail above, includes a table caption 106, table header 107, table body 108, table footnote 109, and table other notes 110. The display also includes a table input box 111 and a table output box 112. Table structure demarcating the header, the rows, and the columns is also displayed, so that the table can be easily understood. In this example, the table footnotes and other-notes are blank.

Each of the other action options and features results in a similar display. The displays can be utilized in a completely intuitive and natural manner by the user.

It is anticipated that authors of textbooks and handbooks will use these facilities and provide all of their equations, tables, graphs, unit strips, work sheets and procedures pertinent to the subject matter in the preferred natural computing format. As these books are read in their computer format, the procedures will be readily available to the reader directly for use in computations, and will also be available for use with procedures given in other books. As a library of books in physics, chemistry, and various engineering disciplines becomes readily available in the preferred format for computations, and new technical papers are published, equations, tables, graphs, and procedures in those journals will simultaneously be made available to readers of the papers. As implied in the introductory portion of this specification, this will mean, for the first time, that computer programs will be developed simultaneously with the knowledge of the subject. The conventional lag between the generation of new scientific and technical knowledge and the programs utilizing that knowledge will be eliminated. Since users will be able to use procedures directly from the textbooks, or technical papers and handbooks, the need for programming professionals will be eliminated, at least from the applications programming area, adding to the efficiency of the economy and reducing the lead time for further generation of knowledge.

Having described such a system in sufficient detail to enable one skilled in the art to make and use it, it should nevertheless be appreciated that variations and modifications of the invention will occur to those skilled in the art, and therefore it is intended that the invention not be limited by the above description but rather that it be defined solely by the appended claims.

I claim:

1. A computational system, comprising:

means including first memory locations for storing data and information;

means including second memory locations for storing software objects;

said objects being selected from an objected group consisting of text, tables, graphs, equations, procedures, and sketches;

an input device;

a display device;

means including said input device and display device for enabling a user to create, manipulate, and interconnect said objects with no assistance from domain specific computer programs or application programmers and wherein said objects are arranged in a hierarchy of classes, each of which includes said objects representing features found in books, and selected from the group consisting of text, tables, graphs, equations, procedures, and sketches, and wherein said objects are implemented as classes following the object-oriented programming methods and languages, and wherein said objects are capable of receiving information and data from a user or another of said objects, and wherein said objects are capable information and data to a user or another of said object, and where each of said objects is capable of automatically performing its inherent calculation for said user in addition to displaying the functionality of said objects to said user,whereby a resultant solution to a user selected problem is automatically produced for said user.

2. A system as claimed in claim 1, wherein a plurality of said objects represent tables, the tables being decomposed into at least the following parts: table structure, table caption, table header, table body, table footnotes, and table othernotes.

3. A system as claimed in claim 2, wherein at least the table body is divided into cells and organized into adjacency lists for manipulation, and which include pointers to locations in said first memory locations which contain contents of said cells.

4. A system as claimed in claim 2, wherein the table header and table body are divided into cells, and wherein contents of the cells are independent of the first memory locations where the contents are stored.

5. A system as claimed in claim 1, wherein said objects represent graphs.

6. A system as claimed in claim 1, wherein said objects are equations.

7. A system as claimed in claim 1, wherein said objects are worksheets and spreadsheets strips.

8. A system as claimed in claim 1, wherein said objects are units strips.

9. A system as claimed in claim 1, wherein said objects include macros.

10. A system as claimed in claim 9, wherein said macros include templates for conditional statements selected from the group consisting of If-Then-Else, Do-loop, and Case statements.

11. A system as claimed in claim 1, wherein said objects include forms and flowcharts.

12. A system as claimed in claim 1, further comprising means for embedding said objects in text, means for connecting said embedded objects through procedures, and means for embedding said procedures in said text.

13. A system as claimed in claim 1, further comprising means for embedding said objects in other objects.

14. A system as claimed in claim 1, further comprising means for combining text with symbols which permit a feature object to be called as the text is displayed.

15. A system as claimed in claim 1, further comprising means including connectors for transferring values from one object to another object, thereby permitting procedures to be developed.

16. A system as claimed in claim 1, wherein said objects are schematics and sketches.

17. A system as claimed in claim 1, further comprising additional input and display devices for use in a networked or multi-user environment.

18. A method of using a computer to solve a computational problem, comprising the steps of:

predefining generic objects selected from the group consisting of tables, graphs, equations, text, units strips, worksheets, spreadsheets, templates, macros, sketches, schematics and procedures;

implementing said objects as classes following the object-oriented programming methods and languages, wherein said objects are used for calculations in addition to displaying functionality of said objects;

defining said objects to behave like their paper counterparts;

enabling the objects to perform calculations;

displaying said objects in stand-alone fashion;

combining said objects into procedures for solving the problem using data connecting pipes;

storing said objects in memory;

retrieving said objects from memory; enabling a user to create, manipulate, and interconnect said objects with no assistance from domain specific computer programs or applications programmers;

making said objects capable of receiving information and data from a user or another of said objects;

making said objects capable of passing information and data to a user or another of said objects; embedding said objects mutually in one another and in text;

selecting and highlighting any of said previously embedded objects; entering domain-specific information and data into said generic objects to create domain-specific objects;

making each of said objects capable of automatically performing its inherent calculation for said user in addition to displaying the functionality of said objects to said user, whereby a resultant solution to a user selected problem is automatically produced for said user.

19. A method as claimed in claim 18, further comprising the steps of testing one of said objects for its isolated behavior; identifying limitations; and including restrictions on input or output values in order to prevent errors from propagating through said procedures.

20. A method as claimed in claim 18, further comprising the step of arranging said objects in a hierarchy of classes, each of said classes including objects representing features found in books.

21. A method as claimed in claim 18, further comprising the step of representing tables as a plurality of said objects decomposed into different table parts.

22. A method as claimed in claim 21, further comprising the steps of dividing at least a table body into cells and organizing the cells into adjacency lists for manipulation, wherein the cells include pointers to memory locations which contain contents of said cells.

23. A method as claimed in claim 18, further comprising the step of embedding said objects in text, and representing said objects as symbols which can be selected to display a respective object for manipulation in conjunction with information contained in said text.

24. A method as claimed in claim 18, further comprising the steps of embedding said objects in text, connecting said embedded objects through procedures, and embedding said procedures in said text.

25. A system as claimed in claim 18, further comprising the steps of embedding said objects in other objects.

26. An interactive electronic book, comprising:

a memory;

means for displaying contents of the memory in the form of text and objects embedded in the text simultaneously;

means for identifying said objects in said text; and means for allowing a user to manipulate said objects with no assistance from domain specific computer programs or applications programmers while reading said text wherein said objects are selected from the group consisting of tables, graphs, equations, units strips, worksheets, spreadsheets, templates, macros, sketches, and schematics.

27. An electronic book as claimed in claim 26, wherein said book is a textbook.

28. An electronic book as claimed in claim 26, wherein said book is a handbook.

29. An electronic book as claimed in claim 26, wherein said book is a catalog of parts, and said objects include tables of data concerning the parts.

30. An electronic book as claimed in claim 26, further comprising means for combining said objects into procedures for solving a computational problem using object connecting pipes.

31. An electronic book as claimed in claim 26, further comprising means for suppressing said symbols such that said text and objects are displayed as they would be displayed on a printed page.

32. An electronic book as claimed in claim 26, wherein said object identifying means comprises means for finding an object based either on a position of said object in said text or from a list of said objects.

33. An electronic book as claimed in claim 26, further comprising means for embedding said objects in text, means for connecting said embedded objects through procedures, and means for embedding said procedures in said text in order to provide an interactive electronic book.

34. A menu-driven process for solving computational problems using a computer, in which menus are used to select objects for viewing or manipulation, the objects appearing to the user as features found in books.

35. A process as claimed in claim 34, wherein said objects are arranged in a hierarchy of classes representing features of said objects for individual manipulation in a manner which simulates the manner in which book features are manipulated.

36. A process as claimed in claim 34, wherein said objects include inputs and outputs for data and information, said objects being usable either in stand-alone form or as part of programs or procedures.

37. A process as claimed in claim 34, wherein said objects are selected from the group consisting of tables, graphs, equations, and sketches.

38. A process as claimed in claim 34, wherein said objects are embedded in text and selectable either from a list of said objects or based on a location in said text.

39. A process as claimed in claim 34, wherein said objects are embedded in text, connected through procedures, and wherein said procedures are also embedded in said text.

* * * * *